US008898628B2

(12) United States Patent
Raza

(10) Patent No.: US 8,898,628 B2
(45) Date of Patent: Nov. 25, 2014

(54) METHOD AND AN APPARATUS FOR DEVELOPING SOFTWARE

(75) Inventor: Ahmad Raza, Lahore (PK)

(73) Assignees: Ahmad Raza, Lahore (PK); Sheikh Afzaal Ahmed, Lahore (PK)

( * ) Notice: Subject to any disclaimer, the term of this patent is extended or adjusted under 35 U.S.C. 154(b) by 269 days.

(21) Appl. No.: 13/242,558

(22) Filed: Sep. 23, 2011

(65) Prior Publication Data

US 2013/0080995 A1    Mar. 28, 2013

(51) Int. Cl.
    *G06F 9/44*         (2006.01)

(52) U.S. Cl.
    CPC ..................................... *G06F 8/35* (2013.01)
    USPC ...................................................... 717/107

(58) Field of Classification Search
    CPC ................................... G06F 8/35; G06F 8/36
    USPC ...................................................... 717/107
    See application file for complete search history.

(56) References Cited

U.S. PATENT DOCUMENTS

| | | | |
|---|---|---|---|
| 4,156,903 A | 5/1979 | Barton et al. | |
| 4,156,908 A | 5/1979 | Missios et al. | |
| 4,156,909 A | 5/1979 | Barton et al. | |
| 4,156,910 A | 5/1979 | Barton et al. | |
| 4,621,340 A | 11/1986 | Pokorny et al. | |
| 4,901,274 A | 2/1990 | Maejima et al. | |
| 4,949,253 A | 8/1990 | Chigira | |
| 5,005,119 A | 4/1991 | Rumbaugh et al. | |
| 5,327,569 A | 7/1994 | Shima et al. | |
| 5,379,432 A | 1/1995 | Orton | |
| 5,485,601 A | 1/1996 | Ching | |
| 5,526,522 A | 6/1996 | Takeuchi | |
| 5,649,181 A | 7/1997 | French et al. | |
| 5,764,989 A | 6/1998 | Gustafsson | |
| 5,768,480 A | 6/1998 | Crawford | |
| 5,778,377 A | 7/1998 | Marlin et al. | |
| 5,819,287 A | 10/1998 | Tsuoka | |
| 5,892,902 A | 4/1999 | Clark | |
| 6,003,037 A | 12/1999 | Kassabgi et al. | |
| 6,035,300 A | 3/2000 | Cason | |
| 6,070,165 A | 5/2000 | Whitmore | |
| 6,117,188 A * | 9/2000 | Aronberg et al. | 717/176 |
| 6,138,268 A | 10/2000 | Negoro | |
| 6,253,366 B1 | 6/2001 | Mutschler | |
| 6,289,501 B1 | 9/2001 | Mutschler, III | |
| 6,381,743 B1 | 4/2002 | Mutschler, III | |
| 6,430,609 B1 | 8/2002 | Dewhurst | |

(Continued)

OTHER PUBLICATIONS

Caldiera et al., "identifying and qualifying reusable software components", Feb. 1991, IEEE.*

(Continued)

*Primary Examiner* — Anna Deng
*Assistant Examiner* — Junchun Wu
(74) *Attorney, Agent, or Firm* — Staas & Halsey LLP

(57) ABSTRACT

A software component, is constructed on the basis of a set of predetermined rules, and by utilizing a source object, a token value and a parameter, wherein the source object is stored in a source object repository, and wherein the source object comprises a component value and/or a token value, wherein the component value may be associated with the token value. For constructing the software component, the token value is processed and a token result, obtained by processing the token value, is utilized for constructing the software component, wherein the parameter may also be utilized for the processing of the token value and/or constructing the software component.

41 Claims, 96 Drawing Sheets

(56) References Cited

U.S. PATENT DOCUMENTS

| | | |
|---|---|---|
| 6,502,102 B1 | 12/2002 | Haswell |
| 6,513,154 B1 | 1/2003 | Porterfield |
| 6,523,172 B1 | 2/2003 | Martinez-Guerra et al. |
| 6,550,052 B1 | 4/2003 | Joyce et al. |
| 6,634,019 B1 | 10/2003 | Rice |
| 6,694,505 B1 | 2/2004 | Tan |
| 7,039,898 B2 | 5/2006 | Shah |
| 7,130,863 B2 | 10/2006 | Diab |
| 7,137,100 B2 | 11/2006 | Iborra |
| 7,171,656 B2 | 1/2007 | Keim |
| 7,210,130 B2 | 4/2007 | Fairweather |
| 7,266,565 B2 | 9/2007 | Diab |
| 7,272,615 B2 | 9/2007 | Li et al. |
| 7,318,216 B2 | 1/2008 | Diab |
| 7,356,482 B2 | 4/2008 | Frankland et al. |
| 7,383,272 B2 | 6/2008 | Krishnan et al. |
| 7,383,531 B2 | 6/2008 | Brigham, II et al. |
| 7,484,219 B2 | 1/2009 | Mitra |
| 7,509,654 B2 | 3/2009 | Jennings et al. |
| 7,689,701 B2 * | 3/2010 | Hollingsworth ............... 709/229 |
| 2001/0044932 A1 | 11/2001 | Hashimoto |
| 2001/0052112 A1* | 12/2001 | Mohan et al. ..................... 717/1 |
| 2004/0100495 A1 | 5/2004 | Brockway |
| 2004/0205699 A1 | 10/2004 | Keim |
| 2005/0044398 A1* | 2/2005 | Ballinger et al. ............. 713/200 |
| 2005/0065970 A1* | 3/2005 | King et al. .................... 707/102 |
| 2006/0130038 A1* | 6/2006 | Claussen et al. .............. 717/168 |
| 2006/0218523 A1* | 9/2006 | Tatsumi et al. ............... 717/106 |
| 2006/0248449 A1* | 11/2006 | Williams et al. ............. 715/513 |
| 2007/0239762 A1 | 10/2007 | Farahbod |
| 2007/0261025 A1* | 11/2007 | Seto et al. ..................... 717/108 |
| 2008/0201690 A1* | 8/2008 | Lovisa et al. ................. 717/107 |
| 2008/0256505 A1 | 10/2008 | Chaar |
| 2009/0094577 A1 | 4/2009 | Fachat |
| 2010/0023924 A1 | 1/2010 | Meijer |
| 2012/0167039 A1* | 6/2012 | Williams et al. .............. 717/107 |

OTHER PUBLICATIONS

Liu et al., "An XML-enabled data extraction toolkit for web sources", 2001, Elsevier Science Ltd.*

PCT International Search Report (ISR) (PCT/ISA/210) issued Dec. 10, 2012 in corresponding PCT International Patent Application No. PCT/IB2012/001736 (4 pages).

PCT Written Opinion of the International Searching Authority (PCT/ISA/237) issued Dec. 10, 2012 in corresponding PCT International Patent Application No. PCT/IB2012/001736 (7 pages).

Jos Warmer, Anneke Kleppe, "6th OOPSLA Workshop on Domain Specific Modeling," Building a Flexible Software Factory Using Partial Domain Specific Models, 2006, pp. Nos. 15 to 22.

Christer Fernstrom, "The Eureka Software Factory: Concepts and Accomplishments," mid 1991, pp. Nos. 23 to 36.

G. Cantone, "Software Factory: Modeling the Improvement", University of Rome "Tor Vergata", Italy, mid 1991, pp. Nos. 124 to 129.

Kevin L. Mills, "Reusing Software Design Expertise," INFT 960 Spring 1994 Expert Database Systems School of Information Technology and Engineering George Mason University, Complete Paper, Specifically: pp. Nos. 7 to 21, pp. Nos. 33 to 71, pp. Nos. 85 to 88.

Alexander S. Narin'Yani, "Intelligent Software Technology for the New Decade," Jun. 1991/vol. 34, No. 6, pp. Nos. 60 to 67.

Don Batory, "Intelligent Components and Software Generators," Department of Computer Sciences University of Texas at Austin, Feb. 1997, pp. Nos. 1 to 14.

Eric Steven Raymond, "The Art of Unix Programming", Chapter 9—Data Driven Programming [online], [retrieved Jan. 30, 2011]. Retrieved from the Internet< URL: http://www.faqs.org/docs/artu/ch09s01.html>.

Paragon Corporation, "Table Driven and Data Driven Programming" complete article [online], [retrieved Nov. 29, 2010]. Retrieved from the Internet:< URL: http://www.paragoncorporation.com/ArticleDetail.aspx?ArticleID=31>.

Irene Garrogos, Christian Cruze, Jaime Gomez, Florian Daniel, Maristella Matera, Alessandro Morandi, Matteo Mortari, Giuseppe Pozzi, Michael Grossnoklaus, and Moria Norrie, "7th International Conference on Web Engineering 2007," Como, Italy, Jul. 16-20, 2007, pp. Nos. 13 to 56.

Martin L. Griss and Kevin D. Wentzel, "Hybrid domain-specific kits for a flexible software factory," Hewlett-Packard laboratories—1994, pp. Nos. 47 to 52.

Minder Chen, Jay F. Nunamaker Jr., E. Sue Weber, "Computer-Aided Software Engineering: Present Status and Future Directions," Database Print 1989, pp. Nos. 7 to 12.

William Mark, Sherman W. Tyler, James McGuire, and Jon L Schlossberg, "Commitment Based Software Development," IEEE Transactions of Software Engineering, vol. 18, No. 10, Oct. 1992, pp. Nos. 870 to 884.

Jack Greenfield and Keith Short, "Software Factories Assembling Applications with Patterns, Models, Frameworks and Tools", OOPSLA'03, Oct. 26-30, 2003, Anaheim, California, USA, pp. Nos. 16-27.

Kent Swanson, Dave McComb, Jill Smith, and Don McCubbery, "The Application Software Factory: Applying Total Quality Techniques to Systems Development," MIS Quarterly, Dec. 1991, pp. Nos. 567 to 579.

Alfonso Fuggeta, Luigi Lavazza, Sandro Morasca, Stefano Cinti, Giandomenico Oldano, and Elena Orazi, "Applying GQM in an Industrial Software Factory," ACM Transactions of Software Engineering and Methodology, vol. 7, No. 4, Oct. 1998, pp. Nos. 411 to 448.

Thomas A. Standish, "An Essay on Software Reuse," IEEE Transaction on Software Engineering, vol. SE-10, No. 5, Sep. 1984, pp. Nos. 494 to 497.

Jahangir Karimi, "An Asset Based Systems Development Approach to Software Reusability," MIS Quaterly/Jun. 1990, pp. Nos. 179 to 196.

Yoshihiro Matsumoto, Kiyoshi Agusa, and Tsuneo Ajisaka, "A Software Process Model Based on Unit Workload Network," Dept. Information Science, Kyoto University, 606 Japan, 1990, pp. Nos. 95 to 97.

Ahmad Raza, "Data Driven Programming", Journal of the Institute of Electrical & Electronics Engineers Pakistan, vol. XXIV Apr.-Dec. 1993, pp. Nos. 35 to 43.

W. Pedrycz, J.F. Peters, et al. "Design of a Software Quality Decision System: A Computational Intelligence Approach," Department of Electrical and Computer Engineering, and Department of Business Computing, University of Winnipeg; 1998, IEEE (Abstract only).

Stefano Ceri, et al., "Data and Web Management Research at Politecnico di Milano," vol. 36, No. 4, SIGMOD Record, Dec. 2007, (p. 43 only).

Jane Siegel et al., "Interactive Electronic Technical Manuals (IETMs) Annotated Bibliography," Oct. 22, 2002, School of Computer Science, Carnegie Mellon University, PA 15213-3890, (abstract only).

"Software Factories, Industrialized Software Development," [online], [retrieved Mar. 25, 2011] Retrieved from the Internet:< URL: http://www.softwarefactories.com/>.

"The Web Service Software Factory 2010," [online], [retrieved Mar. 25, 2011] Retrieved from the Internet:< URL: http://www.msdn.microsoft.com/en-us/libaray/ff699400(d=printer).aspx>.

Jack Greenfield, "Software Factories: Assembling Applications with Patterns, Models, Frameworks, and Tools," Microsoft Corporation, [online], [retrieved Mar. 25, 2011] Retrieved from the Internet:< URL: http://www.msdn.microsoft.com/en-us/libaray/ms954811(d=printer).aspx>.

International Preliminary Report on Patentability—Chapter II of PCT (Forms PCT/IPEA/416 and PCT/IPEA/409) mailed Mar. 27, 2014 in corresponding International Application No. PCT/IB2012/001736 (51 pages).

* cited by examiner

| | |
|---|---|
| WHERE | 471a |
| GROUP | 471b |
| UNION ALL | 471c |
| fldAlaGrp | 471e |
| IIF | 471f |
| SUM | 471g |
| INNER | 471h |
| LEFT | 471i |
| JOIN | 471j |
| plus sign | 471m |
| DECODE | 471n |
| whrXpr | 472a |
| fldNamCol | 472b |
| fldAla | 472c |
| fldXpr | 472d |
| srcAla | 472e |
| fldNamCnd | 472g |
| value | 472h |
| true-result | 472i |
| false-result | 472j |
| table-name | 472k |
| fldAla1 | 472m |
| srcAla2 | 472n |
| fldAla2 | 472p |

FIG. 4S

| | |
|---|---|
| SELECT | 470a |
| whitespace | 470b |
| FROM | 470c |
| BY | 470d |
| opening parenthesis | 470e |
| closing parenthesis | 470f |
| comma | 470g |
| AND | 470h |
| period | 470i |
| AS | 470j |
| srcAlaGrp | 470k |
| equal sign | 470m |
| srcAlaTbl | 470n |
| ON | 470p |
| srcAla1 | 470q |

FIG. 4T

| Data Token | | Comprised Data Value |
|---|---|---|
| qryGrp | 512 | True, False or NULL |
| qryUni | 514 | True, False or NULL |
| srcUseCnd | 516 | A string or NULL |
| colUseCnd | 518 | A string or NULL |
| colReuse | 520 | True, False or NULL |
| tknAlias | 522 | ! |
| tknMonth | 524 | %TknMth% |
| | | %TknMth,argComp,argTrue,argFalse% |
| tknCurlyBrackets | 526 | } |
| | | { |
| tknItemCodeBegin | 528 | itmBeg |
| tknItemCodeEnd | 530 | itmEnd |

FIG. 5A

| | |
|---|---|
| prmQryId | 612 |
| prmMthCnt | 614 |
| prmBegMth | 616 |
| prmOraQry | 618 |
| prmLftJoi | 620 |
| prmUseCnd | 622 |
| prmItmBeg | 624 |
| prmItmEnd | 626 |

FIG. 6

| | |
|---|---|
| qryWhr | 752 |
| srcId | 754 |
| srcJoinFld | 756 |
| srcJoinToFld | 758 |
| srcJoinToSrc | 760 |
| colAla | 762 |
| colXpr | 764 |
| colGrpFun | 766 |

FIG. 7A

| Parameter | | Parameter Value |
|---|---|---|
| prmQryId | 612 | qryA |
| prmMthCnt | 614 | |
| prmBegMth | 616 | |
| prmOraQry | 618 | |
| prmLftJoi | 620 | |
| prmUseCnd | 622 | |
| prmItmBeg | 624 | |
| prmItmEnd | 626 | |
| Resultant query | | |
| SELECT a.itemCode AS itemCode, a.itemName AS itemName, a.brandCode AS brandCode, a.originCode AS originCode, b.brandName AS brandName, c.originName AS originName FROM ((tblItems a INNER JOIN tblBrands b ON (b.brandCode = a.brandCode))  INNER JOIN tblOrigins c ON (c.originCode = a.originCode)) | | |
| | | 1012a |

FIG. 10A

| Parameter | | Parameter Value |
|---|---|---|
| prmQryId | 612 | qryA |
| prmMthCnt | 614 | |
| prmBegMth | 616 | |
| prmOraQry | 618 | True |
| prmLftJoi | 620 | |
| prmUseCnd | 622 | |
| prmItmBeg | 624 | |
| prmItmEnd | 626 | |
| Resultant query | | |
| SELECT a.itemCode AS itemCode, a.itemName AS itemName, a.brandCode AS brandCode, a.originCode AS originCode, b.brandName AS brandName, c.originName AS originName FROM tblItems a, tblBrands b, tblOrigins c WHERE (b.brandCode = a.brandCode) AND (c.originCode = a.originCode) | | |

| Parameter | | Parameter Value |
|---|---|---|
| prmQryId | 612 | qryA |
| prmMthCnt | 614 | |
| prmBegMth | 616 | |
| prmOraQry | 618 | True |
| prmLftJoi | 620 | True |
| prmUseCnd | 622 | |
| prmItmBeg | 624 | |
| prmItmEnd | 626 | |
| Resultant query | | |
| SELECT a.itemCode AS itemCode, a.itemName AS itemName, a.brandCode AS brandCode, a.originCode AS originCode, b.brandName AS brandName, c.originName AS originName FROM tblItems a, tblBrands b, tblOrigins c WHERE (b.brandCode(+) = a.brandCode) AND (c.originCode(+) = a.originCode)  1012c | | |

FIG. 10C

| Parameter | | Parameter Value |
|---|---|---|
| prmQryId | 612 | qryA |
| prmMthCnt | 614 | |
| prmBegMth | 616 | |
| prmOraQry | 618 | False |
| prmLftJoi | 620 | True |
| prmUseCnd | 622 | |
| prmItmBeg | 624 | |
| prmItmEnd | 626 | |
| Resultant query | | |
| SELECT a.itemCode AS itemCode, a.itemName AS itemName, a.brandCode AS brandCode, a.originCode AS originCode, b.brandName AS brandName, c.originName AS originName FROM ((tblItems a LEFT JOIN tblBrands b ON (b.brandCode = a.brandCode))  LEFT JOIN tblOrigins c ON (c.originCode = a.originCode)) | | |

| Parameter | | Parameter Value |
|---|---|---|
| prmQryId | 612 | qryPur |
| prmMthCnt | 614 | |
| prmBegMth | 616 | |
| prmOraQry | 618 | |
| prmLftJoi | 620 | |
| prmUseCnd | 622 | TknZon,TknPur,TknSal |
| prmItmBeg | 624 | |
| prmItmEnd | 626 | |
| Resultant query | | |
| SELECT a.itemCode AS itemCode, a.zoneCode AS zoneCode, a.Amount AS Pur, 0 AS Sal FROM tblPurchases a | | |
| | | 1012e |

FIG. 10E

| Parameter | | Parameter Value |
|---|---|---|
| prmQryId | 612 | qryPur |
| prmMthCnt | 614 | |
| prmBegMth | 616 | |
| prmOraQry | 618 | |
| prmLftJoi | 620 | |
| prmUseCnd | 622 | TknPur |
| prmItmBeg | 624 | |
| prmItmEnd | 626 | |
| Resultant query | | |
| SELECT a.itemCode AS itemCode, a.Amount AS Pur FROM tblPurchases a | | |

| Parameter | | Parameter Value |
|---|---|---|
| prmQryId | 612 | qryPur |
| prmMthCnt | 614 | |
| prmBegMth | 616 | |
| prmOraQry | 618 | True |
| prmLftJoi | 620 | True |
| prmUseCnd | 622 | TknPur |
| prmItmBeg | 624 | |
| prmItmEnd | 626 | |
| Resultant query | | |
| SELECT a.itemCode AS itemCode, a.Amount AS Pur FROM tblPurchases a | | |

| Parameter | | Parameter Value |
|---|---|---|
| prmQryId | 612 | qryFinal |
| prmMthCnt | 614 | |
| prmBegMth | 616 | |
| prmOraQry | 618 | |
| prmLftJoi | 620 | |
| prmUseCnd | 622 | |
| prmItmBeg | 624 | |
| prmItmEnd | 626 | |
| Resultant query | | |
| SELECT a.itemCode AS itemCode, a.itemName AS itemName FROM tblItems a <br> 1012h | | |

FIG. 10H

| Parameter | | Parameter Value |
|---|---|---|
| prmQryId | 612 | qryFinal |
| prmMthCnt | 614 | |
| prmBegMth | 616 | |
| prmOraQry | 618 | |
| prmLftJoi | 620 | |
| prmUseCnd | 622 | TknBrn |
| prmItmBeg | 624 | |
| prmItmEnd | 626 | |
| Resultant query | | |
| SELECT a.itemCode AS itemCode, a.itemName AS itemName, a.brandCode AS brandCode, b.brandName AS brandName FROM (tblItems a INNER JOIN tblBrands b ON (b.brandCode = a.brandCode))   1012i | | |

FIG. 10I

| Parameter | | Parameter Value |
|---|---|---|
| prmQryId | 612 | qryFinal |
| prmMthCnt | 614 | |
| prmBegMth | 616 | |
| prmOraQry | 618 | |
| prmLftJoi | 620 | |
| prmUseCnd | 622 | TknBrn,TknOrg |
| prmItmBeg | 624 | |
| prmItmEnd | 626 | |
| Resultant query | | |
| SELECT a.itemCode AS itemCode, a.itemName AS itemName, a.brandCode AS brandCode, a.originCode AS originCode, b.brandName AS brandName, c.originName AS originName FROM ((tblItems a INNER JOIN tblBrands b ON (b.brandCode = a.brandCode))  INNER JOIN tblOrigins c ON (c.originCode = a.originCode)) | | |

| Parameter | | Parameter Value |
|---|---|---|
| prmQryId | 612 | qryFinal |
| prmMthCnt | 614 | |
| prmBegMth | 616 | |
| prmOraQry | 618 | |
| prmLftJoi | 620 | |
| prmUseCnd | 622 | TknBrn,TknOrg,TknZon,TknPur,TknSal |
| prmItmBeg | 624 | |
| prmItmEnd | 626 | |
| Resultant query | | |
| SELECT a.itemCode AS itemCode, a.itemName AS itemName, a.brandCode AS brandCode, a.originCode AS originCode, b.brandName AS brandName, c.originName AS originName, d.zoneCode AS zoneCode, d.TotPur AS TotPur, d.TotSal AS TotSal, h.zoneName AS zoneName FROM ((((tblItems a INNER JOIN tblBrands b ON (b.brandCode = a.brandCode))  INNER JOIN tblOrigins c ON (c.originCode = a.originCode))  INNER JOIN (SELECT e.itemCode AS itemCode, e.zoneCode AS zoneCode, SUM(Pur) AS TotPur, SUM(Sal) AS TotSal FROM (SELECT f.itemCode AS itemCode, f.zoneCode AS zoneCode, 0 AS Pur, f.Amount AS Sal FROM tblSales f UNION ALL SELECT g.itemCode AS itemCode, g.zoneCode AS zoneCode, g.Amount AS Pur, 0 AS Sal FROM tblPurchases g) e GROUP BY e.itemCode, e.zoneCode) d ON (d.itemCode = a.itemCode))  INNER JOIN tblZones h ON (h.zoneCode = d.zoneCode)) | | |

| Parameter | | Parameter Value |
|---|---|---|
| prmQryId | 612 | qryFinal |
| prmMthCnt | 614 | |
| prmBegMth | 616 | |
| prmOraQry | 618 | |
| prmLftJoi | 620 | |
| prmUseCnd | 622 | TknPur,TknSal |
| prmItmBeg | 624 | |
| prmItmEnd | 626 | |
| Resultant query | | |
| SELECT a.itemCode AS itemCode, a.itemName AS itemName, b.TotPur AS TotPur, b.TotSal AS TotSal FROM (tblItems a INNER JOIN (SELECT c.itemCode AS itemCode, SUM(Pur) AS TotPur, SUM(Sal) AS TotSal FROM (SELECT d.itemCode AS itemCode, 0 AS Pur, d.Amount AS Sal FROM tblSales d UNION ALL SELECT e.itemCode AS itemCode, e.Amount AS Pur, 0 AS Sal FROM tblPurchases e) c GROUP BY c.itemCode) b ON (b.itemCode = a.itemCode)) | | |

| Parameter | | Parameter Value |
|---|---|---|
| prmQryId | 612 | qryFinal |
| prmMthCnt | 614 | 12 |
| prmBegMth | 616 | 1 |
| prmOraQry | 618 | |
| prmLftJoi | 620 | |
| prmUseCnd | 622 | TknPur,TknSal |
| prmItmBeg | 624 | |
| prmItmEnd | 626 | |
| Resultant query | | |
| Illustrated in Fig. 10N | | |

FIG. 10M

```
SELECT a.itemCode AS itemCode, a.itemName AS itemName, b.TotJanPur AS
TotJanPur, b.TotFebPur AS TotFebPur, b.TotMarPur AS TotMarPur, b.TotAprPur AS
TotAprPur, b.TotMayPur AS TotMayPur, b.TotJunPur AS TotJunPur, b.TotJulPur AS
TotJulPur, b.TotAugPur AS TotAugPur, b.TotSepPur AS TotSepPur, b.TotOctPur AS
TotOctPur, b.TotNovPur AS TotNovPur, b.TotDecPur AS TotDecPur, b.TotJanSal AS
TotJanSal, b.TotFebSal AS TotFebSal, b.TotMarSal AS TotMarSal, b.TotAprSal AS
TotAprSal, b.TotMaySal AS TotMaySal, b.TotJunSal AS TotJunSal, b.TotJulSal AS
TotJulSal, b.TotAugSal AS TotAugSal, b.TotSepSal AS TotSepSal, b.TotOctSal AS
TotOctSal, b.TotNovSal AS TotNovSal, b.TotDecSal AS TotDecSal FROM (tblItems a
INNER JOIN (SELECT c.itemCode AS itemCode, SUM(JanPur) AS TotJanPur,
SUM(FebPur) AS TotFebPur, SUM(MarPur) AS TotMarPur, SUM(AprPur) AS
TotAprPur, SUM(MayPur) AS TotMayPur, SUM(JunPur) AS TotJunPur, SUM(JulPur)
AS TotJulPur, SUM(AugPur) AS TotAugPur, SUM(SepPur) AS TotSepPur,
SUM(OctPur) AS TotOctPur, SUM(NovPur) AS TotNovPur, SUM(DecPur) AS
TotDecPur, SUM(JanSal) AS TotJanSal, SUM(FebSal) AS TotFebSal, SUM(MarSal)
AS TotMarSal, SUM(AprSal) AS TotAprSal, SUM(MaySal) AS TotMaySal,
SUM(JunSal) AS TotJunSal, SUM(JulSal) AS TotJulSal, SUM(AugSal) AS TotAugSal,
SUM(SepSal) AS TotSepSal, SUM(OctSal) AS TotOctSal, SUM(NovSal) AS
TotNovSal, SUM(DecSal) AS TotDecSal FROM (SELECT d.itemCode AS itemCode, 0
AS JanPur, 0 AS FebPur, 0 AS MarPur, 0 AS AprPur, 0 AS MayPur, 0 AS JunPur, 0
AS JulPur, 0 AS AugPur, 0 AS SepPur, 0 AS OctPur, 0 AS NovPur, 0 AS DecPur,
IIF(d.saleMonth=1,d.Amount,0) AS JanSal, IIF(d.saleMonth=2,d.Amount,0) AS FebSal,
IIF(d.saleMonth=3,d.Amount,0) AS MarSal, IIF(d.saleMonth=4,d.Amount,0) AS AprSal,
IIF(d.saleMonth=5,d.Amount,0) AS MaySal, IIF(d.saleMonth=6,d.Amount,0) AS JunSal,
IIF(d.saleMonth=7,d.Amount,0) AS JulSal, IIF(d.saleMonth=8,d.Amount,0) AS AugSal,
IIF(d.saleMonth=9,d.Amount,0) AS SepSal, IIF(d.saleMonth=10,d.Amount,0) AS
OctSal, IIF(d.saleMonth=11,d.Amount,0) AS NovSal, IIF(d.saleMonth=12,d.Amount,0)
AS DecSal FROM tblSales d UNION ALL SELECT e.itemCode AS itemCode,
IIF(e.purchaseMonth=1,e.Amount,0) AS JanPur, IIF(e.purchaseMonth=2,e.Amount,0)
AS FebPur, IIF(e.purchaseMonth=3,e.Amount,0) AS MarPur,
IIF(e.purchaseMonth=4,e.Amount,0) AS AprPur, IIF(e.purchaseMonth=5,e.Amount,0)
AS MayPur, IIF(e.purchaseMonth=6,e.Amount,0) AS JunPur,
IIF(e.purchaseMonth=7,e.Amount,0) AS JulPur, IIF(e.purchaseMonth=8,e.Amount,0)
AS AugPur, IIF(e.purchaseMonth=9,e.Amount,0) AS SepPur,
IIF(e.purchaseMonth=10,e.Amount,0) AS OctPur,
IIF(e.purchaseMonth=11,e.Amount,0) AS NovPur,
IIF(e.purchaseMonth=12,e.Amount,0) AS DecPur, 0 AS JanSal, 0 AS FebSal, 0 AS
MarSal, 0 AS AprSal, 0 AS MaySal, 0 AS JunSal, 0 AS JulSal, 0 AS AugSal, 0 AS
SepSal, 0 AS OctSal, 0 AS NovSal, 0 AS DecSal FROM tblPurchases e) c GROUP BY
c.itemCode) b ON (b.itemCode = a.itemCode))
```

| Parameter | | Parameter Value |
|---|---|---|
| prmQryId | 612 | qryFinal |
| prmMthCnt | 614 | 12 |
| prmBegMth | 616 | 1 |
| prmOraQry | 618 | True |
| prmLftJoi | 620 | |
| prmUseCnd | 622 | TknPur,TknSal |
| prmItmBeg | 624 | |
| prmItmEnd | 626 | |
| Resultant query | | |
| Illustrated in Fig. 10P | | |

FIG. 10O

```
SELECT a.itemCode AS itemCode, a.itemName AS itemName, b.TotJanPur AS
TotJanPur, b.TotFebPur AS TotFebPur, b.TotMarPur AS TotMarPur, b.TotAprPur AS
TotAprPur, b.TotMayPur AS TotMayPur, b.TotJunPur AS TotJunPur, b.TotJulPur AS
TotJulPur, b.TotAugPur AS TotAugPur, b.TotSepPur AS TotSepPur, b.TotOctPur AS
TotOctPur, b.TotNovPur AS TotNovPur, b.TotDecPur AS TotDecPur, b.TotJanSal AS
TotJanSal, b.TotFebSal AS TotFebSal, b.TotMarSal AS TotMarSal, b.TotAprSal AS
TotAprSal, b.TotMaySal AS TotMaySal, b.TotJunSal AS TotJunSal, b.TotJulSal AS
TotJulSal, b.TotAugSal AS TotAugSal, b.TotSepSal AS TotSepSal, b.TotOctSal AS
TotOctSal, b.TotNovSal AS TotNovSal, b.TotDecSal AS TotDecSal FROM tblItems a,
(SELECT c.itemCode AS itemCode, SUM(JanPur) AS TotJanPur, SUM(FebPur) AS
TotFebPur, SUM(MarPur) AS TotMarPur, SUM(AprPur) AS TotAprPur, SUM(MayPur)
AS TotMayPur, SUM(JunPur) AS TotJunPur, SUM(JulPur) AS TotJulPur, SUM(AugPur)
AS TotAugPur, SUM(SepPur) AS TotSepPur, SUM(OctPur) AS TotOctPur,
SUM(NovPur) AS TotNovPur, SUM(DecPur) AS TotDecPur, SUM(JanSal) AS
TotJanSal, SUM(FebSal) AS TotFebSal, SUM(MarSal) AS TotMarSal, SUM(AprSal) AS
TotAprSal, SUM(MaySal) AS TotMaySal, SUM(JunSal) AS TotJunSal, SUM(JulSal) AS
TotJulSal, SUM(AugSal) AS TotAugSal, SUM(SepSal) AS TotSepSal, SUM(OctSal) AS
TotOctSal, SUM(NovSal) AS TotNovSal, SUM(DecSal) AS TotDecSal FROM (SELECT
d.itemCode AS itemCode, 0 AS JanPur, 0 AS FebPur, 0 AS MarPur, 0 AS AprPur, 0 AS
MayPur, 0 AS JunPur, 0 AS JulPur, 0 AS AugPur, 0 AS SepPur, 0 AS OctPur, 0 AS
NovPur, 0 AS DecPur, DECODE(d.saleMonth,1,d.Amount,0) AS JanSal,
DECODE(d.saleMonth,2,d.Amount,0) AS FebSal, DECODE(d.saleMonth,3,d.Amount,0)
AS MarSal, DECODE(d.saleMonth,4,d.Amount,0) AS AprSal,
DECODE(d.saleMonth,5,d.Amount,0) AS MaySal, DECODE(d.saleMonth,6,d.Amount,0)
AS JunSal, DECODE(d.saleMonth,7,d.Amount,0) AS JulSal,
DECODE(d.saleMonth,8,d.Amount,0) AS AugSal, DECODE(d.saleMonth,9,d.Amount,0)
AS SepSal, DECODE(d.saleMonth,10,d.Amount,0) AS OctSal,
DECODE(d.saleMonth,11,d.Amount,0) AS NovSal,
DECODE(d.saleMonth,12,d.Amount,0) AS DecSal FROM tblSales d UNION ALL
SELECT e.itemCode AS itemCode, DECODE(e.purchaseMonth,1,e.Amount,0) AS
JanPur, DECODE(e.purchaseMonth,2,e.Amount,0) AS FebPur,
DECODE(e.purchaseMonth,3,e.Amount,0) AS MarPur,
DECODE(e.purchaseMonth,4,e.Amount,0) AS AprPur,
DECODE(e.purchaseMonth,5,e.Amount,0) AS MayPur,
DECODE(e.purchaseMonth,6,e.Amount,0) AS JunPur,
DECODE(e.purchaseMonth,7,e.Amount,0) AS JulPur,
DECODE(e.purchaseMonth,8,e.Amount,0) AS AugPur,
DECODE(e.purchaseMonth,9,e.Amount,0) AS SepPur,
DECODE(e.purchaseMonth,10,e.Amount,0) AS OctPur,
DECODE(e.purchaseMonth,11,e.Amount,0) AS NovPur,
DECODE(e.purchaseMonth,12,e.Amount,0) AS DecPur, 0 AS JanSal, 0 AS FebSal, 0
AS MarSal, 0 AS AprSal, 0 AS MaySal, 0 AS JunSal, 0 AS JulSal, 0 AS AugSal, 0 AS
SepSal, 0 AS OctSal, 0 AS NovSal, 0 AS DecSal FROM tblPurchases e) c GROUP BY
c.itemCode) b WHERE (b.itemCode = a.itemCode)
```

| Parameter | | Parameter Value |
|---|---|---|
| prmQryId | 612 | qryModify |
| prmMthCnt | 614 | |
| prmBegMth | 616 | |
| prmOraQry | 618 | |
| prmLftJoi | 620 | |
| prmUseCnd | 622 | TknItm |
| prmItmBeg | 624 | |
| prmItmEnd | 626 | |
| Resultant query | | |
| SELECT a.itemCode AS itemCode, a.itemName AS itemName FROM (SELECT b.itemCode AS itemCode, b.itemName AS itemName FROM tblItems b) a WHERE (1 = 1) AND (1 = 1)  GROUP BY a.itemCode, a.itemName | | |

| Parameter | | Parameter Value |
|---|---|---|
| prmQryId | 612 | qryModify |
| prmMthCnt | 614 | |
| prmBegMth | 616 | |
| prmOraQry | 618 | |
| prmLftJoi | 620 | |
| prmUseCnd | 622 | TknItm |
| prmItmBeg | 624 | '001' |
| prmItmEnd | 626 | '009' |
| Resultant query | | |
| SELECT a.itemCode AS itemCode, a.itemName AS itemName FROM (SELECT b.itemCode AS itemCode, b.itemName AS itemName FROM tblItems b) a WHERE ( itemCode >= '001' ) AND ( itemCode <= '009' ) GROUP BY a.itemCode, a.itemName | | |
| | | 1012r |

FIG. 10R

| Parameter | | Parameter Value |
|---|---|---|
| prmQryId | 612 | qryModify |
| prmMthCnt | 614 | |
| prmBegMth | 616 | |
| prmOraQry | 618 | |
| prmLftJoi | 620 | |
| prmUseCnd | 622 | TknBrn,TknPur,TknSal |
| prmItmBeg | 624 | |
| prmItmEnd | 626 | |
| Resultant query | | |
| SELECT a.brandCode AS brandCode, a.brandName AS brandName, SUM(a.TotPur) AS TotPur, SUM(a.TotSal) AS TotSal FROM (SELECT b.itemCode AS itemCode, b.itemName AS itemName, b.brandCode AS brandCode, c.brandName AS brandName, d.TotPur AS TotPur, d.TotSal AS TotSal FROM ((tblItems b INNER JOIN tblBrands c ON (c.brandCode = b.brandCode))  INNER JOIN (SELECT e.itemCode AS itemCode, SUM(Pur) AS TotPur, SUM(Sal) AS TotSal FROM (SELECT f.itemCode AS itemCode, 0 AS Pur, f.Amount AS Sal FROM tblSales f UNION ALL SELECT g.itemCode AS itemCode, g.Amount AS Pur, 0 AS Sal FROM tblPurchases g) e GROUP BY e.itemCode) d ON (d.itemCode = b.itemCode)) ) a WHERE (1 = 1) AND (1 = 1) GROUP BY a.brandCode, a.brandName | | |

| Parameter | | Parameter Value |
|---|---|---|
| prmQryId | 612 | qryModify |
| prmMthCnt | 614 | |
| prmBegMth | 616 | |
| prmOraQry | 618 | True |
| prmLftJoi | 620 | |
| prmUseCnd | 622 | TknBrn,TknPur,TknSal |
| prmItmBeg | 624 | |
| prmItmEnd | 626 | |
| Resultant query | | |
| SELECT a.brandCode AS brandCode, a.brandName AS brandName, SUM(a.TotPur) AS TotPur, SUM(a.TotSal) AS TotSal FROM (SELECT b.itemCode AS itemCode, b.itemName AS itemName, b.brandCode AS brandCode, c.brandName AS brandName, d.TotPur AS TotPur, d.TotSal AS TotSal FROM tblItems b, tblBrands c, (SELECT e.itemCode AS itemCode, SUM(Pur) AS TotPur, SUM(Sal) AS TotSal FROM (SELECT f.itemCode AS itemCode, 0 AS Pur, f.Amount AS Sal FROM tblSales f UNION ALL SELECT g.itemCode AS itemCode, g.Amount AS Pur, 0 AS Sal FROM tblPurchases g) e GROUP BY e.itemCode) d WHERE (c.brandCode = b.brandCode) AND (d.itemCode = b.itemCode)) a WHERE (1 = 1) AND (1 = 1) GROUP BY a.brandCode, a.brandName | | |

| Parameter | | Parameter Value |
|---|---|---|
| prmQryId | 612 | qryModify |
| prmMthCnt | 614 | |
| prmBegMth | 616 | |
| prmOraQry | 618 | True |
| prmLftJoi | 620 | True |
| prmUseCnd | 622 | TknBrn,TknPur,TknSal |
| prmItmBeg | 624 | |
| prmItmEnd | 626 | |
| Resultant query | | |
| SELECT a.brandCode AS brandCode, a.brandName AS brandName, SUM(a.TotPur) AS TotPur, SUM(a.TotSal) AS TotSal FROM (SELECT b.itemCode AS itemCode, b.itemName AS itemName, b.brandCode AS brandCode, c.brandName AS brandName, d.TotPur AS TotPur, d.TotSal AS TotSal FROM tblItems b, tblBrands c, (SELECT e.itemCode AS itemCode, SUM(Pur) AS TotPur, SUM(Sal) AS TotSal FROM (SELECT f.itemCode AS itemCode, 0 AS Pur, f.Amount AS Sal FROM tblSales f UNION ALL SELECT g.itemCode AS itemCode, g.Amount AS Pur, 0 AS Sal FROM tblPurchases g) e GROUP BY e.itemCode) d WHERE (c.brandCode(+) = b.brandCode) AND (d.itemCode(+) = b.itemCode)) a WHERE (1 = 1) AND (1 = 1) GROUP BY a.brandCode, a.brandName | | |

| Parameter | | Parameter Value |
|---|---|---|
| prmQryId | 612 | qryModify |
| prmMthCnt | 614 | |
| prmBegMth | 616 | |
| prmOraQry | 618 | True |
| prmLftJoi | 620 | True |
| prmUseCnd | 622 | TknItm,TknBrn,TknOrg,TknZon,TknSal,TknPur |
| prmItmBeg | 624 | |
| prmItmEnd | 626 | |
| Resultant query | | |
| SELECT a.itemCode AS itemCode, a.itemName AS itemName, a.brandCode AS brandCode, a.originCode AS originCode, a.brandName AS brandName, a.originName AS originName, a.zoneCode AS zoneCode, SUM(a.TotPur) AS TotPur, SUM(a.TotSal) AS TotSal, a.zoneName AS zoneName FROM (SELECT b.itemCode AS itemCode, b.itemName AS itemName, b.brandCode AS brandCode, b.originCode AS originCode, c.brandName AS brandName, d.originName AS originName, e.zoneCode AS zoneCode, e.TotPur AS TotPur, e.TotSal AS TotSal, i.zoneName AS zoneName FROM tblItems b, tblBrands c, tblOrigins d, (SELECT f.itemCode AS itemCode, f.zoneCode AS zoneCode, SUM(Pur) AS TotPur, SUM(Sal) AS TotSal FROM (SELECT g.itemCode AS itemCode, g.zoneCode AS zoneCode, 0 AS Pur, g.Amount AS Sal FROM tblSales g UNION ALL SELECT h.itemCode AS itemCode, h.zoneCode AS zoneCode, h.Amount AS Pur, 0 AS Sal FROM tblPurchases h) f GROUP BY f.itemCode, f.zoneCode) e, tblZones i WHERE (c.brandCode(+) = b.brandCode) AND (d.originCode(+) = b.originCode) AND (e.itemCode(+) = b.itemCode) AND (i.zoneCode(+) = e.zoneCode)) a WHERE (1 = 1) AND (1 = 1) GROUP BY a.itemCode, a.itemName, a.brandCode, a.originCode, a.brandName, a.originName, a.zoneCode, a.zoneName | | |

| Parameter | | Parameter Value |
|---|---|---|
| prmQryId | 612 | qryModify |
| prmMthCnt | 614 | 5 |
| prmBegMth | 616 | 11 |
| prmOraQry | 618 | True |
| prmLftJoi | 620 | True |
| prmUseCnd | 622 | TknItm,TknBrn,TknOrg,TknZon,TknSal,TknPur |
| prmItmBeg | 624 | '001' |
| prmItmEnd | 626 | '004' |
| Resultant query | | |
| Illustrated in Fig. 10X | | |

FIG. 10W

```
SELECT a.itemCode AS itemCode, a.itemName AS itemName, a.brandCode AS
brandCode, a.originCode AS originCode, a.brandName AS brandName, a.originName
AS originName, a.zoneCode AS zoneCode, SUM(a.TotNovPur) AS TotNovPur,
SUM(a.TotDecPur) AS TotDecPur, SUM(a.TotJanPur) AS TotJanPur,
SUM(a.TotFebPur) AS TotFebPur, SUM(a.TotMarPur) AS TotMarPur,
SUM(a.TotNovSal) AS TotNovSal, SUM(a.TotDecSal) AS TotDecSal,
SUM(a.TotJanSal) AS TotJanSal, SUM(a.TotFebSal) AS TotFebSal,
SUM(a.TotMarSal) AS TotMarSal, a.zoneName AS zoneName FROM (SELECT
b.itemCode AS itemCode, b.itemName AS itemName, b.brandCode AS brandCode,
b.originCode AS originCode, c.brandName AS brandName, d.originName AS
originName, e.zoneCode AS zoneCode, e.TotNovPur AS TotNovPur, e.TotDecPur AS
TotDecPur, e.TotJanPur AS TotJanPur, e.TotFebPur AS TotFebPur, e.TotMarPur AS
TotMarPur, e.TotNovSal AS TotNovSal, e.TotDecSal AS TotDecSal, e.TotJanSal AS
TotJanSal, e.TotFebSal AS TotFebSal, e.TotMarSal AS TotMarSal, i.zoneName AS
zoneName FROM tblItems b, tblBrands c, tblOrigins d, (SELECT f.itemCode AS
itemCode, f.zoneCode AS zoneCode, SUM(NovPur) AS TotNovPur, SUM(DecPur) AS
TotDecPur, SUM(JanPur) AS TotJanPur, SUM(FebPur) AS TotFebPur, SUM(MarPur)
AS TotMarPur, SUM(NovSal) AS TotNovSal, SUM(DecSal) AS TotDecSal,
SUM(JanSal) AS TotJanSal, SUM(FebSal) AS TotFebSal, SUM(MarSal) AS TotMarSal
FROM (SELECT g.itemCode AS itemCode, g.zoneCode AS zoneCode, 0 AS NovPur,
0 AS DecPur, 0 AS JanPur, 0 AS FebPur, 0 AS MarPur,
DECODE(g.saleMonth,11,g.Amount,0) AS NovSal,
DECODE(g.saleMonth,12,g.Amount,0) AS DecSal,
DECODE(g.saleMonth,1,g.Amount,0) AS JanSal,
DECODE(g.saleMonth,2,g.Amount,0) AS FebSal,
DECODE(g.saleMonth,3,g.Amount,0) AS MarSal FROM tblSales g UNION ALL
SELECT h.itemCode AS itemCode, h.zoneCode AS zoneCode,
DECODE(h.purchaseMonth,11,h.Amount,0) AS NovPur,
DECODE(h.purchaseMonth,12,h.Amount,0) AS DecPur,
DECODE(h.purchaseMonth,1,h.Amount,0) AS JanPur,
DECODE(h.purchaseMonth,2,h.Amount,0) AS FebPur,
DECODE(h.purchaseMonth,3,h.Amount,0) AS MarPur, 0 AS NovSal, 0 AS DecSal, 0
AS JanSal, 0 AS FebSal, 0 AS MarSal FROM tblPurchases h) f GROUP BY
f.itemCode, f.zoneCode) e, tblZones i WHERE (c.brandCode(+) = b.brandCode) AND
(d.originCode(+) = b.originCode) AND (e.itemCode(+) = b.itemCode) AND
(i.zoneCode(+) = e.zoneCode)) a WHERE ( itemCode >= '001' ) AND ( itemCode <=
'004' ) GROUP BY a.itemCode, a.itemName, a.brandCode, a.originCode,
a.brandName, a.originName, a.zoneCode, a.zoneName
```

| Parameter | | Parameter Value |
|---|---|---|
| prmQryId | 612 | qryModify |
| prmMthCnt | 614 | 5 |
| prmBegMth | 616 | 11 |
| prmOraQry | 618 | False |
| prmLftJoi | 620 | False |
| prmUseCnd | 622 | TknItm,TknBrn,TknOrg,TknZon,TknSal,TknPur |
| prmItmBeg | 624 | '001' |
| prmItmEnd | 626 | '004' |
| Resultant query | | |
| Illustrated in Fig. 10Z | | |

FIG. 10Y

```
SELECT a.itemCode AS itemCode, a.itemName AS itemName, a.brandCode AS
brandCode, a.originCode AS originCode, a.brandName AS brandName, a.originName
AS originName, a.zoneCode AS zoneCode, SUM(a.TotNovPur) AS TotNovPur,
SUM(a.TotDecPur) AS TotDecPur, SUM(a.TotJanPur) AS TotJanPur,
SUM(a.TotFebPur) AS TotFebPur, SUM(a.TotMarPur) AS TotMarPur,
SUM(a.TotNovSal) AS TotNovSal, SUM(a.TotDecSal) AS TotDecSal,
SUM(a.TotJanSal) AS TotJanSal, SUM(a.TotFebSal) AS TotFebSal,
SUM(a.TotMarSal) AS TotMarSal, a.zoneName AS zoneName FROM (SELECT
b.itemCode AS itemCode, b.itemName AS itemName, b.brandCode AS brandCode,
b.originCode AS originCode, c.brandName AS brandName, d.originName AS
originName, e.zoneCode AS zoneCode, e.TotNovPur AS TotNovPur, e.TotDecPur AS
TotDecPur, e.TotJanPur AS TotJanPur, e.TotFebPur AS TotFebPur, e.TotMarPur AS
TotMarPur, e.TotNovSal AS TotNovSal, e.TotDecSal AS TotDecSal, e.TotJanSal AS
TotJanSal, e.TotFebSal AS TotFebSal, e.TotMarSal AS TotMarSal, i.zoneName AS
zoneName FROM ((((tblItems b INNER JOIN tblBrands c ON (c.brandCode =
b.brandCode)) INNER JOIN tblOrigins d ON (d.originCode = b.originCode)) INNER
JOIN (SELECT f.itemCode AS itemCode, f.zoneCode AS zoneCode, SUM(NovPur) AS
TotNovPur, SUM(DecPur) AS TotDecPur, SUM(JanPur) AS TotJanPur, SUM(FebPur)
AS TotFebPur, SUM(MarPur) AS TotMarPur, SUM(NovSal) AS TotNovSal,
SUM(DecSal) AS TotDecSal, SUM(JanSal) AS TotJanSal, SUM(FebSal) AS
TotFebSal, SUM(MarSal) AS TotMarSal FROM (SELECT g.itemCode AS itemCode,
g.zoneCode AS zoneCode, 0 AS NovPur, 0 AS DecPur, 0 AS JanPur, 0 AS FebPur, 0
AS MarPur, IIF(g.saleMonth=11,g.Amount,0) AS NovSal,
IIF(g.saleMonth=12,g.Amount,0) AS DecSal, IIF(g.saleMonth=1,g.Amount,0) AS
JanSal, IIF(g.saleMonth=2,g.Amount,0) AS FebSal, IIF(g.saleMonth=3,g.Amount,0) AS
MarSal FROM tblSales g UNION ALL SELECT h.itemCode AS itemCode, h.zoneCode
AS zoneCode, IIF(h.purchaseMonth=11,h.Amount,0) AS NovPur,
IIF(h.purchaseMonth=12,h.Amount,0) AS DecPur, IIF(h.purchaseMonth=1,h.Amount,0)
AS JanPur, IIF(h.purchaseMonth=2,h.Amount,0) AS FebPur,
IIF(h.purchaseMonth=3,h.Amount,0) AS MarPur, 0 AS NovSal, 0 AS DecSal, 0 AS
JanSal, 0 AS FebSal, 0 AS MarSal FROM tblPurchases h) f GROUP BY f.itemCode,
f.zoneCode) e ON (e.itemCode = b.itemCode)) INNER JOIN tblZones i ON
(i.zoneCode = e.zoneCode)) ) a WHERE ( itemCode >= '001' ) AND ( itemCode <=
'004' ) GROUP BY a.itemCode, a.itemName, a.brandCode, a.originCode,
a.brandName, a.originName, a.zoneCode, a.zoneName
```

METHOD AND AN APPARATUS FOR DEVELOPING SOFTWARE

BACKGROUND

1. Field

This invention relates to the field of software development.

2. Description of the Related Art

Software development includes development of new software, maintenance of developed software, and quality assurance of developed software, wherein the maintenance includes a change and/or a modification in developed software, and wherein the quality assurance includes testing and/or debugging of developed software.

In software development, one of the biggest impediments is the large, many times prohibitive, amount of resources required for developing and maintaining even a small computer program. Moreover, the resources required for software development increase exponentially in proportion to the number of features required in a computer program. Also, the required resources can further grow astronomically for computer programs that must exclude any chance of an error and/or a malfunctioning.

At the same time, the expectations and requirements from software are increasing rapidly because of the swiftly increasing processing power and capabilities of computers. However, because of the limitations of available resources, such as, human resource, financial resource, time resource, technical resource, and the like, the art is still unable to develop, and utilize software to its full potential.

To address the above serious impediment, various technologies have been developed over time, but none has been able to effectively solve this problem so far. Such technologies include CASE tools, data driven programming, table driven programming, object oriented programming, CORBA (Common Object Request Broker Architecture), MDA (Model-Driven Architecture), RAD (Rapid Application Development), software factories, and the like. All these technologies have reduced, to some extent, the resource requirements for software development. These technologies have also enabled, somewhat, efficient utilization of the resources required for software development. Simultaneously, though, ever-increasing complexities, as well as exponential rises in functional requirements from software have meant that whatever benefits emanated from such technologies have not been enough to meet the growing demands from software.

In addition to the above mentioned technologies, many computer programs and development environments have been developed for reducing the resource requirement for the software development process. Such computer programs and development environments include, but are not limited to, MS-VISUAL STUDIO, GNAT PROGRAMMING STUDIO, IBM RATIONAL APPLICATION DEVELOPER, POWERBUILDER, C++BUILDER, XCODE, NETBEANS, DELPHI, LAZARUS, CRYSTAL REPORTS, MICROSOFT ACCESS, ORACLE DATABASE, and MICROSOFT SQL SERVER. While these computer programs and development environments have managed to automate a small number of mechanical tasks, they have not been effective in reducing the excessive resource requirements for software development.

Consider, for instance, a computer application which is required to comprise a couple of hundred reports which are desired to be based on MICROSOFT SQL Server database and are specifically designed for MICROSOFT ACCESS reporting engine and a letter size paper. In the prior art, each report, along with its required query, would have to be developed by a software developer. This process may take tens of thousands of hours of a skilled computer programmer. If the same reports are required to be ported to an ORACLE platform and CRYSTAL REPORTS with report layouts for an A4 size paper, the resource expenditure might be even greater than what was required for the original development.

The humongous and unmanageable resource requirement for software development is not only related to reports and queries, but also to every stage and aspect of software development. However, despite the availability of so many technologies, environments and applications, the prior art has been unable to meet the challenge of minimizing the required resources for software development to a desired, and an effective level.

Software development should, ideally, achieve three objectives simultaneously: maximizing features, ensuring highest quality, and minimizing software development resources. However, the prior art has failed to achieve all three objectives in conjunction; in every software development, one or more of these objectives have to be compromised.

SUMMARY

The major challenge in the prior art, that of minimizing resources, (man, technology, money, and time) required for software development, as well as in the maintenance and quality assurance of developed software, has been effectively met by the embodiments of the present invention.

According to an embodiment of the present invention, a new method for developing software is provided which empowers a machine (e.g. a computer) to function like a human software developer. A data token is defined, created and associated with a source code to enable the machine (e.g. a computer) to perform software development (enable the machine to generate or construct further source code, object code, and/or an object).

According to another embodiment of the present invention, a method is provided to streamline and simplify a source code which is required to develop software. A source object is created and utilized as the source code by the machine (e.g. a computer) to perform software development.

According to another embodiment of the present invention, a method is provided for creating a source object repository to store a source object. The source object repository enables easy creation, manageability, and reusability of a source object.

According to another embodiment of the invention, a method is provided for associating a data token to a source object in a manner that enables a computer to generate a complete source code by utilizing the source object and the associated data token.

Embodiments of the present invention provide numerous technical and commercial advantages. For example, according to an embodiment of the present invention, the time and resources required for software development are reduced substantially. According to another embodiment of the present invention, the available features and options in developed software are increased substantially.

The extraordinary benefits of applying the principles of the present invention will change the way software development is conceived and carried out. The inventive concepts and principles will create endless new possibilities and horizons—far beyond queries, reports, data entry forms, menus, business processing rules, help systems, exception handling systems, and the like—that are unknown and unthinkable in the prior art.

Many more advantages will be readily apparent to one who is skilled in the art.

BRIEF DESCRIPTION OF THE DRAWINGS

The concepts, principles, methods, specifications, embodiments and salient features of the invention are illustrated by way of examples, and not by way of any limitation, in the below listed figures along with their drawings and detailed descriptions, wherein like reference numerals refer to similar elements.

FIG. 4S illustrates an exemplary block diagram which shows a few source components, illustrated in FIGS. 4B to 4R, which are categorized as indeterminable source components according to an aspect of an embodiment of the invention.

FIG. 4T illustrates an exemplary block diagram which shows a few source components, illustrated in FIGS. 4B to 4R, which are categorized as determinable source components according to an aspect of an embodiment of the invention.

FIG. 5A illustrates an exemplary block diagram which shows a few exemplary data tokens which are defined according to an aspect of an embodiment of the invention.

FIG. 6 illustrates an exemplary block diagram which shows exemplary parameters which are defined according to an aspect of an embodiment of the invention.

FIG. 7A illustrates an exemplary block diagram which shows a few exemplary attributes (may be called columns or fields as well), for a data model, which are to be included in source object repository to hold component values for desired indeterminable source components out of all indeterminable source components illustrated in the FIG. 4S, according to an aspect of an embodiment of the invention.

FIGS. 10A to 10Z illustrate a few exemplary queries which are constructed by queryBuilder by utilizing the few exemplary source objects illustrated in FIGS. 9A to 9O, according to an aspect of an embodiment of the invention.

DETAILED DESCRIPTION/EMBODIMENTS

1. Definitions

Figure 1A:
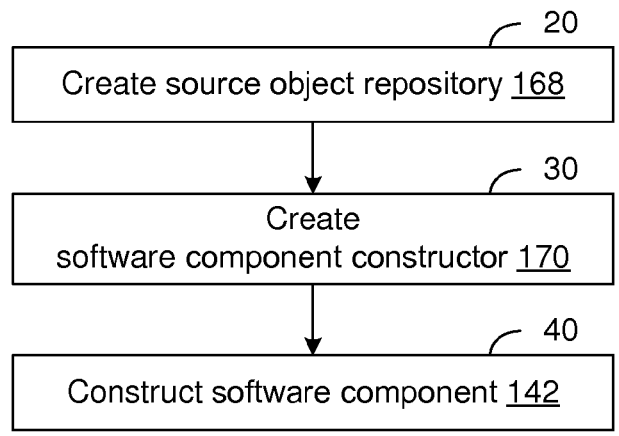
FIG. 1A illustrates a flowchart representing an aspect of an embodiment of the invention.

Some of the terms used herein are not commonly used in the art. The discussion of the present invention utilizes some terms in a specific sense. Therefore, the following definitions are provided in order to ensure clarity, as well as to facilitate the understanding of the detailed description that follows. However, the invention, as set forth in the claims, should not necessarily be limited by these definitions.

A "data value" is a unit of data which comprises a piece of information and which requires at least one bit for a representation in a computer readable recording medium. Anything that can be stored in a computer readable recording medium is a data value. Examples of a data value may include, but are not limited to, a name, an age, a date, a time, a number, a text string, an object, an image, an audio, a video, a signal, a formula, a source code, an object code, a variable name, a variable value, a field name, an alphanumeric character, binary data, alphanumeric data, a bit, a short integer, a long integer, a NULL value, and an empty value.

A "software component" 142 refers to a source code of a computer programming language, an object code of a processor (real and/or virtual), and/or an object, which is at least one part of a software, wherein the one part of software is utilized during execution of the software or a part thereof, that is executed either by a processor or by another software (computer program) in case of virtualization, wherein the processor is either a real (physical) computer processor or an emulator (virtual computer processor). A software component comprises one or more source components which are put together on the basis of "a set of predetermined rules" 140 wherein each of the one or more source components is represented by at least one data value. A software component may comprise one or more other software components. Examples of a software component 142 may include, but are not limited to:

1. An SQL query is a software component.
2. A WHERE clause of an SQL query is a software component.
3. A report layout is a software component.
4. A software object created on a basis of a class model is a software component.
5. A font object is a software component.
6. A data structure is a software component.
7. A database view is a software component.
8. A database table is a software component.
9. A data entry form is a software component.
10. A spreadsheet is a software component.

Examples of a software component 142 comprising another software component may include, but are not limited to:
1. An SQL query, which is a software component, comprising a WHERE clause, which is also a software component.
2. An SQL view, which is a software component, comprising two SQL views, which are also software components.
3. A report layout, which is a software component, comprising a font object, which is also a software component.

A "source component" 144 is represented by at least one data value, hereinafter called component value 146, in a software component 142. In other words, a source component 144 is just like a property of a software object, whereas a component value 146 is just like the value of the property of the software object. Examples of a source component 144 may include, but are not limited to:
1. Paper size is a source component of a report layout, which is a software component. The paper size is represented by at least one component value in a report layout. Component values which represent a paper size in a report layout may include, but are not limited to, A4, A3, Letter, and 8.5"×11".
2. Background color is a source component of a data entry form, which is a software component. The background color may be represented by one or more component values in a data entry form object.
3. In an SQL query, which is software component, a command is a source component.

Component values which represent the command in an SQL query may include, but are not limited to, SELECT, UPDATE, DELETE, INSERT INTO, CREATE DATABASE, ALTER DATABASE, and the like.
4. A whitespace is a source component of a source code block, which is a software component, of a computer programming language. Component values which represent the whitespace may include, but are not limited to, a space character, and a tab character.
5. The width of a textbox is a source component of a textbox object, which is a software component. The width of a textbox may be represented by a component value of a numeric data type.
6. A tax rate is a source component of a tax calculation business rule, which is a software component. The tax rate may be represented by a component value of a numeric data type.
7. A mnemonic is a source component of a source code block, which is a software component, of an assembly language. Component values which represent the mnemonic may include, but are not limited to, MOV, XOR, and CMP.

A "set of predetermined rules" 140 comprises one or more predetermined rules that are sufficient for constructing a software component. A set of predetermined rules is specified in terms of one or more source components, wherein each of the one or more source components is represented by at least one component value in a software component. Examples of a set of predetermined rules 140 may include, but are not limited to
1. A set of predetermined rules for creating an SQL query, which is a software component, according to SQL:2008 standard.
2. A set of predetermined rules for creating an SQL query, which is a software component, which creates a table in an ORACLE database.
3. A set of predetermined rules for creating a form, which is a software component, in MICROSOFT VISUAL BASIC 6.
4. A set of predetermined rules for creating a report layout, which is a software component, in CRYSTAL REPORTS.
5. A set of predetermined rules for calculating the premium of a specific insurance policy in a software application, which is a software component.
6. A set of predetermined rules for creating a formula, which is a software component, in an EXCEL worksheet.

A "user" is someone who develops, installs, utilizes, and/or configures a computer program. A user may include, but is not limited to, a human being, a machine, and a computer program. It is possible that a user is also a developer of the same computer program that the user utilizes.

A "data token" 152 comprises a set of data token rules 158 and is represented by a data value, hereinafter called token value 154, wherein the token value is processed on the basis of the set of data token rules, and then the result of the processed token value, which is also a data value, hereinafter called token result 156, is utilized for constructing a software component. The set of data token rules is specified at the time of defining a data token, wherein the set of data token rules comprises one or more rules which specify one or more manners in which a token value can be associated with a component value of a source component of a software component, can be processed, and/or can be utilized. The processing of a token value may include, but is not limited to, executing a function, performing a comparison, creating a component value, determining a manner in which a software component is constructed, identifying one or more component values for utilizing in a software component, or any combinations thereof. A token value may be determined by utilizing a parameter. A token value can also be associated with another token value. A token value can be nested in another token value of the same and/or a different data token.

Following are a few examples of a data token 152:
1. tknCompare is a data token 152 which is represented by a token value Comp(A,B). When Comp(A,B) is processed according to its set of data token rules 158, the token result of the processed Comp(A,B) is utilized for constructing a software component. The token value Comp(A,B) of the data token tknCompare is processed on the basis of the following set of data token rules, wherein A and B arc may be determined by utilizing two parameter values:
   a. If A>B, then the token result is 1,
   b. If A=B, then the token result is 0, and
   c. If A<B, then the token result is −1.
   In other words, in this example, the token value of the data token tknCompare acts like a function which returns one of the three possible values 1, 0, or −1.
   In this example "A" represents total sales and "B" represents total cost of sales. tknCompare is utilized for determining a type of report that is to printed at runtime, if token result is 1 then a profit summary is printed, if token result is 0 then a breakeven report is printed, and if token result is −1 then a loss report is printed. In this manner, tknCompare enables a software component constructor 170 to generate an appropriate report on the basis of the values of "A" and "B".

2. tknRetrieve is a data token 152 which is represented by a token values tknpept( ). A set of data token rules 158 for processing tknRetrieve specifies that the token value tknpept( ) is processed in such a manner that it returns all department codes from a database table called tblDepartment, hosted on a specific database server, which comprises department codes. The returned department codes, which represent a token result, are then utilized for constructing a desired software component, for example a crosstab SQL query.

Since number of departments may vary from time to time, tknRetrieve enables a software component constructor 170 to create an appropriate query, at runtime, on the basis of departments returned as a token result 156 when tknDept( ) token value 154 of tknRetrieve, is processed.

3. tknJoinType is a data token 152 which is utilized for constructing a SELECT query, which is a software component. According to a set of data token rules 158 of tknJoinType, the data token tknJoinType can be represented by one of the following token values, wherein each of the token values is illustrated along with a rule which specifies a manner in which the token value may be utilized:

a. 0—No Join (a query will be constructed without any join because the first character of the token value is 0),
 b. 1—Inner Join (a query will be constructed with INNER JOIN because the first character of the token value is 1),
 c. 2—Left Join (a query will be constructed with LEFT JOIN because the first character of the token value is 2), and
 d. 3—Right Join (a query will be constructed with RIGHT JOIN because the first character of the token value is 3).

A token value 154 of tknJoinType may be retrieved by utilizing a parameter value 162 obtained from a user at runtime and an SQL query may be constructed by a software component constructor 170 accordingly.

A "source object" 166 comprises:
1. a component value 146,
2. a token value 154,
3. a data value, which specifies:
 a. an identity of a source object 166,
 b. a meta data describing a source object 166,
 c. a relation, order, and/or hierarchy among a component value 146 and a token value 154,
 d. a relation, order, and/or hierarchy among a plurality of component values $146_n$,
 e. a relation, order, and/or hierarchy among a plurality of token values $154_n$,
 f. reference to a component value 146,
 g. reference to a token value 154,
 h. reference to another source object 166, or
 i. any combinations thereof, or
4. any combinations thereof.

A "software component constructor" 170 is a computer program which is sufficient for constructing a software component 142, or a part thereof, on the basis of a set of predetermined rules 140 and by utilizing a source object 166, a component value 146, a token value 154, a token result 156, or any combinations thereof, wherein a source object 166, a component value 146, and/or a token value 154 may be determined by utilizing a parameter value 162. A software component constructor may be a single computer program or a plurality of computer programs that are integrated and/or interfaced with each other. A software component constructor may adapt a set of predetermined rules, on which the software constructor is based, in a manner that no rule of the set of predetermined rules is violated to an extent that a software component cannot be constructed on the basis of the adapted set of predetermined rules. For example, a query builder, a software component constructor, which constructs SQL queries for DB2, MICROSOFT ACCESS, MICROSOFT SQL Server, ORACLE, and/or SYBASE, is a software component constructor. Another example of a software component constructor is a report creator which creates report layouts for CRYSTAL REPORTS.

A "source object repository" 168 comprises one or more data structures and is utilized for storing a source object 166 in a computer readable recording medium, wherein the source object repository is created on the basis of a data model which is suitable and sufficient for creating a source object repository that is suitable and sufficient for:

1. Compulsorily:
 a. storing one or more source objects as structured and/or semi-structured data, and
 b. identifying and retrieving a desired source object out of the one or more source objects.
2. Optionally, if desired:
 a. implementing and maintaining, in a desired manner, a desired hierarchy and/or a desired relationship among all such source components which are comprised in a source object,
 b. implementing and maintaining a desired order among one or more component values belonging to a source component that represents the one or more component values,
 c. utilizing a source object and/or a desired part thereof in another source object,
 d. associating one or more data tokens with one or more component values of one or more source objects, and
 e. any combinations thereof.

A data structure comprised by the source object repository may include, but is not limited to, a database table, a class, an array, a linked list, a variable, a multidimensional array, a multidimensional database, a conventional database, a flat file, a delimited text file, and a parameter.

A "computer program", as used herein, is defined as an executable sequence of instructions designed for execution on a processor either directly and/or via another computer program. The computer program may include, but is not limited to, a subroutine, a function, a procedure, an interpreter, an object method, and an object implementation in an executable application, an applet, a servlet, an executable source code, an object code, an ActiveX, and a shared library/dynamic load library. A computer program is also known as software.

The terms "a" or "an", as used herein, are defined as one or as more than one. The term "plurality", as used herein, is defined as two or as more than two. The term "another", as used herein, is defined as at least a second or more.

The terms "including/include/includes", and/or "have/having/has", as used herein, are defined as "comprising/comprises" (i.e., open language).

Creation, utilization, association, and/or processing of a data token, as used herein, is defined as creation, utilization, association, and/or processing of a token value of the data token.

Utilization of a parameter, as used herein, is defined as utilization of a parameter value of the parameter.

The headings in this detailed description have been inserted for ease of readability and have no interpretative role.

2. The Challenges in Software Development

The main challenges in software development are minimization of:
1. resources (man, technology, money and time) required for development and quality assurance of software,
2. resources required to maintain developed software and its quality assurance, and
3. particularly, the time required to develop and maintain software, as well as ensure quality assurance, even if other resources (human, financial, and technical) are adequately available.

The prior art in software development has failed to effectively address and meet the above challenges in software development because of the serious limitations that have been discussed in the 'BACKGROUND' section.

It is to be noted that, in the current environment, the expectations and requirements from software are rising rapidly because of the rapidly increasing processing power and capabilities of computers. However, because of the scarcity of available resources, such as human resource, financial resource, time resource, technical resource, and the like, the art is still unable to develop and utilize software to its full potential.

3. The Causes of the Impediments in Software Development

After extensive research and detailed analysis of a wide range of existing computer programs, as well as the existing software development technologies, methodologies, tools, environments, and applications, the inventor identified the following main causes of the prohibitive resource requirements for software development in the prior art:
1. The available techniques, tools, and options for developing software are generally time intensive even for a person who is skilled, well trained, and experienced in the art.
2. Despite the availability of many advanced technologies, comprehensive software development tools, debugging tools, and quality assurance tools, most of the development and quality assurance of software is carried out by human beings; some machine assistance is available but is insufficient and inefficient. It is recognized that software development by human beings has some inherent limitations, such as:
   a. A human being cannot work around the clock and is limited by the speed at which he/she can operate.
   b. Software development requires a high level of training and experience in the art.
   c. Trained and experienced developers are hard to find, and are very costly.
3. Many computer programs are very large and too complex and, therefore, require vast, sometimes prohibitive, amounts of resources for development, maintenance, and/or quality assurance.
4. Most of the predetermined rules for developing (writing) software components are designed in a manner that even a small change in a developed computer program may lead to an extensive change in the developed computer program; hence, additional resources are required for any change. In many cases, a change in the developed computer program may require even more resources than were originally spent for developing the computer program. The available technologies and software development tools for facilitating and augmenting this effort are either very complex or provide very little functionality.

4. What Needs to be Done

After finding the primary causes of the impediments in software development, the inventor concluded that the following are required to address the above causes:
1. The contribution provided by a computer and/or a machine in developing and maintaining a computer program, and/or in providing quality assurance, needs to be enhanced as much as possible.
2. The remaining contribution, which is left to be provided by human beings, needs to be further reduced, in addition to being streamlined and simplified, thereby substantially reducing the human resource requirements in terms of time, number, training, experience, and cost.

5. Inventive Concepts and Methodologies that Address the Challenges in Software Development The major challenge in the prior art, that of minimizing the resources (man, technology, money, and time) required for software development, maintenance and quality assurance, has been effectively met by the inventor. According to an aspect of an embodiment of the invention, an inventive method enables a computer and/or a machine to function like a human software developer, and to perform most of the software development. Moreover, the inventive method also streamlines and simplifies the remaining portion of the software development left for human software developers.

6. Embodiments and Drawings

While the concept and methodology of the present invention can be practiced in many different forms and embodiments, the embodiments shown in the drawings herein, and described herein in detail, are only a few embodiments thereof with the understanding that the present disclosure is to be considered as exemplary regarding the principles of the invention and is not intended to limit the invention to the embodiments as illustrated in the attached drawings and the descriptions thereof. The invention is intended to cover alternatives, modifications and equivalents, which may be included within the spirit, principles and scope of the invention as defined by the appended claims In the attached drawings, like reference numerals are used to refer to like elements throughout, and in the descriptions of the drawings, pertinent details have been set forth and explained so as to provide a thorough understanding of the present invention. However, it may be clarified that the present invention may be applied and/or utilized without these specific details.

7. An Embodiment According to an Aspect of the Invention (FIG. 1A)

FIG. 1A is an exemplary flowchart that illustrates as aspect of an embodiment of the invention.

According to an aspect of an embodiment of the invention, at operation 20, a source object repository 168 is created. A source object repository 168 is utilized to store one or more source objects $166_n$ comprising one or more token values $154_n$ and/or one or more component values $146_n$ which represent one or more indeterminable source components $148_n$.

A source object repository 168 is based on a data model 164 which is created for a software component on the basis of rules based upon which a software component is written and/or developed. By way of an example, and not a limitation, a data model for an SQL query will base on the syntax of the SQL query. By way of another example, and not a limitation, a data model for a report layout in CRYSTAL REPORTS will base on the object model for reports exposed by CRYSTAL REPORTS.

According to an aspect of an embodiment of the invention, a source object repository 168 is created on the basis of a data model 164.

According to an aspect of an embodiment of the invention, a data model 164 is created on the basis of a set of predetermined rules 140 of a software component 142 (a software source code) and by utilizing one or more indeterminable source components $148_n$.

According to an aspect of an embodiment of the invention, following steps are taken for creating a data model 164:

1. A set of predetermined rules 140 is selected, wherein the selected set of predetermined rules 140 is defined in terms of one or more source components $144_n$.
2. Each of the one or more source components $144_n$ is categorized into one of the following categories:
    a. an indeterminable source component 148, or
    b. a determinable source component 150.
3. One or more data tokens $152_n$ along with their respective sets of data token rules $158_n$ are defined.
4. A data model 164 is created on the basis of the selected set of predetermined rules 140 and by utilizing:
    a. one or more indeterminable source components $148_n$.
    b. one or more data tokens $152_n$, or
    c. any combinations thereof.

According to an aspect of an embodiment of the invention, a data model 164 enables reusability of a source object 166, a data token value 154, and/or a component value 146.

According to an aspect of an embodiment of the invention, source components $144_n$ of a software component (software source code) 142 are categorized in indeterminable source components $148_n$ and determinable source components $150_n$, wherein categorization is done on the basis of:

1. rules, based upon which a software component is written/developed,
2. desire of a user, or
3. any combinations thereof.

By way of an example, and not a limitation, the starting command, which is a source component 144, of an SQL query is determinable source component 150 if the SQL query is to be utilized for viewing records from a database, because such query always starts with command "SELECT". However, in an SQL query, which can update, insert, view, and/or remove records from a database, the starting command, which is a source component 144, of the SQL query is an indeterminable source component 148, because starting command cannot be determined without knowing the type of SQL query. The above example shows that if a user wants to write queries only for viewing records from a database then the starting command is a determinable source component 150 because of the rules for writing queries for viewing records from a database. However, if a user wants to write queries for updating, inserting, viewing, and/or removing records from a database then the starting command will be an indeterminable source component 148 because of the rules for writing queries for updating, inserting, viewing, and/or removing records from a database.

According to an aspect of an embodiment of the invention, at operation 30, a software component constructor (source code generator) 170, which is a computer program, is created.

According to an aspect of an embodiment of the invention, a software component constructor 170 is utilized for constructing (generating) one or more software components $144_n$. By way of an example, and not a limitation, a software component constructor 170 may be utilized for generating (constructing) an invoice entry form, which is a software component 142, at runtime according to a user's requirements which are specified by utilizing one or more parameters $160_n$.

According to an aspect of an embodiment of the invention, a software component constructor 170 retrieves one or more source objects $166_n$ from one or more source object repositories $168_n$ for constructing one or more software components $142_n$.

According to an aspect of an embodiment of the invention, a software component constructor 170 accepts one or more parameter values $162_n$ from a user at runtime for constructing one or more software components $142_n$.

According to an aspect of an embodiment of the invention, a software component constructor 170 accepts a parameter value 162 at a user interface level of a computer program.

According to an aspect of an embodiment of the invention, a software component constructor 170 is utilized for constructing one or more software components $142_n$ at runtime.

According to an aspect of an embodiment of the invention, at operation 40, a software component 142 is constructed by a software component constructor 170 which utilizes a source object 166 which is created, before constructing the software component 142, and stored in a source object repository 168.

According to an aspect of an embodiment of the invention, a source object 166 can be utilized, with a parameter 160, for constructing a plurality of software components $142_n$.

8. An Embodiment According to an Aspect of the Invention (FIG. 1B)

Figure 1B:
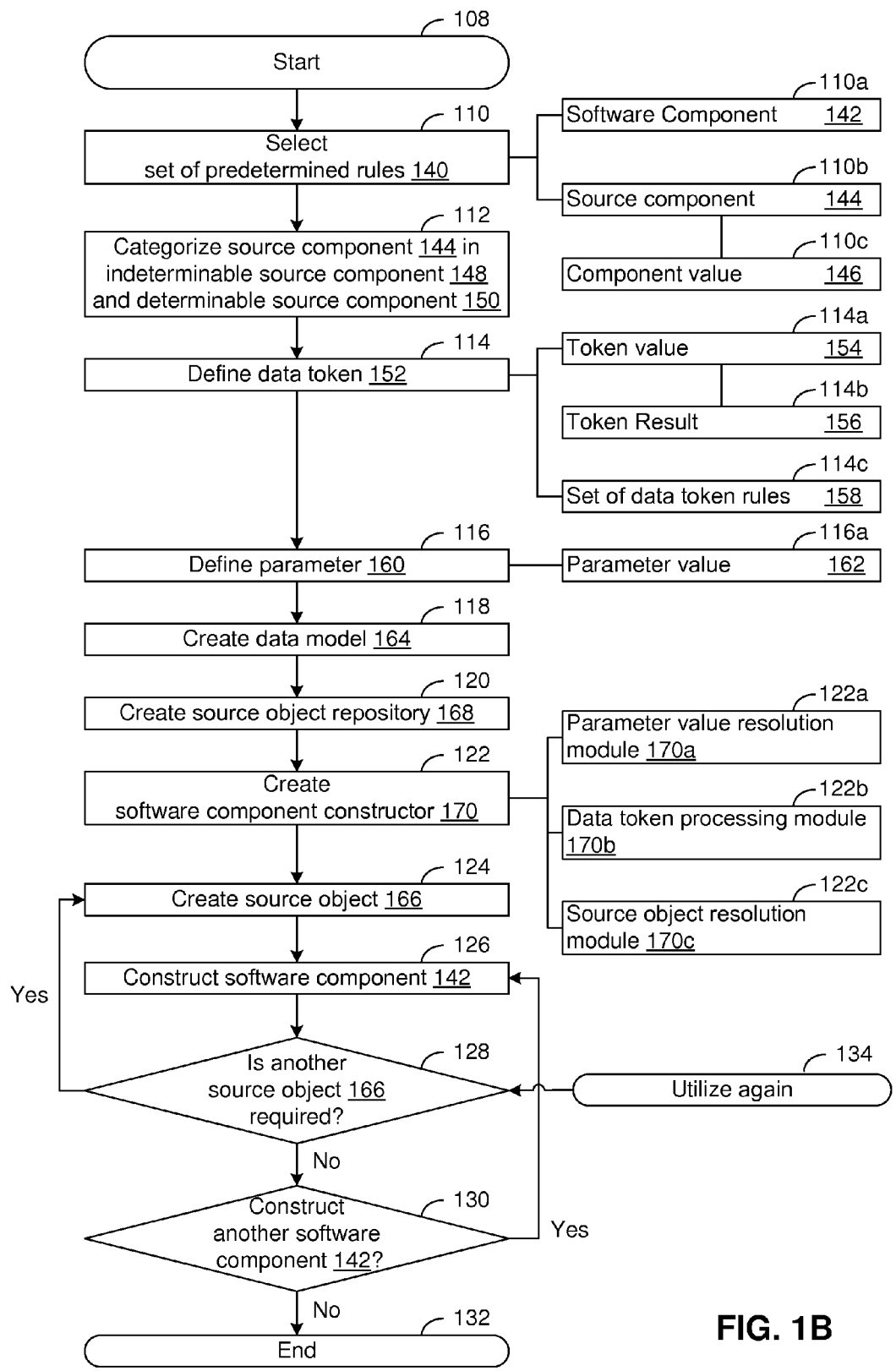
FIG. 1B illustrates a flowchart representing an aspect of an embodiment of the invention in more detail.

FIG. 1B is an exemplary flowchart that illustrates operations 20, 30, and 40 of FIG. 1A in greater detail, according to an aspect of an embodiment of the invention.

At terminal 108, the exemplary flowchart starts.

According to an aspect of an embodiment of the invention, at operation 110, a "set of predetermined rules 140" is selected, wherein the set of predetermined rules 140 is sufficient for constructing a "software component 142", wherein the software component 142 is a software component that is desired to be constructed. According to an aspect of an embodiment of the invention, the set of predetermined rules 140 may be adapted as may be desired as long as a predetermined rule in the set of predetermined rules 140 is not violated to an extent where the software component 142 cannot be constructed on the basis of the adapted set of predetermined rules. According to an aspect of an embodiment of the invention, a plurality of sets of predetermined rules $140_n$ (where n>=1) can be selected. According to an aspect of an embodiment of the invention, a plurality of software components $142_n$ can be constructed on the basis of the set of predetermined rules 140. According to an aspect of an embodiment of the invention, the plurality of software components $142_n$ can be constructed on the basis of one or more sets of predetermined rules $140_n$.

Given below are a few examples of a selected set of predetermined rules. The embodiments of the invention are not limited to these examples:

1. A set of predetermined rules 140 for constructing a SELECT query, which is a software component 142, for an ORACLE database, wherein the version of the ORACLE database is less than 9.
2. A set of predetermined rules 140 for constructing a SELECT query, which is a software component 142, for an ORACLE database, wherein the version of the ORACLE database is 9 or above.
3. A set of predetermined rules 140 for constructing a SELECT query, which is a software component 142, for MICROSOFT ACCESS.
4. A set of predetermined rules 140 for constructing a report layout, which is a software component 142, in CRYSTAL REPORTS.
5. A set of predetermined rules 140 for creating a computer program, which is a software component 142, for processing the payroll of a specific business entity.
6. A set of predetermined rules 140 for creating a software module, which is a software component 142, for calculating sales tax in accordance with a specific country's tax laws.
7. A set of predetermined rules 140 for creating a data entry form, which is a software component 142, in MICROSOFT VISUAL BASIC 6 environment.

Given below are a few examples of an adaptation of a selected set of predetermined rules. The embodiments of the invention are not limited to these examples:
1. A set of predetermined rules 140 for constructing a SELECT query, which is a software component 142, is adapted in a manner that an opening and a closing parentheses is made compulsory for the WHERE clause in the SELECT query.
2. A set of predetermined rules 140 for constructing a report layout, which is a software component 142, in MICROSOFT ACCESS is adapted in a manner that the name of every textbox in the report layout starts with letters "txt", without quotes.
3. A set of predetermined rules 140 for creating a software module, which is a software component 142, for calculating sales tax in accordance with a specific country's tax laws is adapted in a manner that a 0% sales tax is added wherever sales tax does not apply.

According to an aspect of an embodiment of the invention, sub-operation 110*a* illustrates that the set of predetermined rules 140 has to be sufficient for constructing the software component 142.

Given below are a few examples of a software component. The embodiments of the invention are not limited to these examples:
1. A report layout is a software component 142.
2. A data entry form is a software component 142.
3. A message box is a software component 142.
4. An SQL query is a software component 142.
5. A lookup table is a software component 142.
6. A spreadsheet is a software component 142.
7. A video game is a software component 142.
8. A WHERE clause for an SQL query is a software component 142.
9. A software module which implements a business processing rule is a software component 142.

According to an aspect of an embodiment of the invention, sub-operation 110*b* illustrates that the set of predetermined rules 140 is specified in terms of a source component 144. According to an aspect of an embodiment of the invention, the set of predetermined rules 140 can be specified in terms of a plurality of source components $144_n$.

Given below are a few examples of a source component. The embodiments of the invention are not limited to these examples:
1. Paper size is a source component 144 of a report layout, which is a software component 142.
2. Background color is a source component 144 of a data entry form, which is a software component 142.
3. A command is a source component 144 of an SQL query, which is software component 142.
4. A whitespace is a source component 144 of a source code block, which is a software component 142 of a computer programming language.
5. A width of a textbox is a source component 144 of a textbox object, which is a software component 142.
6. A tax rate is a source component 144 of a tax calculation business rule, which is a software component 142.
7. A mnemonic is a source component 144 of a source code block, which is a software component 142, of an assembly language.

According to an aspect of an embodiment of the invention, sub-operation 110*c* illustrates that the source component 144 is represented by a "component value 146" in the software component 142. According to an aspect of an embodiment of the invention, the source component 144 can be represented by a plurality of component values $146_n$.

Given below are a few examples of a component value. The embodiments of the invention are not limited to these examples:
1. A4, A3, Letter, and 8.5"×11" are component values $146_{1-4}$ which may be utilized to represent a paper size, which is a source component 144, of a report layout, which is a software component 142.
2. A long integer value is a component value 146 which is utilized to represent a background color, which is a source component 144, of a data entry form, which is a software component 142.
3. SELECT, UPDATE, DELETE, INSERT INTO, CREATE DATABASE, and ALTER DATABASE are component values $146_{1-6}$ which may be utilized to represent a command, which is a source component 144, of an SQL query, which is software component 142.
4. A space character and a tab character are component values $146_{1-2}$ which may be utilized to represent a whitespace, which is a source component 144, of a source code block, which is a software component 142, of a computer programming language.
5. A positive integer value is a component value 146 which is utilized to represent the width of a textbox, which is a source component 144, of a textbox object, which is a software component 142.
6. A numeric value is a component value 146 which is utilized to represent a tax rate, which is a source component 144, of a tax calculation business rule, which is a software component 142.
7. MOV, XOR, and CMP are component values $146_{1-3}$ which may be utilized to represent a mnemonic, which is a source component 144, of a source code block, which is a software component 142, of an assembly language.

According to an aspect of an embodiment of the invention, at operation 112 the source component 144 is categorized into:
1. an "indeterminable source component 148", and/or
2. a "determinable source component 150"

According to an aspect of an embodiment of the invention, the indeterminable source component 148 is represented by a component value 146 which either:

1. cannot be generated and/or determined by utilizing an algorithm and/or a computer implementable logic for the purpose of being utilized in constructing the software component 142, or
2. can be generated and/or determined by utilizing an algorithm and/or a computer implementable logic for the purpose of being utilized in constructing the software component 142, but is desired not to be generated for the purpose of being utilized in constructing the software component 142.

According to an aspect of an embodiment of the invention, a source component 144 may be categorized into an indeterminable source component 148 or a determinable source component 150 on the basis of the desire of a user.

In other words, categorization of a source component 144 may also be done on the basis of the desire of a user. By way of an example, and not a limitation, paper size, which is a source component 144, for a report, which is a software component 142, may be categorized as an indeterminable source component 148 or as a determinable source component 150, depending on the desire of a user. If a user always wants to print a report on a specific size of paper then paper size will be categorized as a determinable source component 150, otherwise paper size will be categorized as an indeterminable source component 148.

According to an aspect of an embodiment of the invention, a component value 146, representing an indeterminable source component 148, is determined by one or more of the following:
1. utilizing a data token 152,
2. utilizing a parameter 160,
3. retrieving from a source object 166, or
4. any combinations thereof.

Given below are a few examples of an indeterminable source component. The embodiments of the invention are not limited to these examples:
1. A column name is an indeterminable source component 148 in an SQL query, which is a software component 142.
2. A date is an indeterminable source component 148 in a WHERE clause, which is a software component 142, of an SQL query, which is also a software component 142.
3. A report title is an indeterminable source component 148 in a report layout, which is a software component 142.
4. A whitespace may be categorized as a indeterminable source component 148 in a block of source code, which is a software component 142, of JAVA programming language, because the whitespace, which is categorized as a indeterminable source component 148, can be represented by either a tab character or a space character, which are component values $146_{1-2}$ respectively, and it is desired that the whitespace should not be determined by utilizing a computer implementable logic.
5. A command may be categorized as an indeterminable source component 148 in an SQL query, which is a software component 142, because the command, which is categorized as a indeterminable source component 148, can be represented by SELECT, UPDATE, DELETE, INSERT INTO, CREATE DATABASE, and ALTER DATABASE, which are component values $146_{1-6}$ respectively. Therefore, it is not possible to determine a component value 146 for the command, which is categorized as an indeterminable source component 148, by utilizing a computer implementable logic without some kind of implicit and/or explicit information about the SQL query, which is a software component 142.

According to an aspect of an embodiment of the invention, a source component 144 that is not an indeterminable source component 148, can be a determinable source component 150.

Given below are a few examples of a determinable source component. The embodiments of the invention are not limited to these examples:
1. A command may be categorized as a determinable source component 150 in a SELECT query, which is a software component 142, because the command, which is categorized as a determinable source component 150, can only be represented by "SELECT", which is a component value 146.
2. A whitespace may be categorized as a determinable source component 150 in a block of source code, which is a software component 142, of JAVA programming language, because the whitespace, which is categorized as a determinable source component 150, may be represented by a tab character, which is a component value 146.
3. A page number may be categorized as a determinable source component 150 in a report layout which is a software component 142, because the page number, which is categorized as a determinable source component 150, can be represented by a value, which is a component value 146, which can be determined by utilizing a computer implementable logic.

According to an aspect of an embodiment of the invention, at operation 114, a "data token 152" is defined, wherein the data token 152 is desired to be utilized for constructing a software component 142.

According to an aspect of an embodiment of the invention, a data token 152 is to be defined for a source component 144 whose component value is to be determined at runtime for constructing a software component 142 and such value cannot be determined by utilizing a computer implementable logic and/or a parameter 160. In other words a data token 152 is utilized by a software component constructor 170 for determining:
1. a component value 146, which is to be utilized for constructing a software component 142,
2. a manner in which a component value 146 is to be utilized for constructing a software component 142,
3. a manner in which a software component 142 is constructed, or
4. any combinations thereof.

According to an aspect of an embodiment of the invention, a data token 152 is to be defined for:
1. determining a component value 146, of an indeterminable source component 148 and/or a determinable source component 150, which is desired to be determined at runtime for constructing a software component 142 but cannot be determined by utilizing a computer implementable logic and/or a parameter 160,
2. determining a manner in which a component value 146 is utilized for constructing a software component 142, wherein such manner is desired to be determined at runtime but cannot be determined by utilizing a computer implementable logic and/or a parameter 160, or
3. any combinations thereof.

In other words, a data token 152 has to be defined for determining, at runtime, a component value 146 and/or a manner in which a software component 142 is to be constructed, wherein it is desired to determine, at runtime, a component value 146 and/or a manner in which a software component 142 is to be constructed, and wherein such determination cannot be made by utilizing a computer implementable logic and/or a parameter 160 for constructing software component 142.

According to an aspect of an embodiment of the invention, a data token 152 is defined to automate construction of a software component at runtime by utilizing a computer implementable logic.

According to an aspect of an embodiment of the invention, association of a token value 154 with a component value 146 enables a software component constructor 170 to determine a place where a specific type of computer implemented logic needs to be applied. In other words, association of a token value 154 with a component value 146 enables a software component constructor 170 to act like a human software developer.

In other words, a data token 152 is defined to enable a machine (computer) to a perform a task, during construction of a software component 142 at runtime, which normally requires human intelligence but can be performed by utilizing a computer implementable logic if a machine can determine what, when, and where a task has to be performed. A data token 152, represented by a token value 154, enables a machine to determine what, when, and where a task has to be performed.

According to an aspect of an embodiment of the invention, a data token 152 is created along with a set of data token rules 158 that specifies a manner in which a token value 154 can be created, a manner in which a token value 154 can be associated to a component value 146, and a manner in which a token value 154 can be processed, wherein processing of a token value 154 produces a token result 156, wherein the token result 156 is utilizable for constructing a software component 142.

According to an aspect of an embodiment of the invention, a token value 154 is retrieved by utilizing a parameter value 162.

According to an aspect of an embodiment of the invention, a token value 154 is utilized without being processed.

According to an aspect of an embodiment of the invention, a token value 154 is processed by utilizing a parameter value 162.

According to an aspect of an embodiment of the invention, a token value 154 is utilized without processing for constructing a software component 142.

According to an aspect of an embodiment of the invention, processing of a token value 154 comprises executing a set of instructions which are executable by a processor.

According to an aspect of an embodiment of the invention, a token value 154 is embedded in a component value 146.

According to an aspect of an embodiment of the invention, a token value 154 is implicitly (virtually) associated with a component value 146.

According to an aspect of an embodiment of the invention, a component value 146 is retrieved by utilizing a token value 154.

According to an aspect of an embodiment of the invention, a component value 146 is retrieved by utilizing a parameter value 162.

According to an aspect of an embodiment of the invention, sub-operation 114*a* illustrates that a data token 152 is represented by a token value 154.

According to an aspect of an embodiment of the invention, sub-operation 114*b* illustrates that a "token result 156" may be obtained by processing a token value 154, wherein the token value 154 is processed by utilizing a "parameter" 160.

According to an aspect of an embodiment of the invention, sub-operation 114*c* illustrates that the data token 152 comprises a "set of data token rules 158", wherein the set of data token rules 158 is defined along with the data token 152. According to an aspect of an embodiment of the invention, the set of data token rules 158 comprises one or more rules which specify one or more manners in which the data token 152 is desired to be utilized for constructing the software component 142. According to an aspect of an embodiment of the invention, the set of data token rules 158 specifies one or more manners in which the data token 152 is:

1. represented by a token value 154.
2. implicitly and/or explicitly associated, by way of a token value 154, with a component value 146.
3. utilized for constructing a software component 142.
4. processed for obtaining a token result 156 and then a token result 156 is utilized for constructing a software component 142.

A token value 154 may be associated with a component value 146 implicitly, wherein implicit association is implemented in a software component constructor 170. By way of an example, and not a limitation, a software component constructor 170 may assume that a token value 154 is associated with each component value 146 of a source component 144. As another example a software component constructor 170 may assume that a token value 154 is associated with a specific type of component values $146_n$ of a source component 144.

A token value 154 may be associated with a component value 146 explicitly, wherein a token value 154 is explicitly associated with a component value 146 of a source component 144. Explicit association can be done in a source object 166 and/or in a software component constructor 170.

The data token 152 is utilized to automate tasks, in constructing the software component 142, which are normally performed by a human being.

The data token 152 can be utilized to automate all tasks which are required for constructing the software component 142, and which can be performed on the basis of an algorithm and/or a computer implementable logic.

According to an aspect of an embodiment of the invention, a token value 154 of a data token 152 may be determined by utilizing a parameter value 162 of a parameter 160.

Given below are a few examples of how data tokens may be utilized. The embodiments of the invention are not limited to these examples:

1. For creating a component value 146 for constructing a software component 142.
2. For changing a component value 146 for constructing a software component 142.
3. For determining an appropriate component value 146 for constructing a software component 142.
4. For determining an appropriate component value 146 for a source component 144.
5. For retrieving a component value 146 for constructing a software component 142.
6. For determining an order of a plurality of component values $146_n$ for constructing a software component 142.
7. For reusing a component value 146 for constructing a software component 142.
8. For reusing a plurality of component values $146_n$ for constructing a software component 142.
9. For changing a manner in which a software component 142 is to be constructed.

A data token 152 can also be utilized in numerous other ways to automate any part of constructing a software component 142 which can be automated on the basis of an algorithm and/or a computer implementable logic.

A data token 152 can also be utilized for invoking any desired process and/or a task. By way of an example, and not a limitation, upon processing a token value 154 of a data token 152, a network connection may be established, a new program may be started, an existing program may be terminated, a component value 146 may be resolved from a database table, a user input may be acquired, an interaction with a user may be invoked, one or more software components 142$n$ may be constructed, a machine may be started, a machine may be stopped, and the like.

A data token 152 can also be utilized for invoking a process on a hardware component and/or in a software component; such components may include, but are not limited to, a remote computer, a local computer, a server, a networked computer, a software process, a storage device, a cellular device, a communication device, a PLC (Programmable Logic Controller), and a hardware connected to a computer.

According to an aspect of an embodiment of the invention, at operation 116, one or more parameters 160$_n$ are defined.

According to an aspect of an embodiment of the invention, a parameter 160 is defined for enabling a user to define a component value 146 and/or a token value 154 at runtime. In other words, a parameter 160 enables a user to control the construction of a software component 142 at runtime.

A parameter 160, represented by a parameter value 162, is utilized to enable a user to interact with and/or direct/control the process of constructing a software component 142, according to the desire and/or requirement of the user, via input of component values 146$_n$ and/or token values 154$_n$ in the form parameter of values 162$_n$. In other words, a component value 146, and/or a token value 154 may be determined at runtime by a parameter value 162, wherein a parameter value is an input by a user, at runtime.

According to an aspect of an embodiment of the invention, a parameter 160 may be utilized by a software component constructor 170 for constructing a software component 142, wherein the software component constructor 170 determines a manner in which a software component 142 is constructed on the basis of a parameter 160.

According to an aspect of an embodiment of the invention, a parameter 160 is defined for determining a source object 166 which is to be utilized for constructing a software component 142.

According to an aspect of an embodiment of the invention, sub-operation 116$a$ illustrates that a parameter 160 is represented by a "parameter value 162" which is specified and/or input by a user, wherein a parameter value 162 is a data value. The parameter 160 may also be defined with a default parameter value 162.

The parameter value 162 can be specified and/or input by a user either each time the parameter 160 is utilized or only at a time when the user wants to change the parameter value 162 which the user has already specified; in the latter case, the parameter value 162 may:

1. have to be specified for the first time by a user, and/or
2. be stored in a computer readable recording medium and utilized, whenever required, by retrieving from the computer readable recording medium.

According to an aspect of an embodiment of the invention, a parameter 160 may also be defined for determining a component value 146 of an indeterminable source component 148.

Given below are two examples of utilizing a parameter. These examples are neither exhaustive nor complete. Moreover, the invention is not, in any way, dependent on, or restricted by the following examples:

1. For constructing a report layout, which is a software component 142, which comprises a plurality of report columns, a parameter 160 may be utilized to enable a user to specify desired report columns along with their order.
2. For constructing an SQL query, which is a software component 142, a parameter 160 may be utilized to enable a user to specify a target platform for the SQL query, wherein the target platform is either ORACLE or MICROSOFT SQL Server.
3. For constructing a report layout, which is a software component 142, a parameter 160 is defined for determining a value for a paper size, wherein the paper size is an indeterminable source component 148.

A user can specify a parameter value 162 by utilizing one or more methods, which may include, but are not limited to, a data entry via a keyboard, a touch screen, a voice command, a gesture, a blink of an eye, an eye scan, an analog signal converted into a digital signal, and by way of human identification, such as, finger print detection, eye detection, face detection, DNA identification, and the like.

According to an aspect of an embodiment of the invention, at operation 118, a data model 164 is created, wherein the data model 164 is suitable and is sufficient for creating a "source object repository 168", wherein the source object repository 168 is suitable and sufficient for:

1. Compulsorily:
   a. Storing a "source object 166", wherein the source object 166 is sufficient for comprising one or more component values 146$_n$ representing one or more indeterminable source components 148$_n$.
   b. Identifying, resolving, and retrieving the source object 166.
2. Optionally, if desired:
   a. Storing a plurality of source objects 166$_n$.
   b. Identifying, resolving, and retrieving a source object 166 out of the plurality of source objects 166$_n$. In such a case, the source object repository 168 should also provide a mechanism which enables an identification of a source object 166 out of the plurality of source objects 166$_n$.
   c. Implementing and maintaining, in a desired manner, a desired hierarchy and/or a desired relationship between a plurality of source components 144$_n$, wherein both the desired hierarchy and/or the desired relationship are determined on the basis of:
      i. the set of predetermined rules 140, and/or
      ii. a role and/or a purpose of the component value 146 in a software component 142.
   d. Implementing and maintaining a desired order among a plurality of component values 146$_n$.
   e. Utilizing a source object 166, out of a plurality of source objects 166$_n$ and/or a desired part thereof, in another source object 166, out of the plurality of source objects 166$_n$.
   f. Associating, in accordance with the set of data token rules 158, a token value 154 with a component value 146 and/or with another token value 154 that is comprised by a source object repository 168. A token value 154 may be associated by one or more of the following:
      i. embedding in a component value 146,
      ii. embedding in a source object 166,
      iii. associating, implicitly, with a component value 146 stored in the source object repository 168, iv. associating with a component value 146, stored in a source object repository 168, by utilizing a reference value, wherein the reference value is a data value, or v. any combinations thereof, or g. Any combinations thereof.

According to an aspect of an embodiment of the invention, the data model 164 comprises one or more attributes (which may also be called fields or columns) for storing component values $146_n$ for all indeterminable source components $148_{n'}$ for which neither a data token 152 is defined, nor a parameter 160 is defined.

Sub-operation 118*a* specifies that the data model 164, created at operation 118, is sufficient for storing a source object 166.

According to an aspect of an embodiment of the invention, the source object repository 168 is created, at operation 120, in a desired manner and on the basis of a data model 164. According to an aspect of an embodiment of the invention, the source object repository 168 is created by utilizing one or more of the following:

1. structured data,
2. semi-structured data, and
3. any combinations thereof.

According to an aspect of an embodiment of the invention, a source object repository 168 may be created by utilizing any suitable data structure which may include, but is not limited to, a database table, a comma separated text file, a spreadsheet, a matrix, an object, an array, a set of variables, and a linked list.

According to an aspect of an embodiment of the invention, a source object repository 168 is sufficient for storing a source object 166, wherein a source object 166 comprises an indeterminable source component 148 represented by a component value 146, wherein the indeterminable source component 148 is to be utilized for constructing a software component 142.

According to an aspect of an embodiment of the invention, a source object repository 168 enables identification of a component value 146 in the source object repository 168 with reference to the source object 166 and an indeterminable source component 148 which is represented by the component value 146.

According to an aspect of an embodiment of the invention, a source object repository 168 comprises a token value 154 which can:

1. be associated with a component value 146,
2. refer to a component value 146 which is stored in the same source object 166 in which token value 154 is stored,
3. refer to a component value 146 which is stored in another source object 166, or
4. any combinations thereof.

According to an aspect of an embodiment of the invention, a source object repository 168 comprises a plurality of source components $144_n$ in a desired hierarchy.

According to an aspect of an embodiment of the invention, a source object repository 168 comprises a plurality of component values $146_n$ in a desired order.

According to an aspect of an embodiment of the invention, a source object 166 stored in a source object repository 168 is uniquely identifiable.

According to an aspect of an embodiment of the invention, at operation 122, a "software component constructor 170" is created, wherein the software component constructor 170 is a computer program which is sufficient for constructing a software component 142 on the basis of a set of predetermined rules 140 and by utilizing one or more of the following:

1. a component value 146 representing a source component 144,
2. a parameter value 162 of a parameter 160,
3. a token value 154 that represents a data token 152, and
4. any combinations thereof.

According to an aspect of an embodiment of the invention, a software component constructor 170 utilizes a data model 164 of a source object 166 by way of a source object repository 168 for retrieving the source object 166.

According to an aspect of an embodiment of the invention, the software component constructor 170 comprises and implements the set of predetermined rules 140 of a software component 142.

According to an aspect of an embodiment of the invention, a set of predetermined rules 140 may also be adapted in a desired manner for creating a software component constructor 170 to the extent that a software component 142 can be constructed by utilizing the adapted set of predetermined rules 140.

According to an aspect of an embodiment of the invention, a set of predetermined rules 140 can be adapted, as may be desired and/or required, for constructing a software component constructor 170, wherein the adaptation is done in a manner that no rule of the set of predetermined rules 140 is violated to the extent that a software component 142 cannot be constructed on the basis of the adapted set of predetermined rules. According to an aspect of an embodiment of the invention, a set of predetermined rules 140 has to be sufficient for enabling a software component constructor 170 to construct a software component 142 on the basis of set of predetermined rules 140 and by utilizing one or more of the following:

1. a component value 146,
2. a token value 154, and
3. any combinations thereof.

According to an aspect of an embodiment of the invention, a software component constructor 170 utilizes a data token 152 during construction of a software component 142, wherein a software component constructor 170 utilizes, at runtime, a data token 152 for determining:

1. a component value 146,
2. a manner in which a component value 146 is utilized for constructing a software component 142,
3. a manner in which a software component 142 is constructed, or
4. any combinations thereof.

In other words, a software component constructor 170 utilizes a data token 152 to work like a human developer for constructing a software component 142.

By way of an example, and not a limitation, a software component constructor 170 can be utilized for constructing a database query, a report layout, a data entry form, a menu, and/or a customized inventory processing rule. The software component constructor 170 can also be integrated with a computer program for constructing, at runtime, as many software components as may be desired. The integration of software component constructor 170 can be done by either utilizing an API (Application Programming Interface) or directly incorporating software component constructor 170 in a computer program with which the integration of software component constructor 170 is desired.

According to an aspect of an embodiment of the invention, a software component constructor 170 constructs a software component 142 at runtime according to the desire, specified by way of a parameter 160, of a user. In other words, a layer of a computer program, which receives one or more parameters $160_n$ from a user, may be integrated with a software component constructor 170, wherein the software component constructor 170 constructs one or more software components in response to the input parameters $160_n$.

According to an aspect of an embodiment of the invention, a software component constructor 170 may construct a plurality of software components $142_n$ by utilizing a source object 166, a data token 152, and a parameter 160. In other words, a parameter 160 and a data token 152 enable a software component constructor to construct more than one software components $142_n$ from a source object 166.

According to an aspect of an embodiment of the invention, three sub-operations 122a, 122b and 122c are connected to the operation 122. Each of the sub-operations 122a, 122b and 122c illustrates creation of a module, which is a computer program, wherein the module may be required for constructing a software component 142. Each of the modules created in sub-operations 122a, 122b and 122c can be either:

1. an independent computer program which is linked and/or integrated with the software component constructor 170, or
2. a computer program which is an integral part of the software component constructor 170, or
3. a computer program which is linked with the software component constructor 170 via a network, such as a LAN (Local Area Network), a MAN (Metropolitan Area Network), a WAN (Wide Area Network), a PAN (Personal Area Network), a SAN (Storage Area Network), a CAN (Campus Area Network), and a VPN (Virtual Private Network), and the like, or
4. any combinations of the above.

According to an aspect of an embodiment of the invention, at sub-operation 122a, a "parameter value resolution module 170a" is created. The parameter value resolution module 170a is utilized for resolving a parameter value 162. A parameter value 162 may be resolved by utilizing many different methods, which may include, but are not limited to:

1. a user input via one or more of several ways, which may include, but are not limited to:
    a. an input device,
    b. a gesture,
    c. a voice command,
    d. a biometric input,
    e. an eye scan,
    f. face recognition,
    g. a thought which can be interpreted by a computer,
    h. an analog signal converted into a digital signal,
    i. DNA identification, and
    j. any combinations thereof.
2. reading from a computer readable medium, and
3. any combinations thereof.

According to an aspect of an embodiment of the invention, the parameter value resolution module 170a may also resolve the parameter value 162 from a computer readable recording medium and/or by utilizing an algorithm and/or a computer executable logic.

According to an aspect of an embodiment of the invention, at sub-operation 122b, a "data token processing module 170b" is created. The data token processing module 170b is utilized for processing a token value 154. The data token processing module 170b processes the token value 154 on the basis of the set of data token rules 158.

According to an aspect of an embodiment of the invention, at sub-operation 122c, a "source object resolution module 170c" is created. The source object resolution module 170c is utilized for identifying a source object 166 and then resolving a component value 146 from the source object 166.

The source object 166 can be identified in many ways, which may include, but are not limited to, a utilization of a parameter value 162, a utilization of an algorithm and/or a computer implementable logic, a utilization of a token value 154, and/or any combinations thereof.

According to an aspect of an embodiment of the invention, while resolving a component value 146 from a source object 166, the source object resolution module 170c may also utilize a parameter value 162 which is resolved by a parameter value resolution module 170a, and/or may utilize a token value 154 which is processed by a data token processing module 170b.

According to an aspect of an embodiment of the invention, while resolving a component value $146_1$ from a source object $166_1$, a source object resolution module 170c may also resolve another component value $146_2$ from another source object $166_2$, wherein the source object $166_2$ is referenced in the source object $166_1$.

According to an aspect of an embodiment of the invention, while resolving the component value 146 from a source object 166, the source object resolution module 170c may also resolve a plurality of component values $146_n$ from a plurality of source objects $166_n$, wherein the plurality of source objects $166_n$ are referenced in the source object 166.

According to an aspect of an embodiment of the invention, while resolving the component value 146 from a source object 166, the source object resolution module 170c may also change, drop, and/or add a component value 146 on the basis of utilizing a token value 154.

According to an aspect of an embodiment of the invention, at operation 124, a source object 166 is created, wherein the source object 166 is sufficient for constructing a software component 142, and wherein the source object 166 is to be utilized for constructing the software component 142. The creation of the source object 166 may also include creation and association of a token value 154, to a component value 146 and/or another token value 154, of a data token 152 on the basis of a set of data token rules 158. According to an aspect of an embodiment of the invention, the source object 166 is stored in a source object repository 168.

According to an aspect of an embodiment of the invention, at operation 124, a token value 154, representing a data token 152, may be created and associated with a component value 146 representing a source component 144 comprised by a source object 166.

According to an aspect of an embodiment of the invention, a source object 166 is created, wherein a source object 166 comprises a component value 146 which represents an indeterminable source component 148, and wherein the component value 146 is utilized for constructing a software component 142.

According to an aspect of an embodiment of the invention, a source object 166 is created in a manner that a token value 154 can be associated with a component value 146 in a manner that the token value 154 can be utilized and or processed.

According to an aspect of an embodiment of the invention, utilization of a token value 154 determines a manner in which a component value 146 is utilized for constructing a software component 142.

According to an aspect of an embodiment of the invention, utilization of a token value 154 determines that a component value 146 is not to be utilized for constructing a software component 142.

According to an aspect of an embodiment of the invention, utilization of a token value 154 determines that a component value 146 is to be processed, and then the processed component value is to be utilized for constructing a software component 142.

According to an aspect of an embodiment of the invention, utilization of a token value 154 determines that a component value 146 is to be modified, and then the modified component value 146 is to be utilized for constructing a software component 142.

According to an aspect of an embodiment of the invention, utilization of a token value 154 determines that a component value 146 is to be changed, and then the changed component value 146 is to be utilized for constructing a software component 142.

According to an aspect of an embodiment of the invention, utilization of a token value 154 determines that a component value 146 is to be utilized for creating another component value 146, and then another created component value 146 is to be utilized for constructing a software component 142.

According to an aspect of an embodiment of the invention, a token value 154 is embedded in a component value 146.

According to an aspect of an embodiment of the invention, a token value 154 is embedded in a source object 166.

According to an aspect of an embodiment of the invention, a source object 166 comprises a component value 146 which is not comprised in a software component 142.

According to an aspect of an embodiment of the invention, a source object 166 comprises a component value 146, which is not comprised in a software component 142, is determined by utilizing:
1. a token value 154,
2. a token result 156,
3. a parameter value 162,
4. a software component constructor 170, or
5. any combinations thereof.

According to an aspect of an embodiment of the invention, utilization of a token result 156 determines a manner in which a component value 146 is utilized for constructing a software component 142.

According to an aspect of an embodiment of the invention, utilization of a token result 156 determines that a component value 146 is not to be utilized for constructing a software component 142.

According to an aspect of an embodiment of the invention, utilization of a token result 156 determines that a component value 146 is to be processed, and then the processed component value is to be utilized for constructing a software component 142.

According to an aspect of an embodiment of the invention, utilization of a token result 156 determines that a component value 146 is to be modified, and then the modified component value 146 is to be utilized for constructing a software component 142.

According to an aspect of an embodiment of the invention, utilization of a token result 156 determines that a component value 146 is to be changed, and then the changed component value 146 is to be utilized for constructing a software component 142.

According to an aspect of an embodiment of the invention, utilization of a token result 156 determines that a component value 146 is to be utilized for creating another component value 146, and then another created component value 146 is to be utilized for constructing a software component 142.

According to an aspect of an embodiment of the invention, at operation 126, a software component 142 is constructed by utilizing a software component constructor 170. An exemplary construction of the software component 142 is explained in greater detail in FIG. 2.

According to an aspect of an embodiment of the invention, following steps are performed by a software component constructor 170 for constructing a software component 142:
1. Accepts a parameter value 162 from a user.
2. Identifies a source object 166.
3. Retrieves a source object 166 from a source object repository 168.
4. Retrieves a component value 146 of an indeterminable source component 148 from the retrieved source object 166.
5. Processes a token value 154 to obtain a token result 156.
6. Constructs a software component 142 on the basis of a set of predetermined rules 140, of the software component 142, and by utilizing the parameter value 162, the component value 146 of the indeterminable source component 148, a component value 146 of a determinable source component 150, and a token result 156.

According to an aspect of an embodiment of the invention, a token value 154 is not processed for constructing a software component 142. In other words, a token value 154 may be utilized without being processed for constructing a software component 142.

According to an aspect of an embodiment of the invention, a parameter value 162 is not utilized for constructing a software component 142.

According to an aspect of an embodiment of the invention, a parameter value 162 is utilized for processing a token value 154.

According to an aspect of an embodiment of the invention, a component value 146 of a determinable source component 150 is not utilized for constructing a software component 142.

According to an aspect of an embodiment of the invention, a component value 146 of an indeterminable source component 148 is not utilized for constructing a software component 142.

At operation 128, it is decided whether another source object 166 is required or not. If another source object 166 is required, then the flow continues to operation 124. Otherwise, the flow moves to operation 130.

Creation of another source object 166 will be required whenever existing source objects 166$_n$ are not sufficient for constructing a desired software component 142.

At operation 130, it is decided whether another software component 142 is to be constructed or not. If another software component 142 is to be constructed, then the flow continues to operation 126. Otherwise, the flow moves to terminal 132.

At terminal 132, this flowchart ends.

A terminal 134 is utilized as another starting point to illustrate that the source object 166, the software component constructor 170, and the source object repository 168 may be utilized as many times as desired.

9. An Embodiment According to an Aspect of the Invention (FIG. 2)

Figure 2:
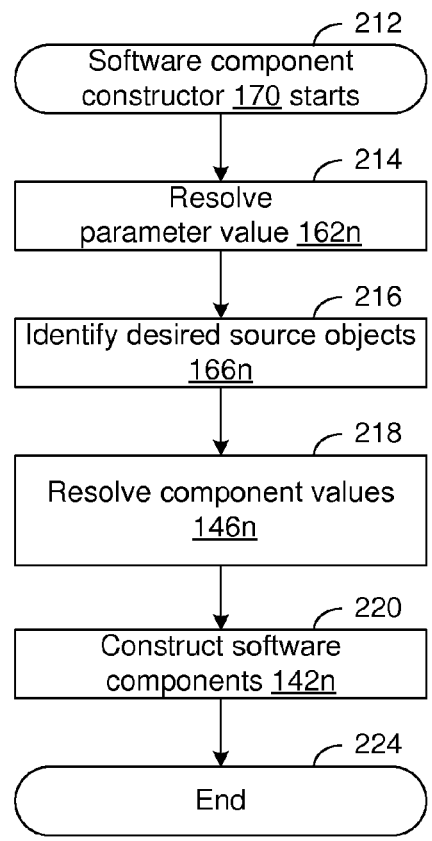
FIG. 2 illustrates a flowchart representing an exemplary construction of an exemplary software component, according to an aspect of an embodiment of the invention.

FIG. 2 illustrates an exemplary flowchart of an exemplary working of software component constructor 170 created at operation 122 in FIG. 1B. This flowchart illustrates only one mode of implementation of software component constructor 170 in accordance with an aspect of an embodiment of the invention. Any person who is skilled in the art can construct software component constructor 170 in many different manners. In other words, FIG. 2 explains operation 126 in greater detail.

At terminal 212, software component constructor 170 starts.

According to an aspect of an embodiment of the invention, at operation 214, the parameter value resolution module 170a resolves one or more parameter values $162_n$ wherein the parameter values $162_n$ are required for constructing one or more desired software components $142_n$.

According to an aspect of an embodiment of the invention, at operation 216, source objects $166_n$ are identified by the source object resolution module 170c, wherein the source objects $166_n$ are required to be utilized for constructing the desired software components $142_n$.

According to an aspect of an embodiment of the invention, at operation 218, component values $146_n$ are resolved by the source object resolution module 170c from the source objects $166_n$. According to an aspect of an embodiment of the invention, the source object resolution module 170c may also utilize, for resolving the component values $146_n$, one or more of the following:

1. one or more parameter values $162_n$,
2. one or more token values $154_n$, wherein one or more token values $154_n$ may be processed by the data token processing module 170b, and
3. any combinations thereof.

At operation 220, the software component constructor 170 constructs the desired software components $142_n$ on the basis of sets of predetermined rules $140_n$, and by utilizing one or more of the following:

1. The parameter values $162_n$.
2. The token values $154_n$, wherein the token values $154_n$ may be processed by the data token processing module 170b.
3. The resolved component values $146_n$, and
4. Any combinations thereof.

At terminal 224, the construction of the desired software components $142_n$ ends.

Figure 3:
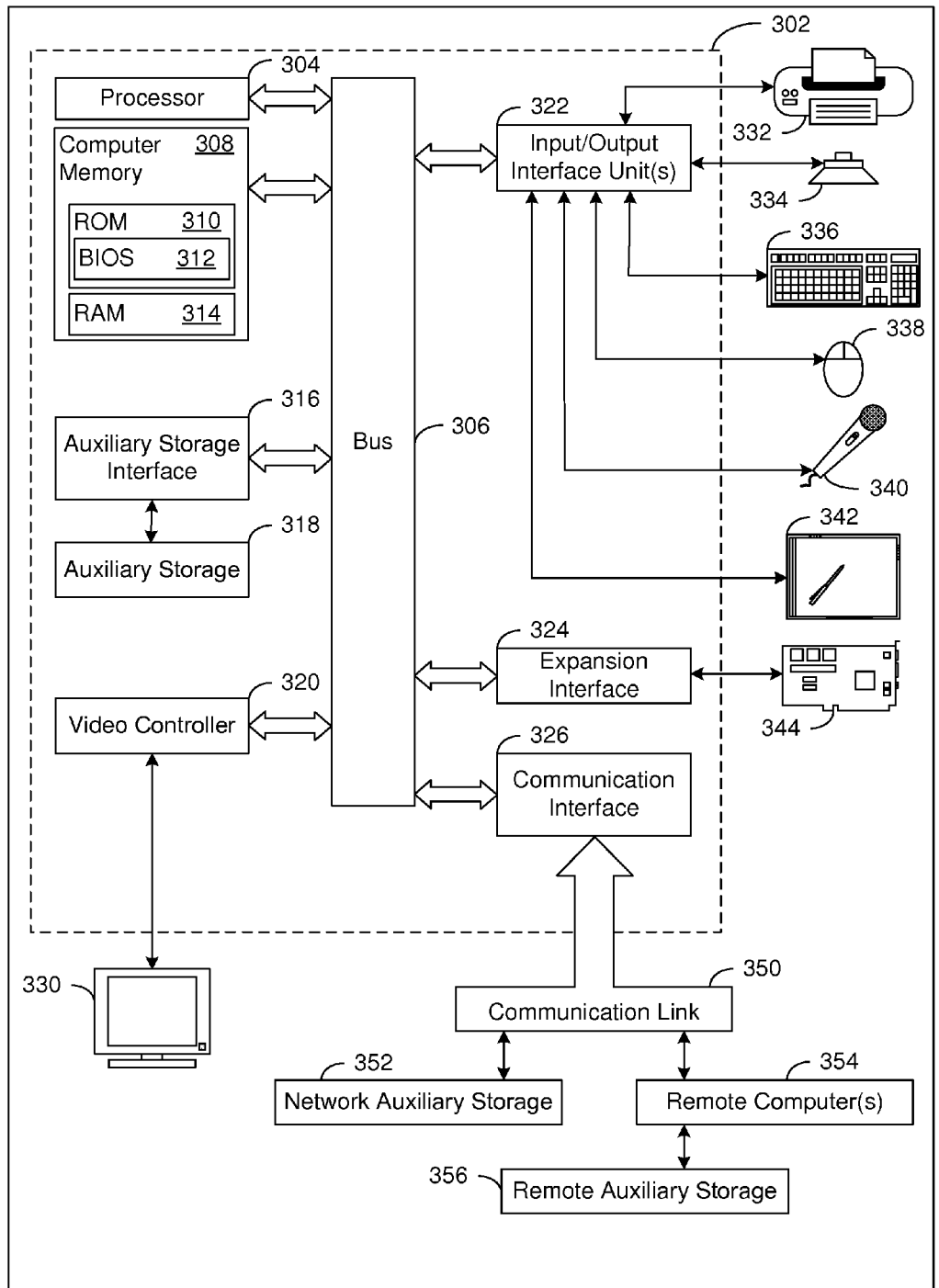
FIG. 3 is an exemplary illustration of a schematic diagram of a computing system environment inclusive of an exemplary computer and other exemplary components which are suitable for implementing an aspect of an embodiment of the invention.

10. An Exemplary Environment for Carrying Out an Aspect of an Embodiment of the Invention FIG. 3 illustrates an exemplary block diagram of an exemplary computing system environment 300 which is suitable for an implementation of an aspect of an embodiment of the invention. Computing system environment 300 includes an exemplary computer 302, an exemplary display unit 330, an exemplary printer 332, an exemplary speaker 334, an exemplary keyboard 336, an exemplary pointing device 338, an exemplary microphone 340, an exemplary digitizer 342, and an exemplary expansion card 344. Computer 302 is connected to an exemplary remote computer(s) 354 so as to work in a networked environment, wherein remote computer(s) 354 is connected to computer 302 via an exemplary communication link 350. Moreover, an exemplary network auxiliary storage 352 is connected to computer 302 via communication link 350, and an exemplary remote auxiliary storage 356 is connected to computer 302 via remote computer(s) 354. Communication link 350 is connected to computer 302 via an exemplary communication interface 326.

Computing system environment 300 in FIG. 3 illustrates only one example of an exemplary environment in which an embodiment of the invention can be implemented, but does not suggest any limitation as to the scope of use and/or functionality of the invention. Moreover, the invention is neither dependent, nor restricted, in any way, on computing system environment 300 inclusive of all the exemplary components incorporated therein. Additionally, computing system environment 300 should not be interpreted as having any dependency on any one and/or any combinations of the components illustrated in computing system environment 300. Furthermore, computing system environment 300 is not limited to the illustrated components; the number of components may be more or less in other configurations and/or environments.

In addition to computing system environment 300, the embodiments of the invention can be implemented under any other general and/or special purpose computing system environment and/or configuration. By way of an example, and not a limitation, some of the well-known computing environments and/or configurations that can utilize the invention may include, but are not limited to, a personal computer, a server computer, a hand-held computer, a laptop computer, a tablet device, a portable communication device, a cellular phone, a multiprocessor based system, a workstation, a programmable consumer electronic, a set top box, a game console, a network personal computer, a minicomputer, a mainframe computer, a super computer, a distributed computing environment that may include any of the above mentioned systems, a process control computer, a flight computer, a GPS device, a media player, and a computer that control automobiles.

The components illustrated in computer 302 include an exemplary processor 304, an exemplary bus 306, an exemplary computer memory 308, an exemplary ROM 310 (Read Only Memory), an exemplary BIOS 312 (Basic Input Output System), an exemplary RAM 314 (Random Access Memory), an exemplary auxiliary storage interface 316, an exemplary auxiliary storage 318, an exemplary video controller 320, an exemplary input/output interface unit(s) 322, an exemplary expansion interface 324, and communication interface 326.

Processor 304, which may be utilized in a plurality, is connected to bus 306. Processor 304 may include, but is not limited to, a microprocessor, a RISC (Reduced Instruction Set Computer) processor, and a CISC (Complex Instruction Set Computer) processor.

Bus 306, which connects one or more components to processor 304 for facilitating data exchange between processor 304 and the connected one or more components, may comprise one or more of the following:

1. a system bus,
2. a peripheral bus, and/or
3. any combinations thereof.

The system bus is also known as a local bus, a processor bus or an FSB (Front-Side Bus). The system bus may further comprise an address bus, a memory bus, a data bus, a Northbridge, an MCH (Memory Controller Hub), and the like. The peripheral bus is also known as an I/O bus.

Bus 306 may include, but is not limited to, an ISA (Industry Standard Architecture) bus, an EISA (Extended Industry Standard Architecture) bus, an MCA (Micro Channel Architecture) bus, a VESA (Video Electronics Standard Association) bus, a VLB (VESA Local Bus), a PCI (Peripheral Component Interconnect) bus, a Multibus, a Unibus, a FireWire bus, an SCSI (Small Computer System Interface) bus, a RS-232 bus, an ATA (Advanced Technology Attachment) bus, a SATA (Serial Advanced Technology Attachment) bus, a PATA (Parallel Advanced Technology Attachment) bus, a USB (Universal Serial Bus), a serial bus, a CardBus, a PCMCIA (Personal Computer Memory Card International Association) bus, an AGP (Accelerated Graphics Port) bus, an ExpressCard bus, a wishbone bus, a CAN (Controller Area Network) bus, a FlexRay bus, and an STD bus. Moreover, the invention will also work with any type and combination of bus topologies which may include, but are not limited to, a parallel, a serial, a daisy-chain, and a multi-drop.

Bus 306 may also provide for adding one or more input/output components to expansion interface 324 by utilizing expansion card 344. Expansion interface 324 and expansion card 344 may support one or more bus types that are supported by bus 306.

Expansion interface 324 may include, but is not limited to, an ISA (Industry Standard Architecture) interface, a PCI (Peripheral Component Interconnect) interface, a FireWire interface, a SCSI (Small Computer System Interface) interface, an RS-232 interface, an ATA (Advanced Technology Attachment) interface, a SATA (Serial Advanced Technology Attachment) interface, a PATA (Parallel Advanced Technology Attachment) interface, a USB (Universal Serial Bus) interface, a PCMCIA (Personal Computer Memory Card International Association) interface, an AGP (Accelerated Graphics Port) interface, and an ExpressCard interface.

Expansion card 344 may include, but is not limited to, a modem, a network card, a Bluetooth card, a USB interface card, a video card, a sound card, a PLC (Programmable Logic Controller) card, and a card that provides an interface to a special hardware.

Computer 302 typically requires a memory which is represented in FIG. 3 as computer memory 308. Computer memory 308 comprises ROM 310 and RAM 314. However, computer memory 308 is not limited to ROM 310 and/or RAM 314, and may include any other type and/or form of memory that may be accessed directly by processor 304. Computer memory 308 is connected to bus 306 for storing information and instructions to be executed by processor 304. Moreover, contents of computer memory 308 may also include contents that are being currently operated upon by processor 304. For this purpose, bus 306 connects computer memory 308 to processor 304.

For a start-up, computer 302 typically requires a set of start-up instructions, wherein the set of start-up instructions is stored in a non-volatile memory, which is represented by ROM 310 in the FIG. 3.

ROM 310 may include, but is not limited to, a ROM (Read Only Memory), also known as solid state ROM, a PROM (Programmable Read Only memory), an EPROM (Erasable Programmable Read Only Memory), and an EEPROM (Electronically Erasable Programmable Read Only Memory), also known as a flash memory.

ROM 310 typically stores BIOS 312, wherein BIOS 312 comprises computer start-up routines and other basic routines that facilitate transfer of information between various components of computer 302. ROM 310 may also store an operating system, a device driver, an application program, a data structure, other program modules, a static application data and the like.

Computer 302 also typically requires a volatile memory, which is represented by RAM 314 in the FIG. 3. RAM 314 is generally utilized for storing a computer program, and information/instructions to be executed by processor 304. RAM 314 may also be utilized for storing temporary variables or other intermediate data during the execution of the instructions by processor 304.

RAM 314 is available in many forms, which may include, but are not limited to, an SRAM (StaticRAM), a DRAM (Dynamic RAM), an SDRAM (Synchronous DRAM), a DDR SDRAM (Double Data Rate SDRAM), an ESDRAM (Enhanced SDRAM), an SLDRAM (Synchronous Link DRAM), and a DRDRAM (Direct Rambus DRAM).

In computer 302, processor 304 can access the contents of ROM 310 and RAM 314 directly by utilizing bus 306. Moreover, the contents of ROM 310 and RAM 314 may include contents that are being currently operated upon by processor 304.

Auxiliary storage interface 316 facilitates connectivity between auxiliary storage 318 and computer 302 via bus 306. Auxiliary storage 318 may also be connected to computer 302 through communication link 350 as network auxiliary storage 352 and/or through remote computer(s) 354 as remote auxiliary storage 356. Auxiliary storage 318 provides storage for software and data which may include, but are not limited to, a computer readable instruction, a data structure, an operating system, a device driver, an application computer program, other program modules, a database, and an application data.

Auxiliary storage interface 316 may include, but is not limited to, one or more of a hard disk interface, a floppy disk interface, a SCSI (Small Computer Serial Interface) interface, an optical disc interface, a Blu-ray disc interface, a magneto-optical interface, a magnetic tape interface, a DAT (Digital Audio Tape) interface, a DASD (Direct Access Storage Device) interface, an ATA (Advanced Technology Attachment) interface, a SATA (Serial Advanced Technology Attachment) interface, a PATA (Parallel Advanced Technology Attachment) interface, and a USB (Universal Serial Bus) interface.

Auxiliary storage 318 may be one or more of a non-volatile non-removable media, a non-volatile removable media, an associated drive for a non-removable media and any combinations thereof.

Auxiliary storage 318 may include, but is not limited to, one or more or any combinations of a hard disk, a fixed disk, a Winchester disk drive, a floppy disk drive and a media, a CD-ROM (Compact Disc Read Only Memory) drive and a media, a CD-R (Compact Disc Recordable) drive and a media, a CD-RW (Compact Disc Re-Writeable) drive and a media, a DVD (Digital Versatile Disc) drive and a media, a Blu-ray drive and a media, an optical disc storage device and a media, a magneto-optical storage device and a media, a magnetic cassette drive and a media, a magnetic tape drive and a media, a paper tape reader and a paper tape, a paper card reader and a paper card, a DAT (Digital Audio Tape) drive and a media, a DASD (Direct Access Storage Device) device and a media, a removable hard disk, and a RAID (Redundant Array of Independent Disks) based hard disk.

Display unit 330 is typically connected to computer 302 through an interface which is video controller 320 in computing system environment 300. Display unit 330 and video controller 320 may be used in a plurality.

Display unit 330 and video controller 320 may be of any type such as a CGA (Color Graphic Adapter), an EGA (Enhanced Graphics Adapter), a VGA (Video Graphics Array), an SVGA (Super Video Graphics Array), an XGA (eXtended Graphics Array), an SXGA (Super XGA), a QVGA (Quarter VGA), a WXGA (Widescreen XGA), an SXGA+, a WXGA+, a WSXGA, a WQVGA, an MDA, a Hercules, an MCGA (Multicolor Graphics Adapter), a UXGA, a WUXGA, a 2K (DLP Cinema Technology), a WQUXGA (Wide Quad Ultra eXtended Graphics Array), and the like.

Display unit 330 and video controller 320 may be connected to each other by utilizing a video interface standard, which may include, but is not limited to, VGA connector standard, DVI (Digital Visual Interface) standard, and HDMI (High-Definition Multimedia Interface) standard.

A touch screen panel (not shown in the FIG. 3) may also be attached to display unit 330, wherein display unit 330 is utilized to display an output, and the touch screen is utilized as an input device.

Computing system environment 300 may include other output devices that may be connected to bus 306 through input/output interface unit(s) 322.

Input/output interface unit(s) 322 may include, but is not limited to, one or more or any combinations of a PS/2 interface, a USB (Universal Serial Bus) interface, a parallel interface, a serial RS-232 interface, and an RS-762 interface.

In computing system environment 300, the following six input/output devices have been illustrated:
1. printer 332,
2. speaker 334,
3. keyboard 336,
4. pointing device 338,
5. microphone 340 and
6. digitizer 342.

However, such input/output devices may include, but are not limited to, a thermal printer, a dot matrix printer, an ink jet printer, a laser printer, a line printer, a plotter, a multifunction printer, a headphone, an earphone, a projector, a mouse, a track ball, a pointing stick, a touch pad, a digitizer, a scanner, a game pad, a joystick, a barcode reader, a game paddle, a webcam, a fingerprint scanner, a web cam, a USB hub, a port replicator, a camera, an access control device, a flash memory key, and a removable hard disk. Moreover, the input/output devices may be used in a plurality.

Computer 302 may also typically operate in a networked environment wherein computer 302 is connected to other computers, such as remote computer(s) 354, by utilizing communication link 350, wherein communication link 350 is established by utilizing communication interface 326, wherein communication interface 326 is coupled with bus 306.

Remote computer(s) 354 may include, but is not limited to, a computer similar to computer 302, a personal computer, a laptop computer, a tablet computer, a notebook computer, a server, a router, a PDA (Personal Digital Assistant), a cellular phone, a network PC, a peer device, other common network nodes, a public network, a cellular network, a mainframe computer, and a minicomputer.

Computer 302 and remote computer(s) 354 may communicate with each other by utilizing one or more technologies which may include, but are not limited to, a web service, a CORBA (Common Object Request Broker Architecture), an RPC (Remote Procedure Call), a CBSE (Component Based Software Engineering), a REST (REpresentational State Transfer), and an email.

Communication interface 326, which is coupled to bus 306, provides a two-way data communication coupling via communication link 350, wherein communication link 350 is utilized for connecting computer 302 with other components such as network auxiliary storage 352, remote computer(s) 354, and remote auxiliary storage 356.

Communication interface 326 may include, but is not limited to, one or more or any combinations of a physical connection, a logical connection, a protocol, a modem, a cable modem, a DSL (Digital Subscriber Line) modem, an ADSL (Asymmetric Digital Subscriber Line) modem, a router, a frame relay connection, an AIN (Advanced Intelligent Network) connection, a synchronous optical connection, a DSL connection, a digital T1 line, a digital T2 line, a digital E1 line, a DDS (Digital Data Service) connection, an Ethernet connection, an ISDN (Integrated Services Digital Network) line, a dial-up port, such as, a V.90, a V.34, or a V.34 bis analog modem connection, an ATM (Asynchronous Transfer Mode) connection, an HSSI (High Speed Serial Interface), an FDDI (Fiber Distributed Data Interface), and a CDDI (Copper Distributed Data Interface).

Communication link 350 facilitates establishment of networks which may include, but are not limited to, a LAN (Local Area Network), a MAN (Metropolitan Area Network), a WAN (Wide Area Network), a PAN (Personal Area Network), a SAN (Storage Area Network), a CAN (Campus Area Network), and a VPN (Virtual Private Network).

Communication link 350 may include, or may access any one or more of, a WAP (Wireless Application Protocol) link, a GPRS (General Packet Radio Service) link, a GSM (Global System for Mobile Communication) link, a CDMA (Code Division Multiple Access) or a TDMA (Time Division Multiple Access) link, such as a cellular phone channel, a GPS (Global Positioning System) link, a CDPD (cellular digital packet data), a RIM (Research in Motion Limited) duplex paging type device, a Bluetooth radio link, an IEEE 802.11-based radio frequency link, a #G Link, an HSPA link, and the like.

Communication link 350 may further include, or may access any one or more of, an RS-232 serial connection, an IEEE-1394 (Fiber wire) connection, an IrDA (infrared) port, a SCSI (Small Computer Serial Interface) connection, a USB (Universal Serial Bus) connection, and any other interface or connection, wired or wireless, digital or analog. The interfaces may include, but are not limited to, Ethernet interfaces, frame relay interfaces, cable interfaces, DSL interfaces, and token ring interfaces. Moreover, various very high-speed interfaces may be utilized; for example, fast Ethernet interfaces, Gigabit Ethernet interfaces, ATM interfaces, POS (Point Of Sale) interfaces, FDDI (Fiber Distributed Data Interface), and the like. An interface may include an appropriate port for a communication with an appropriate media.

Communication link 350 may be deployed by utilizing one or more topologies, which may include, but are not limited to, a bus topology, a star topology, a ring topology, a mesh topology, a star-bus topology, and a tree or a hierarchical topology.

Communication link 350 may utilize one or more protocols for communication which may include, but are not limited to, a IP (Internet Protocol), an IPv4, an IPv6, an ICMP (Internet Control Message Protocol), an IGMP (Internet Group Management Protocol), an IPsec (Internet Protocol Security), a TCP (Transmission Control Protocol), a UDP (User Datagram Protocol), an HTTP (Hypertext Transfer Protocol), an FTP (File Transfer Protocol), a Telnet, an IRC (Internet Relay Chat), a DSL (Digital Subscriber Line), and an ISDN (Integrated Service Digital Network).

Remote computer(s) 354 and communication link 350 may be used in a plurality and/or in any combinations thereof, simultaneously or separately. More particularly, programming or configuring or causing an apparatus or device, for example, a computer, to execute the described functions of embodiments of the invention creates a new machine wherein case of a computer, a general purpose computer, in effect becomes a special purpose computer once it is programmed or configured or caused to perform particular functions of the embodiments of the invention pursuant to instructions from program software. As discussed, a program/software implementing the embodiments may be recorded on a computer-readable media, e.g., a non-transitory or persistent computer-readable medium.

11. An Exemplary Mode for Carrying Out Certain Aspects of a Few Embodiments of the Invention (FIG. 4A to 10Z)

FIGS. 4A to 10Z illustrate detailed steps which are required, according to an aspect of an embodiment of the invention, for constructing desired exemplary SQL queries, which are software components $142_n$, for MICROSOFT ACCESS and/or ORACLE databases. These steps include:

1. Creating a source object repository 168 (an example of operation 20 illustrated in FIG. 1A), illustrated in FIGS. 4A to 7C. Creation of a source object repository 168 is further explained in detail as follows:
    a. Selecting one or more sets of predetermined rules 140$_n$ (an example of operation 110 illustrated in FIG. 1B), illustrated in FIGS. 4A to 4R.
    b. Categorizing source components 144$_n$ in to indeterminable source components 148$_n$ and determinable source components 150$_n$ (an example of operation 112 illustrated in FIG. 1B), illustrated in FIGS. 4S and 4T.
    c. Defining data tokens 152$_n$ (an example of operation 114 illustrated in FIG. 1B) along with their respective sets of data token rules 158$_n$, illustrated in FIGS. 5A to 5C.
    d. Defining parameters 160$_n$ (an example of operation 116 illustrated in FIG. 1B), illustrated in FIG. 6.
    e. Creating a data model 164 (an example of operation 118 illustrated in FIG. 1B), illustrated in FIGS. 7A to 7B.
    f. Creating a source object repository 168 (an example of operation 120 illustrated in FIG. 1B), illustrated in FIG. 7C.
2. Creating a software component constructor 170 (an example of operation 30 illustrated in FIG. 1A), illustrated in FIGS. 8A to 8X.
3. Constructing one or more software components 142$_n$ (an example of operation 40 illustrated in FIG. 1A), illustrated in FIGS. 9A to 10Z.
    a. Creating source objects 166$_n$ (an example of operation 124 illustrated in FIG. 1B), illustrated in FIGS. 9A to 9O.
    b. Constructing software components 142$_n$ (an example of operation 126 illustrated in FIG. 1B), illustrated in FIGS. 10A to 10Z.

FIGS. 4A to 10Z illustrate an exemplary implementation of a few exemplary embodiments according to some aspects of the invention. However, those familiar with the art to which the present invention relates will recognize various alternative designs, embodiments and implementations for practicing these aspects of the invention, as disclosed in the attached claims.

The term "desired query", wherever used in the detailed description of FIGS. 4A to 10Z, is intended to refer to one or more queries, an example of software component 142, which is to be constructed by utilizing the embodiments illustrated in FIGS. 4A to 9O.

Figure 7B:
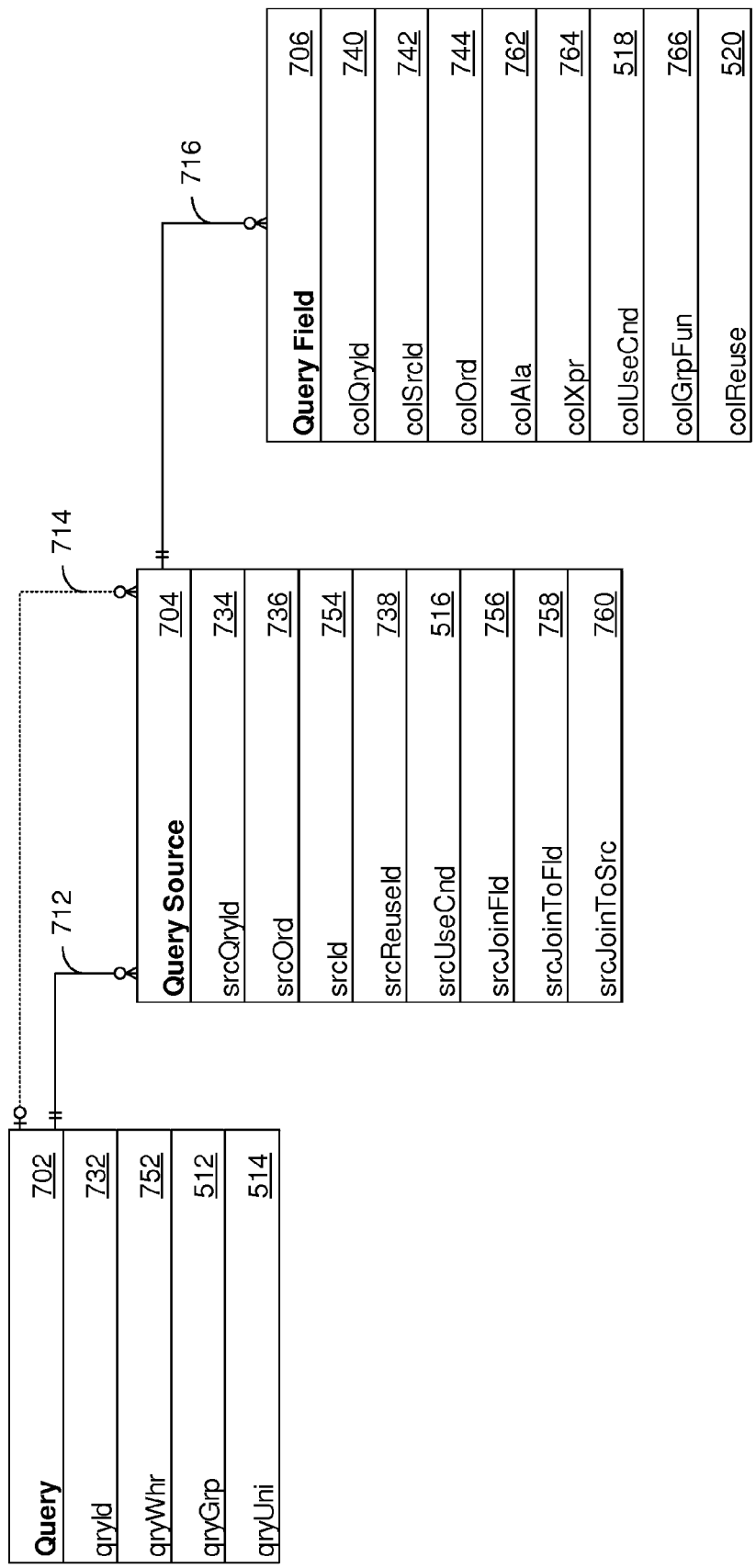
FIG. 7B illustrates an exemplary data model which is sufficient for creating a source object repository, according to an aspect of an embodiment of the invention.
Figure 7C:
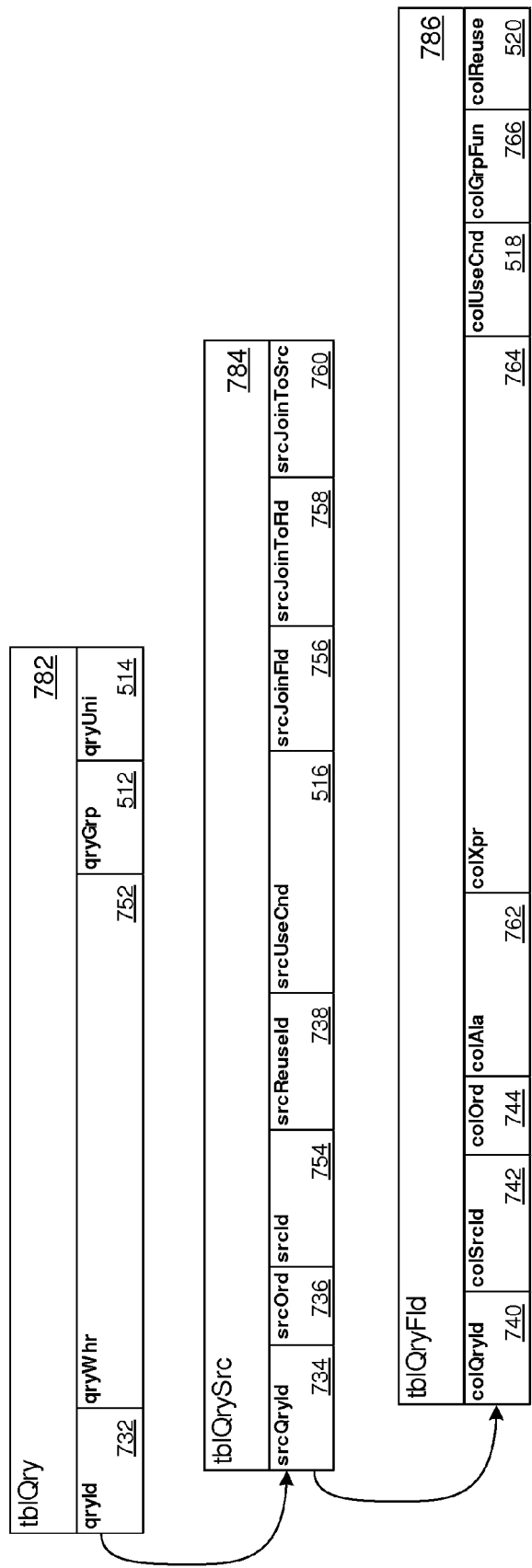
FIG. 7C illustrates an exemplary source object repository which is created on the basis of the exemplary data model, illustrated in FIG. 7B, according to an aspect of an embodiment of the invention.
Figure 8A:
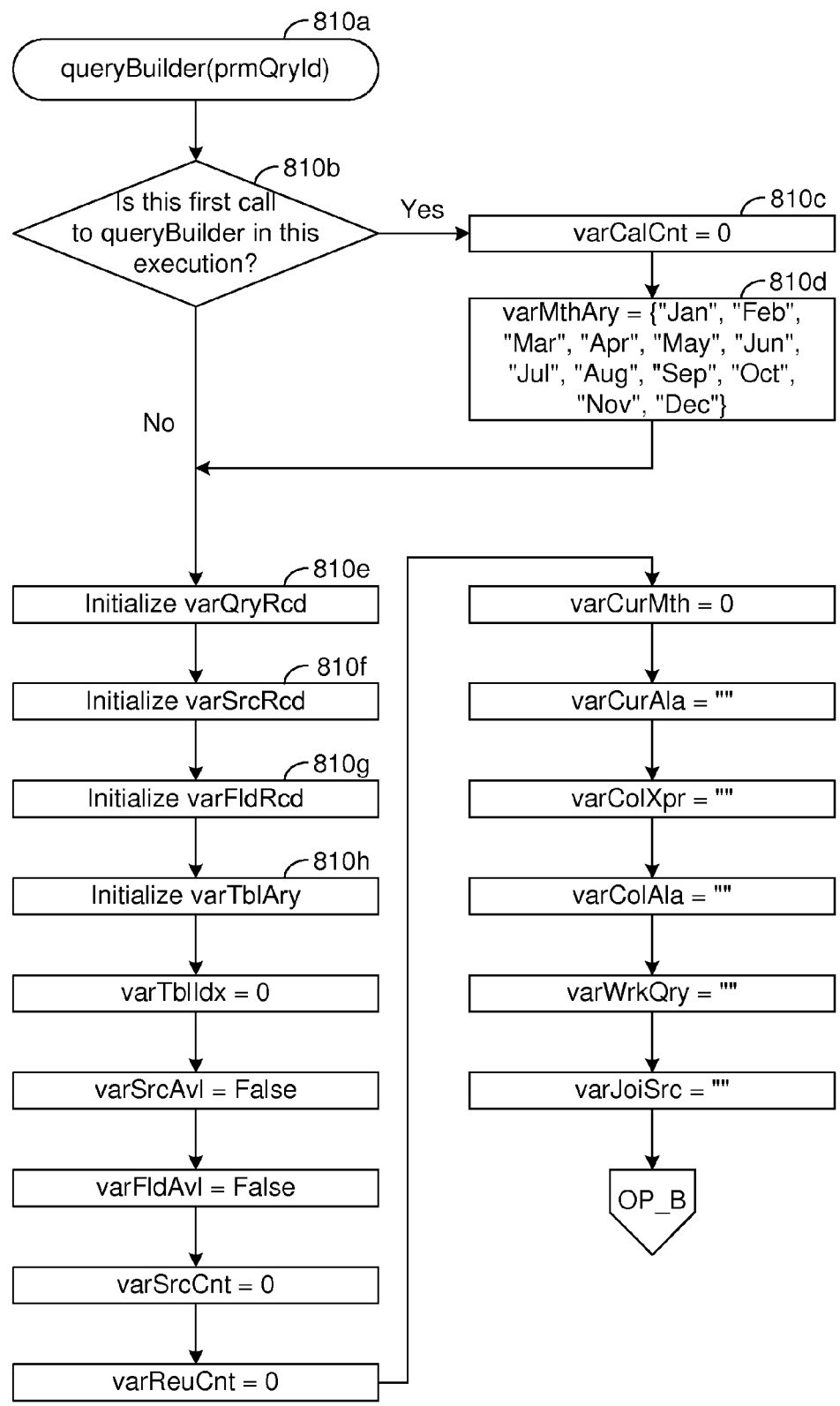
FIGS. 8A to 8P illustrate an exemplary flowchart of an exemplary software component constructor, called query-Builder in this document, according to an aspect of an embodiment of the invention.
Figure 8B:
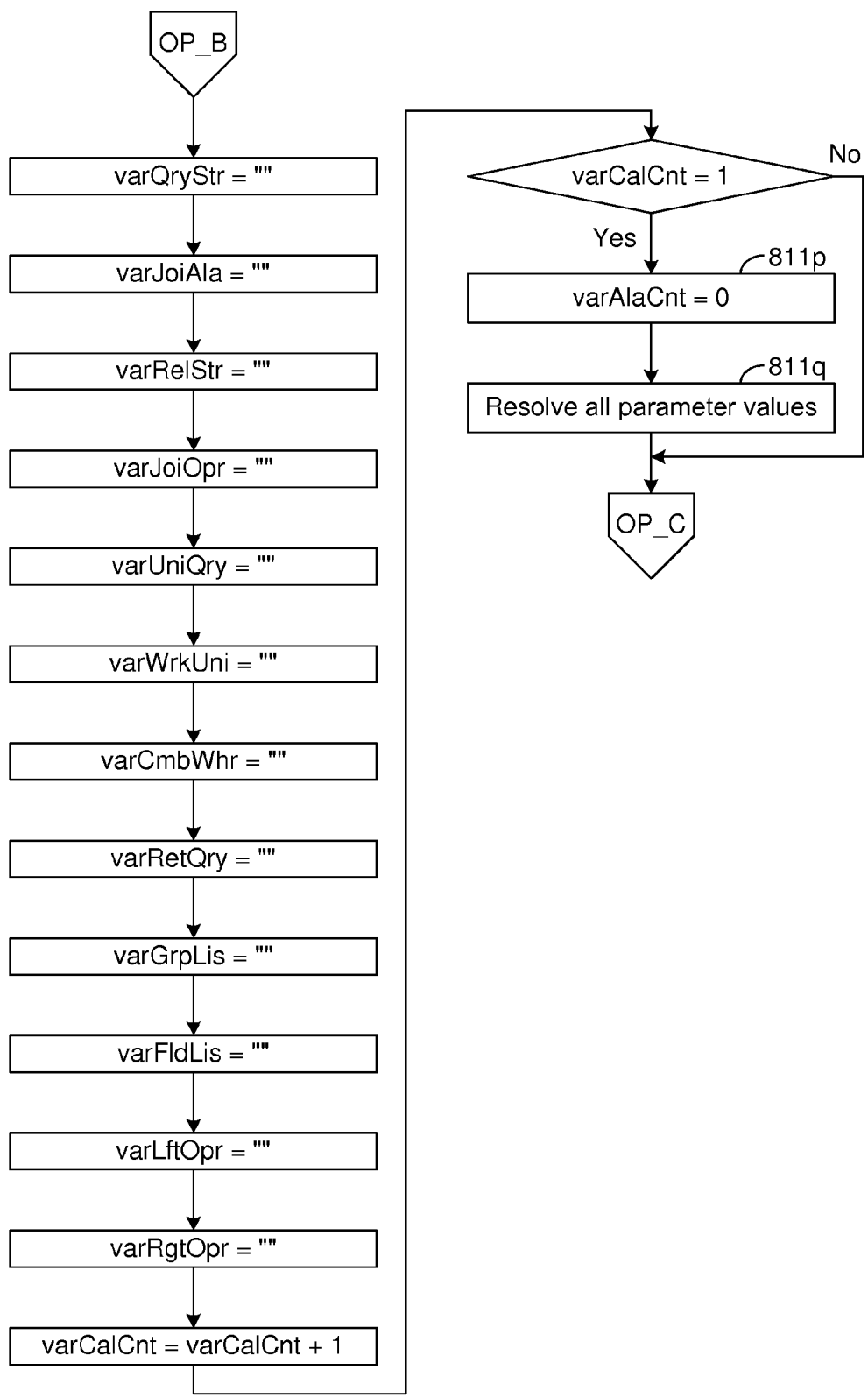
FIG. 8Q illustrates an exemplary flowchart of an exemplary processing of an exemplary specific data token, according to an aspect of an embodiment of the invention.
FIG. 8R illustrates an exemplary flowchart of an exemplary processing of another exemplary specific data token, according to an aspect of an embodiment of the invention.
FIG. 8S illustrates an exemplary flowchart of an exemplary function which is utilized by queryBuilder.
FIGS. 8T to 8X illustrate an exemplary flowchart of the exemplary data token whose processing logic is illustrated in FIGS. 5B and 5C, according to an aspect of an embodiment of the invention.
Figure 8C:
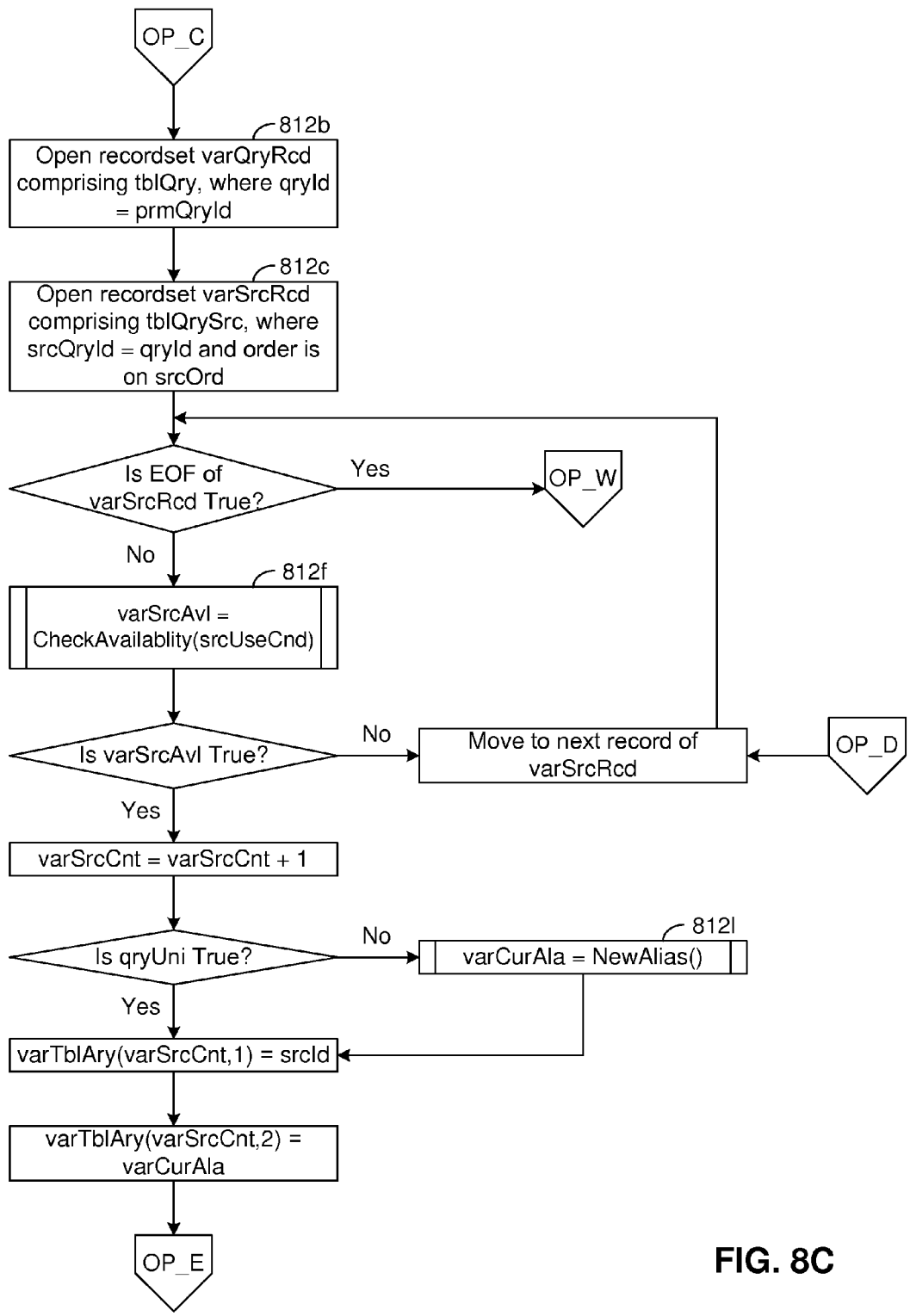
Figure 8D:
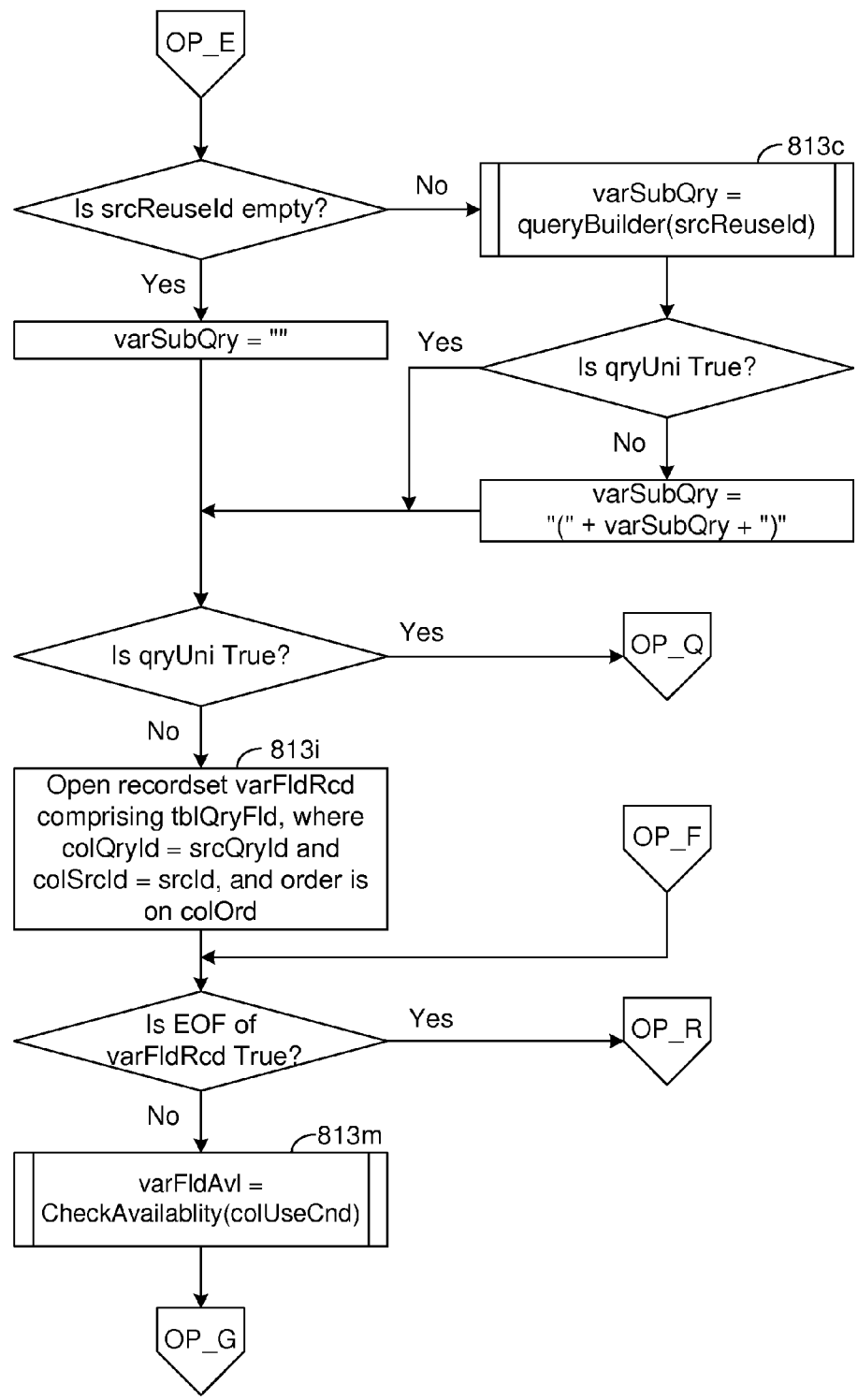
Figure 8E:
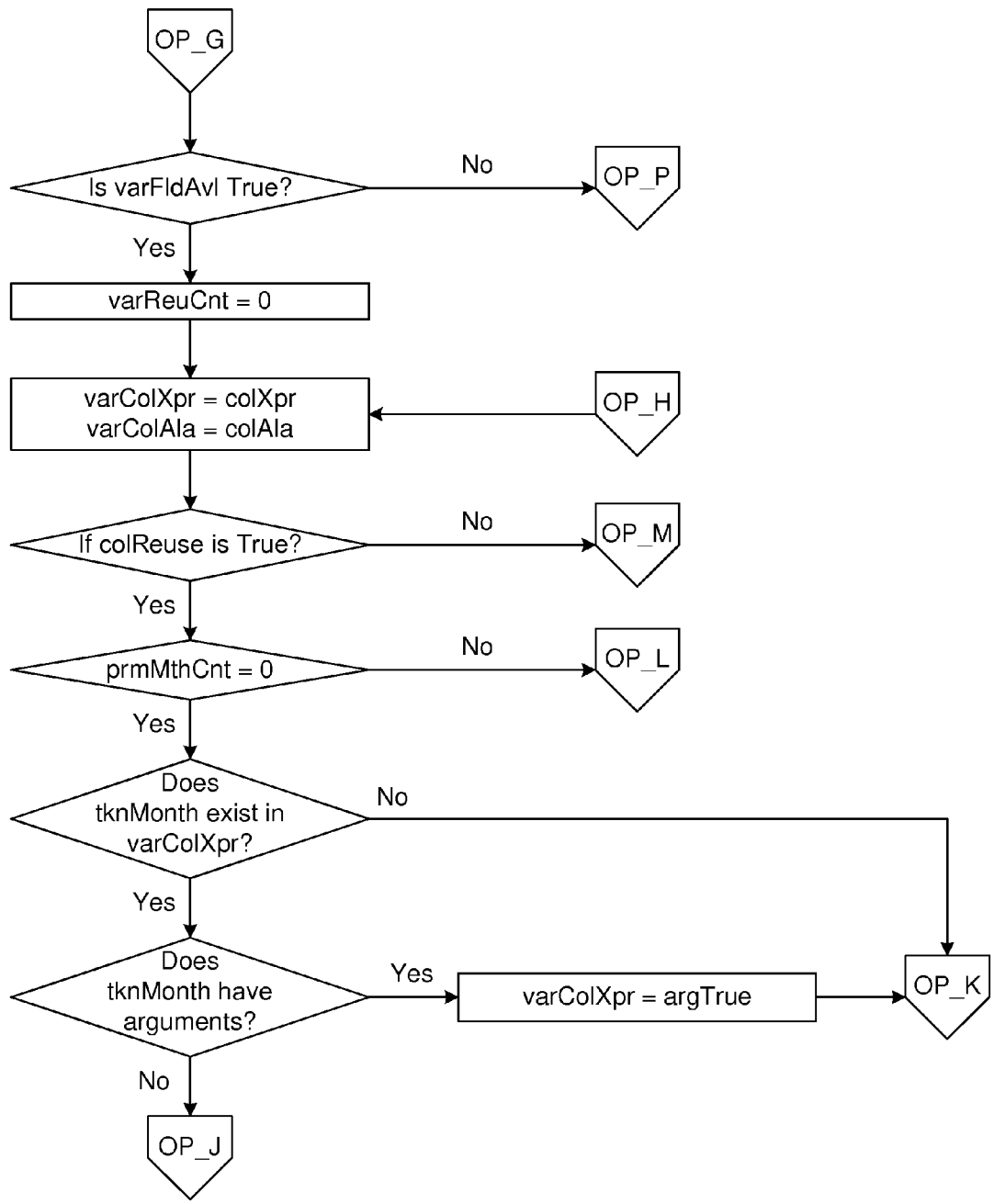
Figure 8F:
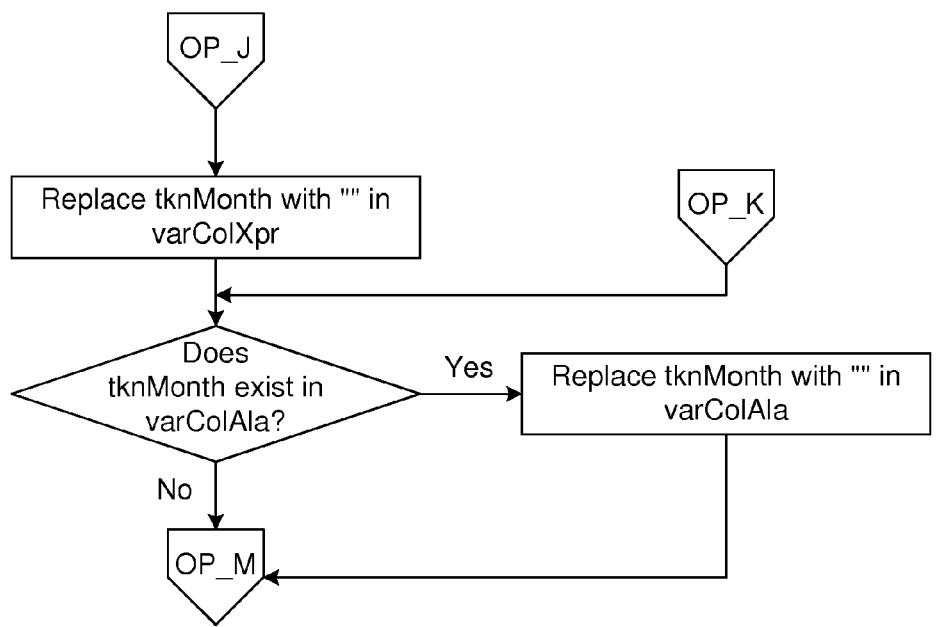
Figure 8G:
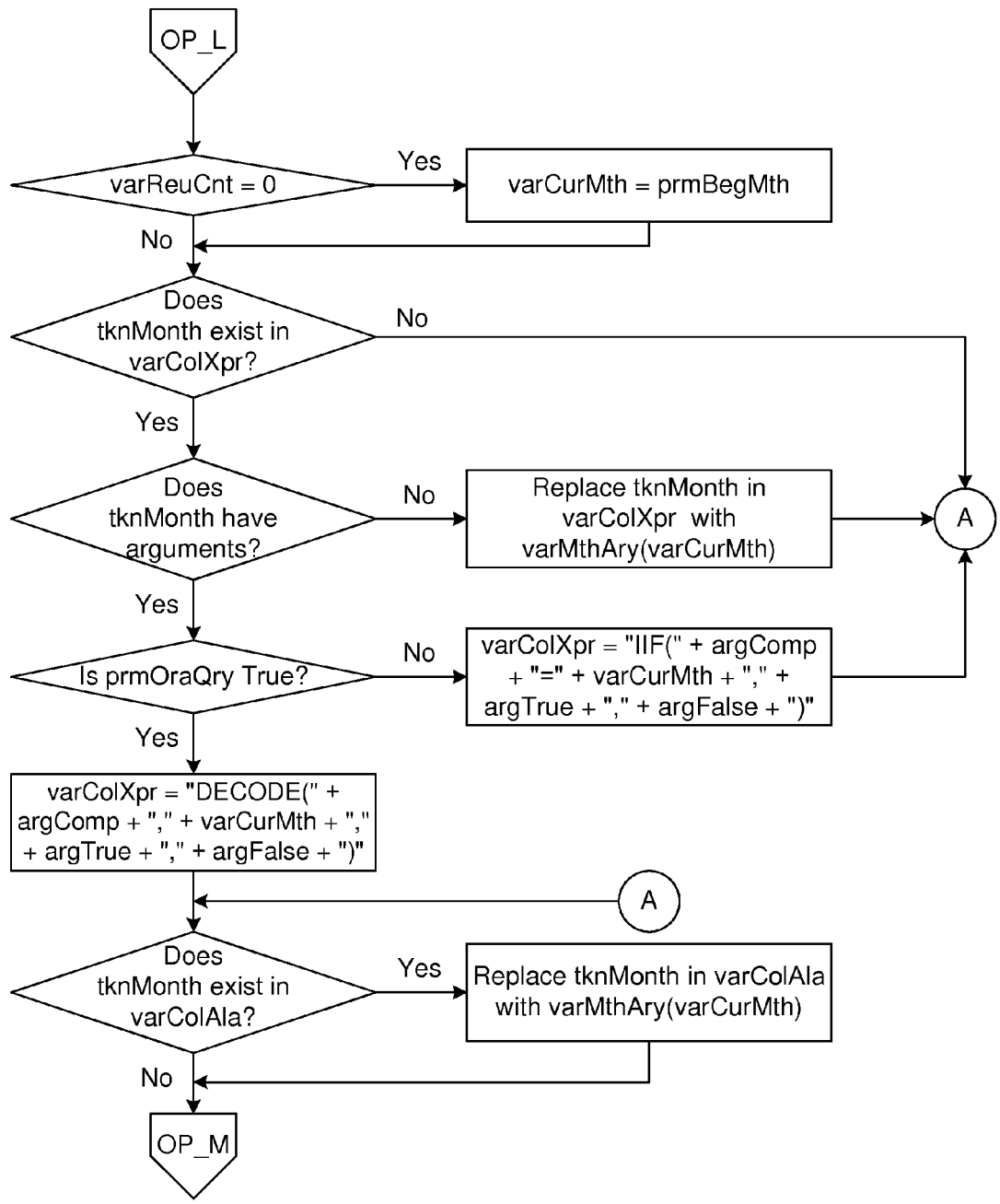
Figure 8H:
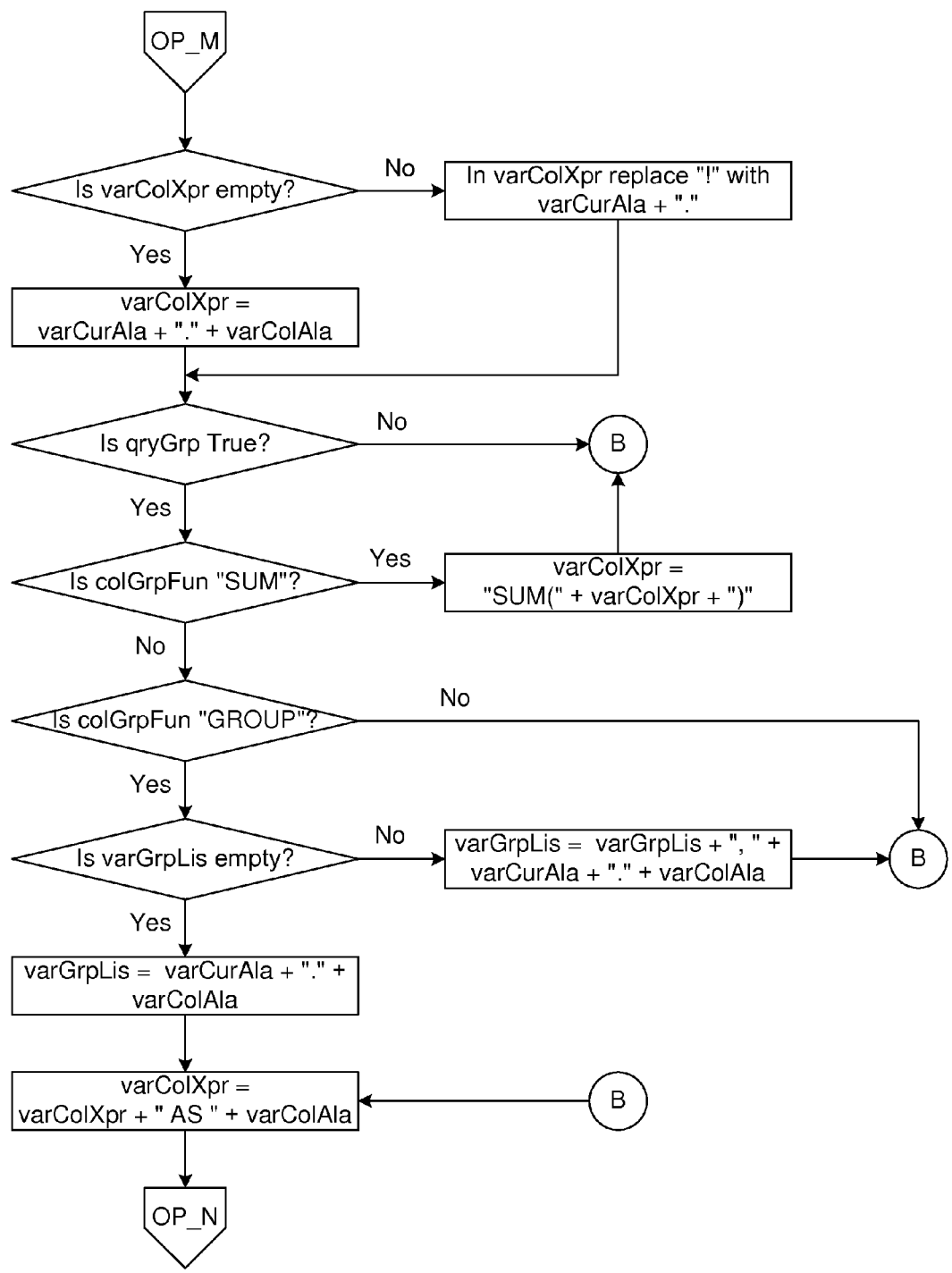
Figure 8I:
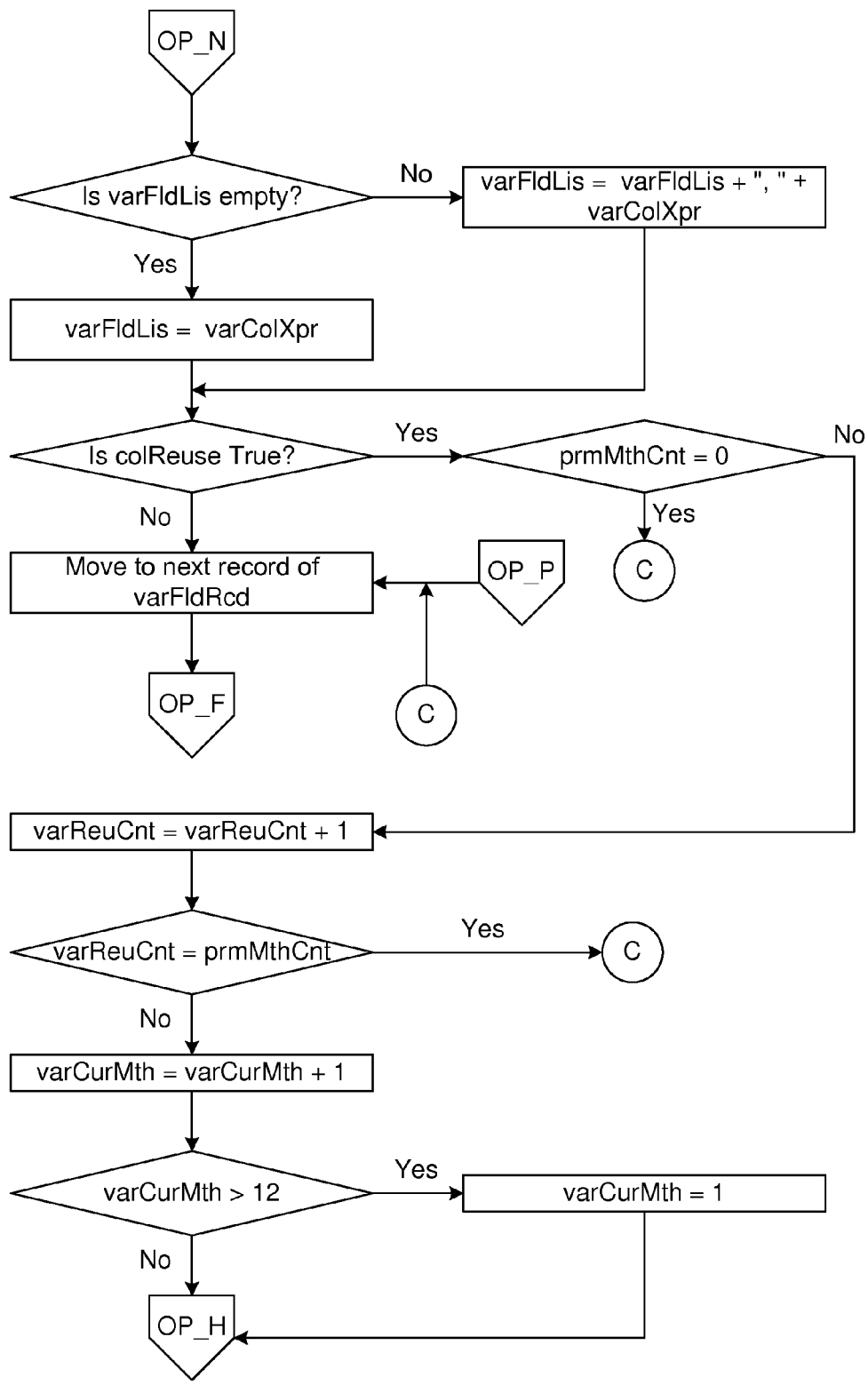
Figure 8J:
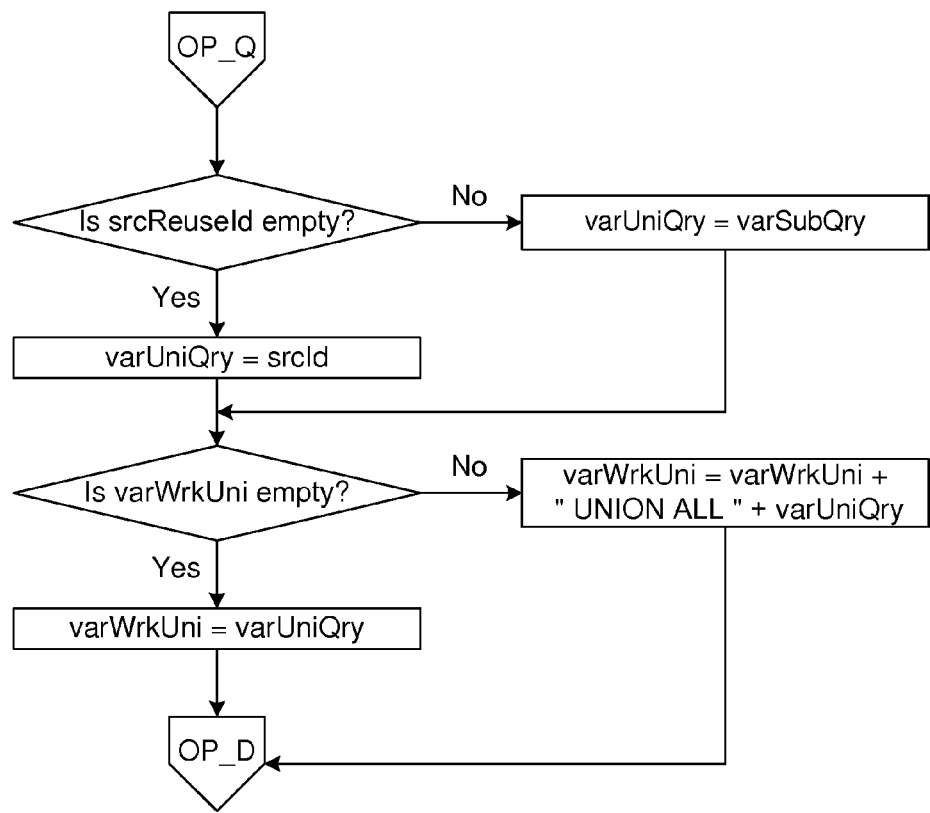
Figure 8K:
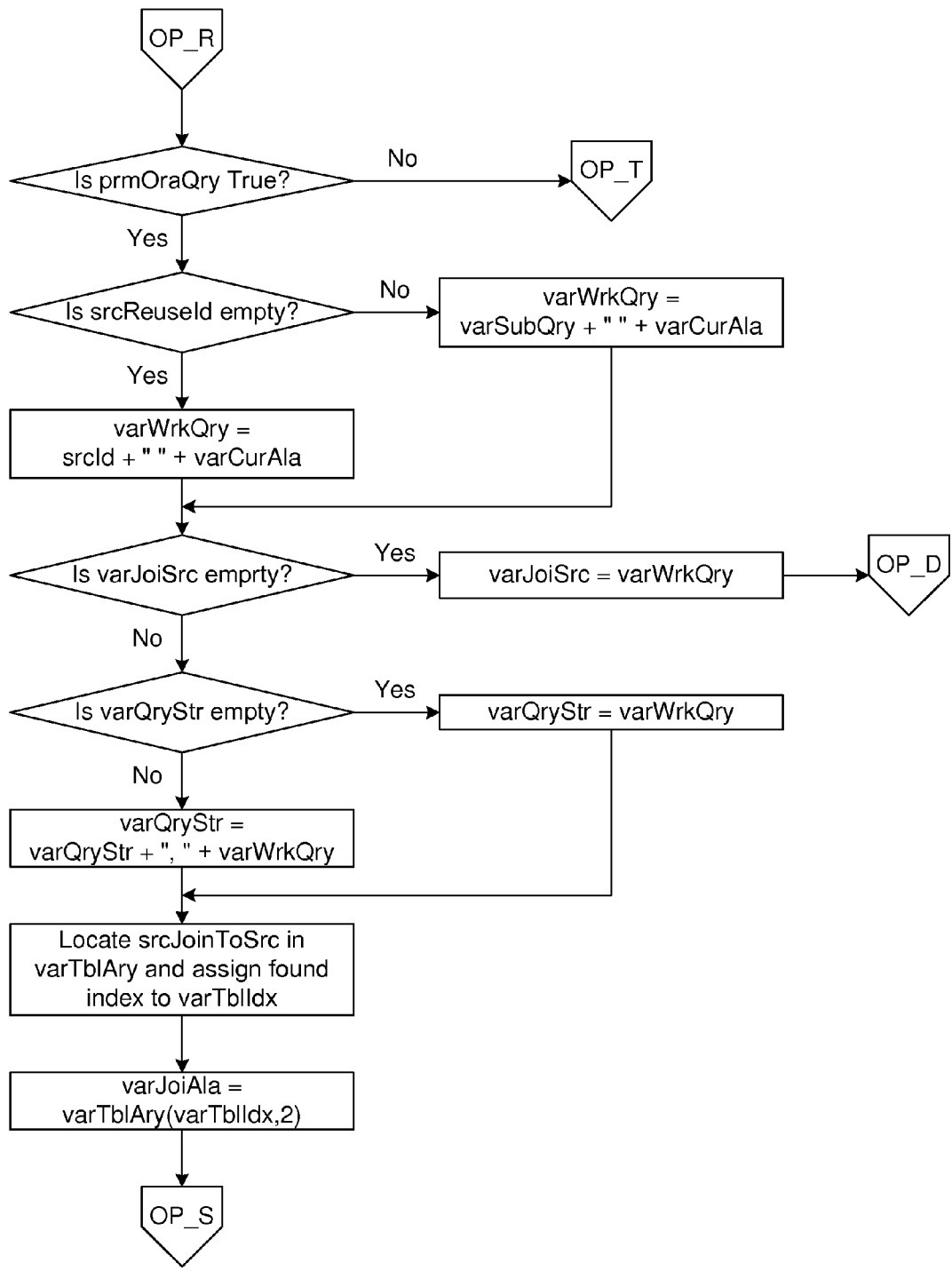
Figure 8L:
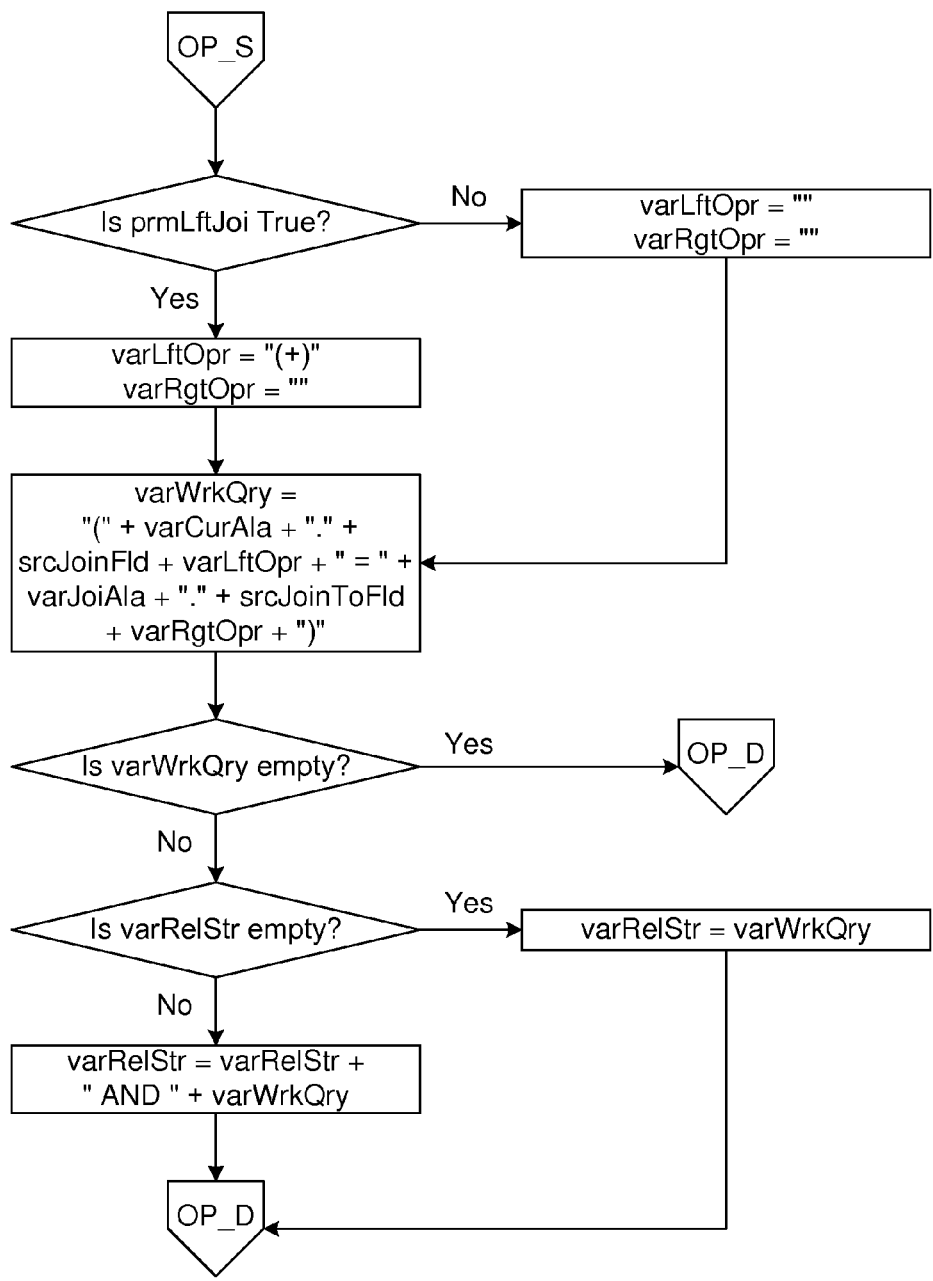
Figure 8M:
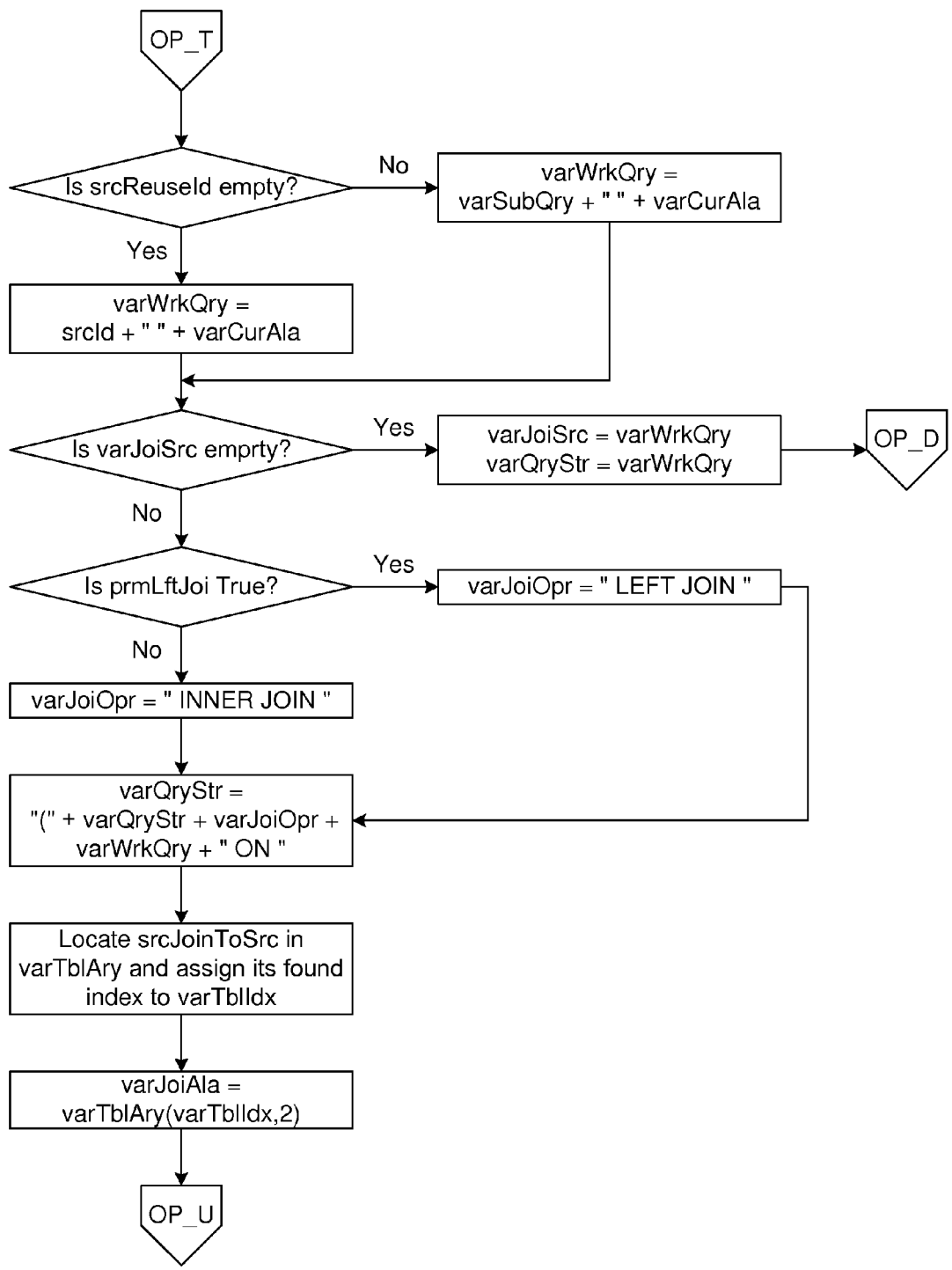
Figure 8N:
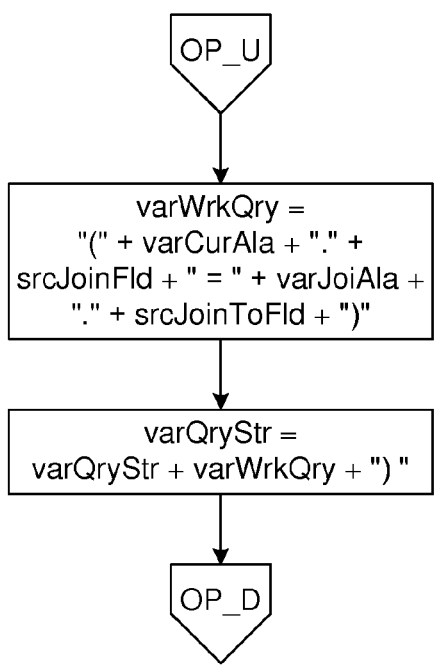
Figure 8O:
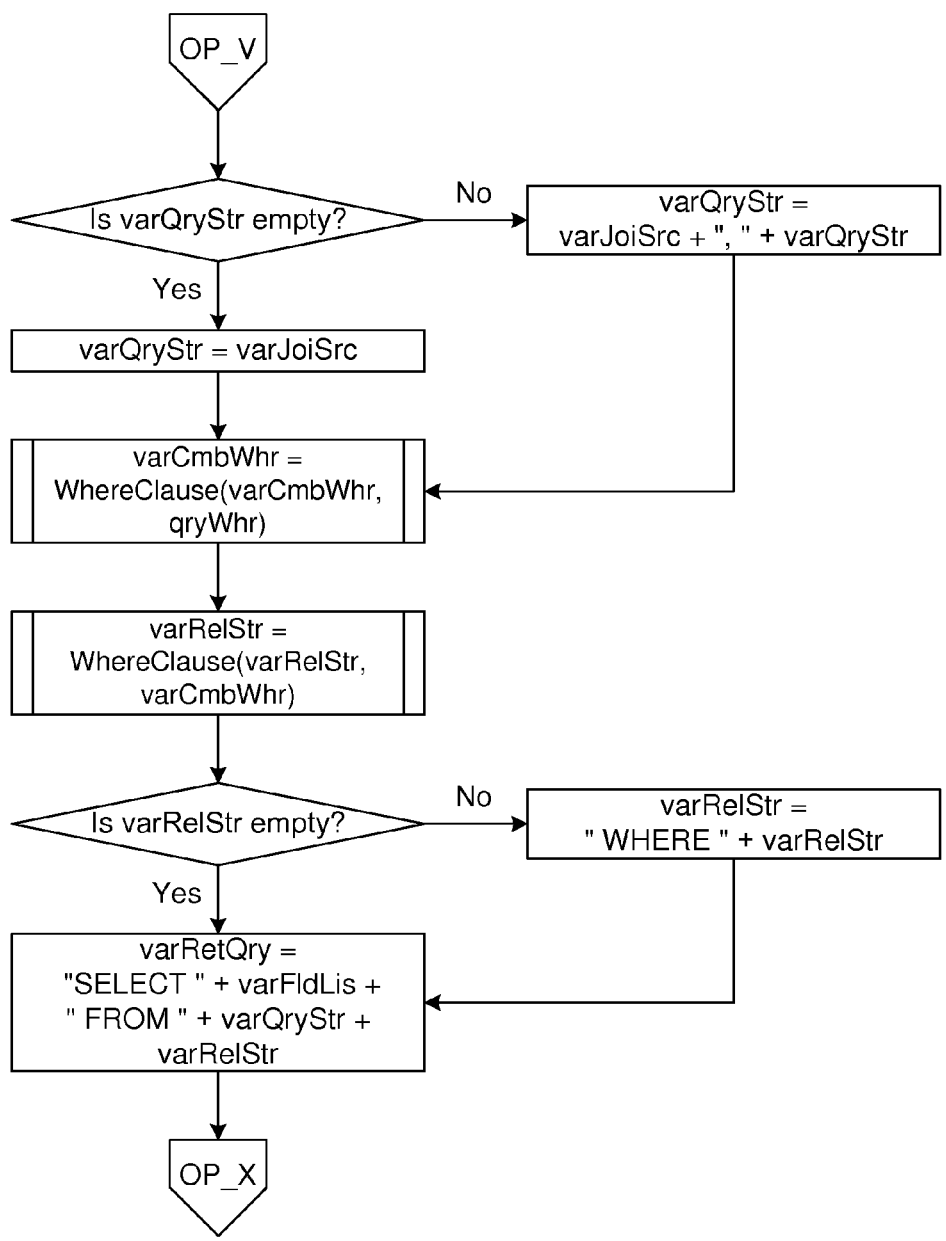
Figure 8P:
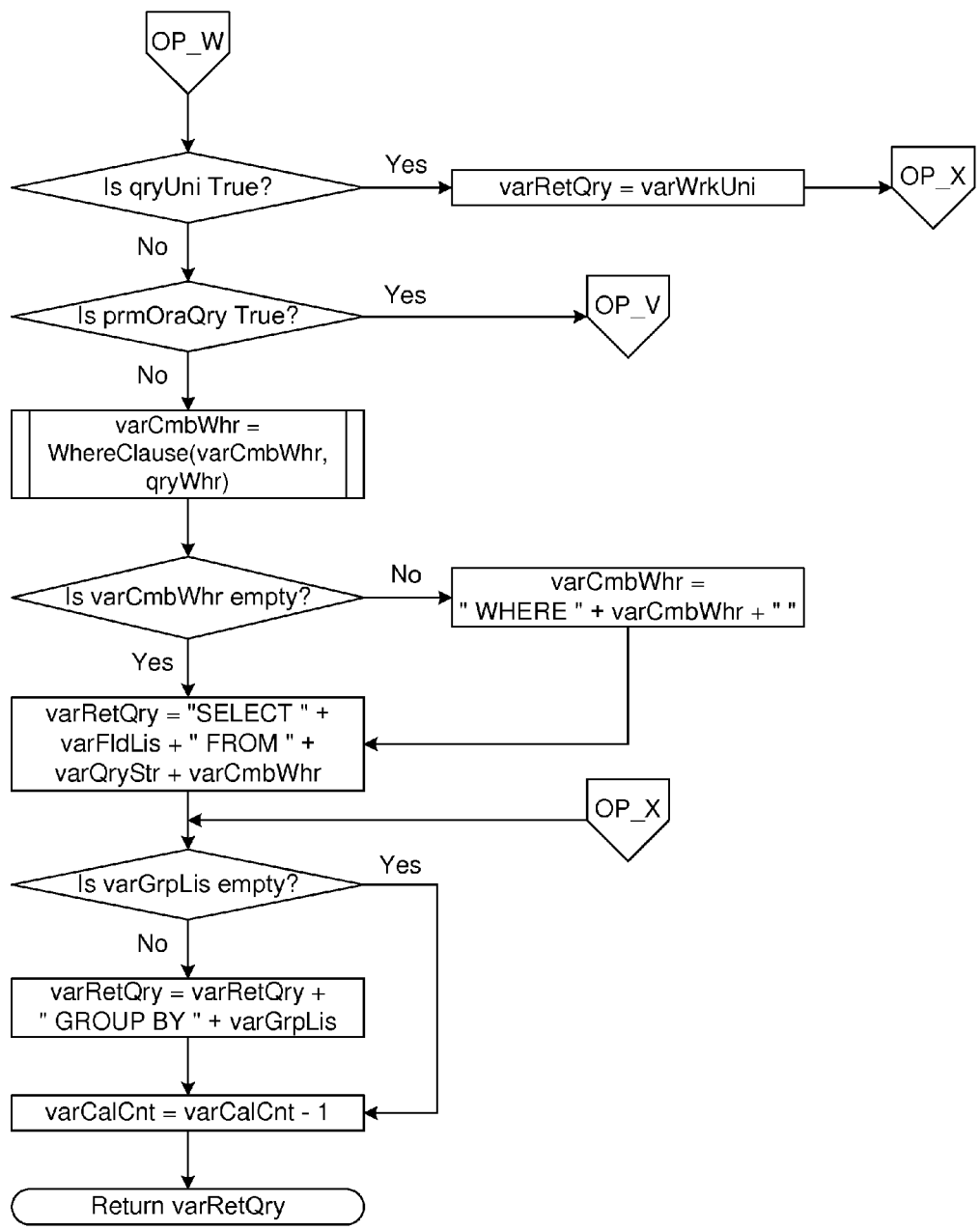

The term "queryBuilder", wherever used in the description of FIGS. 4A to 10Z, is intended to refer to an example of the software component constructor 170. queryBuilder is an exemplary embodiment developed in accordance with certain principles of the invention and is illustrated in FIGS. 8A to 8P. However, the invention is not, in any way, dependent on or restricted by queryBuilder.

Figure 4A:
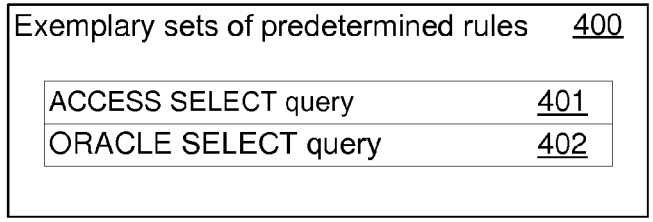
FIG. 4A illustrates two exemplary sets of predetermined rules which are selected according to an aspect of an embodiment of the invention.
Figure 4B:
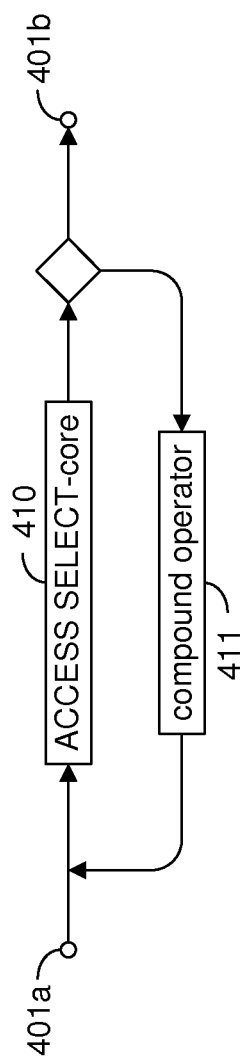
FIGS. 4B to 4K illustrate an exemplary syntax diagram of a set of predetermined rules for ACCESS SELECT QUERY, selected according to an aspect of an embodiment of the invention.
Figure 4C:
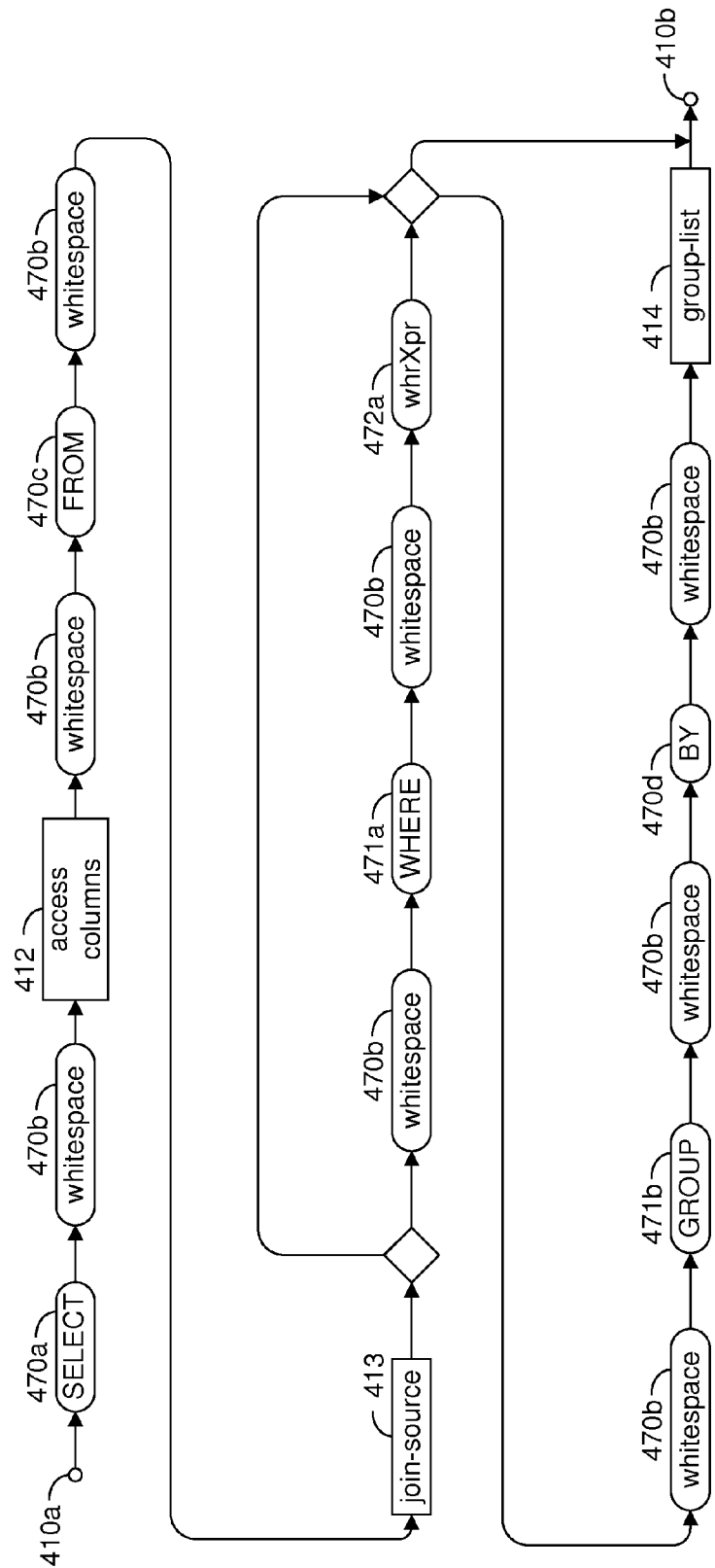
Figure 4D:
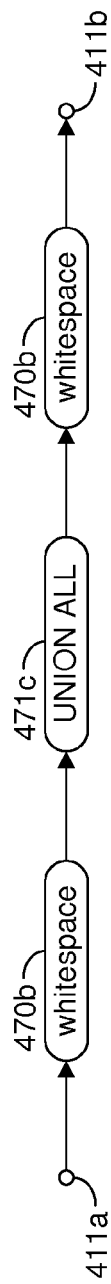
Figure 4E:
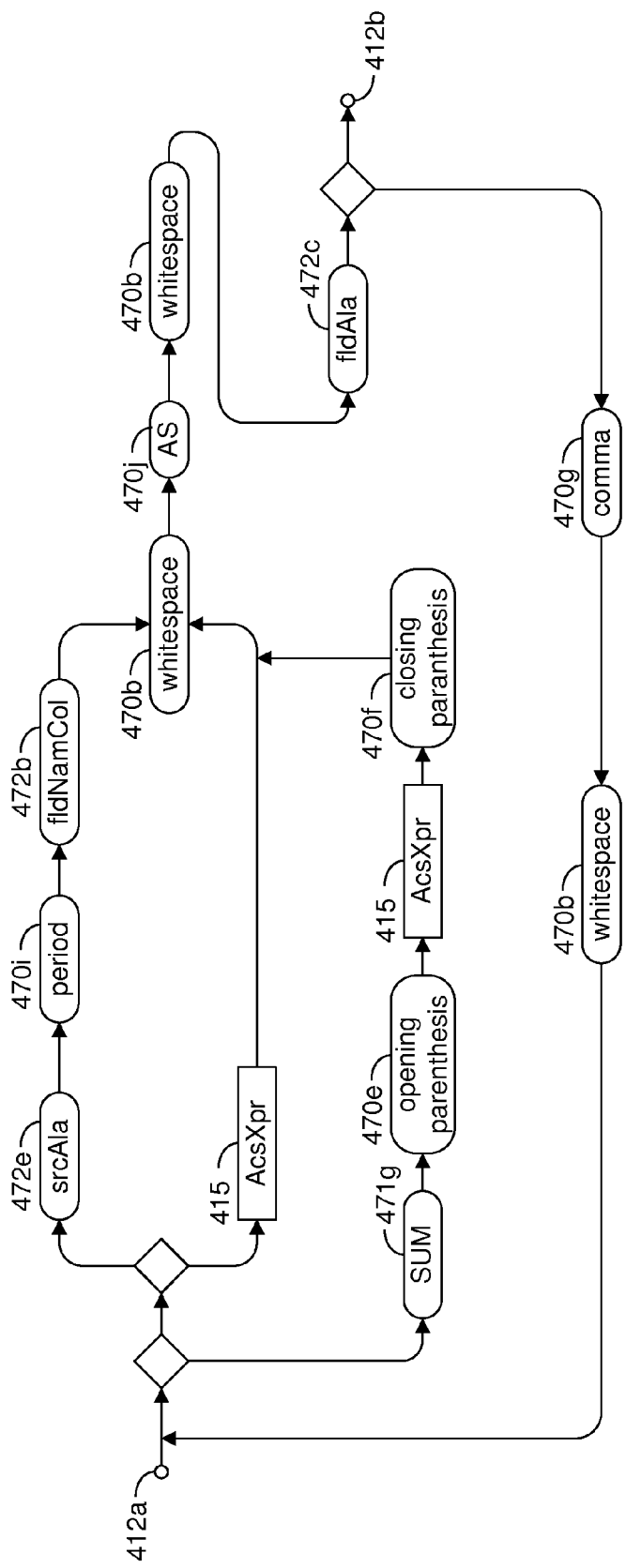
Figure 4F:
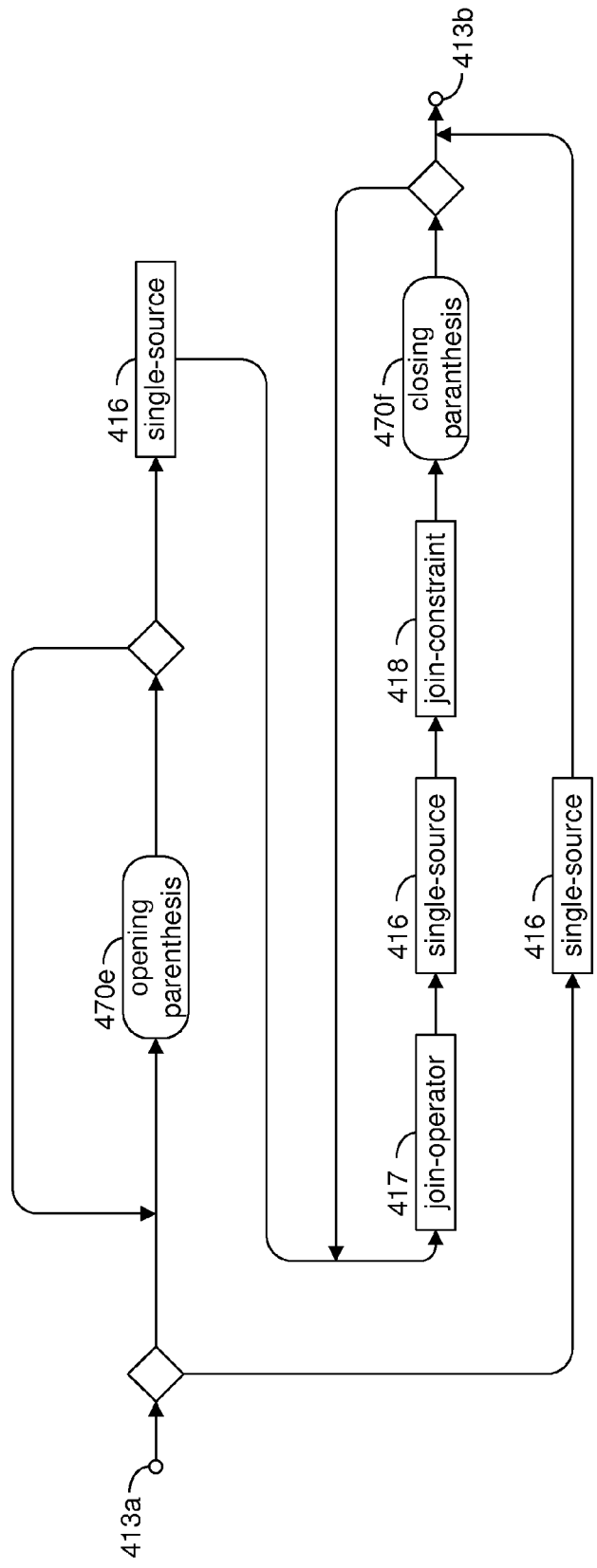
Figure 4G:
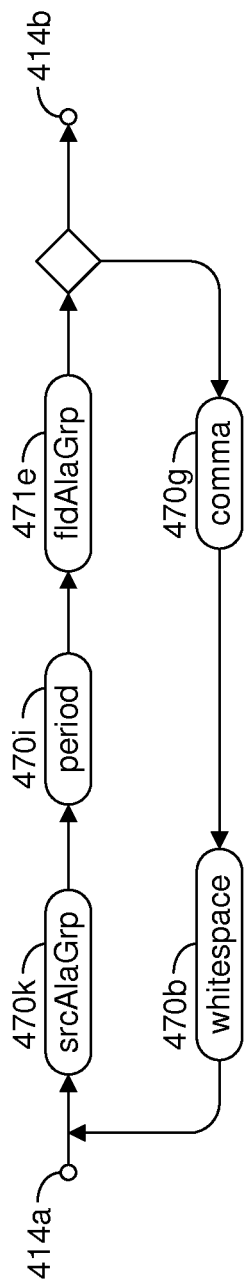
Figure 4H:
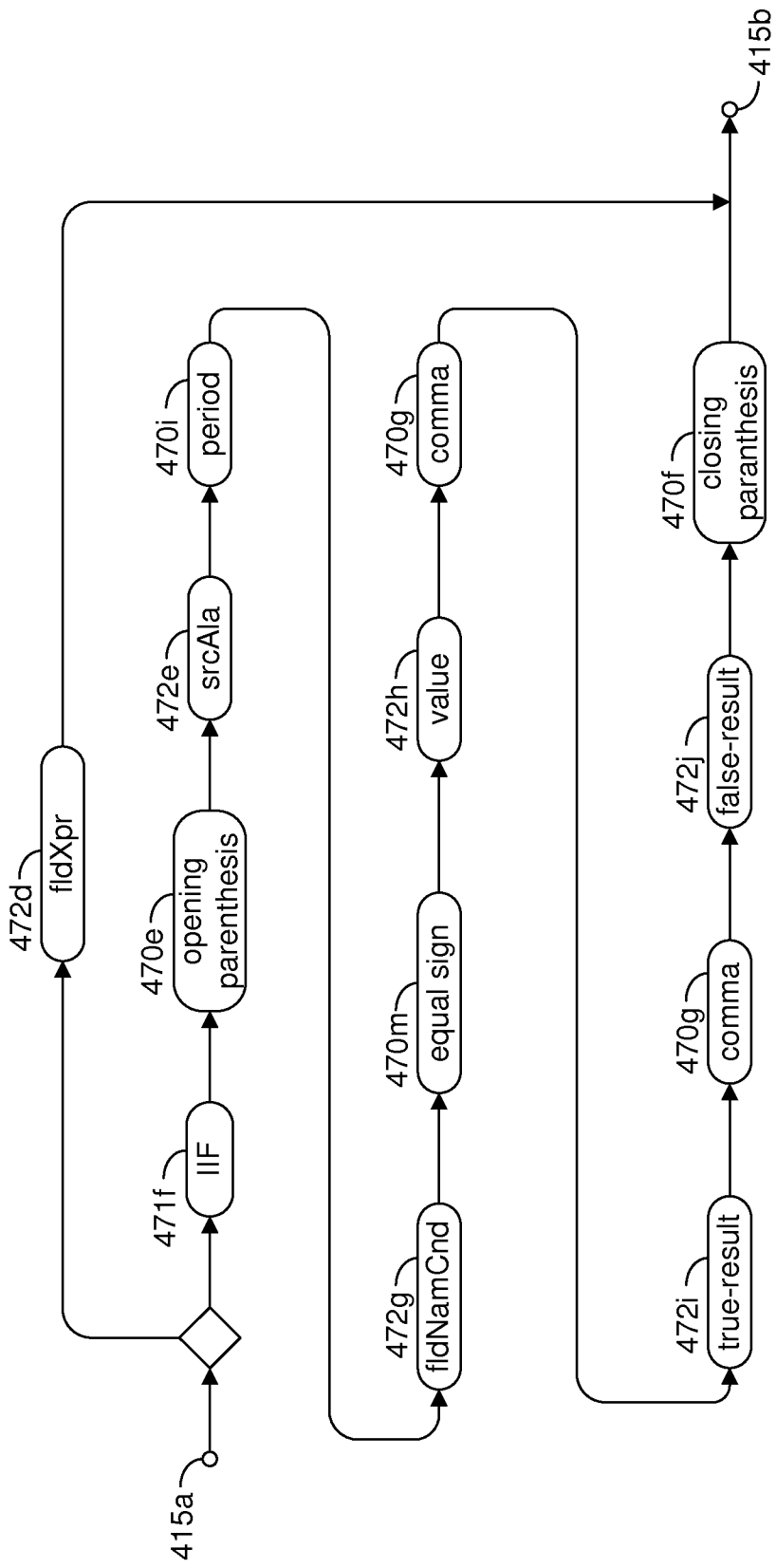
Figure 4I:
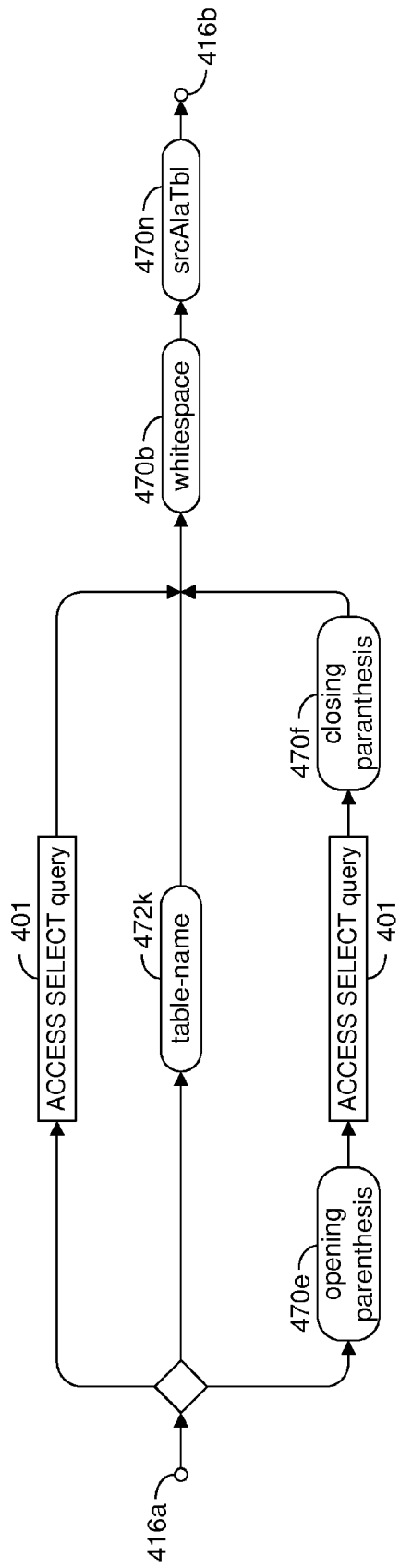
Figure 4J:
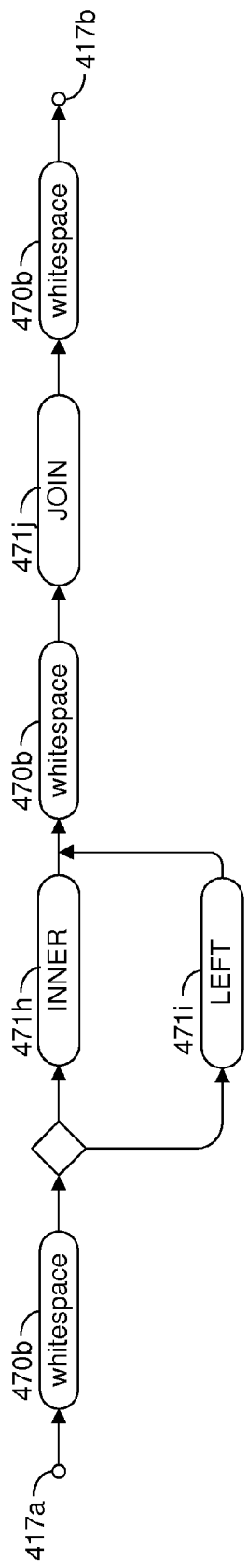
Figure 4K:
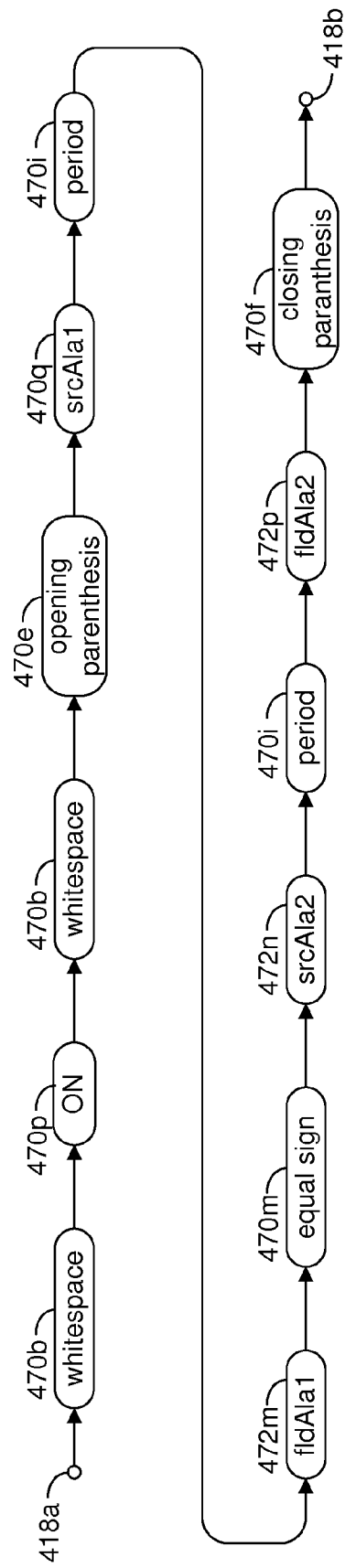
Figure 4L:
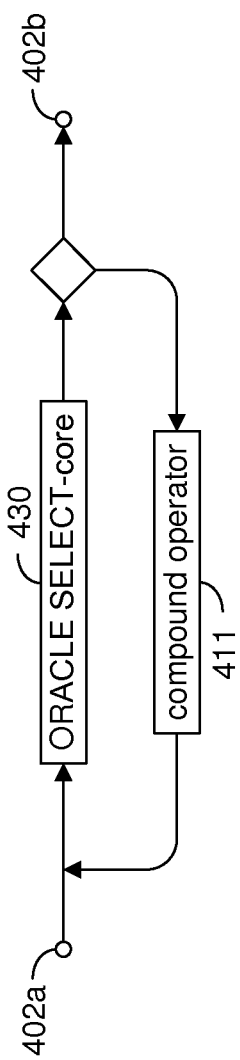
FIGS. 4L to 4R illustrate an exemplary syntax diagram of a set of predetermined rules for ORACLE SELECT QUERY, selected according to an aspect of an embodiment of the invention.
Figure 4M:
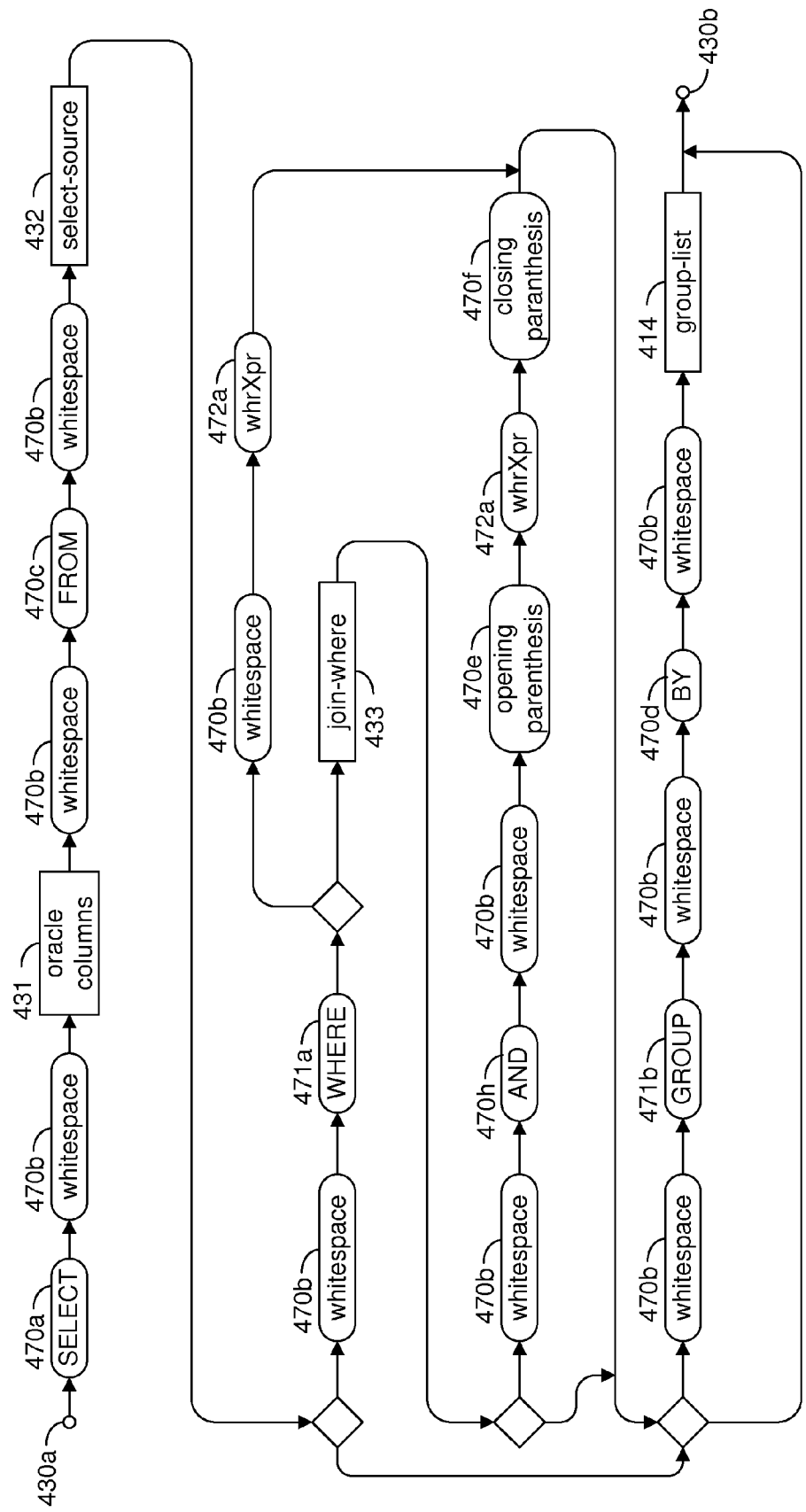
Figure 4N:
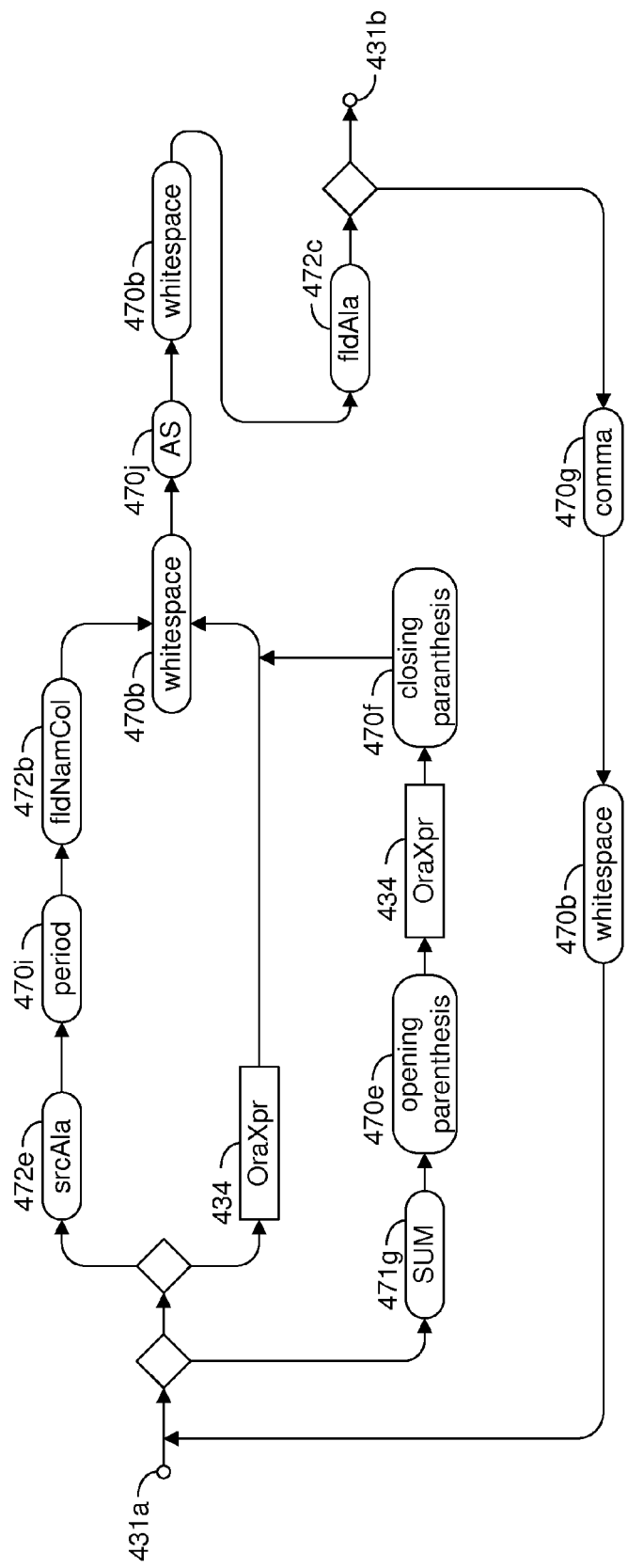
Figure 4O:
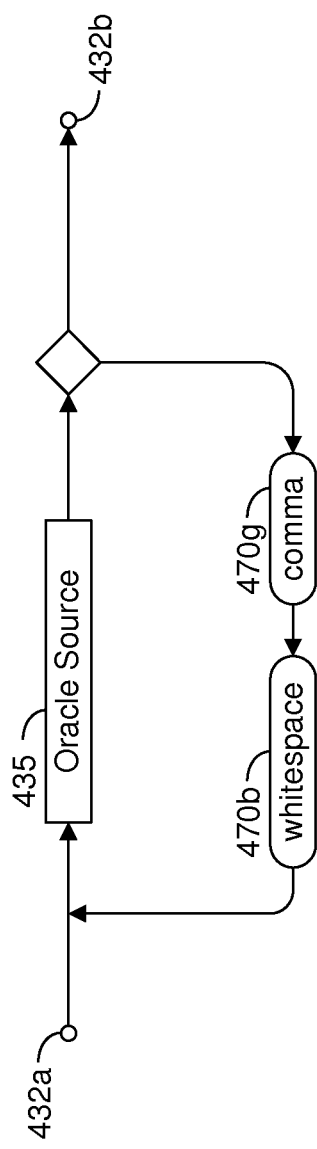
Figure 4P:
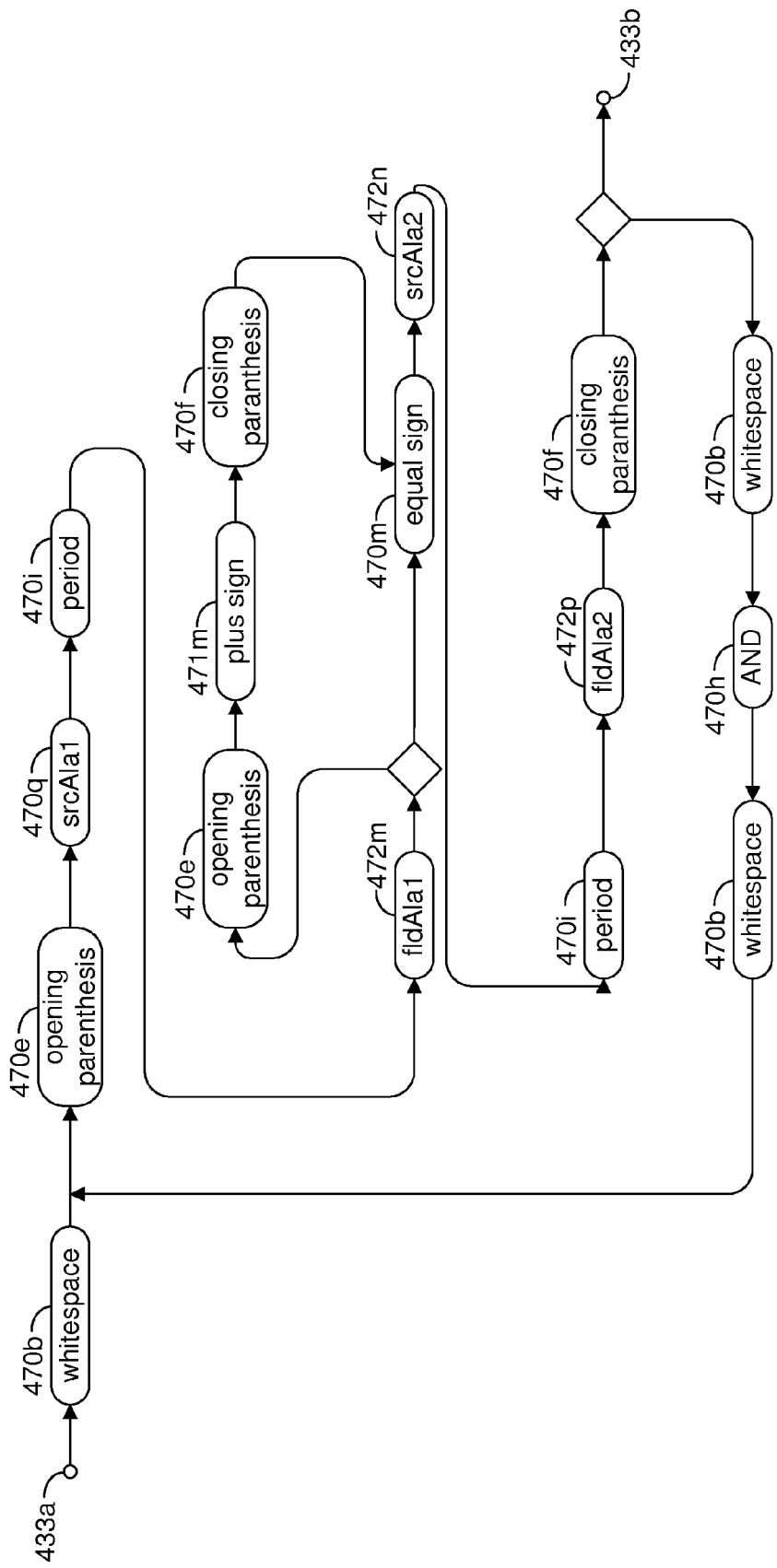
Figure 4Q:
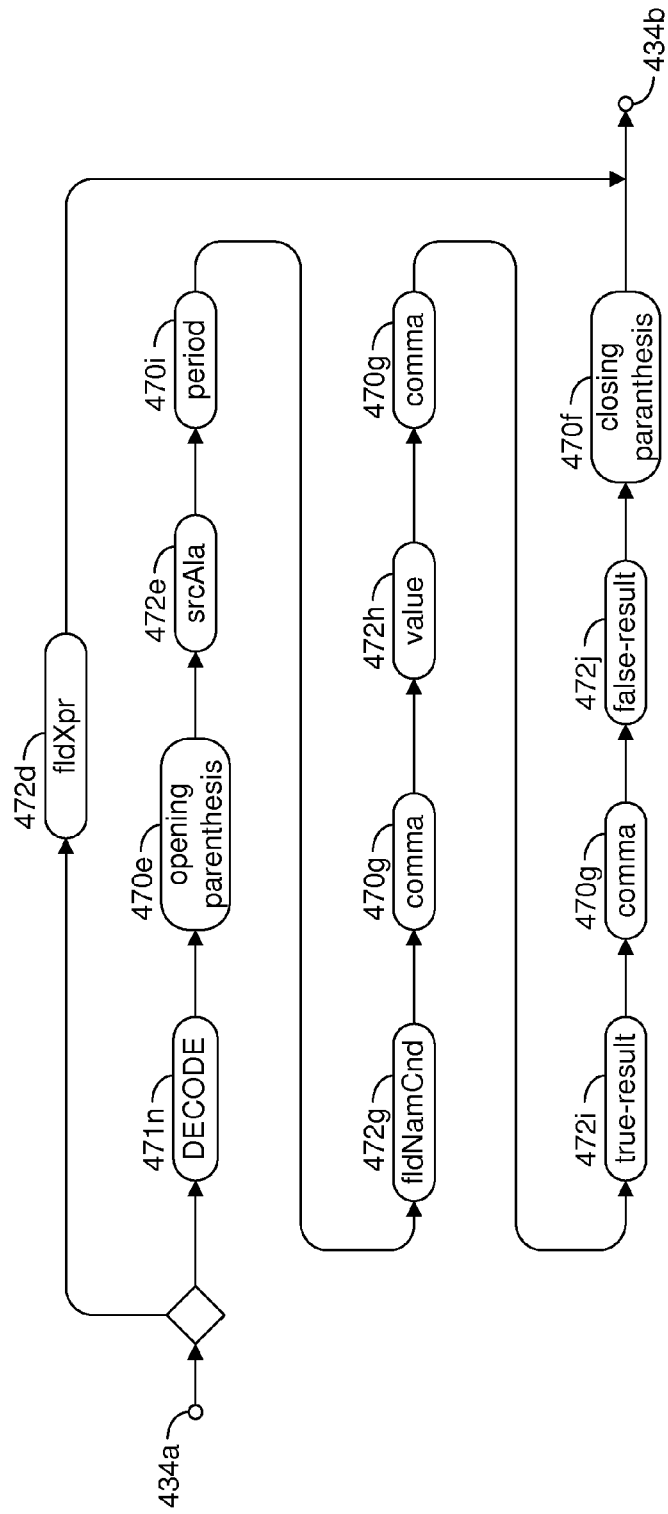
Figure 4R:
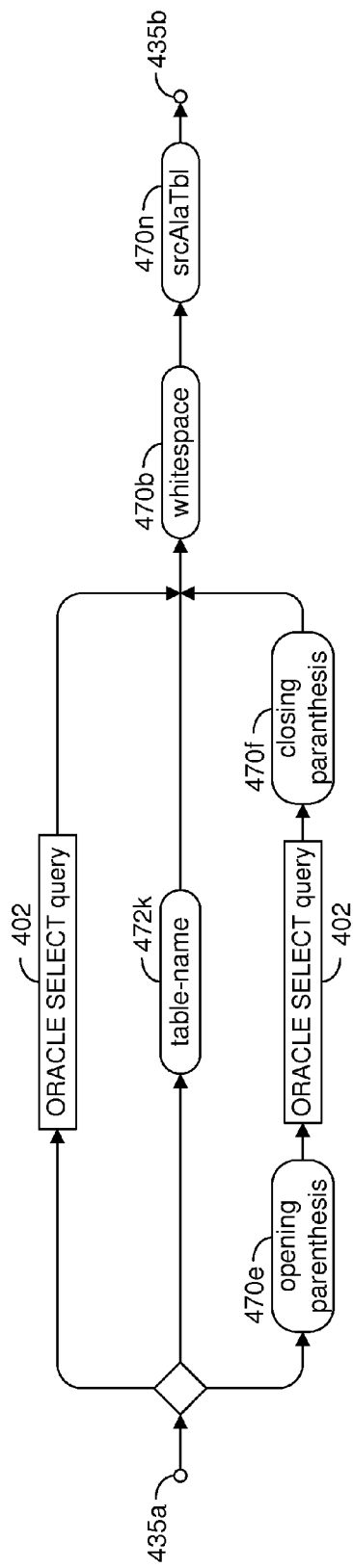

The syntax diagrams, of the exemplary sets of predetermined rules, illustrated in FIGS. 4B to 4R, are adapted for exemplary implementations of a few exemplary embodiments according to some aspects of the invention. However, all such adaptations are made in such a manner that no respective sets of predetermined rules are violated to an extent that a legitimate query cannot be constructed on the basis of the adapted sets of predetermined rules.

The embodiments illustrated in FIGS. 4A to 9O do not include any error checking and/or exception handling; it is assumed that all the embodiments are utilized correctly.

The embodiments illustrated in FIGS. 4A to 9O are collectively sufficient, and are collectively utilized for constructing one or more desired queries at runtime, wherein each of the one or more desired queries can be constructed either for:
1. MICROSOFT ACCESS, or
2. ORACLE, or
3. both MICROSOFT ACCESS and ORACLE.

FIG. 4A illustrates two exemplary sets of predetermined rules 400, selected according to an aspect of an embodiment of the invention, wherein the two exemplary sets of predetermined rules 400 include a set of predetermined rules for ACCESS SELECT query 401, which is an example of the set of predetermined rules 140, and a set of predetermined rules for ORACLE SELECT query 402, which is also an example of the set of predetermined rules 140.

The set of predetermined rules for ACCESS SELECT query 401 comprises only those predetermined rules which are required and sufficient for generating the desired queries for MICROSOFT ACCESS. MICROSOFT ACCESS may comprise additional predetermined rules, which are not selected in this example.

The set of predetermined rules for ORACLE SELECT query 402 comprises only those predetermined rules which are required and sufficient for generating the desired queries for ORACLE. ORACLE may comprise additional predetermined rules, which are not selected in this embodiment.

FIGS. 4B to 4K illustrate the set of predetermined rules for ACCESS SELECT query 401 in greater detail by utilizing a set of syntax diagrams. Each syntax diagram has an entry-point and an end-point, and describes possible paths between the two points by going through other non-terminals, terminals, and/or decision boxes. The terminals are represented by round corner boxes, the non-terminals are represented by square corner boxes, and the decision boxes are represented by diamond shaped boxes.

A circle, such as 410a, 410b, 411a, and the like, represents an entry point and an end point in a syntax diagram.

A terminal, a rectangle with round corners, is something that is written literally, such as "SELECT" (without quotes), whereas a non-terminal, a rectangle with right-angled corners, is expanded into other terminals and non-terminals. Terminals include 470a, 470b, 470c, 471a, 471b, 472a, 472b, and the like. Each terminal is an example of the source component 144.

Non-terminals include 401, 402, 410, 411, 412, and the like.

Decision boxes illustrated from FIGS. 4B to 4R are implemented in the flowchart illustrated in FIGS. 8A to 8P.

In FIG. 4B entry-point 401a illustrates a starting point of ACCESS SELECT query 401, and end-point 401b illustrates an ending point of ACCESS SELECT query 401. FIG. 4B also illustrates two non-terminal boxes 410 and 411, which are illustrated in greater detail in FIG. 4C and FIG. 4D respectively.

FIG. 4C illustrates non-terminal box 410 in greater detail. Entry-point 410a and end-point 410b of non-terminal box 410 are also illustrated in FIG. 4C. Three non-terminal boxes 412, 413 and 414 are also illustrated in FIG. 4C. The three non-terminal boxes 412, 413 and 414 are illustrated in greater detail in FIGS. 4E, 4F, and 4G respectively.

FIG. 4D illustrates non-terminal box 411 in greater detail. Entry-point 411a and end-point 411b of non-terminal box 411 are also illustrated in FIG. 4D.

FIG. 4E illustrates non-terminal box 412 in greater detail. Entry-point 412a and end-point 412b of non-terminal box 412 are also illustrated in FIG. 4E. A non-terminal box 415 is also illustrated in FIG. 4E. Non-terminal box 415 is illustrated in greater detail in FIG. 4H.

FIG. 4F illustrates non-terminal box 413 in greater detail. Entry-point 413*a* and end-point 413*b* of non-terminal box 413 are also illustrated in FIG. 4F. Three non-terminal boxes 416, 417 and 418 are also illustrated in FIG. 4F. The three non-terminal boxes 416, 417 and 418 are illustrated in greater detail in FIGS. 4I, 4J, and 4K respectively.

FIG. 4G illustrates non-terminal box 414 in greater detail. Entry-point 414*a* and end-point 414*b* of non-terminal box 414 are also illustrated in FIG. 4G.

FIG. 4H illustrates non-terminal box 415 in greater detail. Entry-point 415*a* and end-point 415*b* of non-terminal box 415 are also illustrated in FIG. 4H.

FIG. 4I illustrates non-terminal box 416 in greater detail. Entry-point 416*a* and end-point 416*b* of non-terminal box 416 are also illustrated in FIG. 4I. Non-terminal box 410 is also illustrated in FIG. 4I. Non-terminal box 410 is illustrated in greater detail in FIG. 4C.

FIG. 4J illustrates non-terminal box 417 in greater detail. Entry-point 417*a* and end-point 417*b* of non-terminal box 417 are also illustrated in FIG. 4J.

FIG. 4K illustrates non-terminal box 418 in greater detail. Entry-point 418*a* and end-point 418*b* of non-terminal box 418 are also illustrated in FIG. 4K.

FIGS. 4L to 4R illustrate the set of predetermined rules for ORACLE SELECT query 402 in greater detail by utilizing a set of syntax diagrams. Each syntax diagram has an entry-point and an end-point, and describes possible paths between two points by going through other non-terminals, terminals, and/or decision boxes. The terminals are represented by round corner boxes, the non-terminals are represented by square boxes, and the decision boxes are represented by diamond shaped boxes.

In FIG. 4L, entry-point 402*a* illustrates starting point of the set of predetermined rules for ORACLE SELECT query 402 and end-point 402*b* illustrates ending point of the set of predetermined rules for ORACLE SELECT query 402. FIG. 4L also illustrates two non-terminal boxes 430 and 411 which are illustrated in greater detail in FIG. 4M and FIG. 4D respectively.

FIG. 4M illustrates non-terminal box 430 in greater detail. Entry-point 430*a* and end-point 430*b* of non-terminal box 430 are also illustrated in FIG. 4M. Four non-terminal boxes 431, 432, 433 and 414 are also illustrated in FIG. 4M. The four non-terminal boxes 431, 432, 433 and 414 are illustrated in greater detail in FIGS. 4N, 4O, 4P, and 4G respectively.

FIG. 4N illustrates non-terminal box 431 in greater detail. Entry-point 431*a* and end-point 431*b* of non-terminal box 431 are also illustrated in FIG. 4N. Non-terminal box 434 is also illustrated in FIG. 4N. Non-terminal box 434 is illustrated in greater detail in FIG. 4Q.

FIG. 4O illustrates non-terminal box 432 in greater detail. Entry-point 432*a* and end-point 432*b* of non-terminal box 432 are also illustrated in FIG. 4O. Non-terminal box 435 is also illustrated in FIG. 4O. Non-terminal box 435 is illustrated in greater detail in FIG. 4R.

FIG. 4P illustrates non-terminal box 433 in greater detail. Entry-point 433*a* and end-point 433*b* of non-terminal box 433 are also illustrated in FIG. 4P.

FIG. 4Q illustrates non-terminal box 434 in greater detail. Entry-point 434*a* and end-point 434*b* of non-terminal box 434 are also illustrated in FIG. 4Q.

FIG. 4R illustrates non-terminal box 435 in greater detail. Entry-point 435*a* and end-point 435*b* of non-terminal box 435 are also illustrated in FIG. 4R. A non-terminal box 430 is also illustrated in FIG. 4R. Non-terminal box 430 is illustrated in greater detail in FIG. 4M.

FIG. 4S illustrates all those source components that are categorized as indeterminable source components $148_{1-24}$. Each of the indeterminable source components $148_{1-24}$ is desired to be represented by at least one component value 146, in a desired query, which:
1. either cannot be generated by utilizing an algorithm and/or a computer implementable logic, or
2. is desired not to be generated by utilizing an algorithm and/or a computer implementable logic in at least one desired query.

FIG. 4T illustrates all source components that are categorized as determinable source components $150_{1-15}$. Each of the determinable source components $150_{1-15}$ is represented by a component value 146 which can be generated by utilizing an algorithm and/or computer implementable logic. Following are the exemplary determinable source components:
1. SELECT 470*a*,
2. Whitespace 470*b*,
3. FROM 470*c*,
4. BY 470*d*,
5. opening parenthesis 470*e*,
6. closing parenthesis 470*f*,
7. comma 470*g*,
8. AND 470*h*,
9. period 470*i*,
10. AS 470*j*,
11. srcAlaGrp 470*k*,
12. equal sign 470*m*,
13. srcAlaTbl 470*n*,
14. ON 470*p*, and
15. srcAla1 470*q*.

FIG. 5A illustrates exemplary data tokens, wherein each of the data tokens is defined for utilization in conjunction with a component value 146, representing one or more of the indeterminable source components illustrated in FIG. 4S and/or determinable source components illustrated in FIG. 4T.

Data token qryGrp 512, which is an example of a data token 152, is represented by a token value 154 of a Boolean type, and can be represented by one of three possible token values: True, False and NULL. A set of data token rules 158 for qryGrp 512 is specified as follows:
1. If qryGrp 512 is represented by True, which is an example of a token value 154, then the desired query will be constructed as an aggregate query.
2. Otherwise, the desired query will be constructed as a non-aggregate query.

qryGrp 512 can be associated with a component value 146 in a manner that queryBuilder can construct a desired query, either an aggregate query or a non-aggregate query, on the basis of a token value 154, which represents qryGrp 512. qryGrp 512 enables determination of a component value 146 for "GROUP 471*b*", which is an indeterminable source component 148.

Data token qryUni 514, which is an example of a data token 152, is represented by a token value 154 of a Boolean type, and can be represented by one of three possible token values: True, False and NULL. A set of data token rules 158 for qryUni 514 is specified as follows:
1. If gryUni 514 comprises True, which is an example of a token value 154, then the desired query will be constructed as a UNION query by utilizing UNION ALL operator.
2. Otherwise, the desired query will be constructed without UNION ALL operator.

gryUni 514 can be associated with a component value 146 in a manner that queryBuilder can construct a desired query, either a UNION ALL query or a non-union query, on the basis of a token value 154, which represents gryUni 514. gryUni 514 enables determination of a component value 146 for "UNION ALL 471c" which is an indeterminable source component 148.

Token value 154 of gryUni 514 could have been of another data type for catering to other operators, not illustrated in this example, such as, a UNION, a MINUS, and other similar operators, but in this exemplary implementation, gryUni 514 is utilized for catering only to the UNION ALL operator.

Data token srcUseCnd 516, which is an example of a data token 152, is represented by a token value 154 of a string type, which is either:
1. a NULL value, or
2. an empty string, or
3. a string value, or
4. a list of comma-separated string values comprising at least two string values.

A token value 154, representing srcUseCnd 516, can be associated with a component value 146, which represents "table-name 472k", which is an example of indeterminable source component 148, and be processed in conjunction with a parameter value 162 of a parameter prmUseCnd 622, which is an example of a parameter 160. The result of the processed token value 154, which is an example of a token result 156, representing srcUseCnd 516, is utilized to determine whether the component value 146, representing table-name 472k, is desired to be utilized for constructing a desired query or not. The token value 154, representing srcUseCnd 516, can be processed at the time of:
1. resolving a component value 146, which represents table-name 472k, and/or
2. constructing a desired query.

srcUseCnd 516 is processed on the basis of the following set of data token rules 158:
1. A component value 146, representing table-name 472k, is utilized if either:
   a. a token value 154, which represents srcUseCnd 516, and which is also associated to the component value 146, representing table-name 472k, is either an empty string or a NULL value, or
   b. a token value 154, which represents srcUseCnd 516, and which is also associated to the component value 146, representing table-name 472k, comprises at least one string value which is also comprised by the parameter value 162 of prmUseCnd 622. For example, if a token value 154, which represents srcUseCnd 516, and which is also associated to the component value 146, representing table-name 472k, is "abc,xyz", and the parameter value 162 of prmUseCnd 622 is "nop,xyz", then since the string value "xyz" is comprised by both the token value 154, representing srcUseCnd 516, and the parameter value 162 of prmUseCnd 622, therefore the component value 146, representing table-name 472k, will be utilized for constructing the desired query. As another example, if a token value 154, which represents srcUseCnd 516, and which is also associated to the component value 146, representing table-name 472k, is "abc", and the parameter value 162 of prmUseCnd 622 is "abc,xyz", then since the string value "abc" is comprised by both the token value 154, representing srcUseCnd 516, and the parameter value 162 of prmUseCnd 622, therefore the component value 146, representing table-name 472k, will be utilized for constructing a desired query. A comparison is always performed between the individual string values separated by a comma and such comparison is also case insensitive.
2. The component value 146, representing table-name 472k, is not utilized for constructing a desired query if, either:
   a. the parameter value 162 of prmUseCnd 622 is an empty string or a NULL value, but the token value 154, which represents srcUseCnd 516, and which is also associated to the component value 146, representing table-name 472k, comprises at least one string value, or
   b. the token value 154, which represents srcUseCnd 516, and which is also associated to the component value 146, representing table-name 472k, comprises no string value that is comprised by the parameter value 162 of prmUseCnd 622. For example, if the token value 154, which represents srcUseCnd 516, and which is also associated to the component value 146, representing table-name 472k, is "abc,xyz", and the parameter value 162 of prmUseCnd 622 is "nop,rst", then since neither the string value "abc" nor the string value "xyz" is comprised by the parameter value 162 of prmUseCnd 622, therefore the component value 146, representing table-name 472k, will not be utilized for constructing a desired query. A comparison is always performed between the individual string values separated by a comma and such comparison is also case insensitive.

For the implementation of srcUseCnd 516, it is mandatory that either:
1. the token value 154, which represents srcUseCnd 516, and which is also associated to the component value 146, representing table-name 472k, must also be associated to all component values that are either utilized with the component value 146, representing table-name 472k, or are directly dependent on the component value 146, representing table-name 472k, or
2. the component values, which are either utilized with the component value 146, representing table-name 472k, or are directly dependent on the component value 146, representing table-name 472k, should be structured in a manner that, if the component value 146, representing table-name 472k, is not utilized for constructing a desired query, then the component values, which are either utilized with the component value 146, representing table-name 472k, or are directly dependent on the component value 146, representing table-name 472k, should also not be utilized for constructing a desired query.

Data token colUseCnd 518, which is an example of a data token 152, is represented by a token value 154 of a string type, which is either:
1. a NULL value, or
2. an empty string, or
3. a string value or
4. a list of comma-separated string values comprising at least two string values.

A token value 154, representing colUseCnd 518, can be associated with a desired component value 146, which represents fldAla 472c, which is an example of an indeterminable source component 148, and is processed in conjunction with the parameter value 162 of a parameter prmUseCnd 622, which is an example of parameter 160. The result of the processed token value 154, which is an example of a token result 156, representing colUseCnd 518, is utilized to determine whether the component value 146, representing fldAla 472c, is desired to be utilized for constructing the desired query. The token value 154, representing colUseCnd 518, can be processed at the time of:
1. resolving a component value 146, which represents fldAla 472c, and/or
2. constructing the desired query.

colUseCnd 518 is processed on the basis of the following set of data token rules 158:
1. A component value 146, representing fldAla 472c, is utilized if either:
   a. a token value 154, which represents colUseCnd 518, and which is also associated to the component value 146, representing fldAla 472c, is either an empty string or a NULL value, or
   b. a token value 154, which represents colUseCnd 518, and which is also associated to the component value 146, representing fldAla 472c, comprises at least one string value that is also comprised by the parameter value 162 of prmUseCnd 622. For example, if a token value 154, which represents colUseCnd 518, and which is also associated to the component value 146, representing fldAla 472c, is "abc,xyz", and the parameter value 162 of prmUseCnd 622 is "nop,xyz", then since the string value "xyz" is comprised by both the token value 154, representing colUseCnd 518, and the parameter value 162 of prmUseCnd 622, therefore the component value 146, representing fldAla 472c, will be utilized for constructing a desired query. As another example, if a token value 154, which represents colUseCnd 518, and which is also associated to the component value 146, representing fldAla 472c, is "abc", and the parameter value 162 of prmUseCnd 622 is "abc,xyz", then since the string value "abc" is comprised by both the token value 154, representing colUseCnd 518, and the parameter value 162 of prmUseCnd 622, therefore the component value 146, representing fldAla 472c, will be utilized for constructing a desired query. A comparison is always performed between the individual string values separated by a comma and such comparison is also case insensitive.
2. The component value 146, representing fldAla 472c, is not utilized for constructing a desired query if, either:
   a. a parameter value 162 of prmUseCnd 622 is an empty string or a NULL value, but the token value 154, which represents colUseCnd 518, and which is also associated to the component value 146, representing fldAla 472c, comprises at least one string value, or
   b. the token value 154, which represents colUseCnd 518, and which is also associated to the component value 146, representing fldAla 472c, comprises no string value that is comprised by the parameter value 162 of prmUseCnd 622. For example, if the token value 154, which represents colUseCnd 518, and which is also associated to the component value 146, representing the fldAla 472c, is "abc,xyz", and the parameter value 162 of prmUseCnd 622 is "nop,rst", then since neither the string value "abc" nor the string value "xyz" is comprised by the parameter value 162 of prmUseCnd 622, therefore the component value 146, representing fldAla 472c, will not be utilized for constructing the desired query. A comparison is always performed between the individual string values separated by a comma and such comparison is also case insensitive.

For the implementation of colUseCnd 518, it is mandatory that either:

1. the token value 154, which represents colUseCnd 518, and which is also associated to the component value 146, representing fldAla 472c, must also be associated to all component values that are either utilized with the component value 146, representing fldAla 472c, or are directly dependent on the component value 146, representing fldAla 472c, or
2. the component values, which are either utilized with the component value 146, representing fldAla 472c or are directly dependent on the component value 146, representing fldAla 472c, be structured in a manner that, if the component value 146, representing fldAla 472c, is not utilized for constructing the desired query, then the component values, which are either utilized with the component value 146, representing fldAla 472c, or are directly dependent on the component value 146, representing fldAla 472c, should also not be utilized for constructing the desired query.

Data token colReuse 520, which is an example of a data token 152, is represented by a token value 154 of a Boolean type and can comprise one of three possible token values: True, False and NULL. colReuse 520 is utilized in conjunction with a token value 154, which represents another data token tknMonth 524. colReuse 520 is to be associated with a component value 146 that represents fldAla 472c. colReuse 520 enables queryBuilder to identify a component value 146 that represents fldAla 472c, and it is desired to generate component values $146_n$ on the basis of token result 156 of tknMonth 524 and which is also associated with the component value which represents fldAla 472c, wherein the token result 156 of tknMonth 524 is obtained by processing the token value 154, which represents tknMonth 524.

For implementing colReuse 520, it is mandatory that the component values, which are utilized with a component value 146, which represents fldAla 472c, or which are directly dependent on the a component value 146 which represents fldAla 472c, are to be structured in a manner that all component values, which are either utilized with the component value 146, which represents fldAla 472c, or which are directly dependent on component value 146, which represents fldAla 472c, can be generated together with the component value 146, which represents fldAla 472c.

Data token tknAlias 522, which is an example of a data token 152, is represented by a token value "!", an exclamation sign without quotes, as specified by a set of data token rules 158 for tknAlias 522. The set of data token rules 158 for tknAlias 522 also specifies that tknAlias 522 is implicitly associated with the source component table-name 472k in such a manner that for each such new component value 146, which represents table-name 472k, tknAlias 522 is utilized for generating a new and a unique table/view alias comprising one or more alphabets. Since the association of tknAlias 522 is implicit, "!" (exclamation sign without quotes) is never utilized with any component value 146 that represents table-name 472k.

tknAlias 522 enables determination of a component value 146 for srcAla 472e, which is an indeterminable source component 148.

tknAlias 522 can also be associated with a component value 146 that represents fldNamCol 472b and/or fldXpr 472d, wherein the association with the component value 146 which represents fldNamCol 472b and/or fldXpr 472d is achieved by embedding "!" (exclamation sign without quotes) in a component value 146 which represents fldNamCol 472b and/or fldXpr 472d. On processing, "!" (exclamation sign without quotes) will be replaced by a table/view alias, followed by a period, which was generated for a component value 146 which represents fldNamCol 472*b* and/or fldXpr 472*d* and is a source table/view of the component value 146 which represents fldNamCol 472*b* and/or fldXpr 472*d*, in accordance with the predetermined rules illustrated in FIGS. 4B to 4R. For example, if for tblA, a component value 146 representing table-name 472*k*, which is a table/view alias, and which is generated as a result of processing a token value 154, which represents tknAlias 522, is "b" (lowercase b without quotes), then the following are a few examples which illustrate component values which are related to the component value tblA and represent fldNamCol 472*b* and/or fldXpr 472*d*, and which are also associated with "!" (exclamation sign without quotes):

1. a component value "!fld_01" will be "b.fld_01" after processing of "!" (exclamation sign without quotes),
2. a component value "!fld_01+!fld_02" will be "b.fld_01+b.fld_02" after processing of "!" (exclamation sign without quotes),
3. a component value "!fld_04+INT(fld_05)−!fld_06" will be "b.fld_04+INT(fld_05)−b.fld_06" after processing of "!" (exclamation sign without quotes), and
4. a component value "fld_09" will be "fld_09" after processing of "!" (exclamation sign without quotes) because "!" (exclamation sign without quotes) is not embedded in component value "fld_09".

Data token tknMonth 524, which is an example of a data token 152, is utilized for creating one or more component values that represent fldNamCol 472*b*, fldAla 472*c*, and/or fldXpr 472*d*. tknMonth 524 is processed on the basis of a token value 154, which represents colReuse 520, and a parameter value 162 of a parameter prmMthCnt 614, which is an example of a parameter 160. According to a set of data token rules 158 for the tknMonth 524, tknMonth 524 can be utilized in one of the following two formats:

1. % TknMth %, which can be embedded in a component value 146 representing fldNamCol 472*b*, fldAla 472*c*, and/or fldXpr 472*d*, and
2. % TknMth,argComp,argTrue,argFalse %, wherein tknMonth 524 is utilized with three arguments: argComp, argTrue and argFalse. This format of tknMonth 524 can only be embedded in component values that represent fldNamCol 472*b* and/or fldXpr 472*d*. In this format, all three arguments, argComp, argTrue, and arg False, are mandatory, and are required to be represented by a data value which is either a valid column/field name or is a valid expression. In this format, tknMonth 524 is utilized for determining the component values of the following indeterminable source components:
    a. IIF 471*f*,
    b. DECODE 471*n*,
    c. fldNamCnd 472*g*,
    d. value 472*h*,
    e. true-result 472*i*, and
    f. false-result 472*j*.

The processing of tknMonth 524 is done on the basis of a token value 154, which represents colReuse 520, and the parameter value 162 of prmMthCnt 614, which is an example of a parameter 160.

An exemplary set of data token rules 158 for colReuse 520 specifies that if a token value which represents colReuse 520 is a NULL value or False, or the parameter value 162 of prmMthCnt 614 is either zero or not defined, then tknMonth 524 is processed on the basis of the following part of the set of data token rules 158 for tknMonth 524:

1. If tknMonth 524 is embedded as % TknMth %, which is an example of a token value 154, then % TknMth % will be replaced with an empty string wherever it is embedded.
2. If tknMonth 524 is embedded as % TknMth,colCmpare,colTrue,colFalse %, which is an example of a token value 154, then % TknMth,colCmpare,colTrue,colFalse % will be replaced with colTrue wherever tknMonth 524 is embedded.

The set of data token rules 158 for colReuse 520 also specifies that if the token value 154, which represents colReuse 520, is True, and the parameter value 162 of prmMthCnt 614 is a positive integer, then the token value 154, which represents tknMonth 524, is processed in a manner that the component value 146 representing fldAla 472*c* along with all component values, which are either related to the component value 146 representing fldAla 472*c* or which are dependent on the component value 146 representing fldAla 472*c*, are utilized for constructing a desired query as many number of times as specified by the parameter value 162 of prmMthCnt 614. For processing tknMonth 524, the parameter value 162 of prmBegMth 616, which is an example of a parameter 160, is also utilized. The component value 146 which represents fldAla 472*c* along with all component values 146$_n$, which are either related to the component value 146 representing fldAla 472*c*, or which are dependent on the component value 146 representing fldAla 472*c*, are processed in a manner that all these component values are utilizable for constructing the desired query as many number of times as specified by the parameter value 162 of prmMthCnt 614. tknMonth 524 is processed on the basis of the following parts of the set of data token rules 158 for tknMonth 524:

1. If tknMonth 524 is utilized as % TknMth %, which is an example of a token value 154, then each iteration of % TknMth %, which results from the processing of the component value representing fldAla 472*c*, along with all component values that are either related to the component value representing fldAla 472*c* or are dependent on the component value representing fldAla 472*c*, is replaced by the first three letters of the name of the next month, starting from the month represented by the parameter value 162 of prmBegMth 616, and always continuing from Jan (for January) after Dec (for December) is reached. Here are two examples:
    a. If the parameter value 162 of prmMthCnt 614 is 4, and the parameter value 162 of prmBegMth 616 is 3 (which represents the starting month of March), then the component value which represents fldAla 472*c*, along with all component values that are either related to the component value representing fldAla 472*c*, or are dependent on the component value representing fldAla 472*c*, will be utilized in the desired query 4 times, and % TknMth % will be replaced in all component values by:
        i. Mar, on the first utilization of the component values,
        ii. Apr, on the second utilization of the component values,
        iii. May, on the third utilization of the component values, and
        iv. Jun, on the fourth utilization of the component values.
    b. If the parameter value 162 of prmMthCnt 614 is 5, and the parameter value 162 of prmBegMth 616 is 11 (which represents the starting month of November), then the component value which represents fldAla 472*c*, along with all component values which are either related to the component value representing fldAla 472*c* or are dependent on the component value representing fldAla 472*c*, will be utilized in the desired query 5 times, and % TknMth % will be replaced in all component values by:
  i. Nov, on the first utilization of the component values,
  ii. Dec, on the second utilization of the component values,
  iii. Jan, on the third utilization of the component values,
  iv. Feb, on the fourth utilization of the component values, and
  v. Mar, on the fifth utilization of the component values.
2. If tknMonth 524 is utilized as % TknMth,argComp,argTrue,argFalse %, which is an example of a token value 154, then each iteration of % TknMth,argComp,argTrue,argFalse %, which results from the processing of the component value representing fldAla 472*c*, along with all component values, which are either related to the component value representing fldAla 472*c*, or which are dependent on the component value representing fldAla 472*c*, is replaced by either an IIF 471*f* function or a DECODE 471*n* function depending on the database for which the desired query is being constructed. In the IIF 471*f* and the DECODE 471*n* functions, argComp is compared with a value that is equal to the parameter value 162 of prmBegMth 616 at the first iteration, and the value will be increased by 1 for every next iteration, of the component values representing fldAla 472*c*, along with all component values, which are either related to the component value representing fldAla 472*c* or are dependent on the component value representing fldAla 472*c*. The value will start at 1 whenever the value goes beyond 12. Here are two examples:
  a. If the parameter value 162 of prmMthCnt 614 is 4, the parameter value 162 of prmBegMth 616 is 3, and tknMonth 524 is represented by
    % TknMth,colCmpare,colTrue,colFalse %, then
    % TknMth,colCmpare,colTrue,colFalse % will be replaced by:
      i. For MICROSOFT ACCESS:
        1) IIF(colCompare=3,colTrue,colFalse)
        2) IIF(colCompare=4,colTrue,colFalse)
        3) IIF(colCompare=5,colTrue,colFalse)
        4) IIF(colCompare=6,colTrue,colFalse)
      ii. For ORACLE:
        1) DECODE(colCompare,3,colTrue,colFalse)
        2) DECODE(colCompare,4,colTrue,colFalse)
        3) DECODE(colCompare,5,colTrue,colFalse)
        4) DECODE(colCompare,6,colTrue,colFalse)
  b. If the parameter value 162 of prmMthCnt 614 is 5, the parameter value 162 of prmBegMth 616 is 11, and tknMonth 524 is represented by % TknMth,colCmpare,colTrue,colFalse %, then % TknMth,colCmpare,colTrue,colFalse % will be replaced by:
      i. For MICROSOFT ACCESS:
        1) IIF(colCompare=11,colTrue,colFalse)
        2) IIF(colCompare=12,colTrue,colFalse)
        3) IIF(colCompare=1,colTrue,colFalse)
        4) IIF(colCompare=2,colTrue,colFalse)
        5) IIF(colCompare=3,colTrue,colFalse)
      ii. For ORACLE:
        1) DECODE(colCompare,11,colTrue,colFalse)
        2) DECODE(colCompare,12,colTrue,colFalse)
        3) DECODE(colCompare,1,colTrue,colFalse)
        4) DECODE(colCompare,2,colTrue,colFalse)
        5) DECODE(colCompare,3,colTrue,colFalse)

Data token tknCurlyBrackets 526, which is an example of a data token 152, can be embedded in the component value 146 of the indeterminable source component whrXpr 472*a*. Data token tknCurlyBrackets 526 is represented by curly brackets, which are always utilized in a pair; an opening curly bracket, which is an example of a token value 154 of tknCurlyBrackets 526, "{" (without quotes) and a closing curly bracket, which is an example of a token value 154 of tknCurlyBrackets 526, "}" (without quotes). The opening curly bracket is always on the left side of the closing curly bracket. The curly brackets may be nested.

Figure 5B:
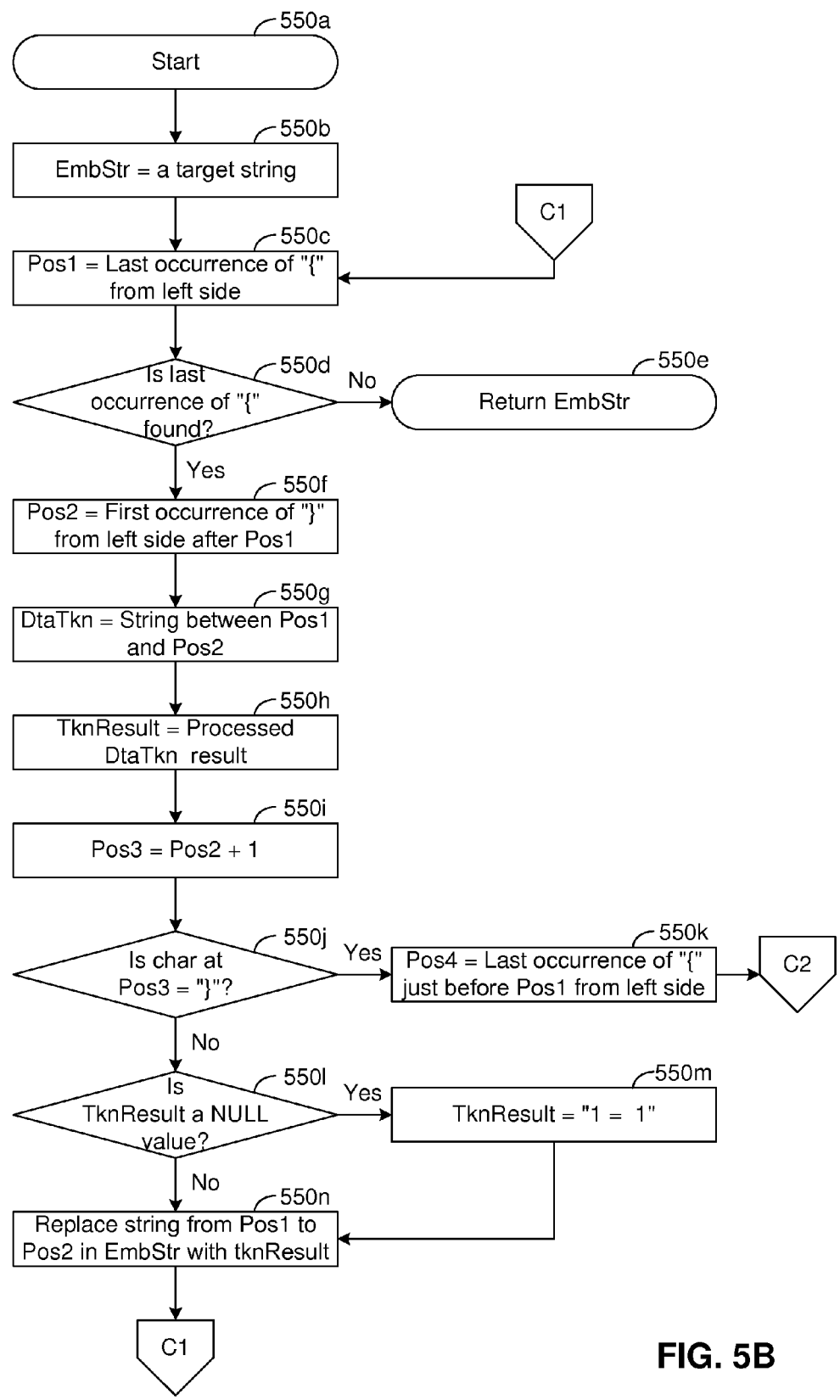
FIGS. 5B and 5C illustrate an exemplary flowchart which shows an exemplary set of data token rules of an exemplary specific data token, according to an aspect of an embodiment of the invention.
Figure 5C:
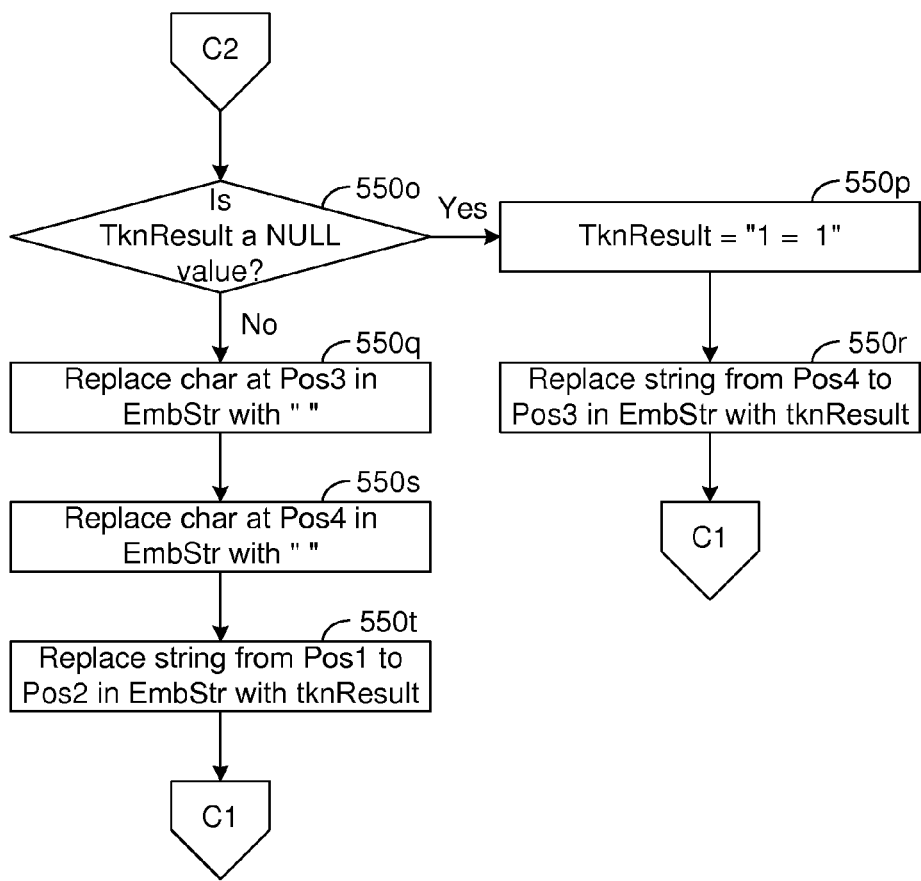

FIGS. 5B and 5C illustrate an exemplary flowchart which explains an exemplary set of data token rules 158, specifying an exemplary processing logic, for tknCurlyBrackets 526. However, the exemplary flowchart does not provide any means for error checking and/or incorrect utilization of tknCurlyBrackets 526; throughout this exemplary flowchart, it is assumed that tknCurlyBrackets 526 is utilized appropriately.

The processing logic for tknCurlyBrackets 526 starts at operation 550*a*.

At operation 550*b*, whrXpr 472*a*, represented as "a target string" in the flowchart, is assigned to a variable EmbStr. In this example, tknCurlyBrackets 526 can only be utilized in a component value representing whrXpr 472*a*. However, tknCurlyBrackets 526 can be utilized in any other component value of a string type, if required and/or desired.

At operation 550*c*, the position of the last occurrence of "{" (without quotes) from the left side of EmbStr is stored in a variable Pos1.

At operation 550*d*, it is checked whether the last occurrence of "{" (without quotes) is found or not. If the last occurrence of "{" (without quotes) is not found, then the flow advances to operation 550*e*. Otherwise, the flow continues to operation 550*f*. The last occurrence of "{" (without quotes) will not be found in EmbStr only in one of the following two cases (assuming that the curly brackets are not utilized incorrectly):
  1. A token value 154 representing tknCurlyBrackets 526 is not utilized in whrXpr 472*a*.
  2. The processing of tknCurlyBrackets 526 is complete.

At operation 550*e*, EmbStr is returned and processing of tknCurlyBrackets 526 is complete.

At operation 550*f*, the first occurrence of "}" (without quotes) from the left side, after Pos1, is located and assigned to a variable Pos2.

At operation 550*g*, the string between Pos1 and Pos2 (characters at Pos1 and Pos2 are not included) is assigned to a variable DtaTkn.

At operation 550*h*, DtaTkn, which carries a token value representing a data token, is processed in a desired manner, and the result of the processed token value carried by DtaTkn is assigned to a variable TknResult. In this particular example, a parameter would be a result of the processing of the token value carried by DtaTkn. If the parameter corresponding to the token value of DtaTkn is found, then TknResult will comprise the found parameter. Otherwise, TknResult will comprise a NULL value.

At operation 550*i*, a variable Pos3 is assigned a value of (Pos2+1).

At operation 550*j*, it is checked whether the character at Pos3 in EmbStr is "}" (without quotes) or not. If the character at Pos3 in EmbStr is "}", then the flow continues to operation 550*k*. Otherwise, the flow continues to operation 550*l*.

At operation 550*k*, a variable Pos4 is assigned the position of the last occurrence of "{" (without quotes) just before Pos1 from the left side in EmbStr.

At operation 550*l*, it is checked whether TknResult carries a NULL value or not. If TknResult carries a NULL value, then the flow continues to operation 550*m*. Otherwise, the flow continues to 550*n*.

At operation 550*m*, TknResult is assigned a value: "1=1" (without quotes).

At operation 550*n*, the string starting from Pos1 and ending at Pos2 (both Pos1 and Pos2 included) in EmbStr is replaced with the value carried by TknResult.

At operation 550*o*, it is checked whether TknResult carries a NULL value or not. If TknResult carries a NULL value, then the flow continues to operation 550*p*. Otherwise, the flow continues to 550*q*.

At operation 550*p*, TknResult is assigned a value: "1=1" (without quotes).

At operation 550*r*, the string starting from Pos4 and ending at Pos3 (both Pos4 and Pos3 are included) in EmbStr is replaced with the value carried by TknResult.

At operation 550*q*, the character at Pos3 is replaced with a space character.

At operation 550*s*, the character at Pos4 is replaced with a space character.

At operation 550*t*, the string starting from Pos1 and ending at Pos2 (both Pos1 and Pos2 included) in EmbStr is replaced with the value carried by TknResult.

Data token tknItemCodeBegin 528 is processed in conjunction with the parameter value 162 of a parameter prmItmBeg 624. An exemplary set of data token rules for tknItemCodeBegin 528 specifies that tknItemCodeBegin 528 is represented by "itmBeg" (without quotes) and can only be embedded in a component value representing whrXpr 472*a*. When processed, "itmBeg" (without quotes) is replaced by the parameter value 162 of prmItmBeg 624.

A data token tknItemCodeEnd 530 is processed in conjunction with the parameter value 162 of a parameter prmItmEnd 626. An exemplary set of data token rules for tknItemCodeEnd 530 specifies that tknItemCodeEnd 530 is represented by "itmEnd" (without quotes) and can only be embedded in a component value representing whrXpr 472*a*. When processed, "itmEnd" (without quotes) is replaced by the parameter value 162 of prmItmEnd 626.

FIG. 6 illustrates exemplary parameters which are utilized for constructing a desired query. Each parameter is given an arbitrary name for the purpose of explanation, and reference. The names given to the exemplary parameters have no impact on the implementation of the concepts, principles, and/or methodology of the invention. FIG. 6 illustrates the following exemplary parameters:

1. Parameter prmQryId 612, which is an example of a parameter 160, is of a string type. The parameter value 162 of prmQryId 612 is utilized to identify a source object, which is desired to be utilized for constructing a desired query.
2. Parameter prmMthCnt 614, which is an example of a parameter 160, is of a number type. The parameter value 162 of prmMthCnt 614 specifies the number of months which is utilized for processing a token value which represents tknMonth 524. The parameter value 162 of prmMthCnt 614 can be an integer ranging from 0 and 12, both inclusive.
3. Parameter prmBegMth 616, which is an example of a parameter 160, is of a number type. The parameter value 162 of prmBegMth 616 is utilized for specifying the starting month which is utilized for processing a token value which represents tknMonth 524. The parameters of prmBegMth 616 can be an integer ranging from 1 and 12, both inclusive.
4. Parameter prmOraQry 618, which is an example of a parameter 160, is of a Boolean type. The parameter value 162 of prmOraQry 618 is utilized for determining the database for which a desired query is to be constructed. If the parameter value 162 of prmOraQry 618 is True, then the desired query is constructed for ORACLE. Otherwise, the desired query is constructed for MICROSOFT ACCESS.
5. Parameter prmLftJoi 620, which is an example of a parameter 160, is of a Boolean type. The parameter value 162 of prmLftJoi 620 is utilized for determining the type of a JOIN which is to be used in a desired query. If the parameter value 162 of prmLftJoi 620 is True, then all joins in a desired query will be converted to LEFT joins. Otherwise, all joins in a desired query will be INNER joins. The parameter value 162 of the prmLftJoi 620 is utilized for determining a component value 146 of the following indeterminable source components:
   a. INNER 471*h*,
   b. LEFT 471*i*,
   c. Plus sign 471*m*
6. Parameter prmUseCnd 622, which is an example of a parameter 160, is of a string type. The parameter value 162 of prmUseCnd 622 is utilized for processing a token value, which represents srcUseCnd 516 and/or colUseCnd 518.
7. Parameter prmItmBeg 624, which is an example of a parameter 160, is of a string type. The parameter value 162 of prmItmBeg 624 is utilized for processing "itmBeg" (without quotes), which is the token value which represents tknItemCodeBegin 528.
8. Parameter prmItmEnd 626, which is an example of a parameter 160, is of a string type. The parameter value 162 of prmItmEnd 626 is utilized for processing "itmEnd" (without quotes), which is the token value which represents tknItemCodeEnd 530.

FIG. 7A illustrates a few exemplary attributes (which may also be called columns or fields), for an exemplary data model 164 illustrated in FIG. 7B, which are to be included in a source object repository to hold component values for those indeterminable source components, out of all indeterminable source components illustrated in the FIG. 4S, whose component values are not determinable either by utilizing a parameter 160, and/or by utilizing a data token 152, according to an aspect of an embodiment of the invention.

Attributes, illustrated in FIG. 7A, are given arbitrary names for the purpose of explanation, and reference. The names given to the attributes have no impact on the implementation of the principles of the invention. The following attributes are illustrated in FIG. 7A:

1. Attribute qryWhr 752 is utilized for storing and determining a component value 146 of the following indeterminable source components:
   a. WHERE 471*a*, and
   b. whrXpr 472*a*
2. Attribute srcId 754 is utilized for storing and determining a component value 146 of the following indeterminable source components:
   a. table-name 472*k*, and
   b. JOIN 471*j*.
3. Attribute srcJoinFld 756 is utilized for storing and determining a component value 146 of fldAla1 472*m*, which is an example of an indeterminable source component 148.

4. Attribute srcJoinToFld 758 is utilized for storing and determining a component value 146 of fldAla2 472p, which is an example of an indeterminable source component 148.
5. Attribute srcJoinToSrc 760 is utilized for storing and determining a component value 146 of srcAla2 472n, which is an example of an indeterminable source component 148.
6. Attribute colAla 762 is utilized for storing and determining a component value 146 of fldAla 472c, which is an example of an indeterminable source component 148.
7. Attribute colXpr 764 is utilized for storing and determining a component value 146 of the following indeterminable source components:
   a. fldNamCol 472b, and
   b. fldXpr 472d
8. Attribute colGrpFun 766 is utilized for storing and determining a component value 146 of the following indeterminable source components:
   a. fldAlaGrp 471e,
   b. SUM 471g, and
   c. fldXpr 472d FIG. 7B illustrates a data model, which is an example of a data model 164, which is utilized for creating an exemplary source object repository 168, wherein the exemplary source object repository 168 is utilized for storing one or more source objects, along with one or more embedded token values, which are desired to be utilized for constructing a desired query. The exemplary source object repository 168, which is created on the basis of the exemplary data model 164, can be created by utilizing one or more data structures which may include, but are not limited to, a multidimensional database, a flat file database, a conventional database, an array, a matrix, a spreadsheet, a class, a comma-separated file, and a variable. The exemplary data model 164 is created in a manner that it is sufficient for creating an exemplary source object repository 168 which is sufficient for:

1. storing one or more desired source objects as structured and/or semi-structured data,
2. identifying and retrieving a desired source object out of the one or more desired source objects,
3. maintaining, in a desired manner, a desired hierarchy and/or a desired relationship among all the indeterminable source components illustrated in FIG. 4S,
4. maintaining a desired order among one or more component values belonging to srcId 754.
5. maintaining a desired order among one or more component values belonging to colAla 762.
6. associating all token values of the data tokens illustrated in FIG. 5A, either implicitly and/or explicitly, with one or more component values of one or more of the source components represented by the attributes illustrated in FIG. 7A, and
7. utilizing a source object and/or a desired part thereof in another source object.

The exemplary data model 164 comprises the following three entities:
1. Query 702.
2. Query Source 704.
3. Query Field 706.

Query 702 is the top level entity which is utilized to comprise information which is sufficient for identifying a source object and also information which is applicable to the entire query. Query 702 comprises the following attributes:
1. qryId 732,
2. qryWhr 752,
3. qryGrp 512, and
4. qryUni 514.

qryId 732 is an exemplary attribute which is utilized in query 702 for the identification of a specific source object. qryId 732 acts as a primary key, and is utilized for uniquely identifying each source object. In query 702, qryId 732 is implemented as a string, and may comprise any valid data value of a string type. Since qryId 732 is utilized only for identifying and referencing a source object, there are no specific rules for a data value which may be stored in qryId 732. However, in this example, the data value stored in qryId 732 must be unique for each source object, and may comprise only printable characters. qryId 732 is of a string type in this exemplary implementation; however, it may be of any other data type which is sufficient for implementing a primary key, such as, a long integer, a short integer, a GUID, and the like.

qryWhr 752 is utilized for storing a WHERE clause expression in this exemplary data model. qryWhr 752 is of a string type and should be of a sufficient size to store all the desired WHERE clause expressions, along with one or more token values representing tknCurlyBrackets 526, tknItemCodeBegin 528, and/or tknItemCodeEnd 530. A component value stored in qryWhr 752 is a string, which:
1. is optionally embedded in one or more of the following:
   a. a token value representing tknCurlyBrackets 526,
   b. a token value representing tknitemCodeBegin 528,
   c. a token value representing tknitemCodeEnd 530, and
   d. any combinations thereof, and
2. becomes a valid WHERE clause expression, as may be desired for MICROSOFT ACCESS, or for ORACLE, or for both MICROSOFT ACCESS and ORACLE, after all token values, which represent tknCurlyBrackets 526, tknItemCodeBegin 528, and/or tknItemCodeEnd 530, and which are embedded in the component values that are stored in gryWhr 752, are processed.

qryGrp 512 is embedded in query 702, so as to enable queryBuilder to determine whether a desired query is an aggregate query or not.

qryUni 514 is embedded in query 702, so as to enable queryBuilder to determine whether a desired query is a UNION ALL query or not.

Query source 704 is a child entity of query 702, wherein query 702 has a one-to-many relationship 712 with query source 704. Query 702 also has another one-to-many relationship 714 with query source 704. The one-to-many relationship 714 is optional. Query 702 comprises following attributes:
1. srcQryId 734,
2. srcOrd 736,
3. srcId 754,
4. srcReuseId 738,
5. srcUseCnd 516,
6. srcJoinFld 756,
7. srcJoinToFld 758, and
8. srcJoinToSrc 760.

srcQryId 734 is an exemplary attribute which is utilized in query source 704 for enabling a one-to-many relationship 712. srcQryId 734 is a foreign key which is related to qryId 732 of query 702. In query source 704, srcQryId 734 is implemented as a string data type, and is of the same size as of qryId 732. srcQryId 734 and srcId 754 serve as a composite primary key in query source 704.

srcOrd 736 is an exemplary attribute which is utilized in query source 704 for maintaining a desired order among a plurality of component values that are stored in srcId 754. In query source 704, srcOrd 736 is implemented as a long integer data type; however, srcOrd 736 can be implemented as any other data type which is sufficient for maintaining an order among a plurality of component values that are stored in srcId 754. Such data types may include, but are not limited to, a short integer, a string, and a floating point.

srcId 754 is utilized for specifying the name of a table/view which is desired to be utilized for constructing a desired query. The component values stored in srcId 754 must be unique within one source object because srcId 754 is a part of the composite primary key of query source 704. srcId 754 may be represented by either:
1. a component value which represents a table/view name which exists in a database which is intended to execute a desired query, or
2. an arbitrary view name (which must comprise all printable characters in this example), only if a data value represents srcReuseId 738.

srcReuseId 738 is an exemplary attribute which is utilized in query source 704 to enable a utilization of another source object in query source 704. srcReuseId 738 is a foreign key and may optionally comprise a value from qryId 732. For this example, srcReuseId 738 cannot comprise a data value which represents its parent qryId 732, because such a data value will cause an infinite recursive loop in this exemplary data model. The one-to-many relationship 714 is implemented by utilizing qryId 732 and srcReuseId 738.

srcUseCnd 516 is embedded in query source 704. If the processing of the token value comprised by srcUseCnd 516 determines that srcId 754 cannot be utilized for constructing a desired query, then the complete record, comprising the token value of srcUseCnd 516 and the data value of srcId 754, including all child records, will not be utilized for constructing a desired query.

srcJoinFld 756, srcJoinToFld 758, and srcJoinToSrc 760 are utilized to specify information which is required to join two tables, two views or one table and one view. srcJoinFld 756 is utilized to specify a field alias which belongs to a table/view specified by srcId 754 of the current record. srcJoinToFld 758 is utilized to specify a field alias which belongs to the other table/view which is to be joined with table/view specified by srcId 754 of the current record, and is specified by the component value representing srcJoinToSrc 760. In this exemplary embodiment, self joins are not implemented.

Query field 706 is a child entity of query source 704, wherein query source 704 has a one-to-many relationship 716 with query field 706. Query field 706 comprises the following attributes:
1. colQryId 740,
2. colSrcId 742,
3. colOrd 744,
4. colAla 762,
5. colXpr 764,
6. colUseCnd 518,
7. colGrpFun 766, and
8. colReuse 520.

colQryId 740 and colSrcId 742 are two exemplary attributes which are utilized in query field 706 for enabling the one-to-many relationship 716. colQryId 740 and colSrcId 742 are foreign keys which are related to srcQryId 734 and srcId 754 respectively. colQryId 740 and colSrcId 742 are implemented by utilizing a string data type and are of the same size as srcQryId 734 and srcId 754 respectively. colQryId 740, colSrcId 742, and colAla 762 serve as a composite primary key in query field 706.

colOrd 744 is an exemplary attribute which is utilized in query field 706 for maintaining a desired order among a plurality of those component values that are stored in colAla 762. In query field 706, colOrd 744 is implemented as a long integer data type; however, colOrd 744 could have been implemented as any other data type which is sufficient for maintaining a desired order among a plurality of component values which are stored in colAla 762. Such data types may include, but are not limited to, a short integer, a string, and a floating point.

colAla 762 is utilized to specify a valid column/field alias for a desired query. colAla 762 is implemented as a string data type in this exemplary data model. A component value, which is stored in colAla 762, may also be embedded with % TknMth % which is a token value representing tknMonth 524. The component values stored in colAla 762 must be unique within one source object with reference to their parent component value, which is stored in srcId 754, because colAla 762 is a part of the composite primary key of query source 704.

colXpr 764 is utilized to specify a valid expression for a desired query. colXpr 764 is implemented as a string data type in this exemplary data model. A component value, which Is stored in colAla 762, may also be embedded with:
1. one or more token values representing tknMonth 524, and/or
2. one or more "!" (exclamation mark without quotes) representing tknAlias 522.

colUseCnd 518 is embedded in query field 706. If the processing of the token value comprised by colUseCnd 518 determines that colAla 762 cannot be utilized for constructing the desired query, the entire record, comprising the token value of colUseCnd 518 and component values of colAla 762, will not be utilized for constructing a desired query.

colGrpFun 766 is utilized for specifying a SUM function for columns/fields which are desired to be summed in a desired query which is constructed as an aggregate query. In this exemplary embodiment, if colGrpFun 766 is represented by "SUM" (without quotes), then the SUM function is applied to the component value stored in colXpr 764. Otherwise, if colGrpFun 766 is represented by "Group" (without quotes), then colAla 762 is utilized in a GROUP BY clause, otherwise the component value stored in colXpr 764 is treated as an expression and is not included in the GROUP BY clause. In this exemplary embodiment, the utilization of only the SUM function is illustrated; however, colGrpFun 766 can be utilized for implementing any other function, such as, AVG, MAX, MIN, and the like.

colReuse 520 is embedded in query field 706, and is utilized to specify those records of query field 706 which are desired to be replicated.

FIG. 7C illustrates an exemplary implementation of the exemplary data model 164, illustrated in FIG. 7B, as an exemplary source object repository 168. Query 702 is implemented as a tblQry 782, which is a MICROSOFT ACCESS database table. Query source 704 is implemented as a tblQrySrc 784, which is a MICROSOFT ACCESS database table. Query field 706 is implemented as a tblQryFld 786, which is a MICROSOFT ACCESS database table.

FIGS. 8A to 8P illustrate an exemplary flowchart of an exemplary software component constructor 170 which is implemented as a function and is called queryBuilder. queryBuilder is utilized for constructing a desired query by utilizing a source object 166, which is stored in tblQry 782, tblQrySrc 784, and tblQryFld 786, which are the data tokens illustrated in FIG. 5A, and the parameters illustrated in FIG. 6. The exemplary flowchart may be implemented in any computer programming language. The variable names and the programming conventions utilized in the exemplary flowchart are not dependent on any specific computer programming language. However, the implementation of this exemplary flowchart may require a programming language specific interpretation of one or more operations, illustrated in the exemplary flowchart. For example, a concatenation of two or more string values is represented in the exemplary flowchart by a plus sign, whereas this same operation is represented by an ampersand sign in some programming languages. Moreover, all variable names and function names utilized in the exemplary flowchart are exemplary and can be changed as may be desired and/or required for any particular implementation.

In the exemplary flowchart, the UNION ALL operator is implemented for sub queries only.

In the exemplary flowchart, arguments argComp, argTrue and argFalse are utilized symbolically. However, the values comprised by these arguments will be utilized in each operation, wherever any of these arguments are utilized.

In the exemplary flowchart, it is implied that whenever tknMonth 524 is replaced in an operation, the complete representation of tknMonth 524, starting from the first % (percent sign) to the last % (percent sign), is replaced. For this exemplary flowchart, it is assumed that only one token value representing tknMonth 524 is embedded in one database field.

In the exemplary flowchart, a variable is considered empty if the variable:
1. is empty, or
2. comprises a NULL value, or
3. comprises an empty value according to its data type, for example, an empty string, a zero, and a False.

In the exemplary flowchart, all variables, except for varCalCnt and varMthAry, are defined at the module level, and are created again on any recursive call to the function queryBuilder, with the previous variables retaining their respective values. However, the variables varCalCnt and varMthAry are not initialized on a recursive call to the function queryBuilder. All parameters, defined in FIG. 6, are defined at a global level, and are not initialized on any recursive call.

In the exemplary flowchart, double quotes are utilized for identifying a string value. The double quotes are never a part of the string in the exemplary flowchart. However, a single quote, whenever utilized, is a part of a string value.

The exemplary flowchart does not include any error and/or exception handling; it is assumed that all the component values and token values are provided correctly, and are within the required ranges.

The exemplary flowchart is self-explanatory. However, for clarity, some operations have been described in greater detail.

Figure 8Q:
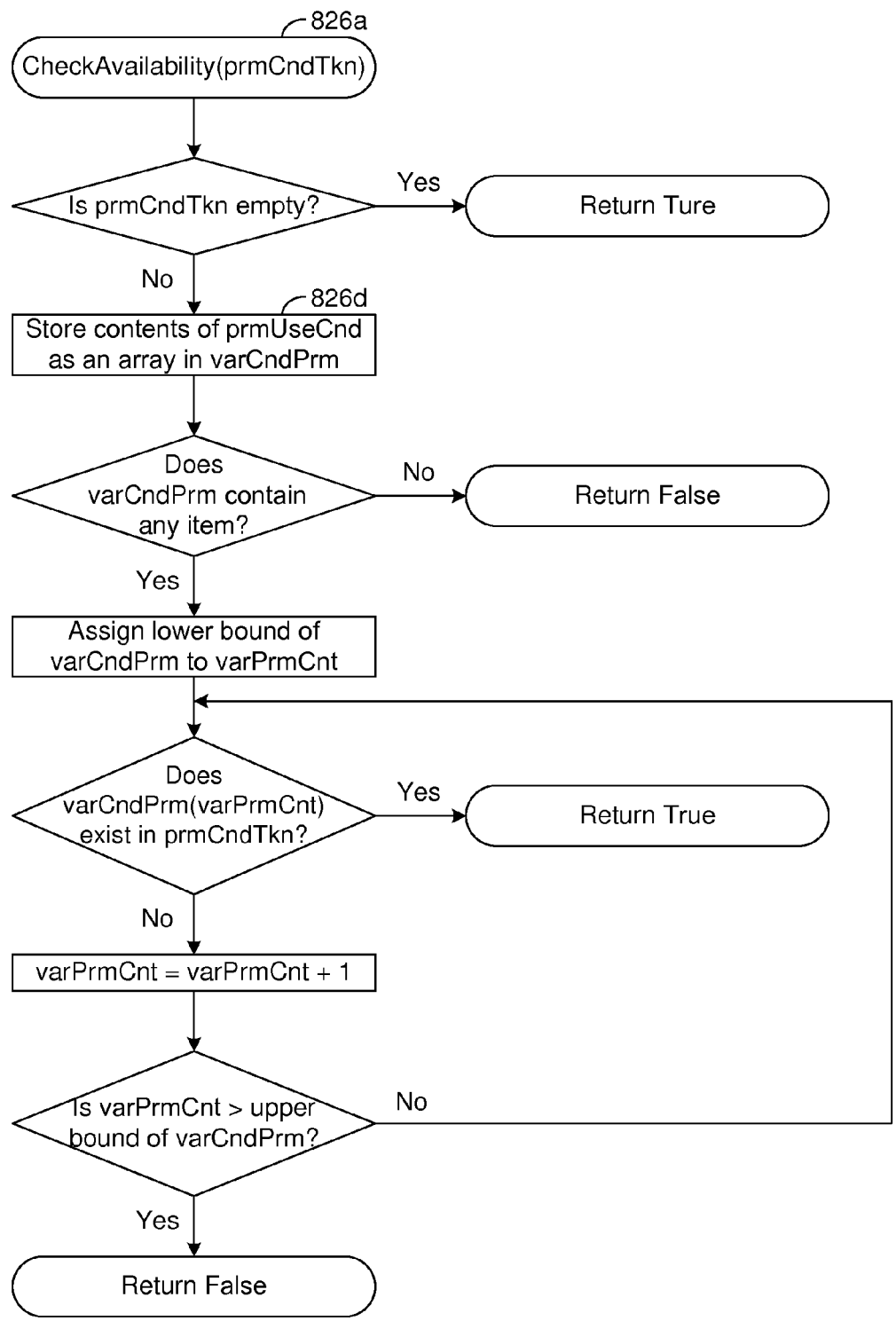
Figure 8R:
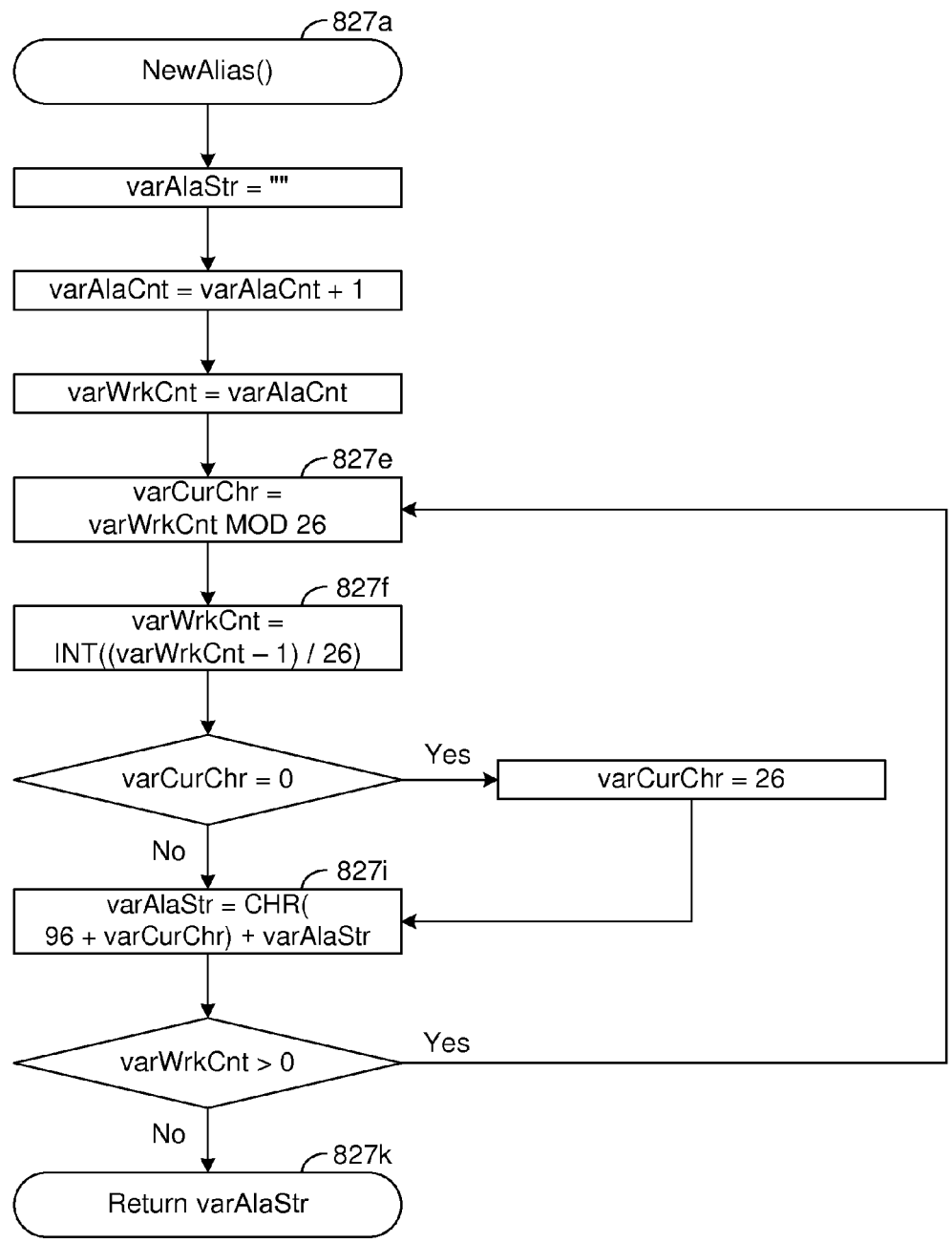
Figure 8S:
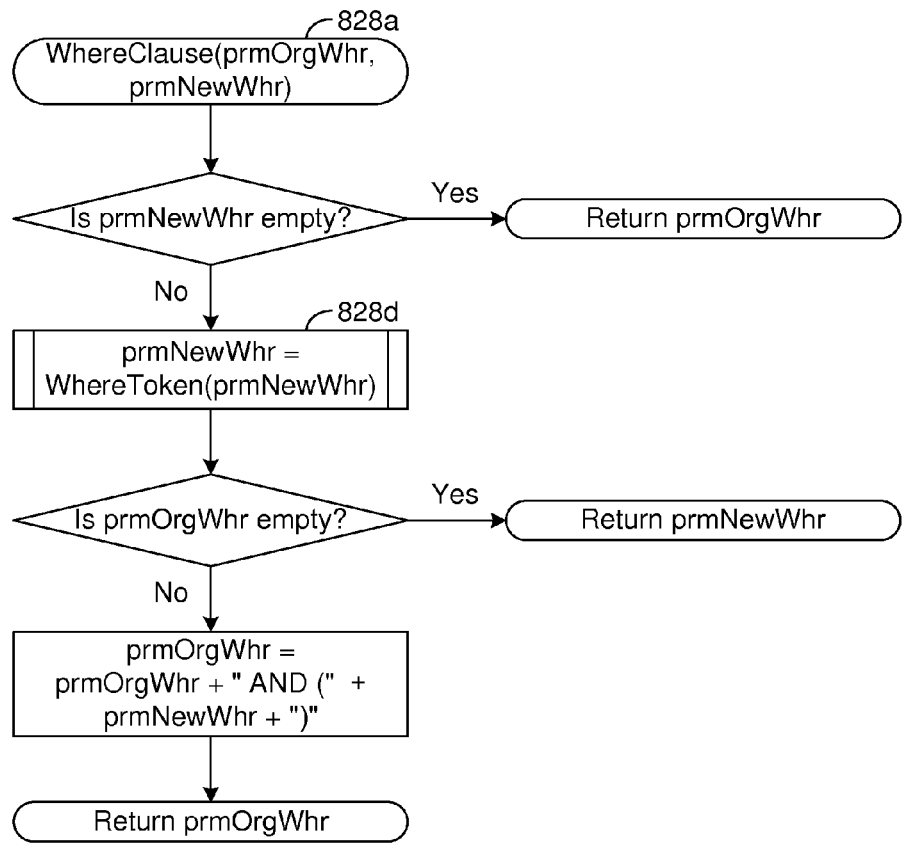
Figure 8T:
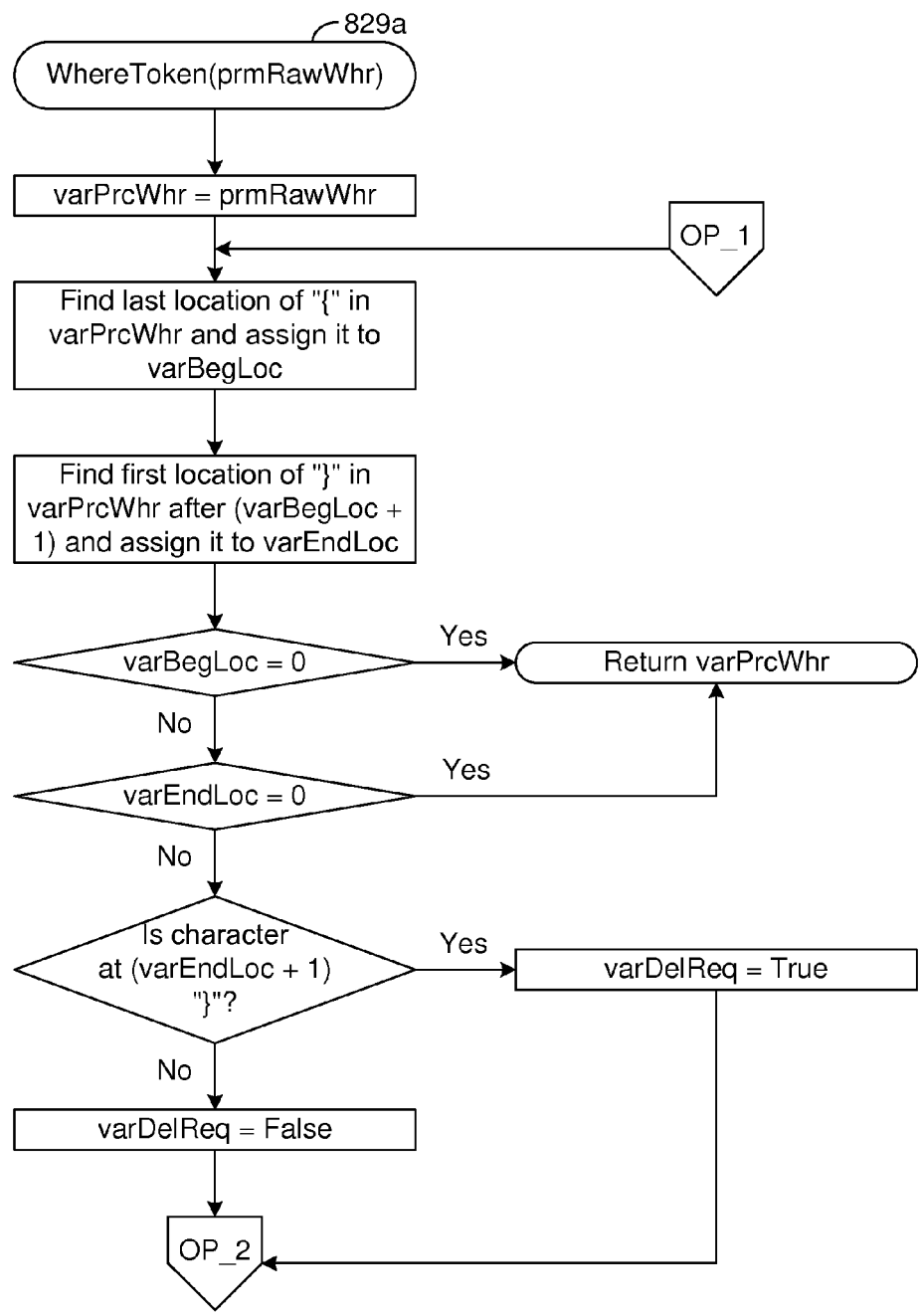
Figure 8U:
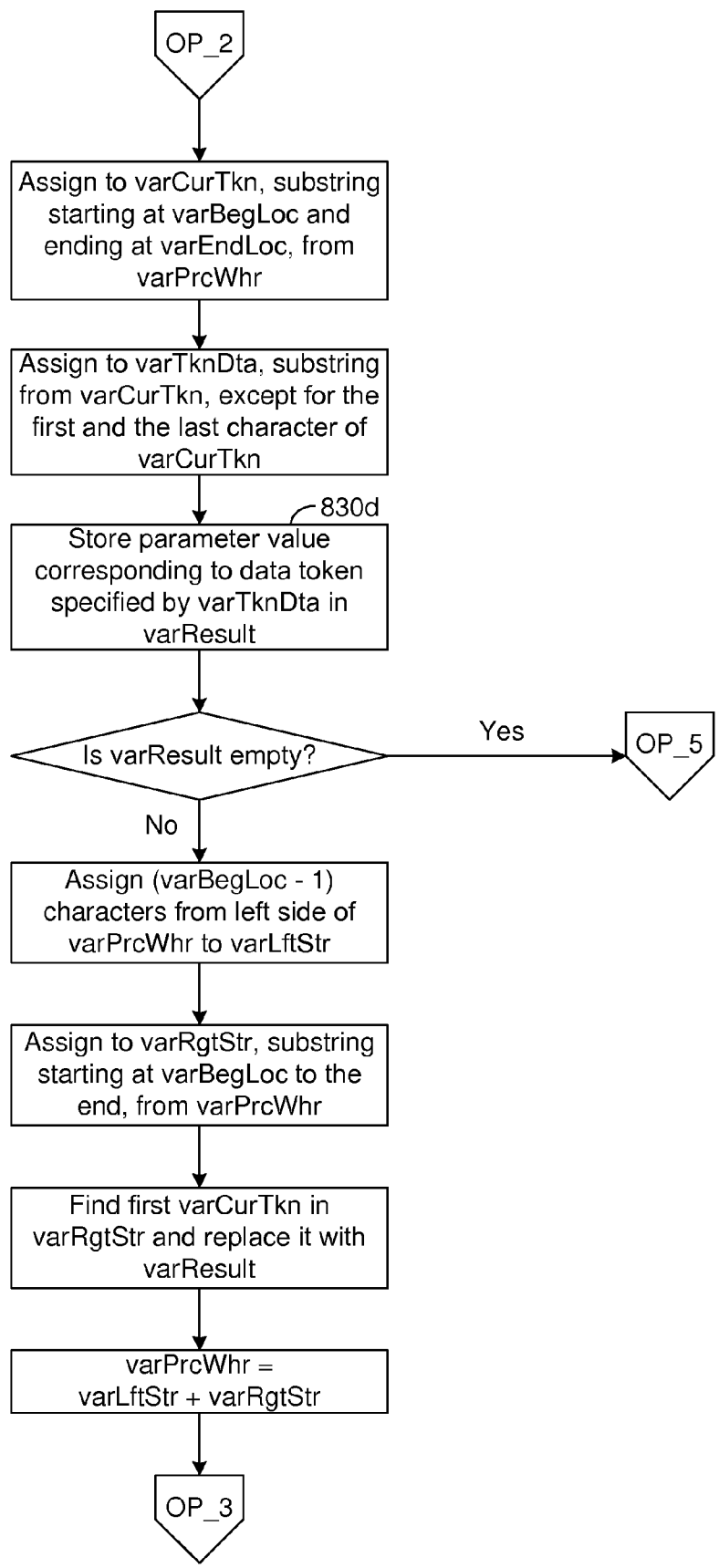
Figure 8V:
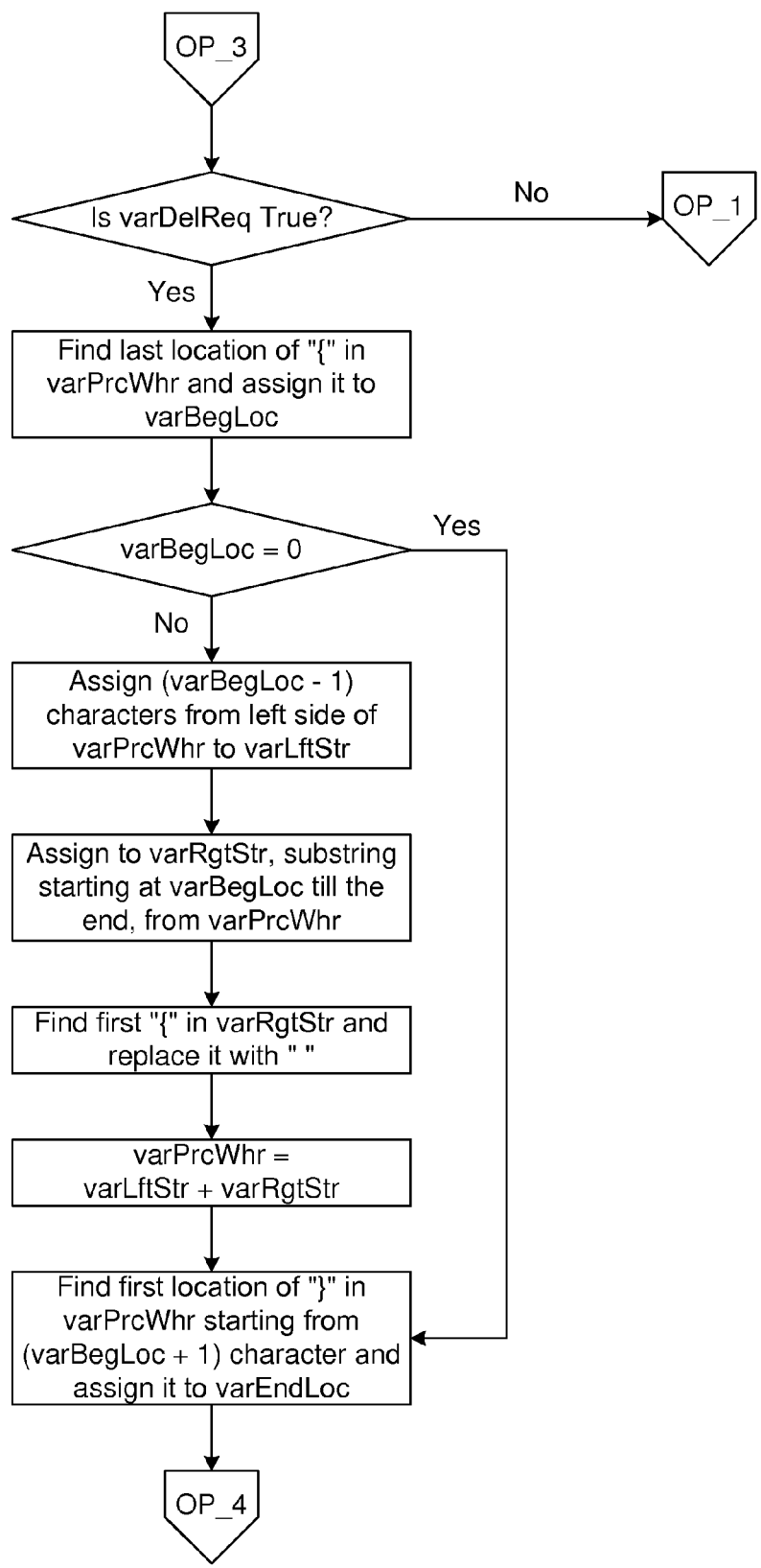
Figure 8W:
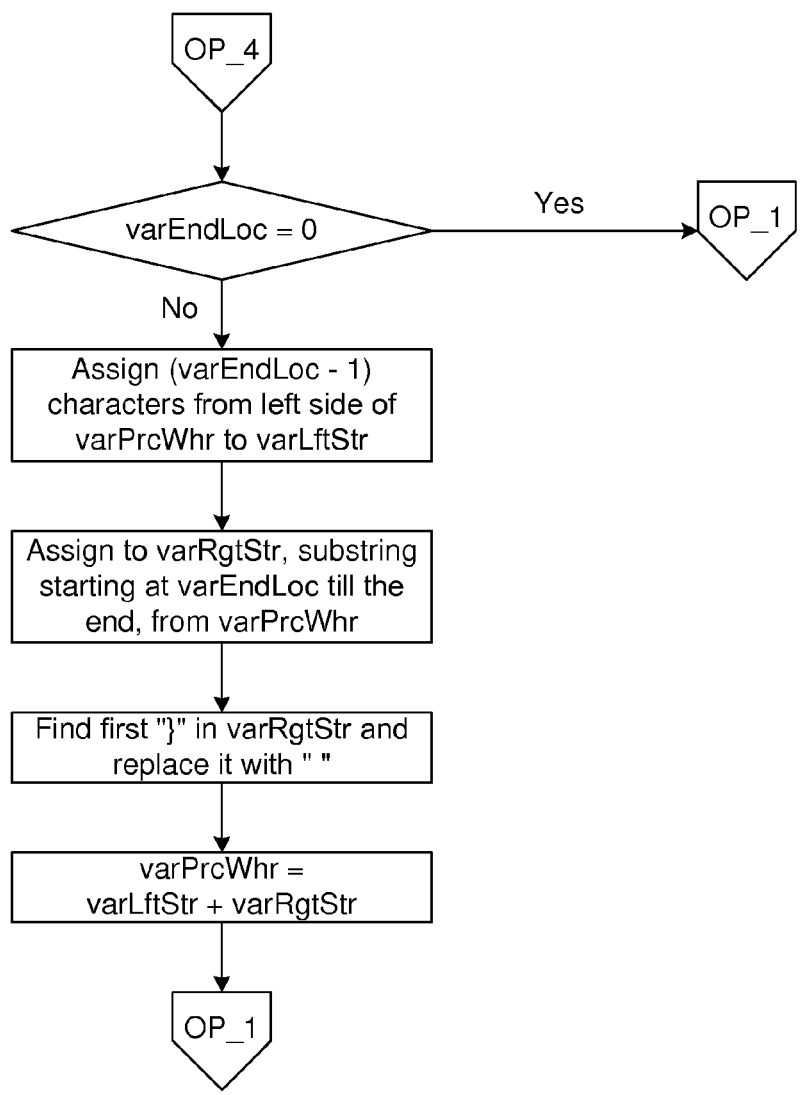
Figure 8X:
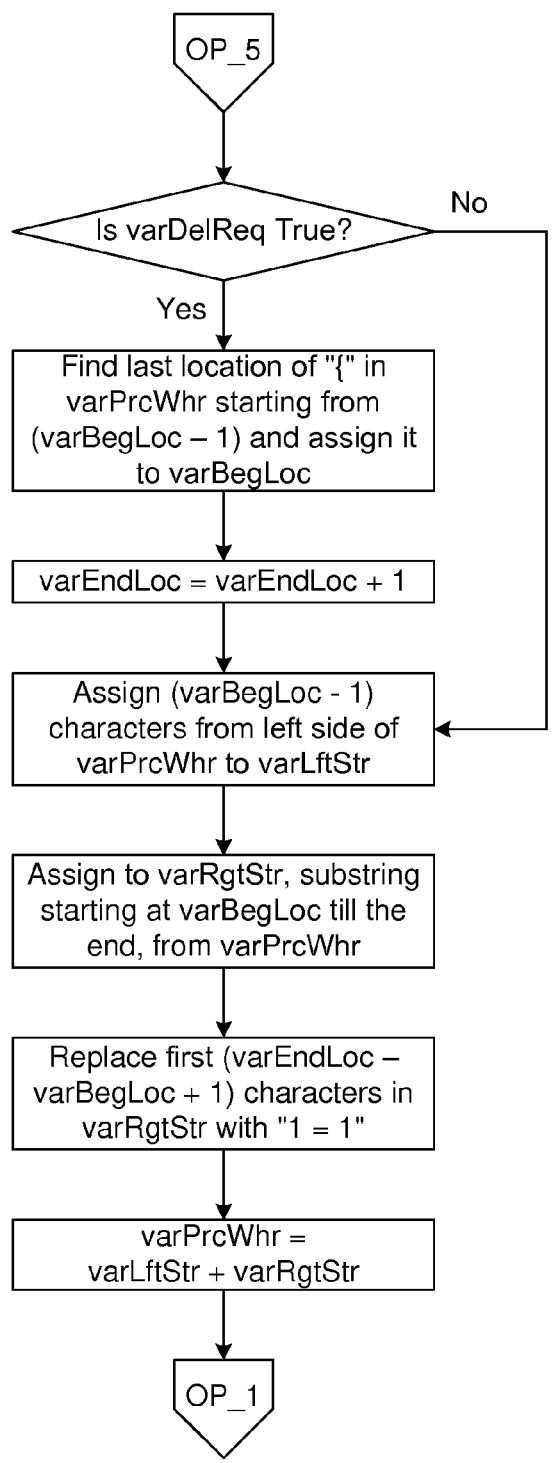

In the exemplary flowchart illustrated in FIGS. 8A to 8X, the field names of tblQry 782, tblQrySrc 784, and tblQryFld 786 are utilized without their respective numerals. The field names of the aforementioned tables, which represent attributes of the exemplary data model, are listed below:
1. qryId 732,
2. qryWhr 752,
3. qryGrp 512,
4. qryUni 514,
5. srcQryId 734,
6. srcOrd 736,
7. srcId 754,
8. srcReuseId 738,
9. srcUseCnd 516,
10. srcJoinFld 756,
11. srcJoinToFld 758,
12. srcJoinToSrc 760,
13. colQryId 740,
14. colSrcId 742,
15. colOrd 744,
16. colAla 762,
17. colXpr 764,
18. colUseCnd 518,
19. colGrpFun 766, and
20. colReuse 520.

In addition to the above-mentioned field names, the following data tokens, parameters, and table names are also utilized without their respective numerals in the exemplary flowchart illustrated in FIG. 8A to 8X:
1. prmQryId 612,
2. prmMthCnt 614,
3. prmOraQry 618,
4. prmLftJoi 620,
5. tblQry 782,
6. tblQrySrc 784,
7. tblQryFld 786,
8. tknMonth 524,
9. prmBegMth 616, and
10. prmUseCnd 622, In FIG. 8A, at terminal 810a, the function queryBuilder starts. queryBuilder receives a parameter for prmQryId 612, which is utilized to identify a desired source object from tblQry 782.

At decision box 810b, it is checked whether this is the first call to queryBuilder or not. This check is required for a one-time initialization of the global variables, varCalCnt and varMthAry, which are initialized at operation 810c and operation 810d respectively. If this is the first call to queryBuilder, then the flow continues to operation 810c. Otherwise, the flow continues to operation 810e.

At operation 810e, an object varQryRcd is initialized. The object varQryRcd is an exemplary ADO Recordset Object, and comprises information about a Recordset, which is opened by utilizing the object varQryRcd.

At operation 810f, an object varSrcRcd is initialized. The object varSrcRcd is an exemplary ADO Recordset Object, and comprises information about a Recordset, which is opened by utilizing the object varSrcRcd.

At operation 810g, an object varFldRcd is initialized. The object varFldRcd is an exemplary ADO Recordset Object, and comprises information about a Recordset, which is opened by utilizing the object varFldRcd.

At operation 810h, an array variable varTblAry is initialized. varTblAry is a two dimensional array that is utilized for storing component values in srcId 754 along with a table/view alias, which is generated, as a result of processing tknAlias 522, for srcId 754.

In FIG. 8B, operations 811p and 811q are called only once for a query; these operations are not called for sub-queries.

At operation 811p, varAlaCnt is initialized to zero. varAlaCnt is utilized for calculating an alias for tknAlias 522.

At operation 811q, all parameters illustrated in FIG. 6 are resolved. The parameters may either be resolved by a direct input of a user, or be retrieved from a computer readable recording medium.

In FIG. 8C, at operation 812b, the object varQryRcd is opened, wherein the object varQryRcd comprises all fields of tblQry 782, wherein the data value of qryId 732 is equal to the parameter value 162 of prmQryId 612. Since qryId 732 is the primary key, the object varQryRcd will comprise maximum one record.

At operation 812c, the object varSrcRcd is opened, wherein the object varSrcRcd comprises all fields of tblQrySrc 784, wherein the data value of srcQryId 734 is equal to the data value of qryId 732, and the order of the Recordset comprised by the object varSrcRcd is on the data values of srcOrd 736.

At operation 812f, the varSrcAvl is assigned a result of the processed token value of srcUseCnd 516. The processing of the token value of srcUseCnd 516 is done in an exemplary function called CheckAvailability, which is illustrated in detail in FIG. 8Q. If the function CheckAvailability returns True, it implies that the current record pointed by the object varSrcRcd will be utilized by queryBuilder. If, on the other hand, the function CheckAvailability returns False, it implies that the current record pointed by the object varSrcRcd will not be utilized by queryBuilder.

At operation 8121, tknAlias 522 is processed. tknAlias 522 is processed by an exemplary function NewAlias( ) which is illustrated in detail in FIG. 8R. The alias generated by a function NewAlias( ) is then stored in a variable varCurAla.

In FIG. 8D, at operation 813c, queryBuilder is called recursively for constructing a sub-query, wherein the sub-query is identified by a data value of srcReuseId 738. The resultant sub-query is stored in a variable varSubQry.

At operation 813i, the object varFldRcd is opened, wherein the object varFldRcd comprises all fields of tblQryFld 786, wherein the data value of colQryId 740 is equal to the data value of srcQryId 734, the data value of colSrcId 742 is equal to the data value of srcId 754, and the order of the Recordset represented by the object varFldRcd is on the data values of colOrd 744.

At operation 813m, varFldAvl is assigned a result, which is an example of token result 156, of the processed token value of colUseCnd 518. The processing of the token value of colUseCnd 518 is done in the exemplary function CheckAvailability, which is illustrated in detail in FIG. 8Q. If the function CheckAvailability returns True, it implies that the current record pointed by the object varFldRcd will be utilized by queryBuilder. If, on the other hand, the function CheckAvailability returns False, it implies that the current record pointed by the object varFldRcd will not be utilized by queryBuilder.

FIG. 8Q illustrates an exemplary flowchart of an exemplary processing of two data tokens, srcUseCnd 516 and colUseCnd 518, wherein the processing of srcUseCnd 516 and colUseCnd 518 is implemented by utilizing the exemplary function CheckAvailability. Since the processing logic of both data tokens, srcUseCnd 516 and colUseCnd 518, is the same, the processing of both data tokens is implemented as one function.

At operation 826a, the function CheckAvailability starts and receives a parameter prmCndTkn which comprises a parameter which will be either a token value representing srcUseCnd 516, or a token value representing colUseCnd 518, depending on the location from where the function CheckAvailability is called.

At operation 826d, the parameter value 162 of prmUseCnd 622, which comprises either a list of comma-separated string values, or a single string value, is stored as an array in an array variable varCndPrm. The following are a few examples illustrating the storage of contents of prmUseCnd 622 as an array in varCndPrm:

1. If prmUseCnd 622 is empty, then varCndPrm will comprise no array item.
2. If prmUseCnd 622 comprises only one string value, then varCndPrm will comprise one array item.
3. If prmUseCnd 622 comprises 10 comma-separated string values, then varCndPrm will comprise 10 array items, wherein each array item will comprise a string value.

FIG. 8R illustrates an exemplary flowchart of an exemplary processing of the function NewAlias( ) which is utilized for an exemplary processing of tknAlias 522. Each time the function NewAlias( ) is called, it returns a new alias comprising one or more alphabets.

At operation 827a, the function NewAlias( ) starts.

At operation 827e, MOD represents modulo operation, which finds the remainder of a division of the value of a variable varWrkCnt by 26.

At operation 827f, INT represents an integer function, which returns only the integer part of a number without rounding the number.

At operation 827i, CHR represents a function, which returns an ASCII character which is represented by the number that is passed to CHR as a parameter.

At operation 827k, the function NewAlias( ) returns the newly calculated alias.

FIG. 8S illustrates an exemplary function WhereClause, which is utilized by queryBuilder for merging two WHERE clauses together. The function WhereClause also utilizes an exemplary function WhereToken, which is utilized for processing tknCurlyBrackets 526, tknItemCodeBegin 528, and tknItemCodeEnd 530.

At operation 828a, the function WhereClause starts and receives two parameters, prmOrgWhr and prmNewWhr, wherein prmOrgWhr comprises an already built WHERE clause, which may be an empty string in certain cases, and prmNewWhr, which may be an empty string and which comprises a WHERE clause that is desired to be merged in prmOrgWhr.

At operation 828d, the function WhereToken is utilized for processing tknCurlyBrackets 526, tknItemCodeBegin 528, and tknItemCodeEnd 530.

FIGS. 8T to 8X illustrate an exemplary flowchart of an exemplary implementation of a processing of tknCurlyBrackets 526, tknItemCodeBegin 528, and tknItemCodeEnd 530 on the basis of the processing rules, illustrated in FIGS. 5B and 5C, and the processing rules specified for tknItemCodeBegin 528 and tknItemCodeEnd 530.

In FIG. 8T, at operation 829a, the function WhereToken starts and receives a parameter prmRawWhr comprises a WHERE clause which may contain one or more token values representing tknCurlyBrackets 526, tknItemCodeBegin 528, and/or tknItemCodeEnd 530.

In FIG. 8U, at operation 830d, varResult is replaced by either:
1. the parameter value 162 of prmItmBeg 624, if a variable varTknDta contains "itmBeg" (without quotes), which represents tknItemCodeBegin 528, or
2. the parameter value 162 of prmItmEnd 626, if the variable varTknDta contains "itmEnd" (without quotes), which represents tknItemCodeEnd 530, or
3. a NULL value, if the variable varTknDta contains neither "itmBeg" (without quotes), which represents tknItemCodeBegin 528, nor "itmEnd" (without quotes), which represents tknItemCodeEnd 530.

Figure 9A:
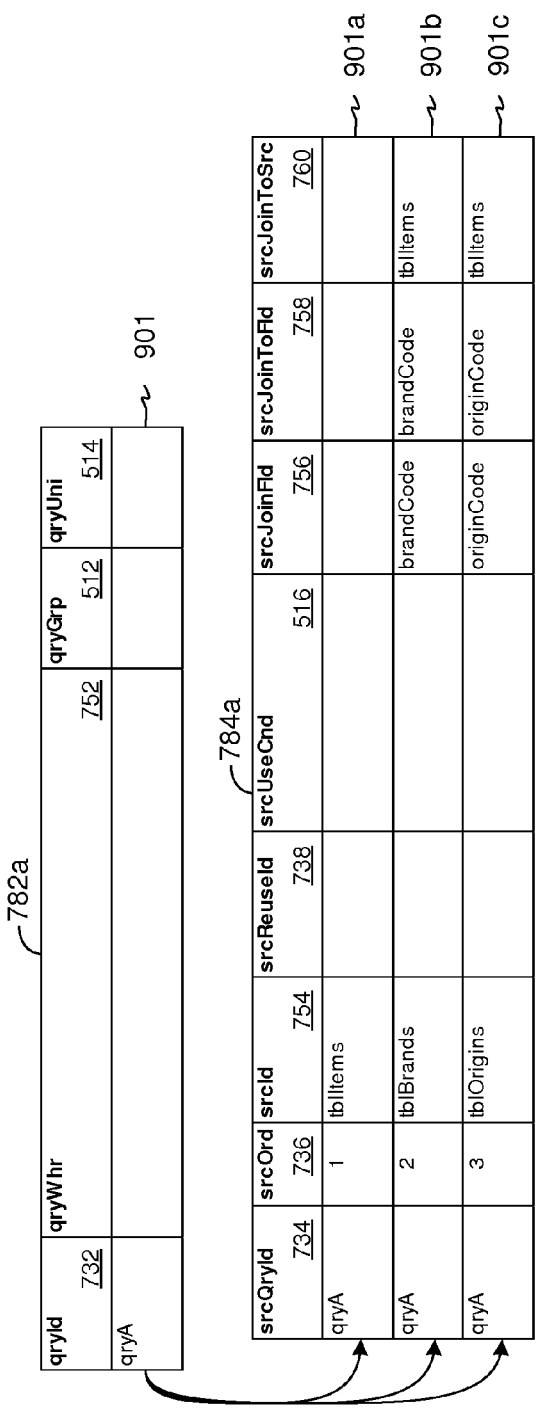
FIGS. 9A to 9O illustrate a few exemplary source objects which are stored in the exemplary source object repository illustrated in FIG. 7C, according to an aspect of an embodiment of the invention.
Figure 9B:
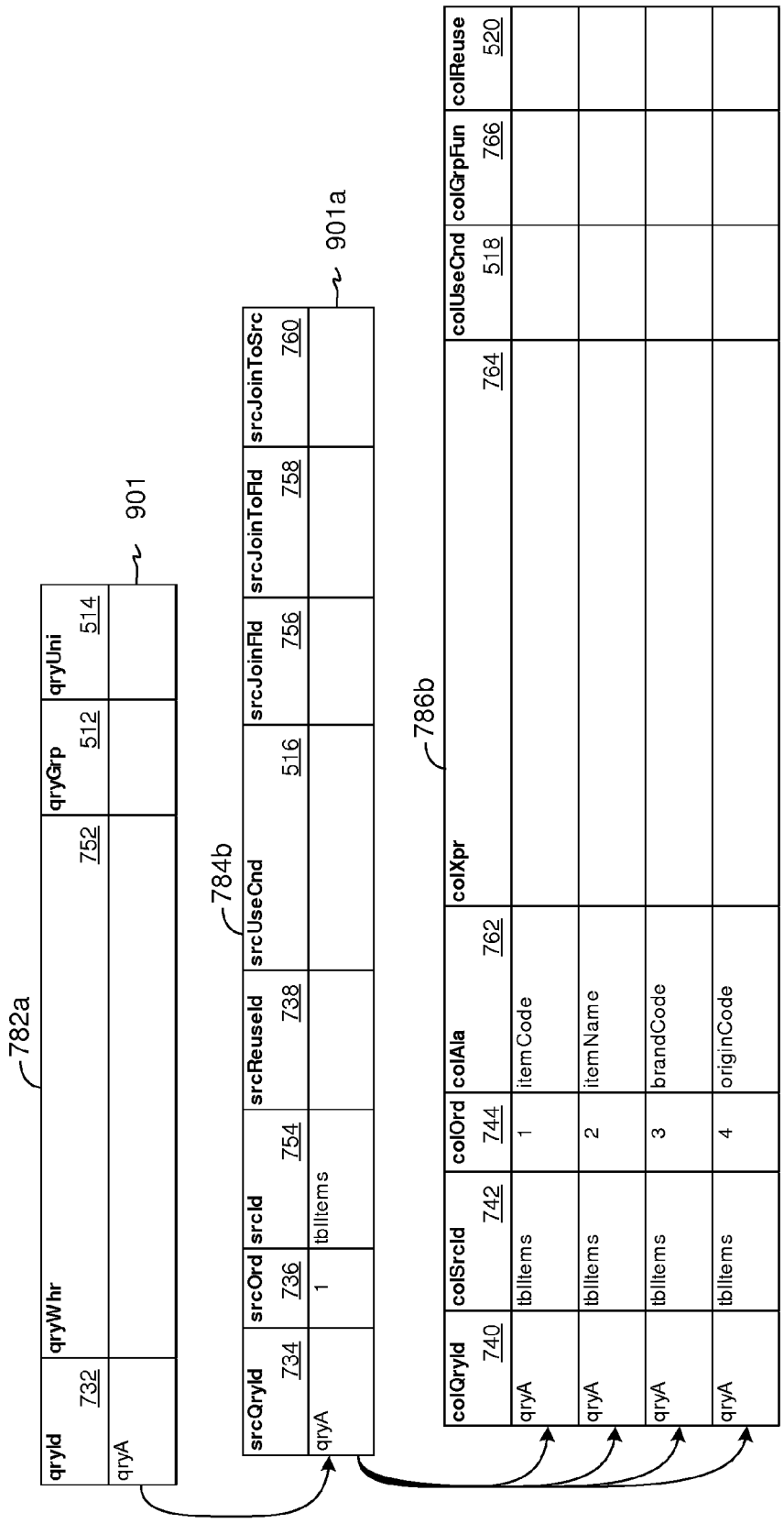
Figure 9C:
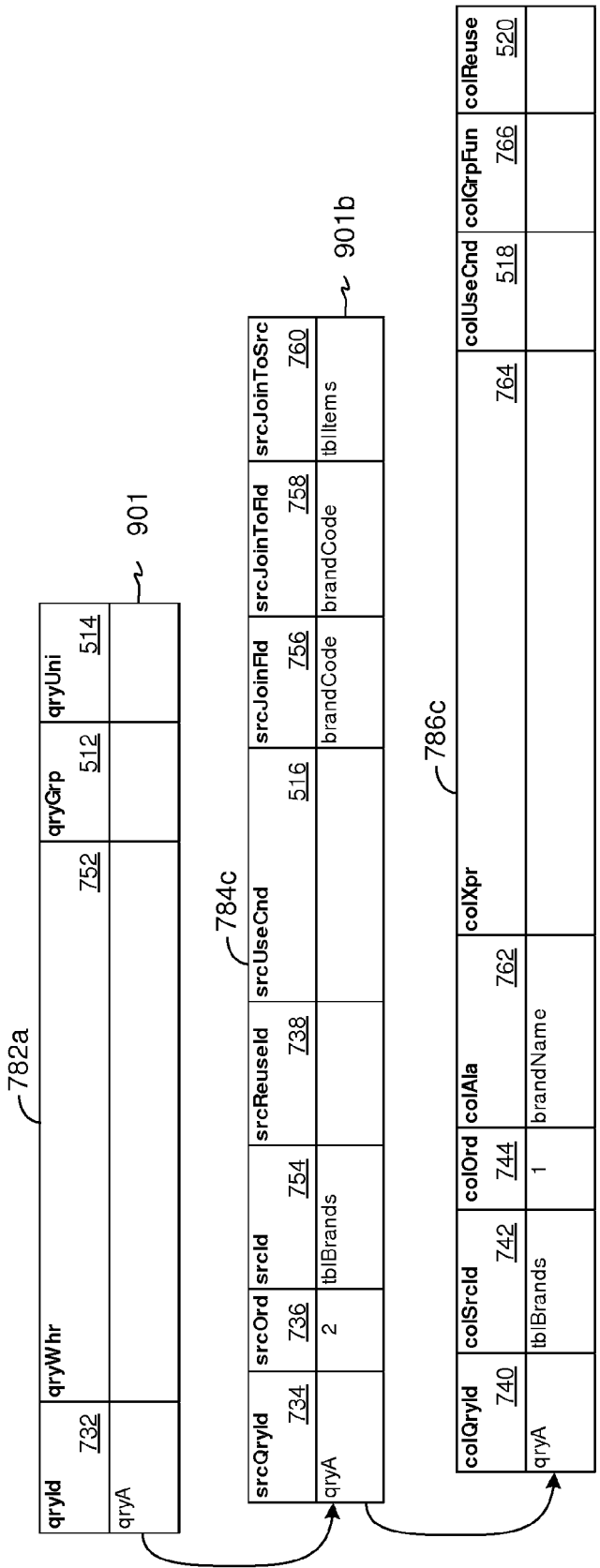
Figure 9D:
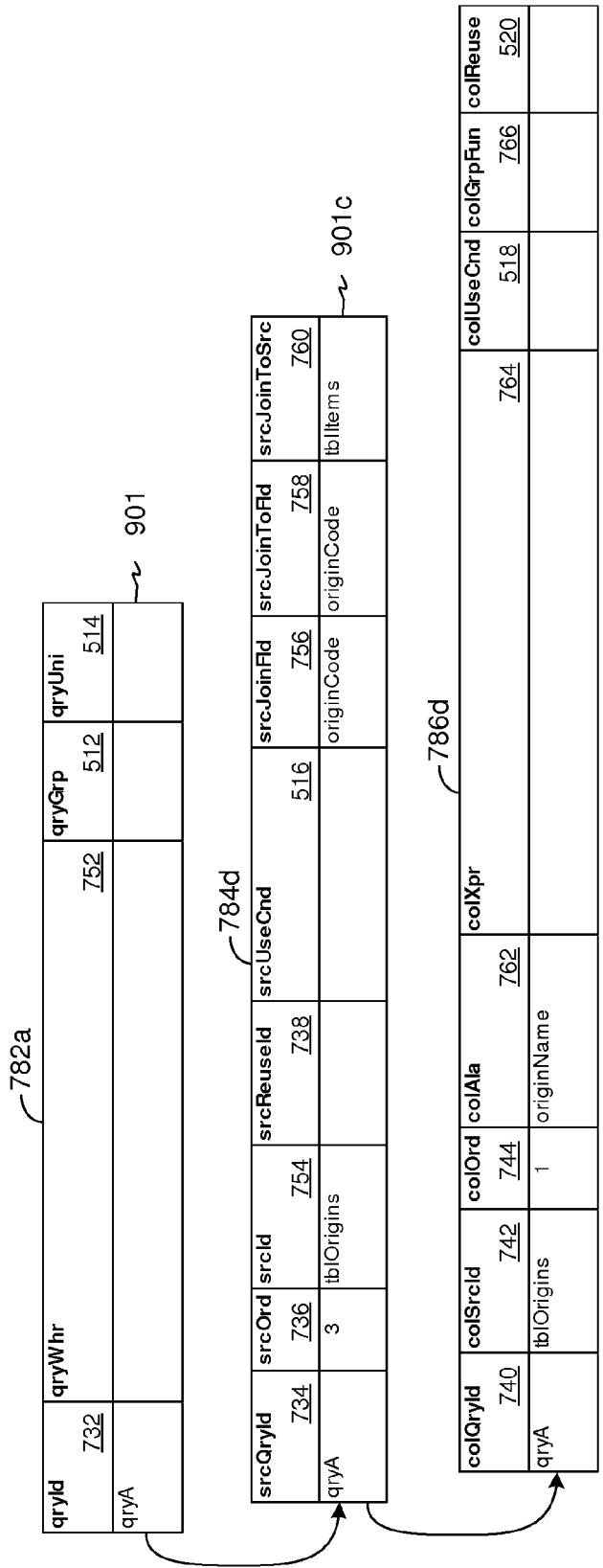
Figure 9E:
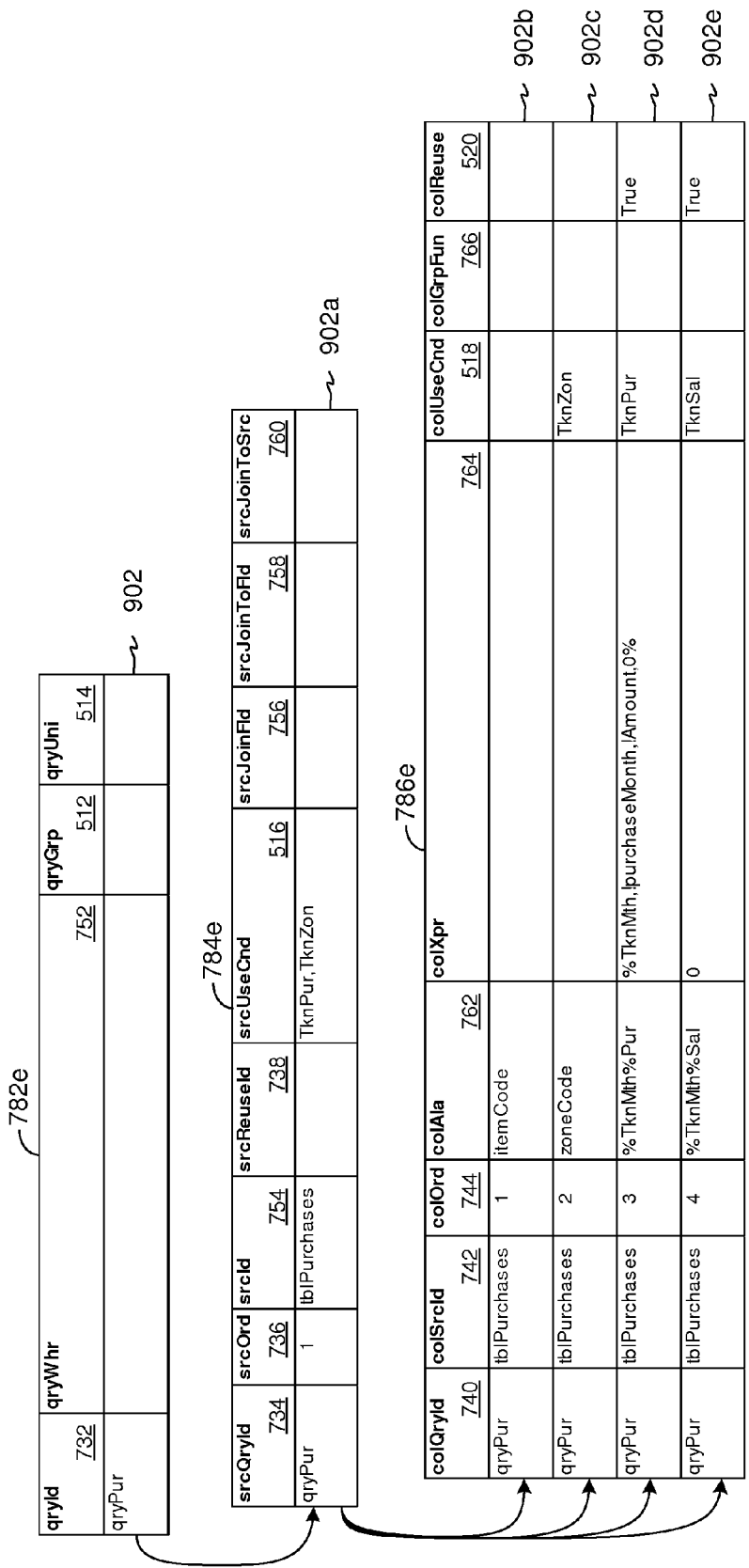
Figure 9F:
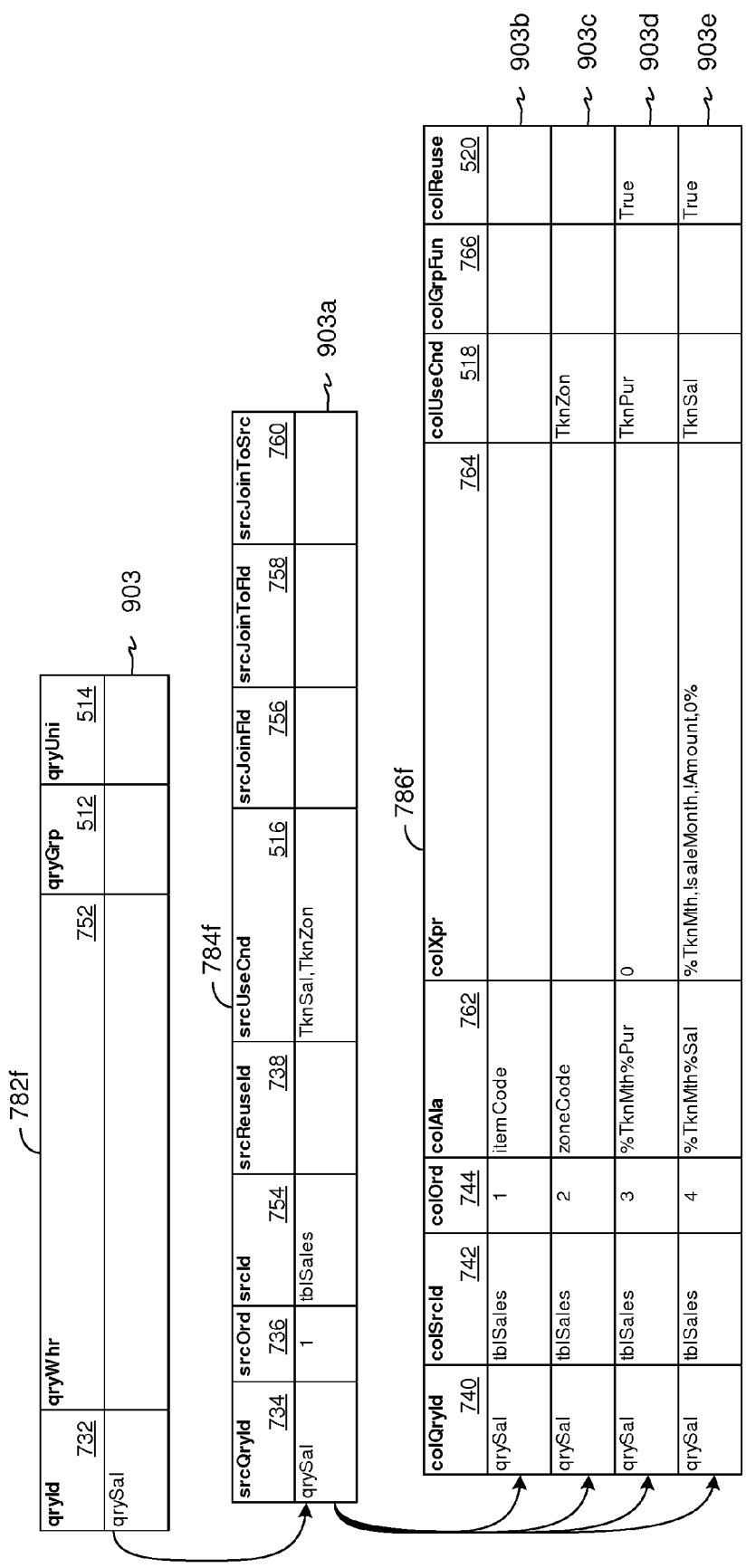
Figure 9G:
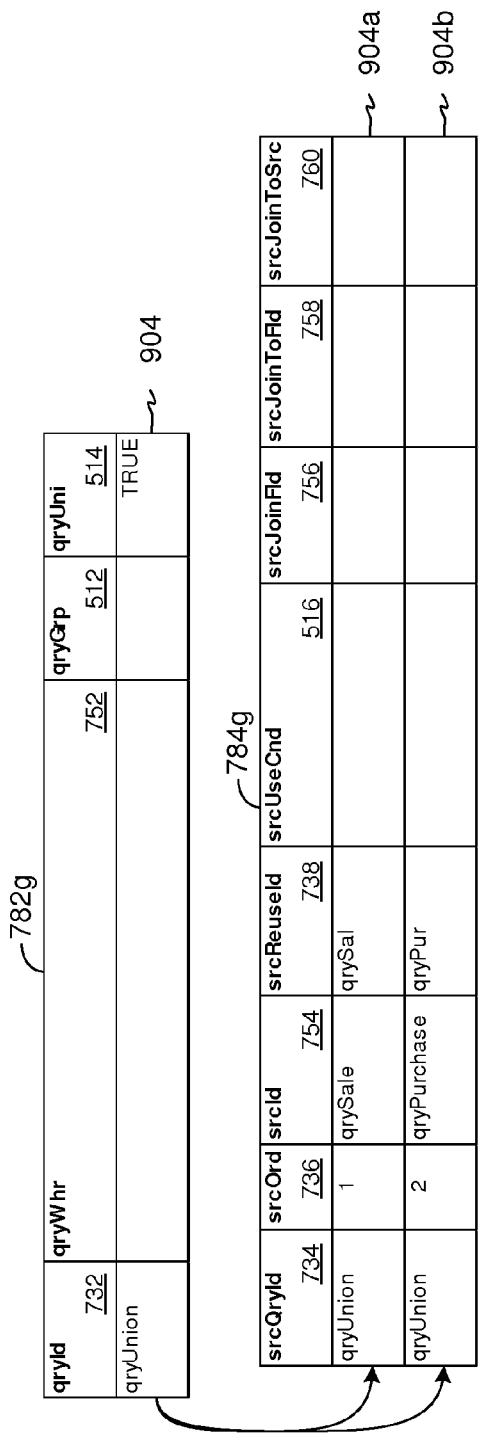
Figure 9H:
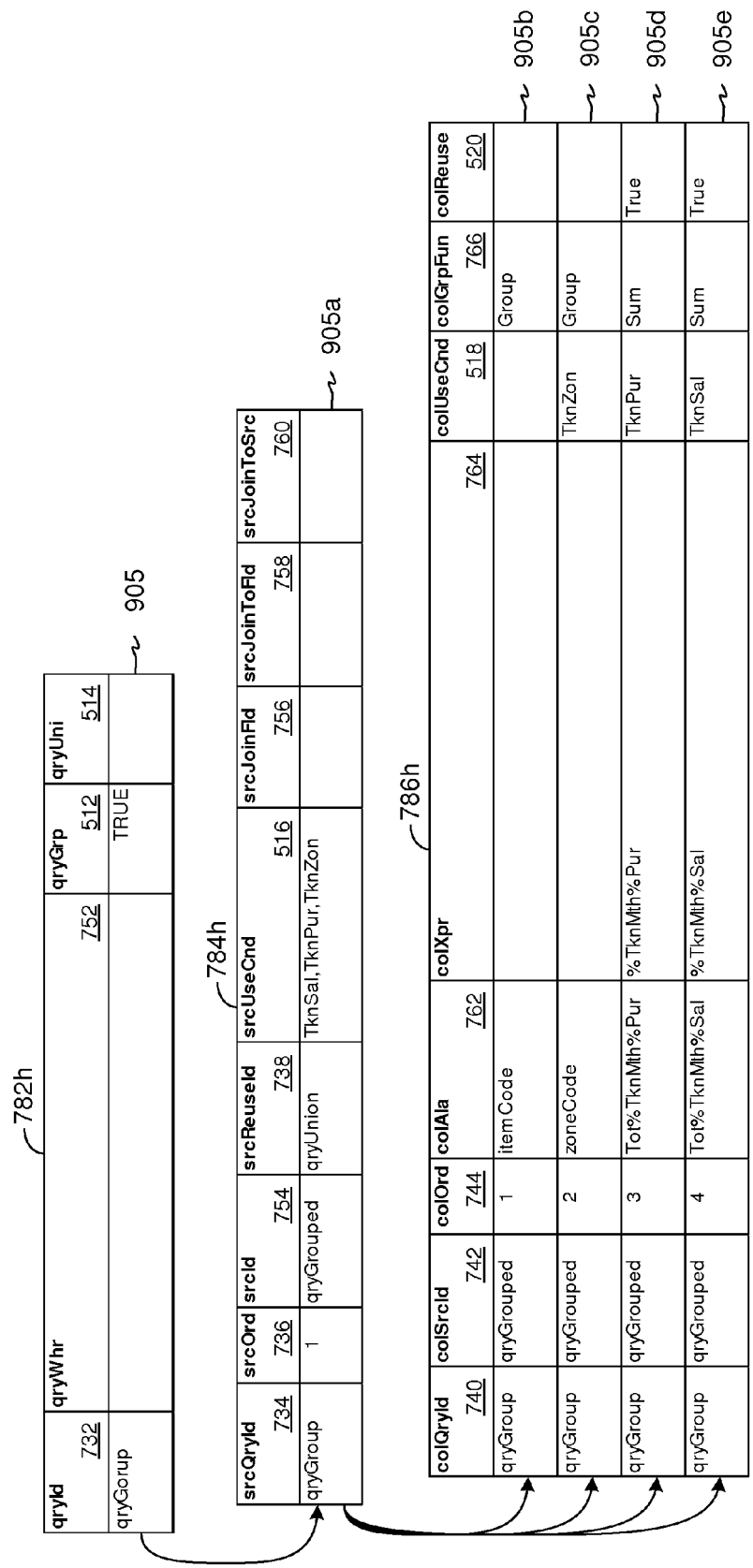
Figure 9I:
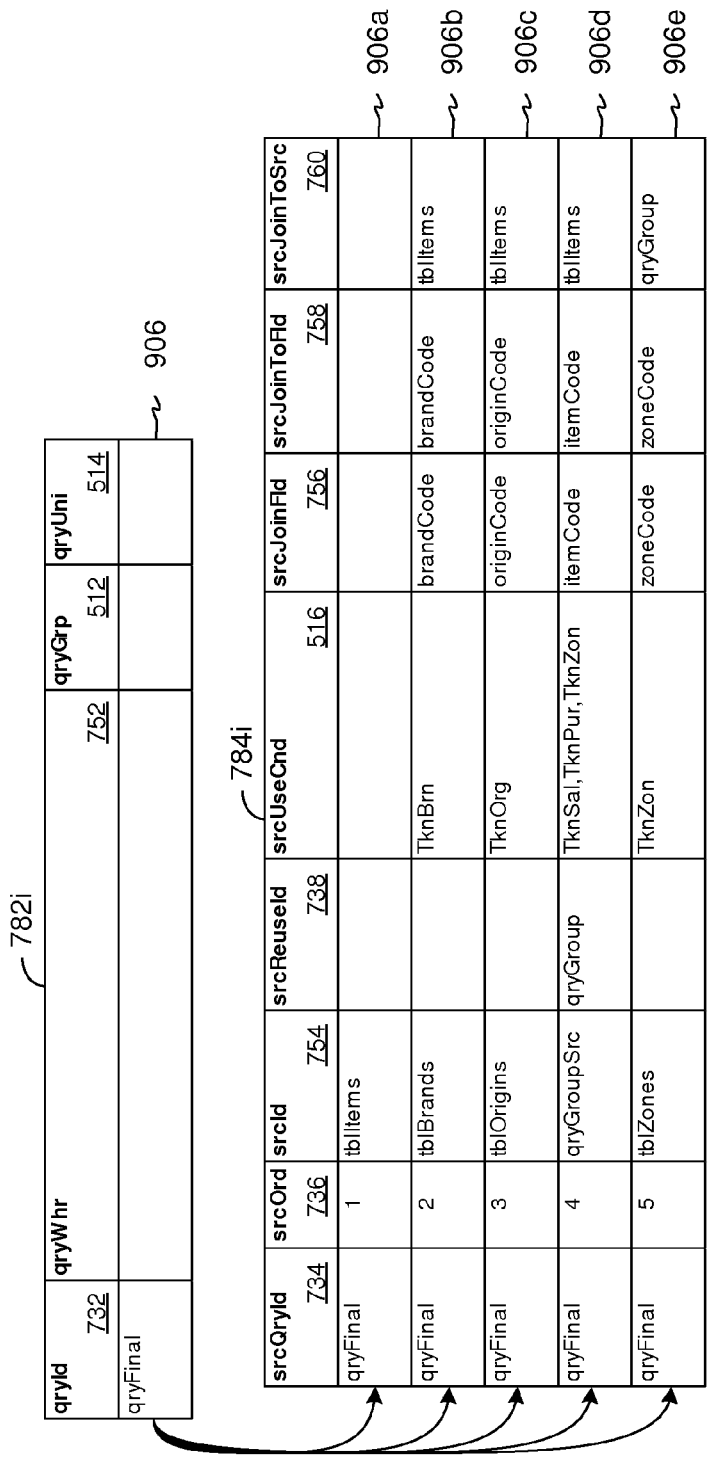
Figure 9J:
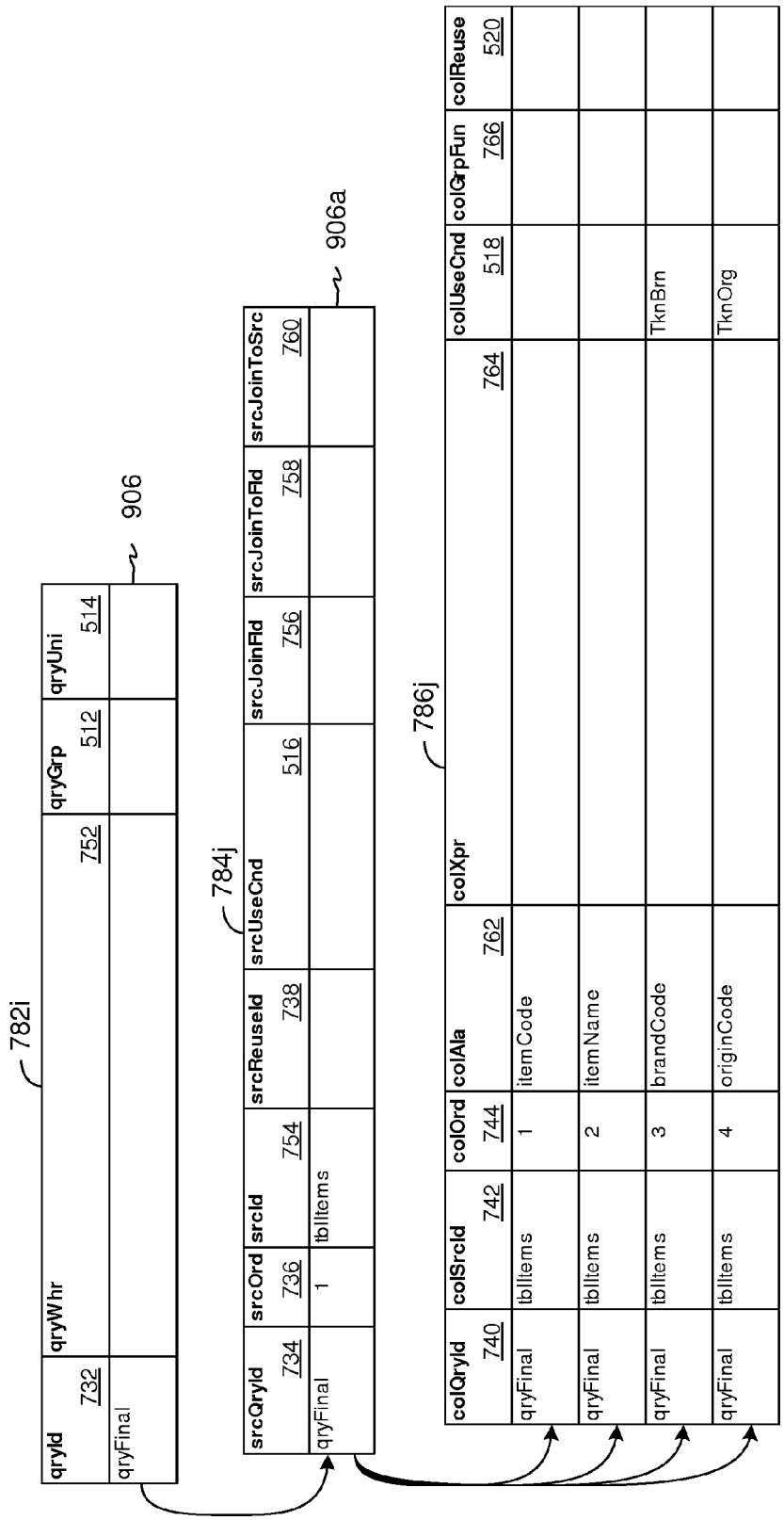
Figure 9K:
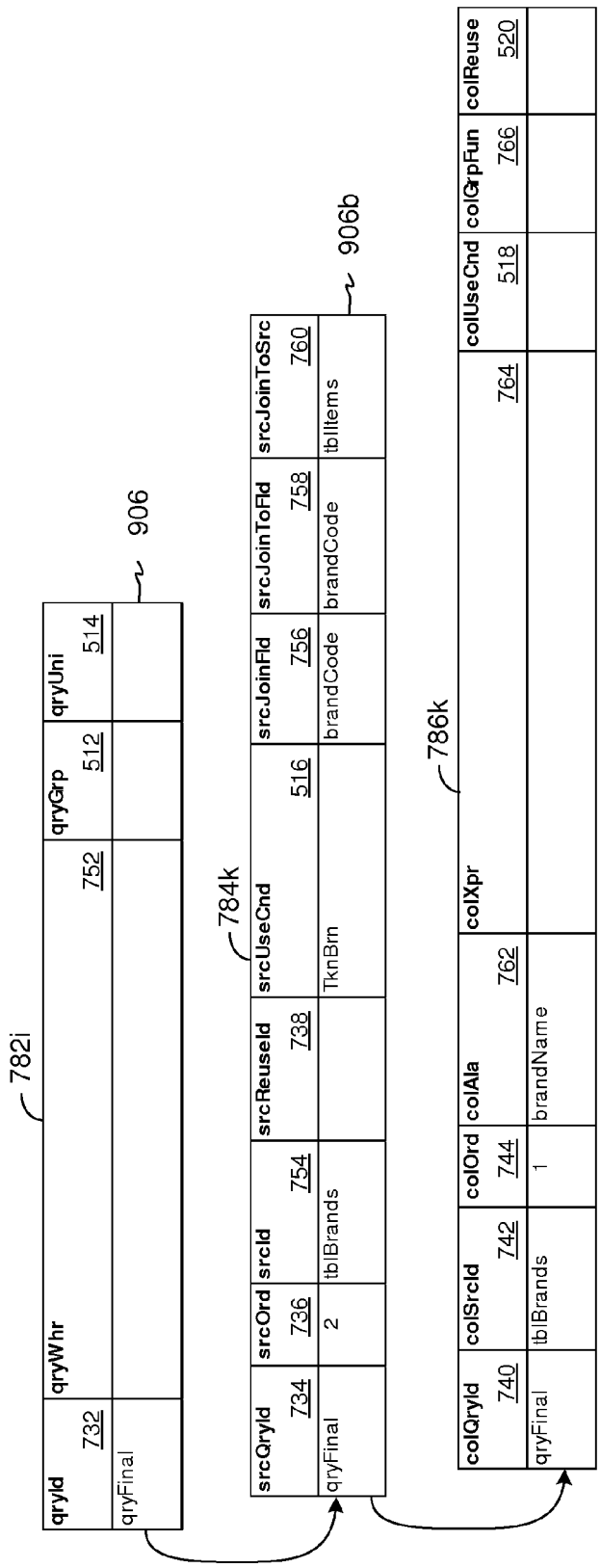
Figure 9L:
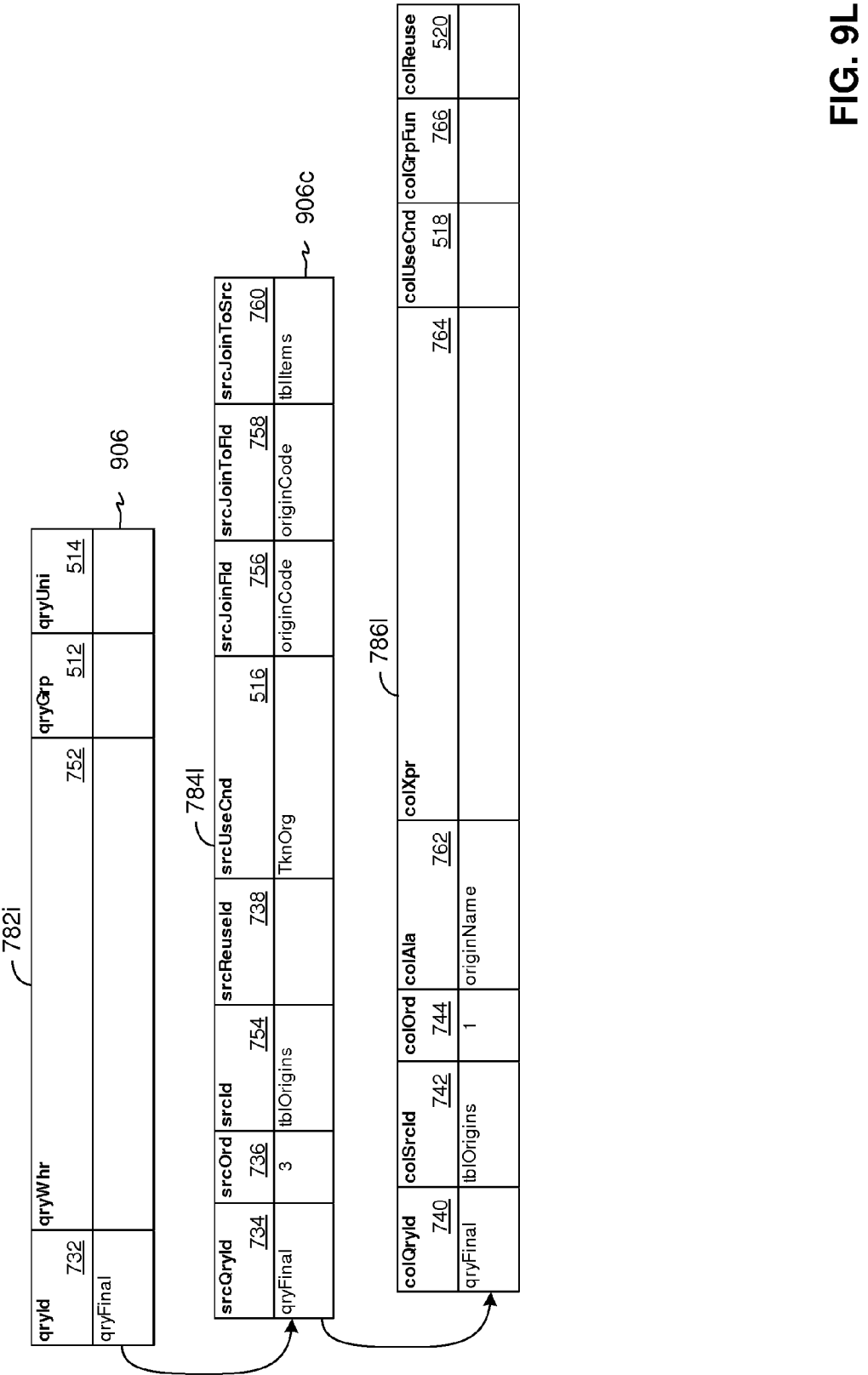
Figure 9M:
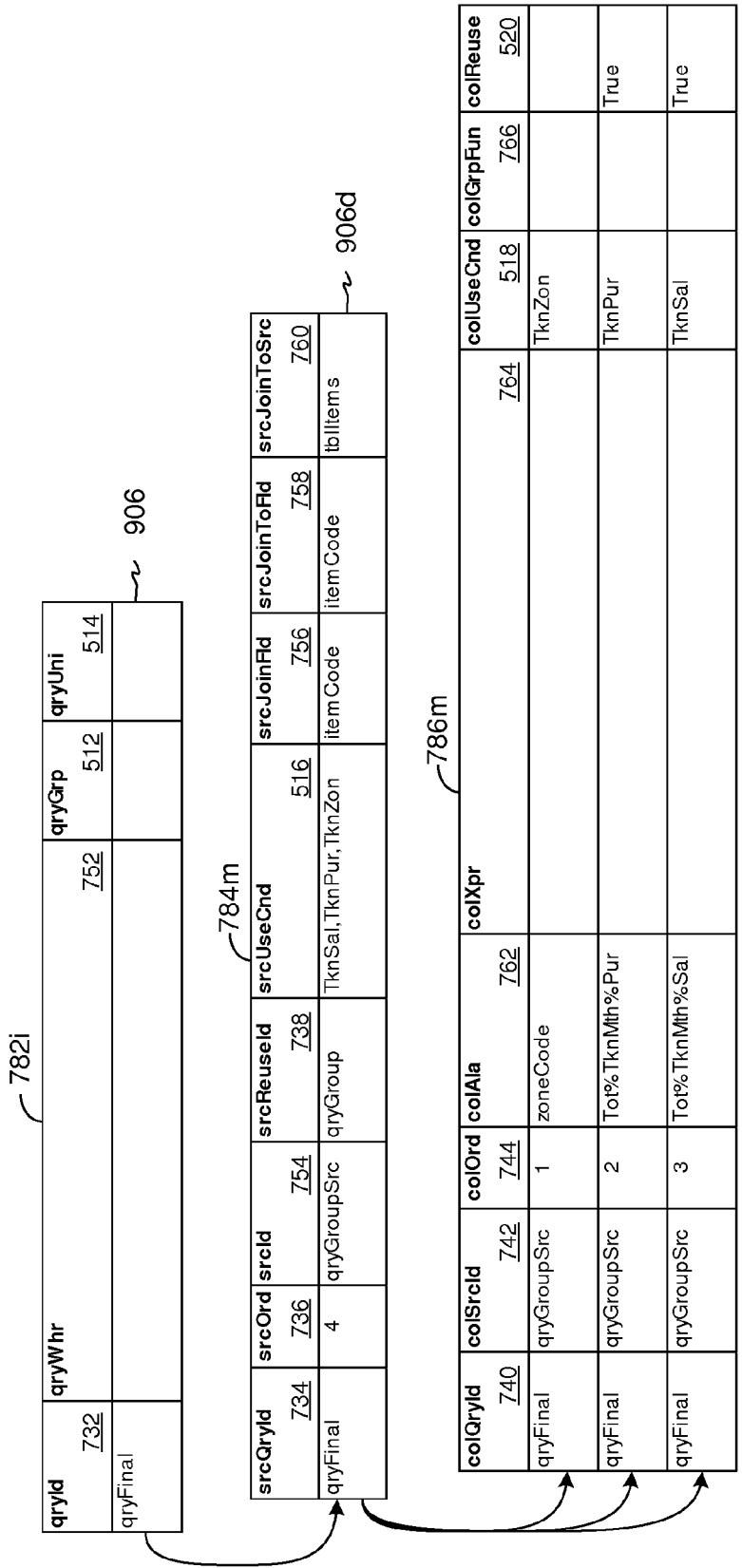
Figure 9N:
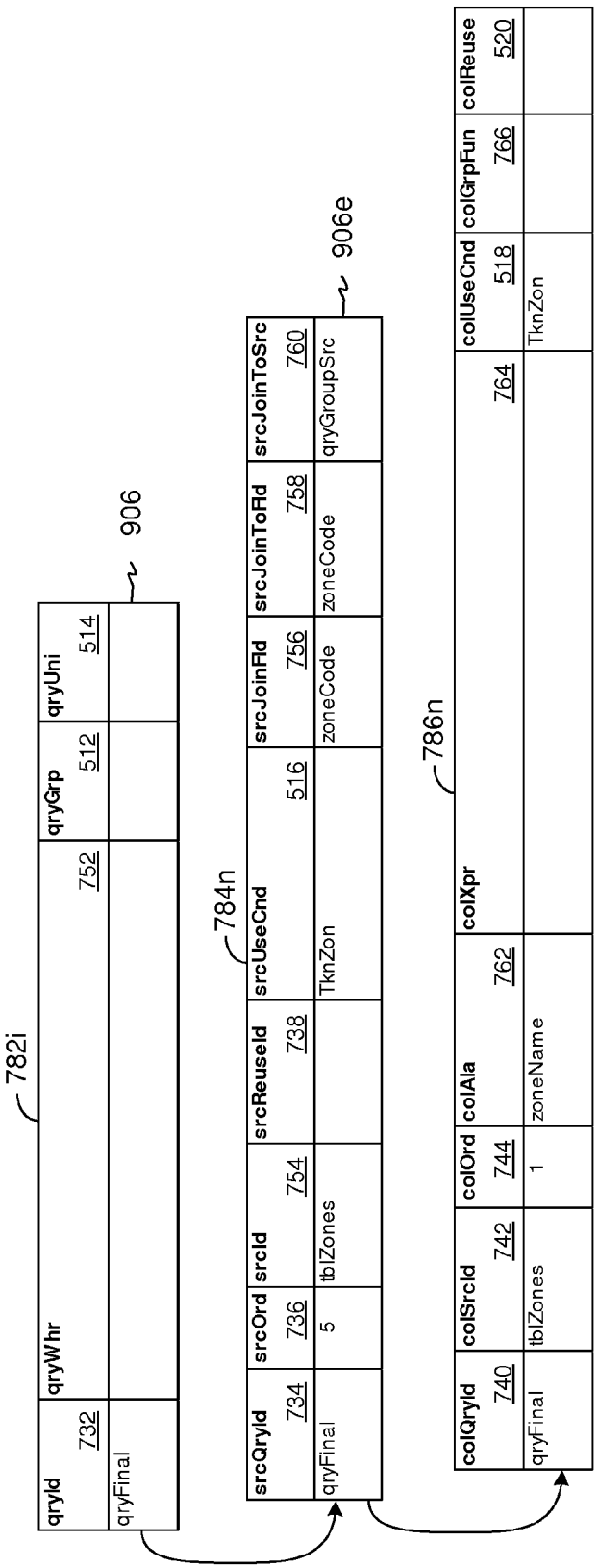
Figure 9O:
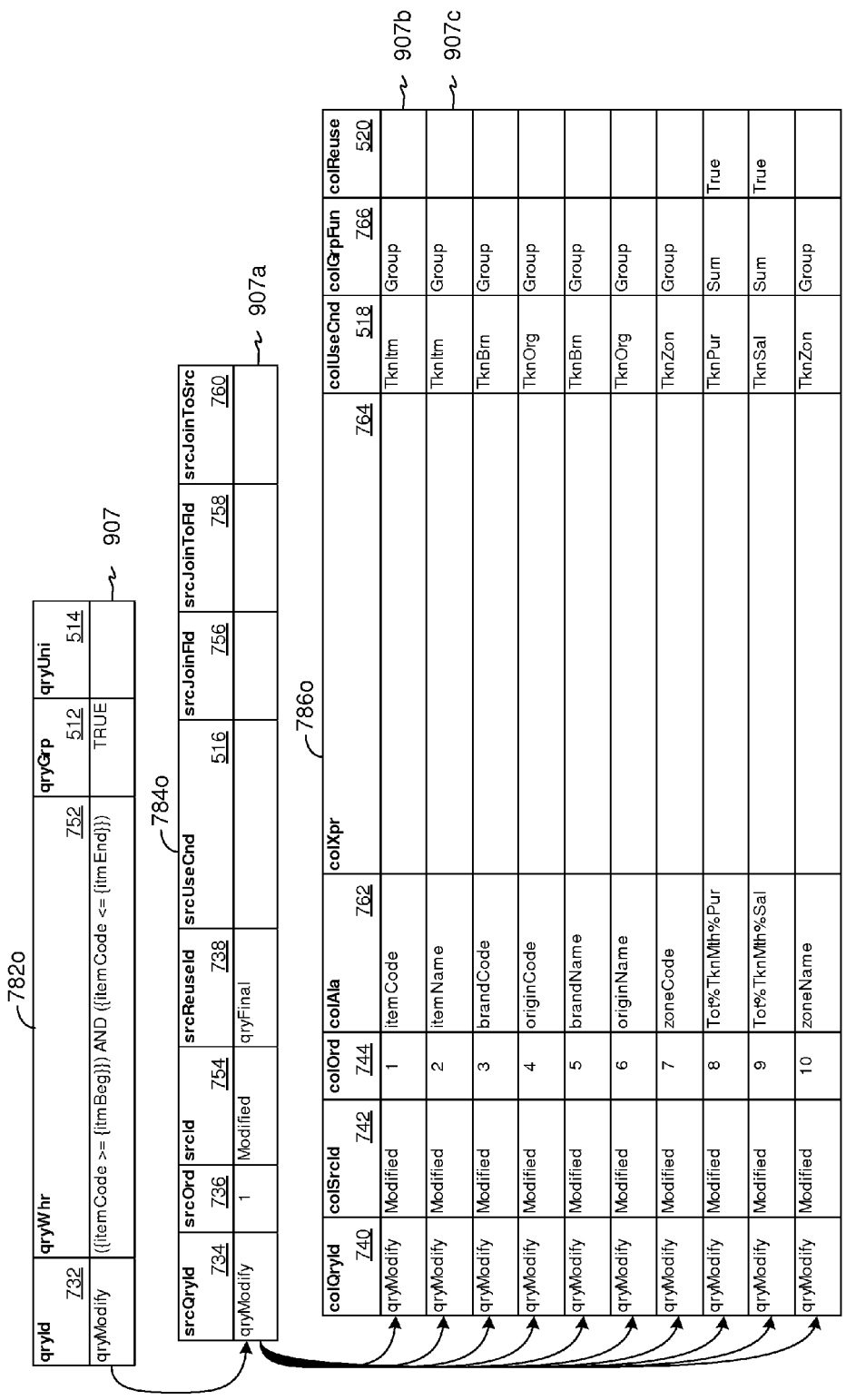

FIGS. 9A to 9O illustrate exemplary source objects, which are stored in the source object repositories tblQry 782, tblQrySrc 784, and tblQryFld 786, which are to be utilized by queryBuilder for constructing a desired query.

FIG. 9A illustrates a specific exemplary segment from tblQry 782 (represented as 782a because it illustrates a specific exemplary segment of tblQry 782), which shows an exemplary source object that is identifiable by qryA (a data value representing qryId 732), hereinafter called exemplary source object qryA, and which is represented in a record 901. The exemplary source object qryA can be utilized for constructing a desired query. The exemplary source object qryA is not associated with any data token. Resultantly, the desired query constructed by utilizing the exemplary source object qryA will always be the same for a specific database. However, the parameters of prmOraQry 618 and prmLftJoi 620 can change the resultant constructed query because these parameters are utilized during a construction of the desired query without utilizing any data token.

An exemplary segment of tblQrySrc 784 (represented as 784*a* because it illustrates a specific exemplary segment of tblQrySrc 784) comprises three records which are related to record 901. Each record in 784*a* illustrates information relating to a table which is to be utilized in a desired query which is to be constructed by utilizing the exemplary source object qryA. 784*a* illustrates:

1. A record 901*a* comprising tblItems.
2. A record 901*b* comprising tblBrands, wherein tblBrands will be JOINED with tblItems in the desired query constructed by utilizing the exemplary source object qryA by utilizing a column brandCode.
3. A record 901*c* comprising tblOrigins, wherein tblOrigins will be JOINED with tblItems in the desired query constructed by utilizing the exemplary source object qryA by utilizing a column originCode.

FIG. 9B illustrates exemplary records from tblQryFld 786 (represented as 786*b* because it illustrates a specific exemplary segment of tblQryFld 786) which are related to the record 901*a*, wherein the record 901*a* is illustrated in an exemplary segment of tblQrySrc 784 (represented as 784*b* because it illustrates a specific exemplary segment of tblQrySrc 784). The records illustrated in 786*b* comprise columns of tblItems, which is comprised by record 901*a*, which will be included in a desired query which queryBuilder constructs by utilizing the exemplary source object qryA.

FIG. 9C illustrates exemplary records from tblQryFld 786 (represented as 786*c* because it illustrates a specific exemplary segment of tblQryFld 786), which are related to record 901*b*, wherein record 901*b* is illustrated in an exemplary segment of tblQrySrc 784 (represented as 784*c* because it illustrates a specific exemplary segment of tblQrySrc 784). The record illustrated in 786*c* comprises a column of tblBrands, which is comprised by record 901*b*, which will be included in a desired query which queryBuilder constructs by utilizing the exemplary source object qryA.

FIG. 9D illustrates exemplary records from tblQryFld 786 (represented as 786*d* because it illustrates a specific exemplary segment of tblQryFld 786) which are related to record 901*c*, wherein record 901*c* is illustrated in an exemplary segment of tblQrySrc 784 (represented as 784*d* because it illustrates a specific exemplary segment of tblQrySrc 784). The record illustrated in 786*d* comprises a column of tblOrigins, which is comprised by record 901*c*, which will be included in a desired query which queryBuilder constructs by utilizing the exemplary source object qryA.

FIG. 9E illustrates an exemplary segment of tblQry 782 (represented as 782*e* because it illustrates a specific exemplary segment of tblQry 782) which shows an exemplary source object which is identifiable by qryPur (a data value which represents qryId 732), hereinafter called exemplary source object qryPur, and is represented in record 902. The exemplary source object qryPur is utilized in another source object, which is identifiable by qryUnion (a data value which represents qryId 732), hereinafter called the exemplary source object qryUnion, illustrated in FIG. 9G. However, queryBuilder can construct a desired query by utilizing only the exemplary source object qryPur.

An exemplary segment of tblQrySrc 784 (represented as 784*e* because it illustrates a specific exemplary segment of tblQrySrc 784) comprises one record 902*a* which is related to record 902. Record 902*a* illustrates a table which is to be utilized in a desired query that is to be constructed by utilizing the exemplary source object qryPur and/or any other query, which queryBuilder constructs by utilizing a source object, which utilizes the exemplary source object qryPur.

In record 902*a*, srcUseCnd 516 is represented by an exemplary token value comprising a list of comma separated string comprising two string values: TknPur and TknZon. Utilization of srcUseCnd 516 implies that during the construction of a desired query which utilizes the exemplary source object qryPur, record 902*a* will be utilized only if the parameter value 162 of prmUseCnd 622 comprises at least one of the string values: TknPur and TknZon. In a case where record 902*a* is not utilized, the records illustrated in an exemplary segment of tblQryFld 786 (represented as 786*e* because it illustrates a specific exemplary segment of tblQryFld 786) will also not be utilized.

Record 902*b* will be utilized only if record 902*a* is utilized. Record 902*c* will be utilized only if srcUseCnd 516 comprises a string value TknZon. Record 902*d* will be utilized only if srcUseCnd 516 comprises a string value TknPur. Record 902*e* will be utilized only if srcUseCnd 516 comprises a string value TknSal. The string value TknSal is not included in record 902*a* because record 902*a* and its related records 902*b*, 902*c*, 902*d*, and 902*e* are not desired to be utilized for constructing a desired query if the parameter value 162 of srcUseCnd 516 comprises string value TknSal, but does not comprise any of the string values: TknPur and TknZon.

In records 902*d* and 902*e*, % TknMth %, which is a token value representing tknMonth 524, is embedded in the component value representing colAla 762.

In record 902*d*, colXpr 764 comprises an exemplary token value 154 % TknMth,!purchaseMonth,!Amount,0% which represents tknMonth 524, wherein the token value representing tknMonth 524 also comprises two instances of "!" (sign of exclamation without quotes), which is a token value 154 representing tknAlias 522. This exemplary implementation illustrates a nesting of a token value representing tknAlias 522 in another token value representing tknMonth 524. The arguments purchaseMonth and Amount, which are utilized in colXpr 764 of record 902*d*, are column names of tblPurchases, and 0 is a constant value.

In records 902*d* and 902*e*, col Reuse 520 is represented by an exemplary data value True. This implies that records 902*d* and 902*e* will be utilized for constructing a desired query if utilized on the basis of colUseCnd 518, as many times as specified by the parameter value 162 of prmMthCnt 614. In a case where the parameter value 162 of prmMthCnt 614 is zero, records 902*d* and 902*e* will be utilized only once.

FIG. 9F illustrates an exemplary segment of tblQry 782 (represented as 782*f* because it illustrates a specific exemplary segment of tblQry 782) which shows an exemplary source object which is identifiable by qrySal (a data value which represents qryId 732), hereinafter called the exemplary source object qrySal, and represented in record 903. The exemplary source object qrySal is utilized in another source object, identifiable by the exemplary source object qryUnion, which is illustrated in FIG. 9G. However, queryBuilder can construct a desired query by utilizing only the exemplary source object qrySal.

An exemplary segment of tblQrySrc 784 (represented as 784*f* because it illustrates a specific exemplary segment of tblQrySrc 784) comprises one record 903*a* which is related to record 903. Record 903*a* illustrates a table, which is to be utilized in a desired query that is to be constructed by utilizing the exemplary source object qrySal, and/or any other query, which queryBuilder constructs by utilizing a source object, which utilizes the exemplary source object qrySal.

In record 903*a*, srcUseCnd 516 is represented by an exemplary token value comprising a list of comma separated string comprising two string values; TknSal and TknZon. The utilization of srcUseCnd 516 implies that during the construction of a desired query which utilizes the exemplary source object qrySal, record 903*a* will be utilized only if the parameter value 162 of prmUseCnd 622 comprises at least one of the string values: TknSal and TknZon. In a case where record 903*a* is not utilized, the records illustrated in an exemplary segment of tblQryFld 786 (represented as 786*f* because it illustrates a specific exemplary segment of tblQryFld 786) will also not be utilized.

Record 903*b* will be utilized only if record 903*a* is utilized. Record 903*c* will be utilized only if srcUseCnd 516 comprises a string value TknZon. Record 903*d* will be utilized only if srcUseCnd 516 comprises a string value TknSal. Record 903*e* will be utilized only if srcUseCnd 516 comprises a string value TknPur. The string value TknPur is not included in record 903*a* because record 903*a*, and its related records 903*b*, 903*c*, 903*d*, and 903*e*, are not desired to be utilized for constructing a desired query if the parameter value 162 of srcUseCnd 516 comprises a string value TknPur, but does not comprise any of the string values: TknSal and TknZon.

In records 903*d* and 903*e*, % TknMth %, which is a token value representing tknMonth 524, is embedded in the component value stored in colAla 762.

In record 903*e*, colXpr 764 comprises an exemplary token value % TknMth,!saleMonth,!Amount,0% which represents tknMonth 524, wherein the token value representing tknMonth 524 also comprises two instances of "!" (sign of exclamation without quotes), which is a token value 154 representing tknAlias 522. This exemplary implementation illustrates a nesting of a token value representing tknAlias 522 in another token value representing tknMonth 524. The arguments saleMonth and Amount, which are utilized in colXpr 764 of record 903*d*, are column names of tblSales, and 0 is a constant value.

In records 903*d* and 903*e*, col Reuse 520 is represented by an exemplary data value True. This implies that records 903*d* and 903*e* will be utilized for constructing a desired query if utilized on the basis of colUseCnd 518, as many times as specified by the parameter value 162 of prmMthCnt 614. In a case where the parameter value 162 of prmMthCnt 614 is zero, records 903*d* and 903*e* will be utilized only once.

FIG. 9G illustrates an exemplary segment of tblQry 782 (represented as 782*g* because it illustrates a specific exemplary segment of tblQry 782) which shows an exemplary source object identifiable by a data value qryUnion, which represents qryId 732, and is stored in record 904.

In record 904, qryUni 514 is represented by an exemplary token value True, which implies that a desired query, which is constructed by utilizing the exemplary source object qryUnion, will be a union query. Record 904 has two related records illustrated in an exemplary segment of tblQrySrc 784 (represented as 784*g* because it illustrates a specific exemplary segment of tblQrySrc 784). If both the exemplary records of 784*g*, record 904*a* and record 904*b*, are utilized, then the desired query constructed by utilizing the exemplary source object qryUnion will be a union query which will utilize UNION ALL operator.

In record 904*a*, srcReuseId 738 is represented by a data value qrySal, which specifies that the exemplary source object qrySal will be utilized, as a view, whenever the record 904*a* will be utilized for constructing a desired query. A data value, qrySale, which represents srcId 754 of record 904*a*, is an exemplary arbitrary name given to a desired query, which is constructed by utilizing the exemplary source object qrySal.

In record 904*b*, srcReuseId 738 is represented by a data value qryPur, which specifies that the exemplary source object qryPur will be utilized, as a view, whenever record 904*b* will be utilized for constructing a desired query. A data value qryPurchase, which represents srcId 754 of record 904*b*, is an exemplary arbitrary name given to a desired query, which is constructed by utilizing the exemplary source object qryPur.

FIG. 9H illustrates an exemplary segment of tblQry 782 (represented as 782*h* because it illustrates a specific exemplary segment of tblQry 782) which shows an exemplary source object identifiable by a data value qryGroup, hereinafter called the exemplary source object qryGroup, which represents qryId 732, and is in record 905.

In record 905, qryGrp 512 is represented by an exemplary token value True, which implies that the desired query constructed by utilizing the exemplary source object qryGroup will be an aggregate query. Record 905 has one related record illustrated in an exemplary segment of tblQrySrc 784 (represented as 784*h* because it illustrates a specific exemplary segment of tblQrySrc 784), which is represented by record 905*a*.

Record 905*a* has four related records illustrated in an exemplary segment of tblQryFld 786 (represented as 786*h* because it illustrates a specific exemplary segment of tblQryFld 786). In records 905*b* and 905*c*, colGrpFun 766 is represented by a component value "Group" (without quotes), which implies that the columns mentioned by records 905*b* and 905*c* will be utilized in GROUP BY clause of a desired query, which is constructed by utilizing the exemplary source object qryGroup. In records 905*d* and 905*e*, colGrpFun 766 comprises an exemplary component value "SUM" (without quotes), which implies that SUM function will be applied on the columns mentioned by records 905*d* and 905*e* in a desired query which is constructed by utilizing the exemplary source object qryGroup.

FIG. 9I illustrates an exemplary segment of tblQry 782 (represented as 782*i* because it illustrates a specific exemplary segment of tblQry 782) which shows an exemplary source object, identifiable by qryFinal (a data value representing qryId 732), hereinafter called the exemplary source object qryFinal, which is represented in record 906.

Record 906 has five related exemplary records illustrated in an exemplary segment of tblQrySrc 784 (represented as 784*i* because it illustrates a specific exemplary segment of tblQrySrc 784), which are represented by records 906*a*, 906*b*, 906*c*, 906*d*, and 906*e*. The five exemplary records illustrated in 784*i* represent four tables and one view, which may be utilized in a desired query which is constructed by utilizing the exemplary source object qryFinal. In 784*i*, each of records 906*a*, 906*b*, 906*c*, and 906*e* comprises a definition of one table which may be utilized, on the basis of the token value representing srcUseCnd 516 of each respective record and the parameter value 162 of prmUseCnd 622, in a query which is constructed by utilizing the exemplary source object qryFinal. Record 906*d* comprises a definition of a view, specified by "qryGroup" (without quotes), which is a data value representing srcReuseId 738, and which may be utilized, on the basis of the token value representing srcUseCnd 516 of its respective record and the parameter value 162 of prmUseCnd 622, in a desired query which is constructed by utilizing the exemplary source object qryFinal.

FIG. 9J illustrates records of tblQryFld 786 (represented as 786*j* because it illustrates a specific exemplary segment of tblQryFld 786) which are related to record 906*a*, which is illustrated in an exemplary segment of tblQrySrc 784 (represented as 784*j* because it illustrates a specific exemplary segment of tblQrySrc 784). The records illustrated in 786*j* specify columns of tblItems, which is comprised by record 906*a*, which may be utilized for constructing a desired query which is to be constructed by queryBuilder by utilizing the exemplary source object qryFinal.

FIG. 9K illustrates a record of tblQryFld 786 (represented as 786*k* because it illustrates a specific exemplary segment of tblQryFld 786) which is related to record 906*b*, illustrated in an exemplary segment of tblQrySrc 784 (represented as 784*k* because it illustrates a specific exemplary segment of tblQrySrc 784). The record illustrated in 786*k* specifies a column of tblBrands, which is comprised by record 906*b*, which may be utilized for constructing a desired query which is to be constructed by queryBuilder by utilizing the exemplary source object qryFinal.

FIG. 9L illustrates a record of tblQryFld 786 (represented as 786*l* because it illustrates a specific exemplary segment of tblQryFld 786) which is related to record 906*c*, illustrated in an exemplary segment of tblQrySrc 784 (represented as 784*l* because it illustrates a specific exemplary segment of tblQrySrc 784). The record illustrated in 786*l* specifies a column of tblOrigins, which is comprised by record 906*c*, which may be utilized for constructing a desired query which is to be constructed by queryBuilder by utilizing the exemplary source object qryFinal.

FIG. 9M illustrates records of tblQryFld 786 (represented as 786*m* because it illustrates a specific exemplary segment of tblQryFld 786) which are related to record 906*d*, illustrated in an exemplary segment of tblQrySrc 784 (represented as 784*m* because it illustrates a specific exemplary segment of tblQrySrc 784). The records illustrated in 786*m* specify columns of qryGroupSrc, which is comprised by record 906*d*, which may be utilized for constructing a desired query which is to be constructed by queryBuilder by utilizing the exemplary source object qryFinal.

FIG. 9N illustrates a record of tblQryFld 786 (represented as 786*n* because it illustrates a specific exemplary segment of tblQryFld 786) which is related to record 906*e*, illustrated in an exemplary segment of tblQrySrc 784 (represented as 784*n* because it illustrates a specific exemplary segment of tblQrySrc 784). The record illustrated in 786*n* specifies a column of tblZones, which is comprised by record 906*e*, which may be utilized for constructing a desired query which is to be constructed by queryBuilder by utilizing the exemplary source object qryFinal.

FIG. 9O illustrates an exemplary segment of tblQry 782 (represented as 782*o* because it illustrates a specific exemplary segment of tblQry 782) which shows an exemplary source object, identifiable by qryModify (a data value representing qryId 732), hereinafter called the exemplary source object qryModify, which is represented in record 907.

In record 907, qryWhr 752 is represented by an exemplary WHERE clause expression, wherein the exemplary WHERE clause expression is embedded with token values representing tknCurlyBrackets 526, tknItemCodeBegin 528, and tknItemCodeEnd 530. Record 907 has one related exemplary record illustrated in an exemplary segment of tblQrySrc 784 (represented as 784*o* because it illustrates a specific exemplary segment of tblQrySrc 784), which is represented by record 907*a*.

Record 907*a* has ten related records, which are illustrated in an exemplary segment of tblQryFld 786 (represented as 786*o* because it illustrates a specific exemplary segment of tblQryFld 786). In records 907*b* and 907*c*, colUseCnd 518 is represented by an exemplary token value "TknItm" (without quotes), which is utilized to enable the utilization of records 907*b* and 907*c* for constructing a desired query, which is constructed by utilizing the exemplary source object qryModify optionally on the basis of the parameter value 162 of prmUseCnd 622.

FIGS. 10A to 10Z illustrate a few exemplary desired queries constructed by queryBuilder, which is illustrated in FIGS. 8A to 8P, by utilizing one or more source objects, illustrated in FIGS. 9A to 9O. It is to be noted that only a few exemplary queries are illustrated in FIGS. 10A to 10Z. Queries which can be constructed by utilizing different combinations of parameters, which are illustrated in FIG. 6, and source objects, which are illustrated in FIGS. 9A to 9O, can be in the hundreds of thousands, and can be constructed instantly at runtime. In the prior art, the construction of queries in such numbers will require millions of man hours.

FIG. 10A illustrates an exemplary desired query 1012*a* which is constructed by queryBuilder by utilizing the exemplary source object qryA and the parameters specified in FIG. 10A.

FIG. 10B illustrates an exemplary desired query 1012*b* which is constructed by queryBuilder by utilizing the exemplary source object qryA and the parameters specified in FIG. 10B.

FIG. 10C illustrates an exemplary desired query 1012*c* which is constructed by queryBuilder by utilizing the exemplary source object qryA and the parameters specified in FIG. 10C.

FIG. 10D illustrates an exemplary desired query 1012*d* which is constructed by queryBuilder by utilizing the exemplary source object qryA and the parameters specified in FIG. 10D.

FIG. 10E illustrates an exemplary desired query 1012*e* which is constructed by queryBuilder by utilizing the exemplary source object qryPur and the parameters specified in FIG. 10E.

FIG. 10F illustrates an exemplary desired query 1012*f* which is constructed by queryBuilder by utilizing the exemplary source object qryPur and the parameters specified in FIG. 10F.

FIG. 10G illustrates an exemplary desired query 1012*g* which is constructed by queryBuilder by utilizing the exemplary source object qryPur and the parameters specified in FIG. 10G.

FIG. 10H illustrates an exemplary desired query 1012*h* which is constructed by queryBuilder by utilizing the exemplary source object qryFinal and the parameters specified in FIG. 10H.

FIG. 10I illustrates an exemplary desired query 1012*i* which is constructed by queryBuilder by utilizing the exemplary source object qryFinal and the parameters specified in FIG. 10I.

FIG. 10J illustrates an exemplary desired query 1012*j* which is constructed by queryBuilder by utilizing the exemplary source object qryFinal and the parameters specified in FIG. 10J.

FIG. 10K illustrates an exemplary desired query 1012*k* which is constructed by queryBuilder by utilizing the exemplary source object qryFinal and the parameters specified in FIG. 10K.

FIG. 10L illustrates an exemplary desired query 1012*l* which is constructed by queryBuilder by utilizing the exemplary source object qryFinal and the parameters specified in FIG. 10L.

FIG. 10N illustrates an exemplary desired query 1012m which is constructed by queryBuilder by utilizing the exemplary source object qryFinal and the parameters specified in FIG. 10M.

FIG. 10P illustrates an exemplary desired query 1012o which is constructed by queryBuilder by utilizing the exemplary source object qryFinal and the parameters specified in FIG. 10O.

FIG. 10Q illustrates an exemplary desired query 1012q which is constructed by queryBuilder by utilizing the exemplary source object qryModify and the parameters specified in FIG. 10Q.

FIG. 10R illustrates an exemplary desired query 1012r which is constructed by queryBuilder by utilizing the exemplary source object qryModify and the parameters specified in FIG. 10R.

FIG. 10S illustrates an exemplary desired query 1012s which is constructed by queryBuilder by utilizing the exemplary source object qryModify and the parameters specified in FIG. 10S.

FIG. 10T illustrates an exemplary desired query 1012t which is constructed by queryBuilder by utilizing the exemplary source object qryModify and the parameters specified in FIG. 10T.

FIG. 10U illustrates an exemplary desired query 1012u which is constructed by queryBuilder by utilizing the exemplary source object qryModify and the parameters specified in FIG. 10U.

FIG. 10V illustrates an exemplary desired query 1012v which is constructed by queryBuilder by utilizing the exemplary source object qryModify and the parameters specified in FIG. 10V.

FIG. 10X illustrates an exemplary desired query 1012w which is constructed by queryBuilder by utilizing the exemplary source object qryModify and the parameters specified in FIG. 10W.

FIG. 10Z illustrates an exemplary desired query 1012y which is constructed by queryBuilder by utilizing the exemplary source object qryModify and the parameters specified in FIG. 10Y.

12. Concluding Remarks on Embodiments and Drawings

The present invention, although described above with reference to a few embodiments, may be embodied in numerous forms, too many to describe herein, and should not be limited by the above described exemplary embodiments, which are illustrative of the present invention, but not exhaustive. Accordingly, the invention is not to be considered limited to the specific examples and embodiments which have been described for the purpose of disclosure. Many alternatives, modifications, and variations will be apparent to those skilled in the art in the light of the above teaching. Accordingly, the invention is intended to embrace all alternatives, modifications, and variations that fall within the spirit and broad scope of the attached claims.

The embodiments of the invention can be implemented in a computing hardware (computing apparatus) and/or software, which may include, but is not limited to, any computer or machine which can store, retrieve, process and/or output data, and/or communicate with other computers or machines, and any type of software, such as, computing system environment 300 of FIG. 3.

A software/computer program which implements the embodiments may be provided by any computer readable recording media, and may be recorded on any volatile and/or non-volatile memory. The software/computer program which implements the embodiments may also be transmitted over a transmission communication media which may include, but are not limited to, a carrier-wave signal, and an optical signal, etc.

The invention can also be implemented in digital electronic circuitry or in computer hardware, firmware, software and/or in any combinations thereof. The present invention can be implemented in a computer program product tangibly embodied in a machine readable storage device, or a machine for an execution by a programmable processor. The method of the present invention can be performed by a programmable processor executing a program of instructions to perform the functions of the invention.

The attached claims are to be read to include not only the elements or any combinations thereof which have been literally set forth above, but also all possible equivalent elements for effectively performing the same function in practically the same way to obtain substantially the same result. Therefore, the claims are to be understood to include what is specifically illustrated and described above, what is conceptually equivalent, and also what incorporates the essential idea and principles of the invention. The appended claims are intended to cover all such features and advantages of the embodiments, and their equivalents, that fall within the true spirit and scope thereof.

13. A Few Benefits and Commercial Applications of the Invention

The benefits and advantages of this invention are numerous and overwhelming, and can readily be achieved in most computer programs. This invention also has huge commercial potential. Any commercial application based on this invention will have power and functionality well beyond what can be achieved in the prior art. Even existing commercial products and applications, like computer programs, can be made extremely powerful, flexible, dynamic, feature rich and cost effective by utilizing this invention. Utilization of this invention will open new horizons in software development and take it to a new programming paradigm which will be beneficial for software developers as well as software users.

It will be apparent to anyone familiar with the art that this invention can readily be applied/utilized in almost every aspect of software development, particularly in almost any computer program, existing or new.

This invention will enable development of software which can easily develop software components on a user's demand, as and when required.

This invention will greatly simplify and streamline the development of software. Most of the complexities currently faced by software developers will be wiped out. This will lead to another vital advantage: extensive training of human beings for software development will no longer be required. As a result, productivity of human beings will be greatly enhanced, and result in substantial cost savings in terms of finance and time.

The streamlining and simplification of software development achieved under this invention will particularly reduce the time presently required for software development. The time required to develop a software program under this invention will only be a very small fraction of the time required in the prior art. For example:

1. By utilizing this invention, development of database queries can be made so simple and efficient that it can save hundreds of thousands of man hours for even a medium-size computer program.

2. The innovative source object repository of the invention can make software development so simple and easy that even a novice software developer will be able to produce such outstanding results in only a few minutes that, in the prior art, a highly skilled professional software developer could not produce in months.

By utilizing this invention, creating and managing database queries will become extremely efficient and cost effective. Hundreds of thousands of man hours of query writing, query testing, and query debugging can be saved for even one computer program. This will make creating, managing, maintaining, modifying, as well as providing quality assurance of database queries substantially easier than in the prior art. The extraordinary ease in query building will particularly benefit software developers.

The inventive concepts of a source object repository, a software component constructor, reusability, a data token, and a parameter will make it possible to substantially reduce the quantum of queries which, in the prior art, may span hundreds of thousands of query lines. Software development in general, and business intelligence in particular, will greatly benefit from such reduction. A few possibilities under this invention are discussed below:

1. Database queries: This invention can substantially improve creating, testing, and debugging database queries in any database management system and/or any computer program which utilizes database queries.
2. Reporting: Reporting is an important segment of any computer program. Application of this invention to a reporting computer program will enable a computer to generate millions of report layouts, along with respective database queries, from a single source object.
3. Data entry forms: This invention will allow development of data entry forms which can be customized either at runtime and/or according to a user's requirements. It will also become possible to develop business applications which can be utilized and deployed in one or more different industries, across one or more different regions/countries having different laws and environments.
4. Business processing rules: Business processing rules are one of the most significant parts of a computer program. The business processing rules vary greatly from one industry to another, and also from one country to another. For this reason, many computer programs which rely heavily on business processing rules, such as payroll processing, tax calculation, and the like, can only be developed for specific industries and/or regions. This invention makes it possible to develop computer programs that are utilizable in cross industry and in cross region.
5. Software configuration: One of the most time-consuming and resource-hungry phases in software deployment is software configuration according to a user's requirements. Even small business applications take months to deploy. The present invention enables development of computer programs that can be configured and deployed in a fraction of the time required in the prior art.
6. The invention can similarly be applied to a user management system, an error management system, a help system, a user interface, a software wizard, a gaming engine, etc.

This invention can be utilized in almost every type of software program and application. Therefore, it is next to impossible to list all possible applications of the present invention. However, some exemplary commercial applications and usages are mentioned below:

1. Business intelligence based computer programs utilize many software components, such as, a database query, a report layout, a user interface, a user management system, and the like. This invention can be applied to all these components. However, by applying this invention only to database queries and report layouts, the business intelligence computer programs can be made hundreds of times more powerful, intelligent, and economical. The current invention will open up new possibilities in data analysis and reporting which are impossible to achieve, or even conceive, in the prior art.
2. This invention can also be utilized to enhance the productivity and functionality of existing business intelligence computer programs such as CRYSTAL REPORTS, COGNOS, and the like, to a level that is unachievable in the prior art.
3. Given below are a few software application categories which can benefit from the present invention in terms of power, flexibility, dynamism, and cost effectiveness:
    a. Business intelligence.
    b. Database management system.
    c. CRM (Customer Relationship Management) software.
    d. ERP (Enterprise Resource Planning) software.
    e. SCM (Supply Chain Management) software.
    f. GIS (Geographical Information System) software.
    g. DAM (Digital Asset Management) software.
    h. MRP (Material Requirements Planning) software.
    i. SFA (Sales Force Automation) software.
    j. CAE (Computer Aided Engineering) software.
    k. CAD (Computer Aided Design) software.
    l. Hotel management software.
    m. Human resource management software.
    n. Banking software.
    o. Web based applications.
    p. Manufacturing control systems.
    q. Process control systems.

This invention makes it possible for a developed computer program, and its related resources, to be utilized, as many times as may be desired, in another computer program. Anyone familiar with the art will immediately capitalize on this advantage. For example, if a query building engine (which is a software component constructor) is developed on the basis of this invention, it can be utilized in any other computer program. By only porting the query building engine to any other platform, all the queries written by the query building engine can readily be utilized on other platforms.

The innovative software component constructor, which is developed on the basis of this invention, can easily be utilized for constructing billions and trillions of different software components, even from a single source object. This gives software development new potential which is unthinkable in the prior art.

Under this invention, the benefits of reusability and multiplicity of instantly available software components will be readily available for almost all software components, such as, reports, data entry forms, business processing rules, error management systems, knowledge base systems, web portals, computer games, and the like.

This invention makes it possible to develop software components in small pieces and test each piece individually and independently. This possibility enables a software developer to manage a computer in a way that each piece of a software component is developed and tested independently, and then all the pieces of the software component are combined together to work as a single software component. This power is achieved by utilizing the innovative source object repository, data tokens and reusability of one or more component values.

This invention enables creation of software factories which work as real factories thus making software industrialization a reality.

In the prior art, most computer programs are developed in a way that they have to be maintained at a huge cost in terms of time, human effort and financial resources. However, this invention makes maintenance of software so convenient and easy that is unimaginable in the prior art. Moreover, this invention teaches a software developer to develop software in such a manner that maintaining developed software is hassle-free and no more than a minor routine. For example, if a conventionally developed computer program utilizes a couple of hundred queries based on one database table, adding a new column in each database query may require tens of thousands of man hours. But, in a similar computer program which is developed on the basis of this invention, such a change will require only a few minutes.

In the prior art, the ability to develop software which is platform independent has been an ongoing challenge which has not been met effectively. This invention enables this ability to such a level that is unheard of in the prior art. By utilizing this invention, it is possible to develop a software component constructor which can construct software components for a plurality of platforms. For example, a reporting engine, which is a software component constructor, can be developed under this invention that can construct report layouts for CRYSTAL REPORTS, MICROSOFT ACCESS, and many other reporting programs from a single source object.

Software developed by utilizing this invention utilizes the available computing resources efficiently. Storage requirements for a computer program developed on the basis of this invention is substantially smaller than the storage requirements for a similar computer program developed according to the conventions used in the prior art. Moreover, utilization of network bandwidth is also optimized because of the much reduced size of the computer program developed under this invention. Hence, it is extremely efficient to deploy computer programs developed under this invention, in networked and/or web based environments, such as cloud computing, client server architecture, and the like.

Software which is developed on the basis of this invention is also inherently resource efficient in terms of software support to a user. Because of the inherent architecture of such software, it is possible to upgrade and maintain such software very efficiently and at an extremely low cost. The resources required to support computer programs developed by utilizing this invention are only a fraction of the resources required to support similar programs developed in the prior art.

Utilization of this invention for software development will enable optimization for minimizing the software development resources and maximizing the software efficiency, flexibility and/or output, and will enable a user to have: (1) precise control, (2) dynamic change, and/or (3) any combinations thereof, in: (i) the behavior of software, (ii) the outcome of software, (iii) the reusability of program data, (iv) the ease of software development, and/or (v) any combinations thereof; and all of the above, especially: (a) at runtime and/or (b) by utilization of one or more control parameters.

Software developed on the basis of this invention also gives unmatched runtime power, flexibility, and dynamism to a user. Utilization of a source object repository, a data token, and a parameter enables developed software to also work as an intelligent component constructor which can instantly construct a software component on the basis of a user's desire at runtime; indeed, the user may utilize the developed software according to the ever-changing and growing business requirements. For example, it is possible, under this invention, to develop a reporting system which can produce almost any conceivable data combination instantly on a user's demand. Such possibilities are inconceivable in the prior art.

By utilizing this invention, it is possible to create computer programs which can cater to almost any future requirement, only by either changing one or more parameters, or by adding new component values, data tokens and/or parameters, as may be pertinent for any new/future requirement.

Since any software, developed on the basis of this invention, is very easy to maintain, it is possible to extend the life cycle of developed software by many years.

In a nutshell, this invention is a unique and breakthrough development. It will provide total flexibility and dynamism to a software developer and user in software development, especially at runtime. Moreover, this invention will cater to the complex and massive demands on software, precipitated by the exponential growth of computing power, accounting for both the current and future requirements. Indeed, the invention is unique in its nature and scope, and no similar prior art exists in this regard.

What is claimed is:

1. A non-transitory computer readable recording medium that stores instructions which when executed by a computer including a computer processor generate a software source code based upon a set of predetermined rules of the software source code according to a user's input of a parameter value, the set of predetermined rules comprises a source code component of the software source code, which source code component is represented by a component value, by performing:
   using a stored data token created along with a set of data token rules that specify a manner by which a value for the data token as token value is creatable, a manner in which the token value is associated to a component value representing a source code component in the software source code;
   using a stored source object which comprises a component value which represents an indeterminable source code component of the software source code, and a token value which is associated to the component value, wherein the indeterminable source code component is a source code component in the set of predetermined rules of the software source code for which the component value is not determined by utilizing computer implementable logic by being determined by a user when generating the software source code; and
   generating the software source code by determining a place where a computer implemented logic is applied, and a manner by which the token value is processed by utilization of the parameter to retrieve, from the source object, the token value of the data token and the component value for the indeterminable source code component, for obtaining a token result, thereby generating the software source code by utilizing the parameter value, the component value of the indeterminable source code component, a component value of a determinable source code component determined by the computer implemented logic, and the token result.

2. The non-transitory computer readable recording medium according to claim 1, wherein the token value is utilized without any processing, for constructing the source code.

3. The non-transitory computer readable recording medium according to claim 1, wherein processing of the token value comprises executing a set of instructions which are executable by the computer processor.

4. One or more non-transitory computer readable recording media storing computer executable instructions for controlling a computer to execute operations for performing the method detailed in claim 1.

5. A computer system comprising a client computer, a server computer in communication with the client computer and comprising a computer processor and a non-transitory computer readable recording memory coupled to the computer processor and comprising such computer processor executable instructions which, when executed, cause the computer processor to implement the method as detailed in claim 1.

6. An apparatus comprising a non-transitory computer readable recording medium comprising instructions that, when executed by a computing device, cause the computing device to perform the method described in claim 1.

7. A method of generating, by a computer processor, a software source code based upon a set of predetermined rules of the software source code, wherein the set of predetermined rules comprises a source code component of the software source code, which source code component is represented by a component value, the method comprising:
   a. creating a source object repository, comprising:
      i. categorizing the source code component into an indeterminable source code component or a determinable source code component, wherein the indeterminable source code component is a source code component in the set of predetermined rules of the software source code for which the component value is not determined by utilizing computer implementable logic by being determined by a user when generating the software source code,
      ii. defining a data token along with a set of data token rules, wherein the data token is represented by a token value,
      iii. defining a parameter, wherein the parameter is represented by a parameter value,
      iv. creating a data model on basis of the set of predetermined rules of the software source code and by utilizing the indeterminable source code component and the data token, wherein the data model is sufficient for storing a source object, wherein the source object comprises the component value and the token value, and
      v. creating, by the computer processor, the source object repository on basis of the data model by creating a source object, which comprises a component value and a token value, by associating the token value with the component value in accordance with the set of data token rules;
   b. creating a source code generator, wherein the source code generator is created based upon the source object repository, the set of predetermined rules of the software source code, the parameter, and the data token; and
   c. executing, by the computer processor, the source code generator which generates a desired source code according to a user's input of the parameter by utilizing the source object and the parameter value to generate the desired source code.

8. The method according to claim 7, wherein the data token is not utilized for creating the data model.

9. The method according to claim 7, wherein the parameter is utilized for creating the data model.

10. The method according to claim 7, wherein a token result is obtained by processing the token value and the token result is utilized for generating the desired source code.

11. The method according to claim 7, wherein the token value is obtained by utilizing the parameter value.

12. The method according to claim 7, wherein the component value is obtained by utilizing the parameter value.

13. The method according to claim 7, wherein the source object does not comprise the token value.

14. The method according to claim 7, wherein the source object does not comprise the component value.

15. The method according to claim 7, wherein the source code generator is integrated with a computer program.

16. One or more non-transitory computer readable recording media storing computer executable instructions for controlling a computer to execute operations for performing the method detailed in claim 7.

17. A computer system comprising a client computer, a server computer in communication with the client computer and comprising a computer processor and a non-transitory computer readable recording memory coupled to the computer processor and comprising such computer processor executable instructions which, when executed, cause the computer processor to implement the method as detailed in claim 7.

18. An apparatus comprising a non-transitory computer readable recording medium comprising instructions that, when executed by a computing device, cause the computing device to perform the method described in claim 7.

19. A non-transitory computer readable recording medium that stores instructions which when executed by a computing device generate a software source code based upon a set of predetermined rules of the software source code according to a user's input of a parameter value, the set of predetermined rules comprises a source code component of the software source code, which source code component is represented by a component value, by performing:
   a. identifying a source object,
   b. retrieving the source object from a source object repository, the source object repository created in accordance with:
      i. categorization of the source code component into an indeterminable source code component or a determinable source code component, wherein the indeterminable source code component is a source code component in the set of predetermined rules of the software source code for which the component value is not determined by utilizing computer implementable logic by being determined by a user when generating the software source code,
      ii. definition of a data token along with a set of data token rules, wherein the data token is represented by a token value,
      iii. definition of a parameter, wherein the parameter is represented by a parameter value, and
      iv. creation of a data model on basis of the set of predetermined rules of the software source code and by utilizing the indeterminable source code component and the data token, wherein the data model is sufficient for storing a source object, wherein the source object comprises the component value and the token value;
   c. retrieving a component value of an indeterminable source code component from the source object, wherein the indeterminable source code component is a source code component in a set of predetermined rules of the software source code for which the component value is not determined by utilizing computer implementable logic by being determined by a user when generating the source code,
d. processing a token value for obtaining a token result, and
e. constructing the source code on the basis of the set of predetermined rules of the source code and by utilizing the parameter value, the component value of the indeterminable source code component, a component value of a determinable source code component, and the token result.

20. The non-transitory computer readable recording medium according to claim 19, wherein the token value is not processed.

21. The non-transitory computer readable recording medium according to claim 19, wherein the token value is utilized for constructing the source code.

22. The non-transitory computer readable recording medium according to claim 19, wherein the token result is not utilized for constructing the source code.

23. The non-transitory computer readable recording medium according to claim 19, wherein the parameter value is not utilized for constructing the source code.

24. The non-transitory computer readable recording medium according to claim 19, wherein the component value of the indeterminable source code component is not utilized for constructing the source code.

25. The non-transitory computer readable recording medium according to claim 19, wherein the component value of the determinable source component is not utilized for constructing the source code.

26. The non-transitory computer readable recording medium according to claim 19, wherein the token value is processed by utilizing the parameter value.

27. A method by a computer processor for creating a data token for constructing source code by a source code generator, which is a computer program, on basis of a set of predetermined rules which specify a manner in which one or more source code components are put together for constructing the source code, and by utilizing a token result produced by processing of the data token and a component value representing a source code component in the source code, the method comprising:
creating a set of data token rules which specify a manner in which:
a token value, which is a representation of the data token, is creatable,
the token value of the data token is associable to the component value to enable the source code generator to determine a place where a computer implemented logic needs to be applied, and
the token value of the data token processable by utilizing a parameter for producing a token result which is utilizable by the source code generator for constructing the source code;
the component value is identifiable in a source object repository with reference to a source object and to an indeterminable source code component, the indeterminable source code component is a source code component in the set of predetermined rules of the source code for which the component value is not determined by utilizing computer implementable logic by being determined by a user when generating the source code; and
creating, by the computer processor, a token value for the data token by utilizing the set of data token rules,
thereby the created data token associable to the component value of the source code component and storable in a source object repository is utilizable by the source code generator for constructing the source code.

28. The method according to claim 27, wherein utilization of a token result determines that a component value is not to be utilized for constructing the source code.

29. The method according to claim 27, wherein utilization of a token result determines one or more of:
a component value is to be changed, and the changed component value is to be utilized for constructing the source code,
a component value is to be utilized for creating another component value, and the another created component value is to be utilized for constructing the source code, or
a combination thereof.

30. The method according to claim 27, wherein the token value of the data token is embedded in the component value.

31. A method by a computer processor for creating a source object repository for storing a source object which comprises a data value, a component value which represents an indeterminable source code component of a source code, and a token value which is associated to the component value, wherein the source object is utilized by a source code generator for constructing a source code on basis of a set of predetermined rules, the method by the computer processor comprises:
creating a data model for creating the source object repository to store a source object in a manner that:
the source object is identifiable and retrievable from the source object repository by utilizing the data value,
the component value is identifiable in the source object repository with reference to the source object and to a indeterminable source code component, wherein the indeterminable source code component is a source code component in the set of predetermined rules of the source code for which the component value is not determined by utilizing computer implementable logic by being determined by a user when generating the source code, and
the token value of a data token, created on basis of a set of data token rules, is associable to the component value as specified by the set of data token rules; and
creating a data structure as the source object repository on basis of the data model, thereby enabling the source code generator to construct the source code by utilizing the created source object repository.

32. The method according to claim 31, wherein the source object comprises a plurality of component values and a plurality of data values, wherein the plurality of data values are utilized for maintaining a desired relationship among the plurality of component values.

33. The method according to claim 31, wherein the source object comprises a plurality of component values and a plurality of data values, wherein the plurality of data values are utilized for maintaining a desired order among the plurality of component values.

34. The method according to claim 31, wherein the data value refers to another component value which is stored in one or more of:
the source object,
another source object, or
a combination thereof.

35. A method by a computer processor for constructing source code which comprises one or more source code components which are put together on basis of a set of predetermined rules, wherein the source code component is represented by a component value, the method comprising:
creating a data token, creating, by the computer processor, a source object repository, creating a source code generator, wherein the source code generator is a computer program which constructs the source code on basis of the set of predetermined rules and by utilizing a data token, wherein the data token is processed on basis of the set of data token rules, creating a source object, wherein the source object comprises a data value, a component value which represents an indeterminable source code component, and a token value, wherein the token value of the data token is associated with the component value, and wherein the source object is stored in the source object repository, the indeterminable source code component is a source code component in the set of predetermined rules of the source code for which the component value is not determined by utilizing computer implementable logic by being determined by a user when generating the source code, and executing, by the computer processor, the source code generator for constructing the source code, wherein the source code generator constructs the source code on basis of the set of predetermined rules and by utilizing a token result and a component value, wherein the token result is obtained by processing the token value of the data token, wherein the source code generator utilizes a parameter for processing the token value of the data token to produce the token result by retrieving the token value of the data token and the component value from the source object, wherein the source code generator retrieves the source object from the source object repository by utilizing the data value.

36. The method according to claim 35, wherein the utilization of the token result by the source code generator determines whether the component value is to be utilized for constructing the source code.

37. The method according to claim 35, wherein the utilization of the token result determines one or more of:
- a component value is to be changed, and the changed component value is to be utilized for constructing the source code,
- another component value is to be created, and the another created component value is to be utilized for constructing the source code, or
- a combination thereof.

38. The method according to claim 35, wherein the token value of the data token is embedded in the component value.

39. One or more non-transitory computer readable recording media storing computer executable instructions for controlling a computer processor to execute the method performed by the computer processor in any of claim 27, 31, or 35.

40. A computer system comprising a client computer, a server computer configured to communicate with the client computer and comprising a computer processor and a non-transitory computer readable recording memory coupled to the computer processor and comprising such computer processor executable instructions which, when executed, cause the computer processor to implement the method performed by the computer processor in any of claim 27, 31, or 35.

41. A computer comprising a non-transitory computer readable recording medium comprising instructions that, when executed by the computer, cause the computer to perform the method performed by the computer processor in any of claims 27, 31, or 35.

* * * * *